US011625019B2

(12) United States Patent
Berman et al.

(10) Patent No.: US 11,625,019 B2
(45) Date of Patent: Apr. 11, 2023

(54) COMPUTERIZED TOOL PATH GENERATION

(71) Applicant: SOLIDCAM LTD., Or Yehuda (IL)

(72) Inventors: Michael Berman, Kfar Yona (IL); Doron Osovlanski, Givat Shmuel (IL); Christopher Matthew Calderone, Levittown, PA (US); Anthony Joseph Calderone, Yardley, PA (US)

(73) Assignee: SOLIDCAM LTD., Or Yehuda (IL)

( * ) Notice: Subject to any disclaimer, the term of this patent is extended or adjusted under 35 U.S.C. 154(b) by 63 days.

(21) Appl. No.: 16/807,688

(22) Filed: Mar. 3, 2020

(65) Prior Publication Data

US 2020/0257260 A1 Aug. 13, 2020

Related U.S. Application Data

(60) Continuation of application No. 15/598,749, filed on May 18, 2017, now Pat. No. 10,620,607, which is a
(Continued)

(51) Int. Cl.
*G05B 19/18* (2006.01)
*G05B 19/4093* (2006.01)

(52) U.S. Cl.
CPC ......... *G05B 19/18* (2013.01); *G05B 19/4093* (2013.01); *G05B 2219/35097* (2013.01);
(Continued)

(58) Field of Classification Search
None
See application file for complete search history.

(56) References Cited

U.S. PATENT DOCUMENTS

| 3,784,798 A | 1/1974 | Beadle et al. |
| 4,200,015 A | 4/1980 | Gerber |

(Continued)

FOREIGN PATENT DOCUMENTS

| CN | 101444811 | 6/2009 |
| CN | 101813930 | 8/2010 |

(Continued)

OTHER PUBLICATIONS

Notice of Allowance dated Sep. 16, 2020, which issued during the prosecution of U.S. Appl. No. 16/385,640.
(Continued)

*Primary Examiner* — Jason Lin
(74) *Attorney, Agent, or Firm* — Sughrue Mion, PLLC

(57) ABSTRACT

An automated computer-implemented method for generating commands for controlling a computer numerically controlled milling machine to fabricate a machined object from a workpiece, the machined object being configured to facilitate subsequent finishing into a finished object, the method including defining a surface of the finished object, defining an offset surface defining an inner limiting surface of the machined object, defining a scallop surface defining an outer limiting surface of the machined object and calculating a tool path for the milling machine which produces multiple step-up cuts in the workpiece resulting in the machined object, wherein surfaces of the machined object all lie between the inner limiting surface and the outer limiting surface and the number of step-up cuts in the workpiece and the areas cut in each of the step-up cuts are selected to generally minimize the amount of workpiece material that is removed from the workpiece.

8 Claims, 86 Drawing Sheets

Related U.S. Application Data division of application No. 14/013,704, filed on Aug. 29, 2013, now Pat. No. 9,690,282, which is a continuation-in-part of application No. 13/916,918, filed on Jun. 13, 2013, now Pat. No. 9,052,704, which is a division of application No. 13/036,726, filed on Feb. 28, 2011, now Pat. No. 8,489,224.

(52) U.S. Cl.
CPC .............. *G05B 2219/35106* (2013.01); *G05B 2219/35215* (2013.01); *Y02P 90/02* (2015.11)

(56) References Cited

U.S. PATENT DOCUMENTS

| | | | |
|---|---|---|---|
| 4,531,192 A | 7/1985 | Cook | |
| 4,542,328 A | 9/1985 | Pouyet | |
| 4,605,886 A | 8/1986 | Inoue | |
| 4,608,476 A | 8/1986 | Shimizu | |
| 4,618,924 A | 10/1986 | Hinds | |
| 4,745,558 A | 5/1988 | Kishi et al. | |
| 4,785,153 A | 11/1988 | Stimmel | |
| 4,833,617 A | 5/1989 | Wang | |
| 4,837,703 A | 6/1989 | Kakazu et al. | |
| 4,870,561 A | 9/1989 | Love et al. | |
| 4,907,164 A | 3/1990 | Guyder | |
| 4,985,840 A | 1/1991 | Shinozaki | |
| 5,003,484 A | 3/1991 | Vollmayr | |
| 5,043,906 A | 8/1991 | Jepson | |
| 5,087,159 A | 2/1992 | Thomas | |
| 5,091,861 A | 2/1992 | Geller | |
| 5,128,870 A | 7/1992 | Erdman et al. | |
| 5,170,358 A | 12/1992 | Delio | |
| 5,251,143 A | 10/1993 | Maeda | |
| 5,297,022 A | 3/1994 | Watanabe | |
| 5,351,196 A | 9/1994 | Sowar et al. | |
| 5,363,308 A | 11/1994 | Guyder | |
| 5,406,494 A * | 4/1995 | Schuett | G05B 19/41 700/188 |
| 5,432,704 A | 7/1995 | Vouzelaud et al. | |
| 5,515,290 A | 5/1996 | Honda | |
| 5,526,272 A | 6/1996 | Kondo | |
| 5,565,749 A | 10/1996 | Jinno | |
| 5,596,504 A | 1/1997 | Tata | |
| 5,602,748 A | 2/1997 | Seki et al. | |
| 5,703,782 A | 12/1997 | Dundorf | |
| 5,727,912 A | 3/1998 | Rubashkin et al. | |
| 5,768,136 A | 6/1998 | Fujiwara | |
| 5,796,618 A | 8/1998 | Maeda et al. | |
| 5,808,263 A | 9/1998 | Beltrami | |
| 5,815,400 A * | 9/1998 | Hirai | G05B 19/401 700/173 |
| 5,847,958 A * | 12/1998 | Shaikh | G16Z 99/00 700/119 |
| 6,007,280 A | 12/1999 | Asahi | |
| 6,065,858 A | 5/2000 | Yamaguchi et al. | |
| 6,077,002 A * | 6/2000 | Lowe | B23C 3/18 416/223 A |
| 6,112,133 A | 8/2000 | Fishman | |
| 6,266,572 B1 | 7/2001 | Yamazaki et al. | |
| 6,311,100 B1 | 10/2001 | Sarma | |
| 6,363,298 B1 | 3/2002 | Shin et al. | |
| 6,421,724 B1 | 7/2002 | Nickerson et al. | |
| 6,428,252 B1 * | 8/2002 | Oldani | B23C 3/00 318/570 |
| 6,447,223 B1 | 9/2002 | Farah et al. | |
| 6,535,788 B1 * | 3/2003 | Yoshida | G06Q 30/0283 700/36 |
| 6,591,156 B1 | 7/2003 | Fukaya | |
| 6,591,158 B1 * | 7/2003 | Bieterman | G05B 19/41 700/169 |
| 6,606,581 B1 | 8/2003 | Nickerson et al. | |
| 6,772,039 B2 * | 8/2004 | Kakino | G05B 19/4163 700/86 |
| 6,785,717 B1 | 8/2004 | Nickerson et al. | |
| 6,928,392 B2 | 8/2005 | Nickerson et al. | |
| 7,012,395 B2 | 3/2006 | Haunerdinger et al. | |
| 7,085,820 B1 | 8/2006 | Nickerson et al. | |
| 7,149,599 B2 | 12/2006 | Arai | |
| 7,237,989 B2 | 7/2007 | Glaesser | |
| 7,269,471 B2 | 9/2007 | Kadono | |
| 7,269,741 B2 | 9/2007 | Matsui et al. | |
| 7,370,285 B1 | 5/2008 | Nickerson et al. | |
| 7,441,484 B1 * | 10/2008 | Larsen | B23B 25/02 82/158 |
| 7,450,127 B2 | 11/2008 | Hong | |
| 7,451,013 B2 | 11/2008 | Coleman et al. | |
| 7,478,121 B1 | 1/2009 | Nickerson et al. | |
| 7,577,490 B2 | 8/2009 | Diehl et al. | |
| 7,693,588 B2 | 4/2010 | Hong | |
| 7,831,332 B2 | 11/2010 | Diehl | |
| 8,000,834 B2 | 8/2011 | Diehl | |
| 8,011,864 B2 | 9/2011 | Olgac | |
| 8,014,893 B2 * | 9/2011 | Miki | B23Q 15/013 700/193 |
| 8,489,224 B2 | 7/2013 | Berman | |
| 8,880,212 B2 | 11/2014 | Coleman et al. | |
| 9,052,704 B2 | 6/2015 | Berman et al. | |
| 9,292,626 B2 | 3/2016 | Nelaturi et al. | |
| 9,690,282 B2 | 6/2017 | Berman et al. | |
| 9,709,974 B2 | 7/2017 | Jiang | |
| 9,823,645 B2 | 11/2017 | Berman et al. | |
| 10,324,445 B2 | 6/2019 | Berman et al. | |
| 10,416,648 B2 | 9/2019 | Berman | |
| 10,620,607 B2 | 4/2020 | Berman et al. | |
| 2002/0146296 A1 | 10/2002 | Schmitz et al. | |
| 2002/0161469 A1 | 10/2002 | Faulkner et al. | |
| 2003/0040834 A1 | 2/2003 | Coleman et al. | |
| 2005/0154693 A1 | 7/2005 | Ebert | |
| 2005/0256604 A1 * | 11/2005 | Diehl | G05B 19/40937 700/159 |
| 2006/0074515 A1 | 4/2006 | Dixon | |
| 2006/0140734 A1 | 6/2006 | Glaesser | |
| 2007/0088455 A1 | 4/2007 | Fraunhofer | |
| 2007/0179661 A1 | 8/2007 | Onozuka et al. | |
| 2008/0092060 A1 | 4/2008 | Berg et al. | |
| 2008/0269943 A1 | 10/2008 | Diehl et al. | |
| 2009/0036280 A1 * | 2/2009 | Yazaki | G05B 19/182 483/30 |
| 2010/0087949 A1 | 4/2010 | Coleman et al. | |
| 2010/0191359 A1 | 7/2010 | Diehl et al. | |
| 2011/0178629 A1 | 7/2011 | Diehl | |
| 2012/0093603 A1 | 4/2012 | Ueno | |
| 2012/0221140 A1 | 8/2012 | Berman | |
| 2013/0046405 A1 | 2/2013 | Shamoto | |
| 2013/0144426 A1 | 6/2013 | Coleman et al. | |
| 2013/0151000 A1 | 6/2013 | Mackman | |
| 2013/0262066 A1 | 10/2013 | Erdim et al. | |
| 2013/0272812 A1 | 10/2013 | Hamada et al. | |
| 2013/0282161 A1 | 10/2013 | Berman et al. | |
| 2013/0345853 A1 | 12/2013 | Berman et al. | |
| 2014/0202293 A1 | 7/2014 | Van Handel et al. | |
| 2014/0364991 A1 | 12/2014 | Lee et al. | |
| 2015/0293520 A1 | 10/2015 | Berman et al. | |
| 2015/0306720 A1 | 10/2015 | Ono | |
| 2016/0161936 A1 | 6/2016 | Lee et al. | |
| 2016/0288285 A1 | 10/2016 | Piner et al. | |
| 2017/0315532 A1 | 11/2017 | Berman et al. | |
| 2018/0052439 A1 | 2/2018 | Chen et al. | |
| 2018/0095445 A1 | 4/2018 | Berman et al. | |
| 2018/0203432 A1 | 7/2018 | Walker et al. | |
| 2018/0292804 A1 | 10/2018 | Berman | |
| 2019/0243331 A1 | 8/2019 | Berman et al. | |
| 2019/0354078 A1 | 11/2019 | Berman | |

FOREIGN PATENT DOCUMENTS

| | | |
|---|---|---|
| CN | 101893873 | 11/2010 |
| CN | 103492964 | 1/2014 |
| DE | 3804743 | 8/1989 |
| EP | 3039496 | 11/2017 |
| EP | 2681683 | 4/2020 |

(56) References Cited

FOREIGN PATENT DOCUMENTS

| | | |
|---|---|---|
| GB | 2494250 | 3/2013 |
| JP | 1988-127853 | 5/1988 |
| JP | 1996-66844 | 3/1996 |
| JP | 1997-216127 | 8/1997 |
| JP | 1998-124126 | 5/1998 |
| JP | 2002-014711 | 1/2002 |
| JP | 2002-023814 | 1/2002 |
| JP | 2002-132315 | 5/2002 |
| JP | 2003-108207 | 4/2003 |
| JP | 2004-058183 | 2/2004 |
| JP | 2004-362270 | 12/2004 |
| JP | 2005-205517 | 8/2005 |
| JP | 2006-127213 | 5/2006 |
| JP | 2007-109088 | 4/2007 |
| JP | 2010-003018 | 1/2010 |
| JP | 2012-096301 | 5/2012 |
| KR | 1019970005523 | 2/1997 |
| WO | 2011/004368 | 1/2011 |
| WO | 2012/117391 | 9/2012 |
| WO | 2015/029034 | 3/2015 |
| WO | 2018/173030 | 9/2018 |

OTHER PUBLICATIONS

An Office Action dated Oct. 28, 2020, which issued during the prosecution of Indian Patent Application No. 201617007947.
An International Search Report and a Written Opinion both dated Jul. 17, 2012, which issued during the prosecution of Applicant's PCT/IL2012/000087.
Marinac. Toll Path Strategeis for high Speed Machining. Modern Machine Shop. (Feb. 15, 2000) [retrieved on Jul. 9, 2012], Retrieved from the internet: <URL: http://www.mmsonline.com/articles/tool-path-strategeis-for-high-Speed-machining>.
An International Search Report and a Written Opinion both dated Nov. 3, 2010, which issued during the prosecution of Applicant's PCT/IL10/00543.
A Restriction Requirement dated Oct. 18, 2012, which issued during the prosecution of U.S. Appl. No. 13/036,726.
An Office Action dated Jan. 2, 2013, which issued during the prosecution of U.S. Appl. No. 13/036,726.
A Notice of Allowance dated May 1, 2013, which issued during the prosecution of U.S. Appl. No. 13/036,726.
Feng, Hsi-Yung, and Huiwen Li. "Constant scallop-height tool path generation for three-axis sculptured surface machining." Computer-Aided Design 34.9 (2002): 647-654.
An International Preliminary Report on Patentability dated Sep. 3, 2013, which issued during the prosecution of Applicant's PCT/IL2012/000087.
Search Report dated Nov. 3, 2014 which issued during the prosecution of Applicant's Singaporean App No. 201306455-5.
An Office Action dated Sep. 7, 2017, which issued during the prosecution of Applicant's Australian App No. 2014313756.
Koren, Y., and R. Lin. "Efficient tool-path planning for machining free-form surfaces." Ann Arbor 1050 (1996): 48109-2125.
Yang, D. C. H. and Suresh K "Constant scallop-height machining of free-form surfaces." Journal of engineering for industry 116 (1994): 253.
Supplementary European Search Report dated Dec. 12, 2014 which issued during the prosecution of Applicant's European App No. 12752319.9.
An International Search Report and a Written Opinion both dated Mar. 11, 2015, which issued during the prosecution of Applicant's PCT/IL14/050772.
European Search Report dated Apr. 3, 2017, which issued during the prosecution of Applicant's European App No. 14841078.0.
Notice of Allowance dated Feb. 22, 2017, which issued during the prosecution of U.S. Appl. No. 14/013,704.
Notice of Allowance dated Apr. 28, 2017, which issued during the prosecution of U.S. Appl. No. 14/013,704.

An Office Action dated Aug. 5, 2014, which issued during the prosecution of U.S. Appl. No. 13/916,918.
An Office Action dated May 2, 2014, which issued during the prosecution of U.S. Appl. No. 13/916,918.
Notice of Allowace dated May 13, 2015, which issued during the prosecution of U.S. Appl. No. 13/916,918.
Notice of Allowance dated Feb. 4, 2015, which issued during the prosecution of U.S. Appl. No. 13/916,918.
An Office Action together with the English translation dated Mar. 31, 2015, which issued during the prosecution of Chinese Patent Application No. 201280020643.1.
Ibaraki S et al: "On the removal of critical cutting regions by trochoidal grooving", Precision Engineering, Elsevier, Amsterdam, NL, vol. 34, No. 3, Jul. 1, 2010 (Jul. 1, 2010), pp. 467-473.
Elber G et al: Mathsm: medial axis transform toward high speed machining of pockets 11 Computerised Design, Elsevier Publishers BV., Barking, GB, vol. 37, No. 2, Feb. 1, 2005 (Feb. 1, 2005), pp. 241-250.
An International Search Report and a Written Opinion both dated Jun. 26, 2017, which issued during the prosecution of Applicant's PCT/IL2017/050345.
An English translation of an Office Action dated Feb. 23, 2016, which issued during the prosecution of Japanese Patent Application No. 2013-555990.
An English translation of an Office Action dated Jan. 31, 2017, which issued during the prosecution of Japanese Patent Application No. 2013-555990.
An Office Action dated Aug. 11, 2017, which issued during the prosecution of Applicant's Australian Application No. 2012222895.
An Office Action dated Aug. 8, 2016, which issued during the prosecution of U.S. Appl. No. 14/013,704.
An Office Action dated Jun. 8, 2016, which issued during the prosecution of U.S. Appl. No. 14/013,704.
An Office Action dated Jan. 20, 2016, which issued during the prosecution of U.S. Appl. No. 14/013,704.
An Office Action dated May 5, 2015, which issued during the prosecution of Applicant's Singaporean App No. 201306455-5.
An Office Action dated Apr. 3, 2017, which issued during the prosecution of U.S. Appl. No. 14/700,881.
Notice of Allowance dated Sep. 12, 2017, which issued during the prosecution of U.S. Appl. No. 14/700,881.
Notice of Allowance dated Aug. 30, 2017, which issued during the prosecution of U.S. Appl. No. 14/700,881.
An International Preliminary Report on Patentability dated Mar. 1, 2016, which issued during the prosecution of Applicant's PCT/IL2014/050772.
An Office Action dated Jan. 14, 2019, which issued during the prosecution of Chinese Patent Application No. 201480053585.1.
An Office Action dated Aug. 20, 2018, which issued during the prosecution of Applicant's Australian App No. 2014313756.
An English translation of a Notice of Allowance dated May 1, 2018, which issued during the prosecution of Korean Patent Application No. 10-2013-7025618.
An Office Action dated May 30, 2018, which issued during the prosecution of Chinese Patent Application No. 201480053585.1.
Notice of Allowance dated Apr. 3, 2018, which issued during the prosecution of Japanese Patent Application No. 2016-537599.
European Search Report dated Dec. 5, 2018 which issued during the prosecution of Applicant's European App No. 12752319.9.
An Office Action dated Nov. 2, 2018, which issued during the prosecution of U.S. Appl. No. 15/525,514.
An Office Action dated Feb. 7, 2019, which issued during the prosecution of U.S. Appl. No. 15/598,749.
An English translation of an Office Action dated May 7, 2019, which issued during the prosecution of Japanese Patent Application No. 2018-016226.
Notice of Allowance dated Feb. 4, 2019, which issued during the prosecution of U.S. Appl. No. 15/729,230.
An Advisory Action dated Oct. 22, 2019, which issued during the prosecution of U.S. Appl. No. 15/598,749.
An Office Action dated Jul. 5, 2019, which issued during the prosecution of U.S. Appl. No. 15/598,749.

(56) References Cited

OTHER PUBLICATIONS

An Office Action dated Jun. 18, 2018, which issued during the prosecution of Canadian Patent Application No. 2,828,372.
An Office Action dated Mar. 26, 2019, which issued during the prosecution of Canadian Patent Application No. 2,828,372.
An Office Action dated Nov. 20, 2017, which issued during the prosecution of Canadian Patent Application No. 2,828,372.
An English translation of an Office Action dated Nov. 20, 2017, which issued during the prosecution of Korean Patent Application No. 10-2013-7025618.
Notice of Allowance dated Feb. 28, 2019, which issued during the prosecution of U.S. Appl. No. 15/729,230.
Notice of Allowance dated Apr. 25, 2019, which issued during the prosecution of U.S. Appl. No. 15/729,230.
An Examination Report dated Oct. 1, 2019, which issued during the prosecution of India Patent Application No. 8280/DELNP/2013.
An Office Action dated Mar. 10, 2020, which issued during the prosecution of Canadian Patent Application No. 2,828,372.
An Office Action dated Apr. 27, 2020, which issued during the prosecution of Canadian Patent Application No. 2,921,748.
Notice of Allowance dated Nov. 25, 2019, which issued during the prosecution of U.S. Appl. No. 15/598,749.
Notice of Allowance dated Jan. 31, 2020, which issued during the prosecution of U.S. Appl. No. 15/598,749.
Notice of Allowance dated May 31, 2019, which issued during the prosecution of U.S. Appl. No. 15/525,514.
An International Preliminary Report on Patentability dated Sep. 24, 2019, which issued during the prosecution of Applicant's PCT/IL2017/050345.
An Office Action dated May 12, 2016, which issued during the prosecution of Applicant's Australian Application No. 2012222895.

* cited by examiner

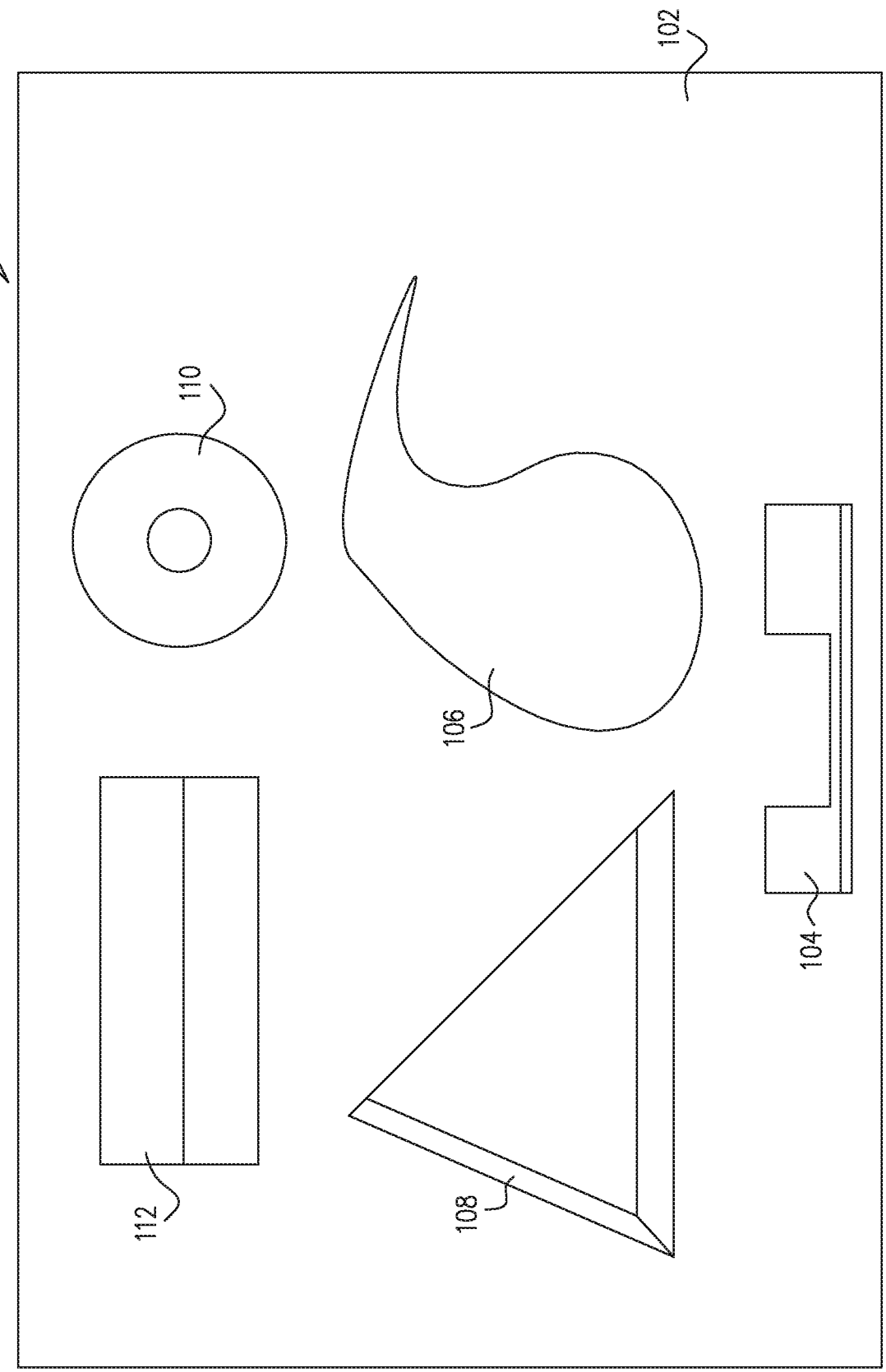

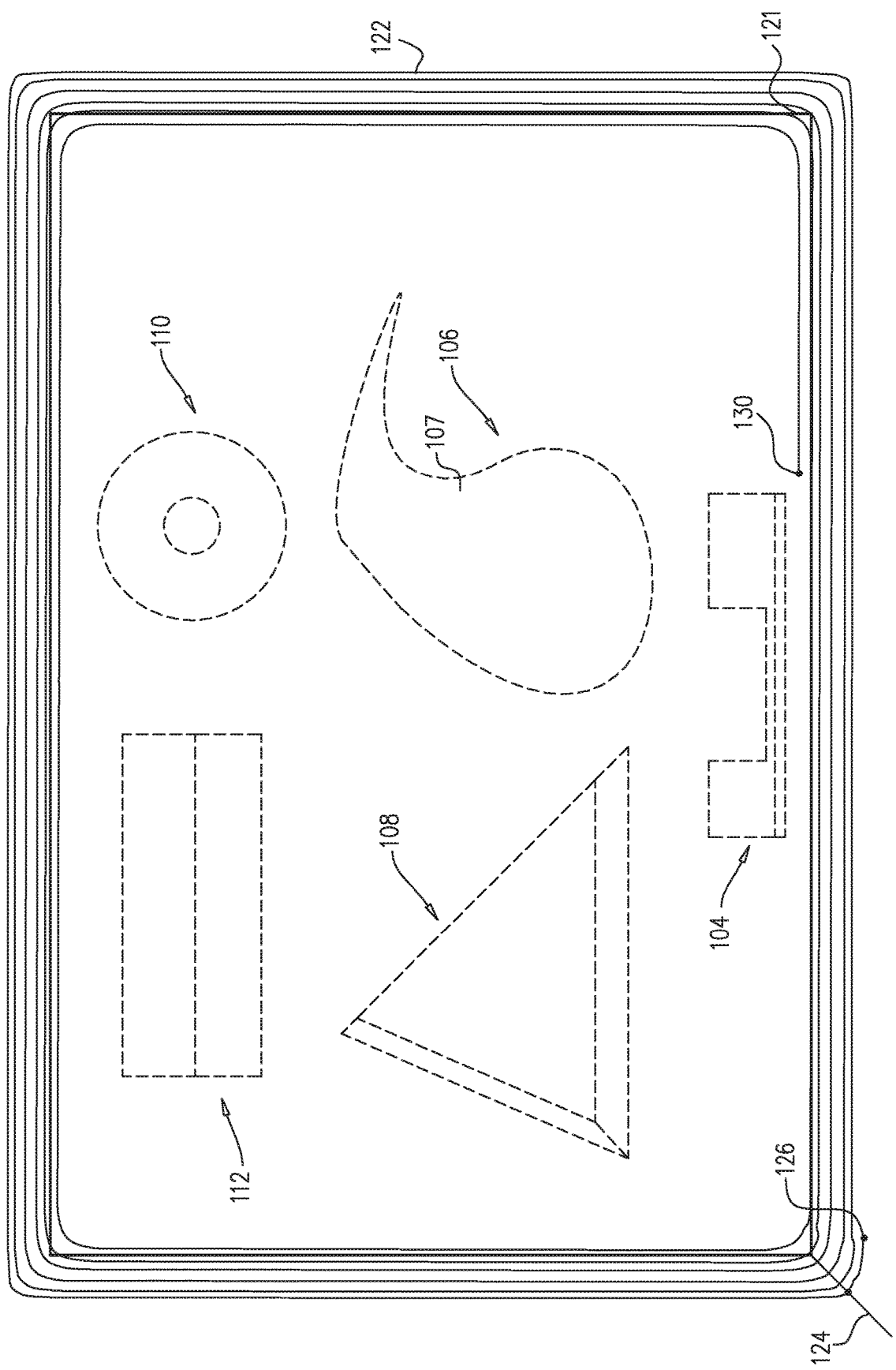

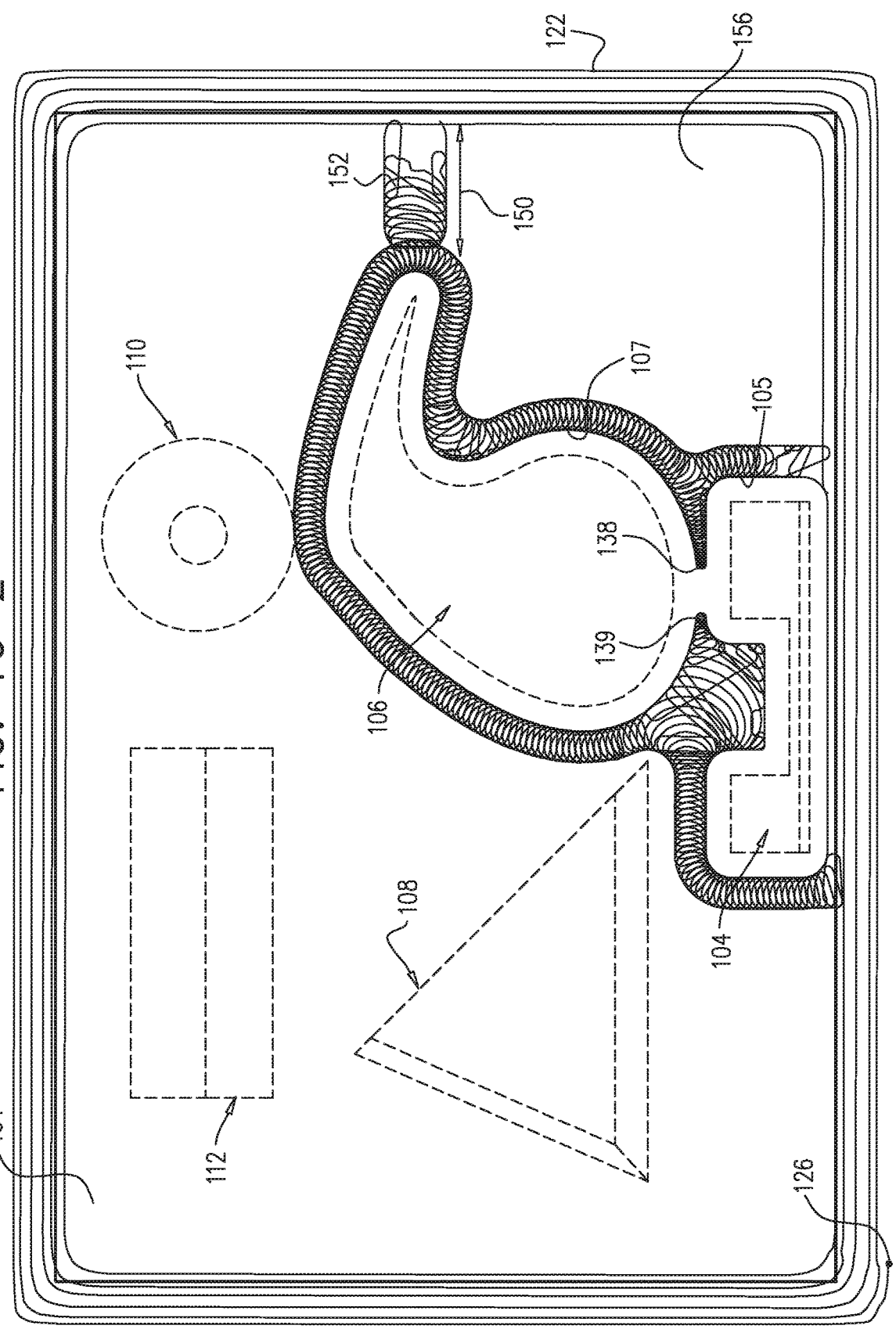

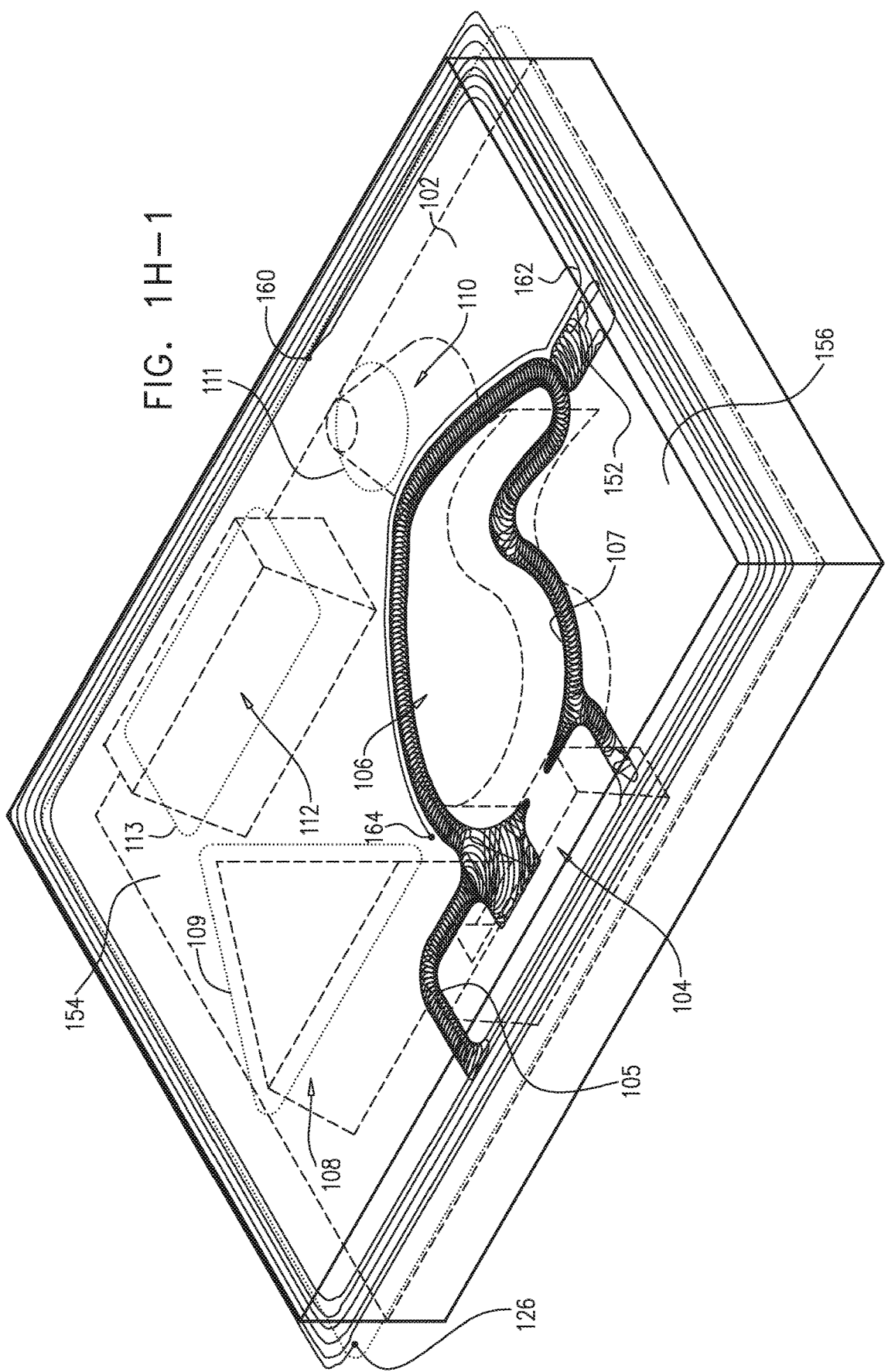

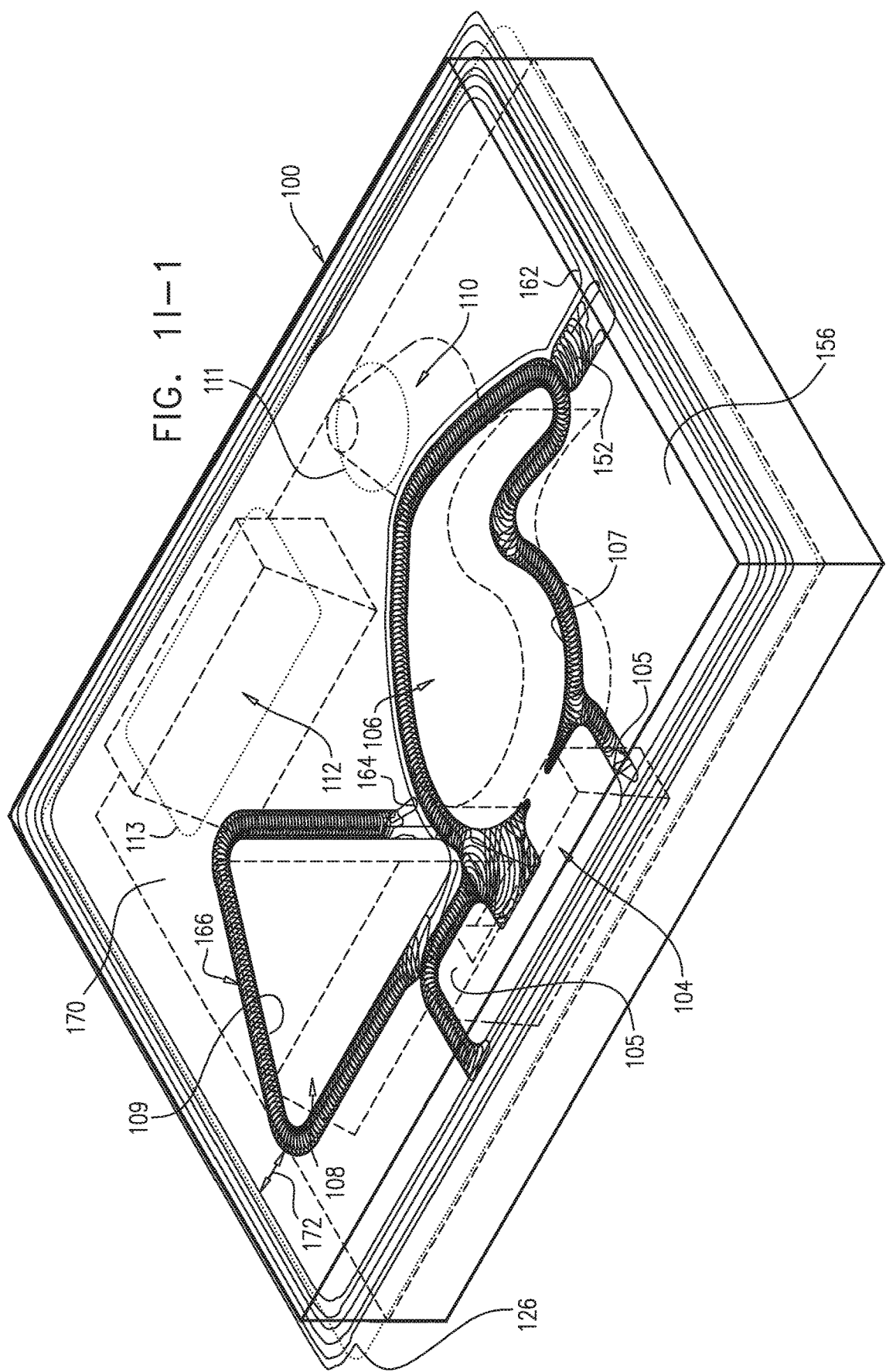

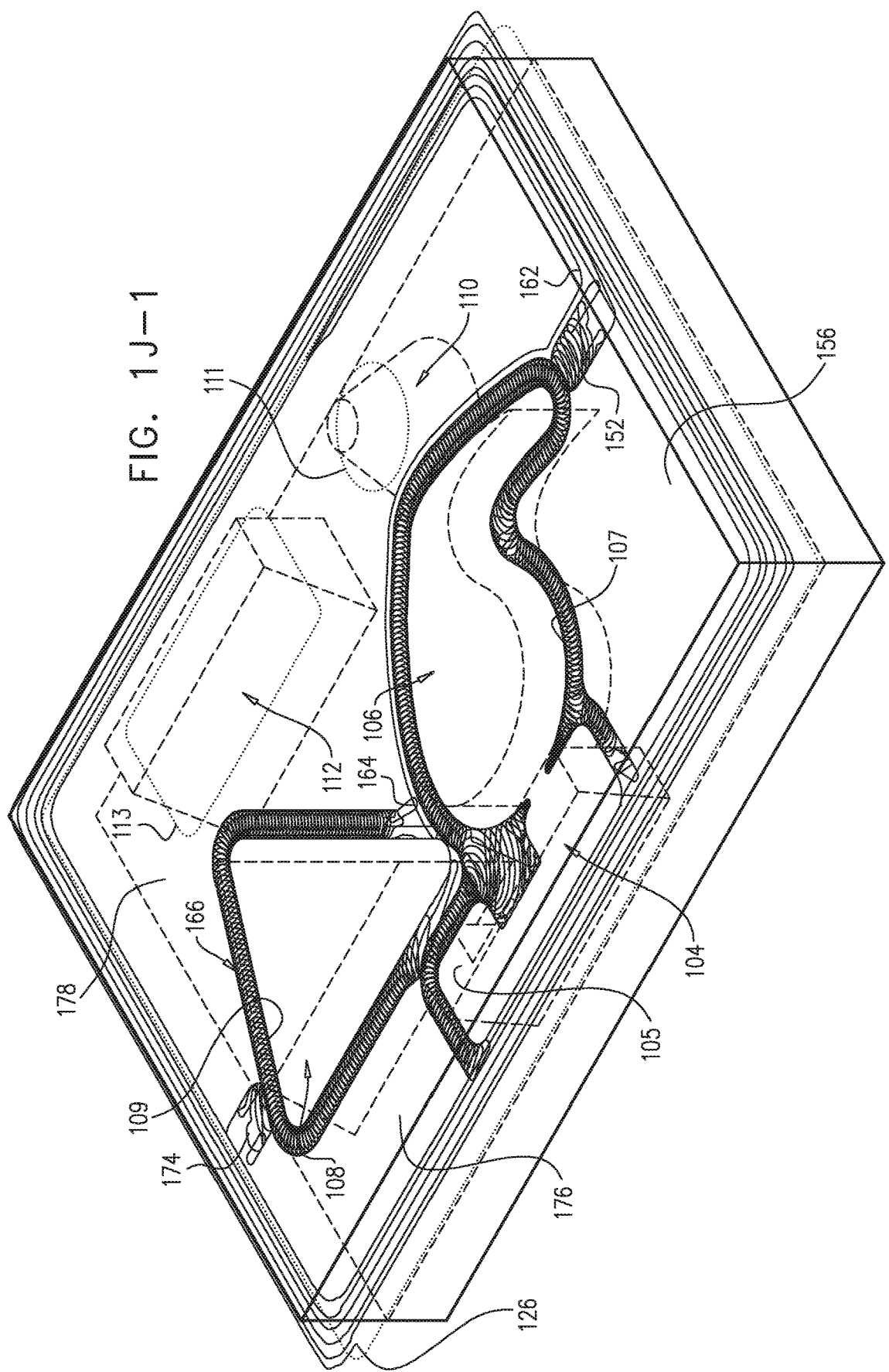

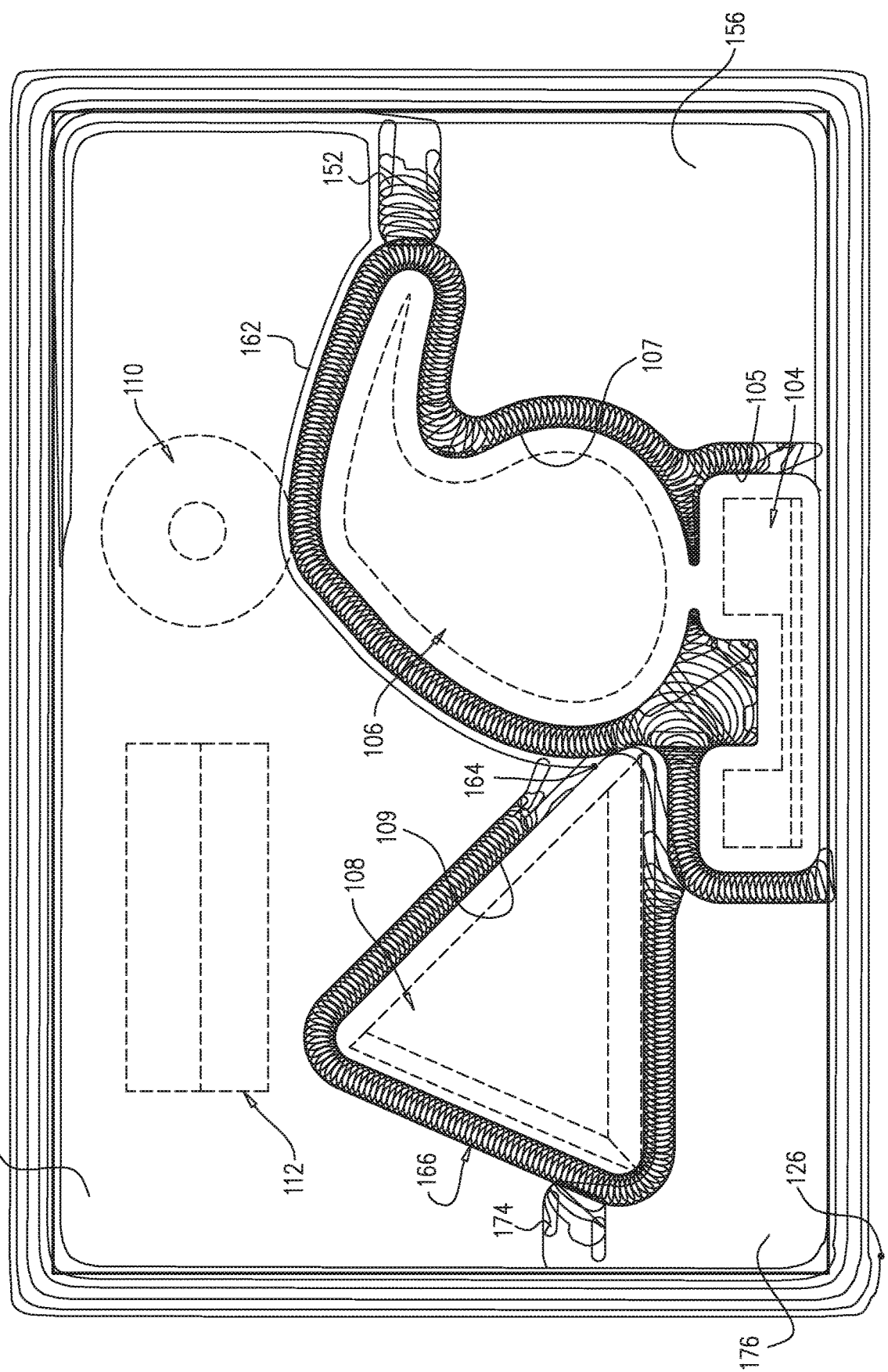

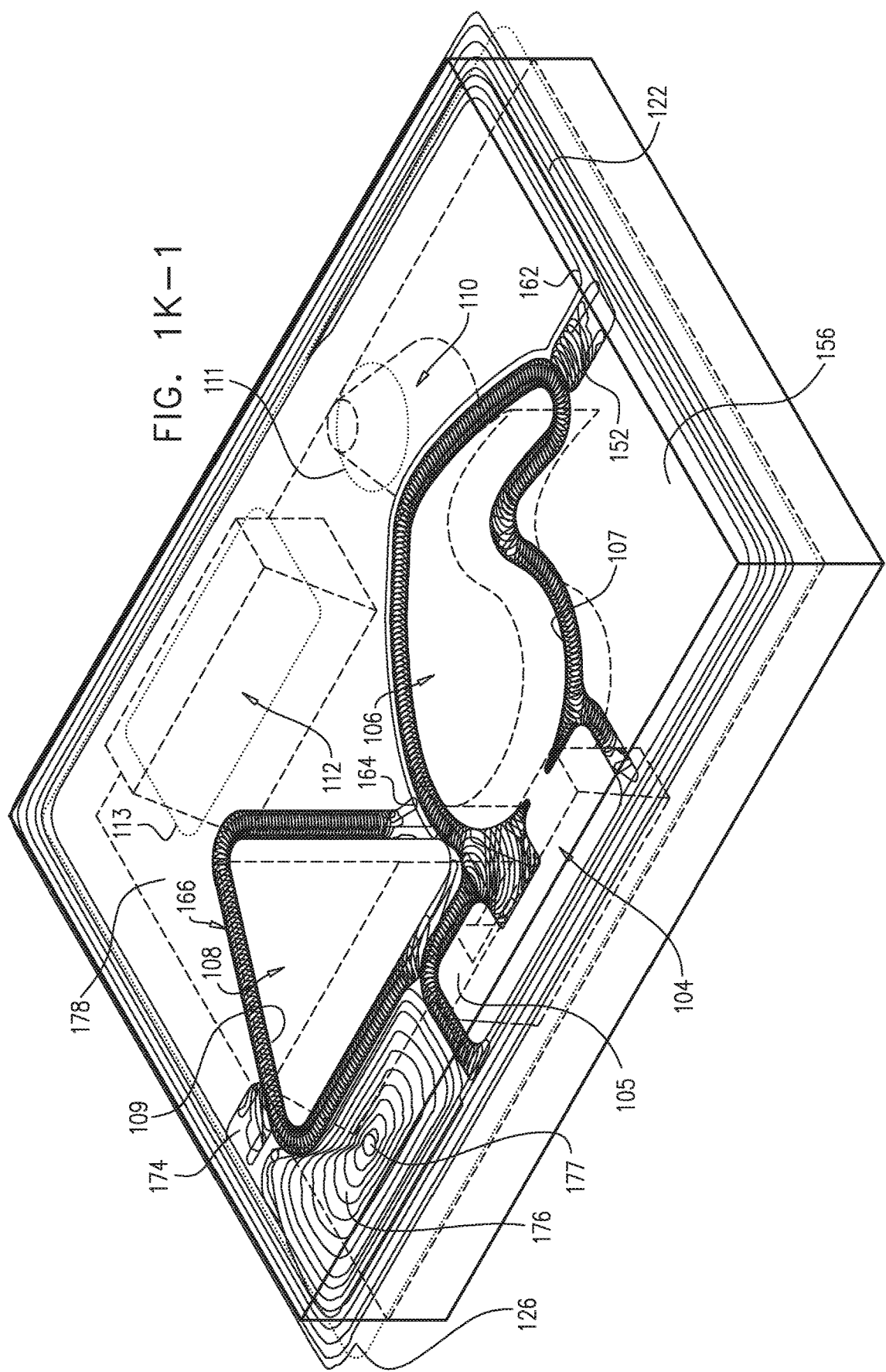

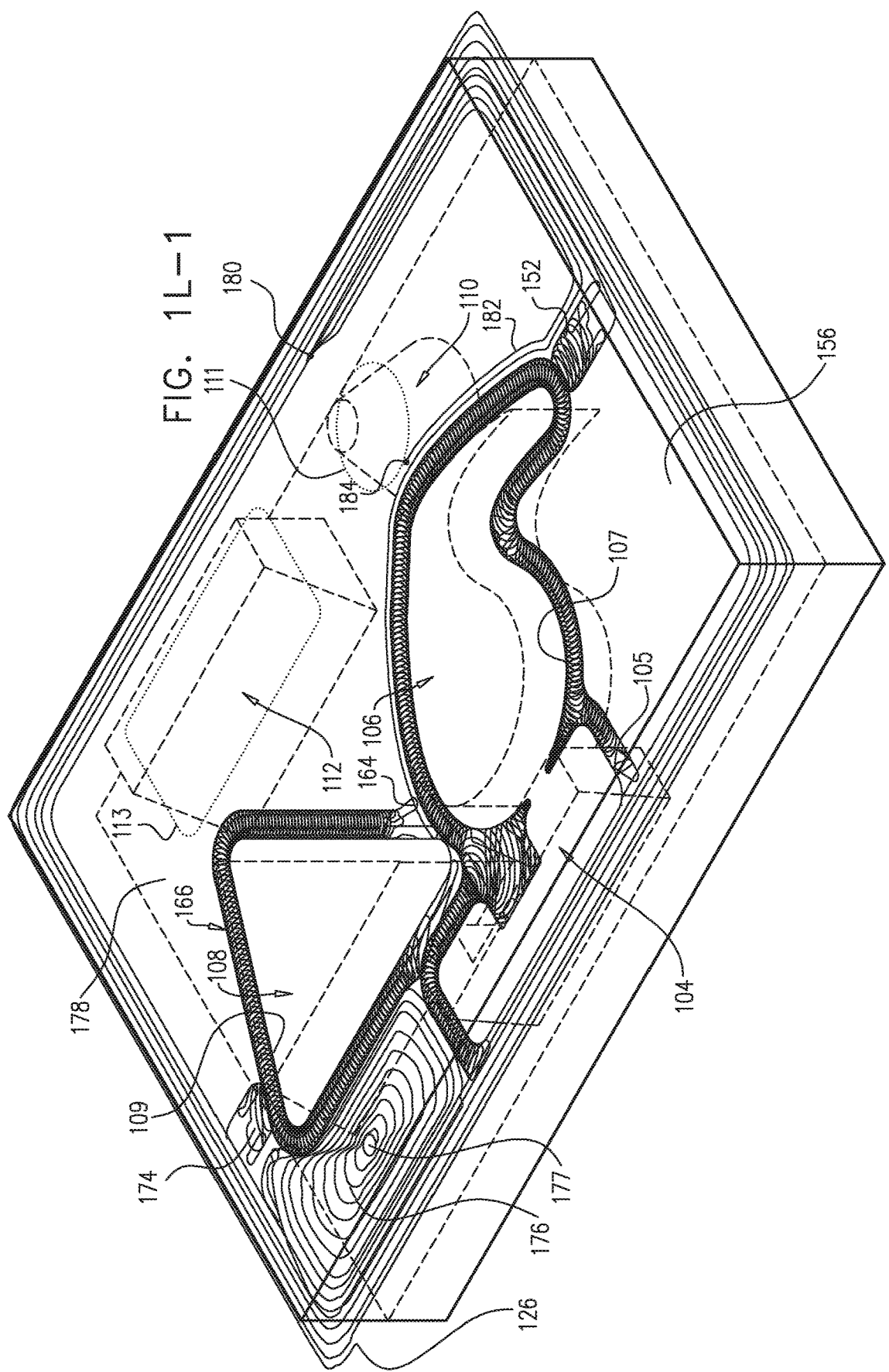

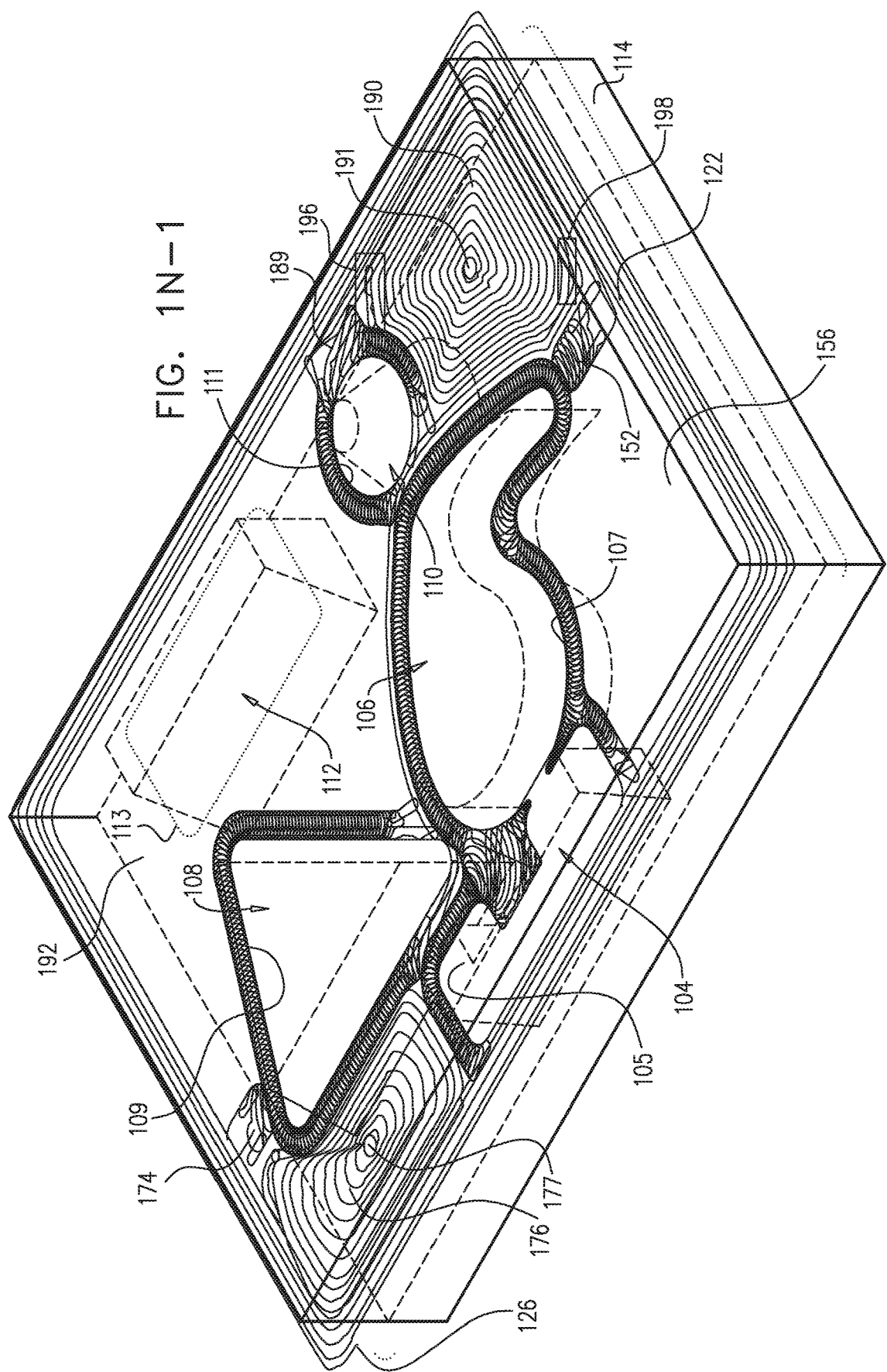

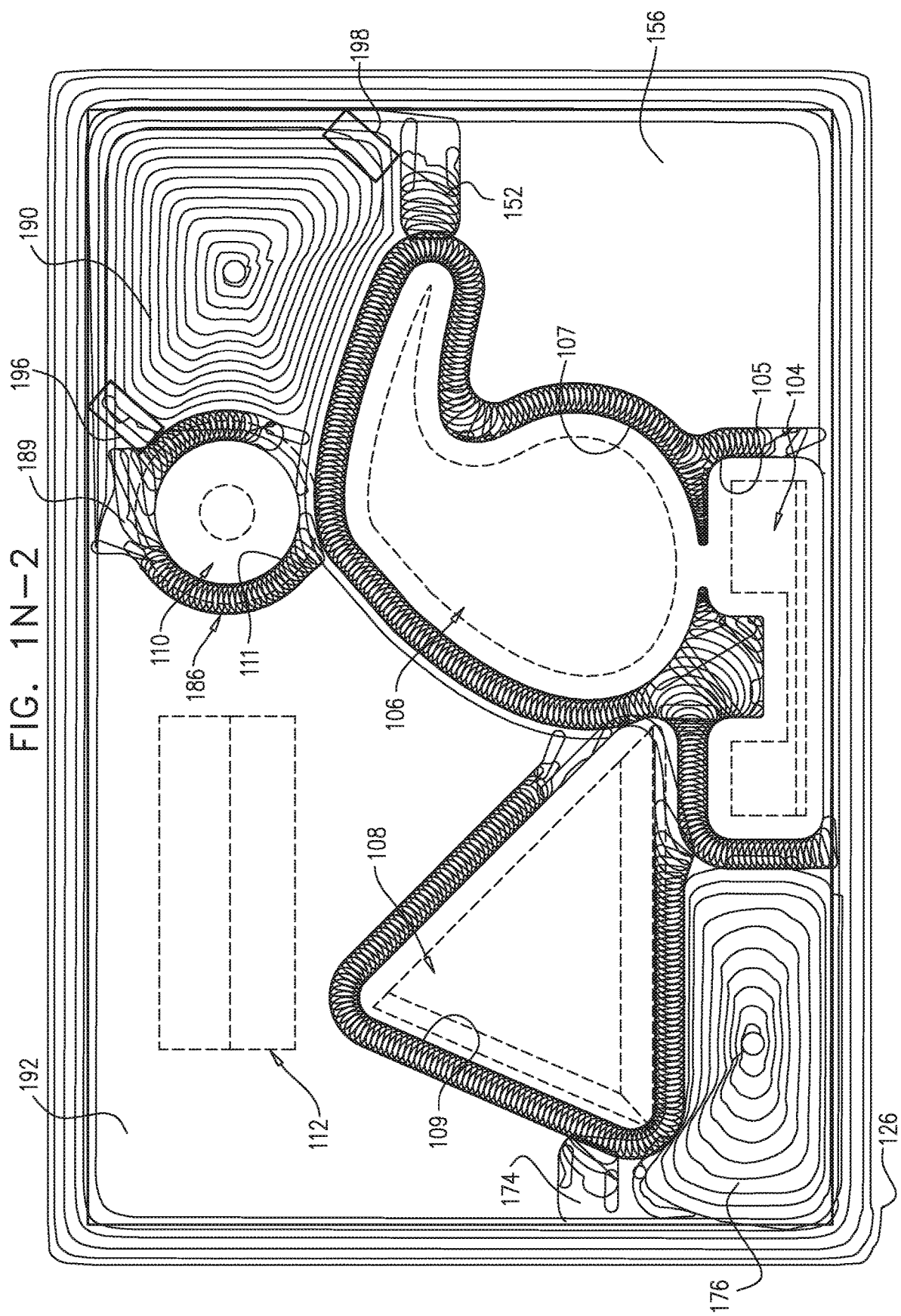

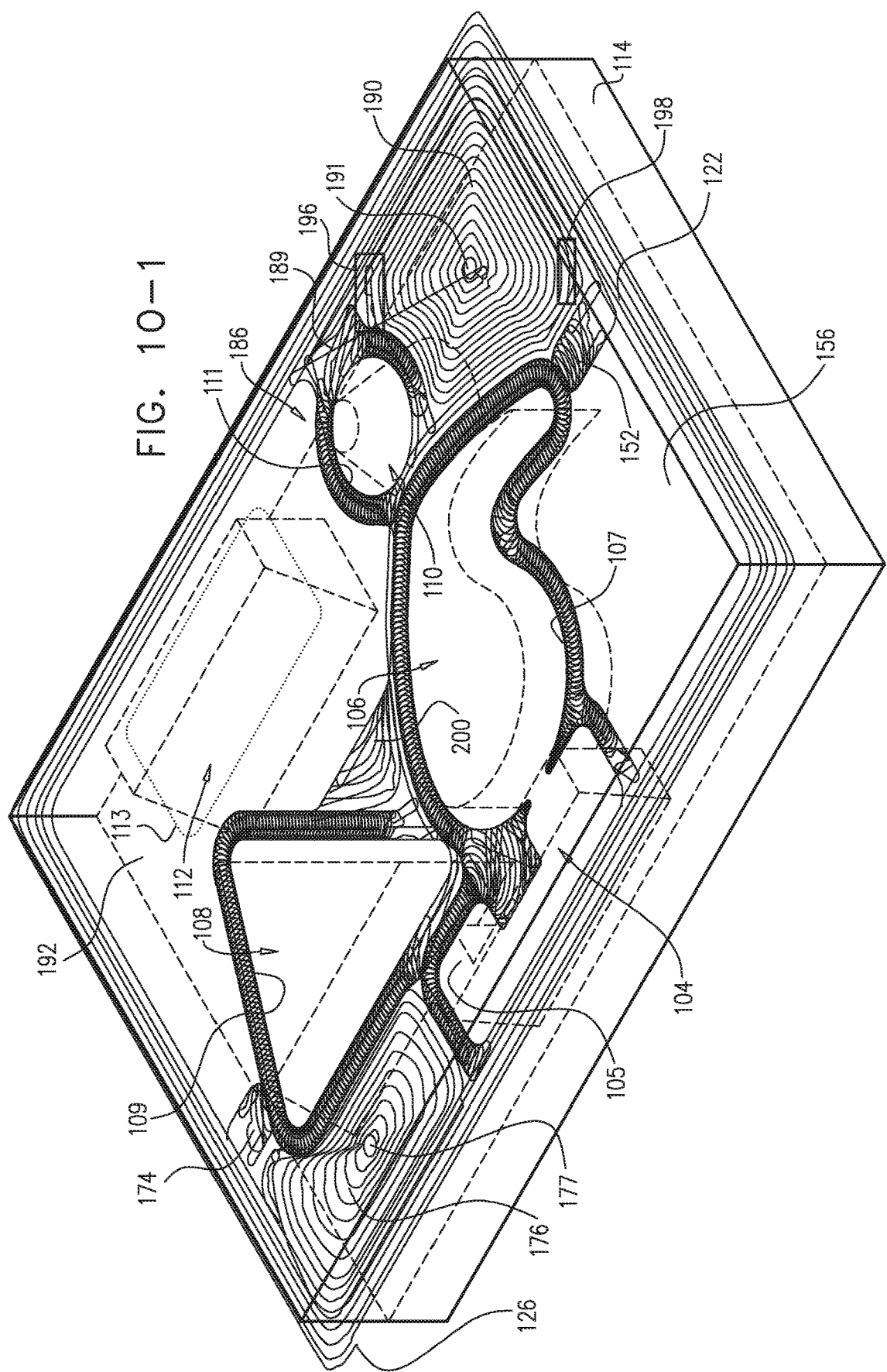

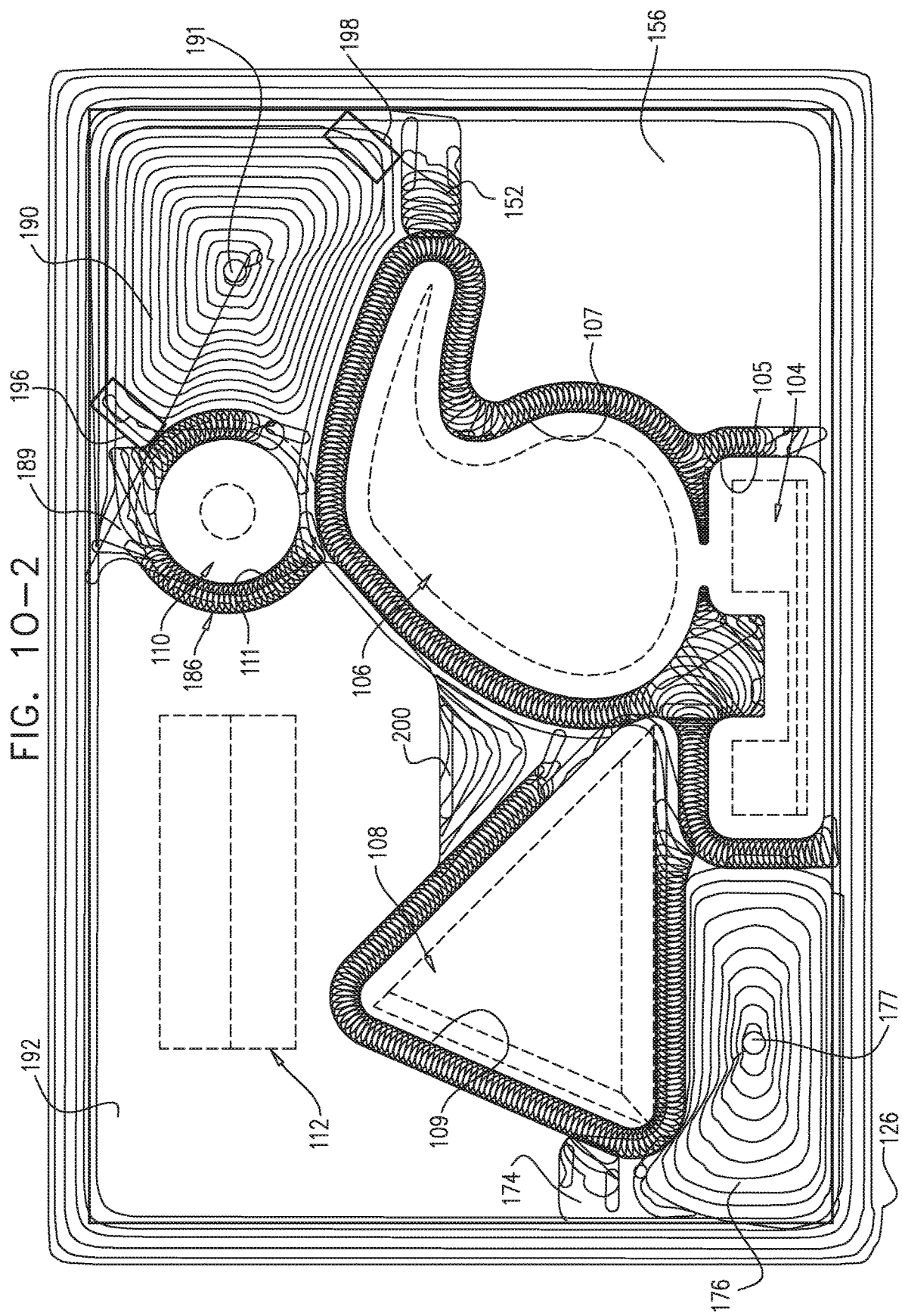

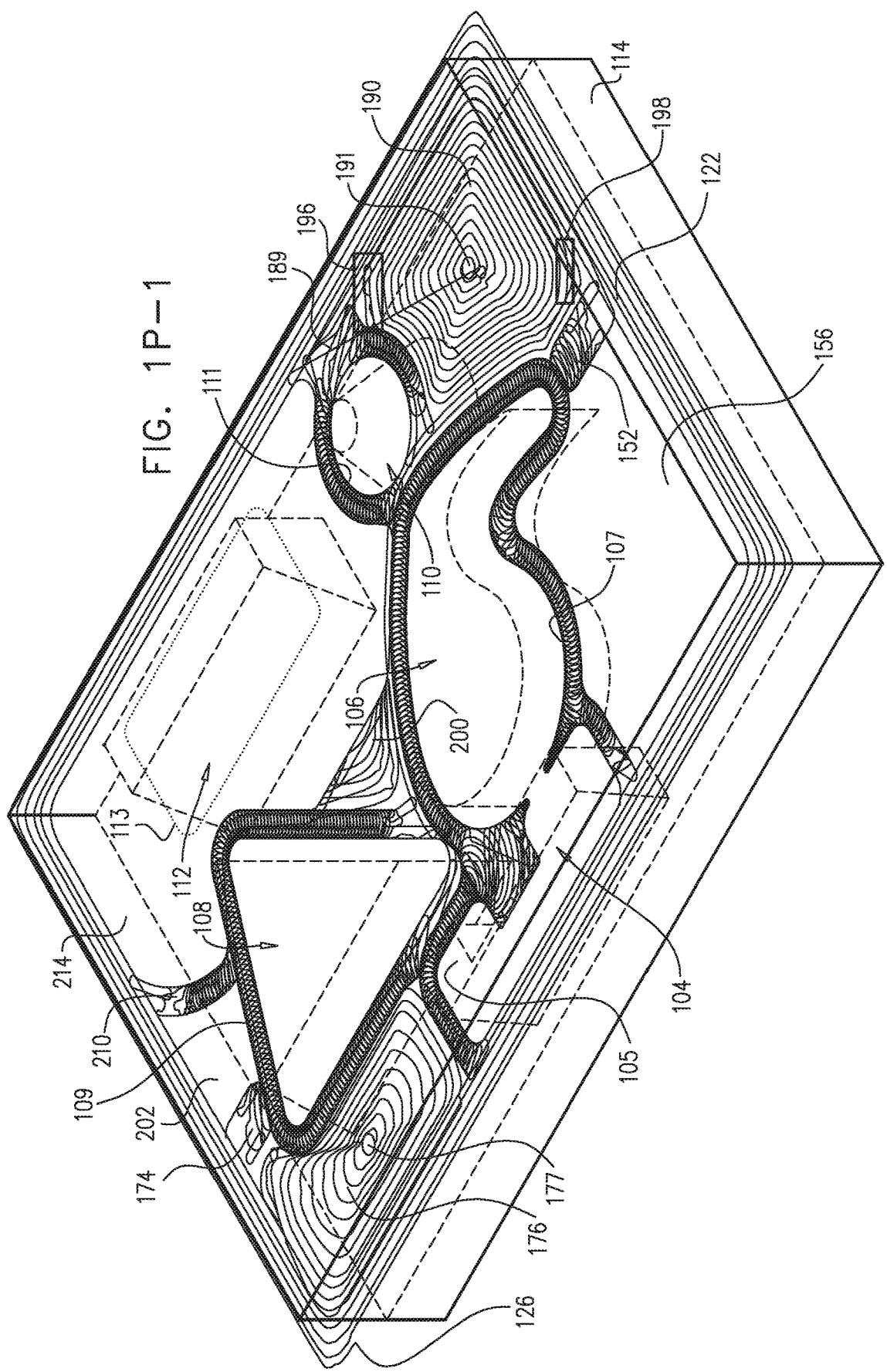

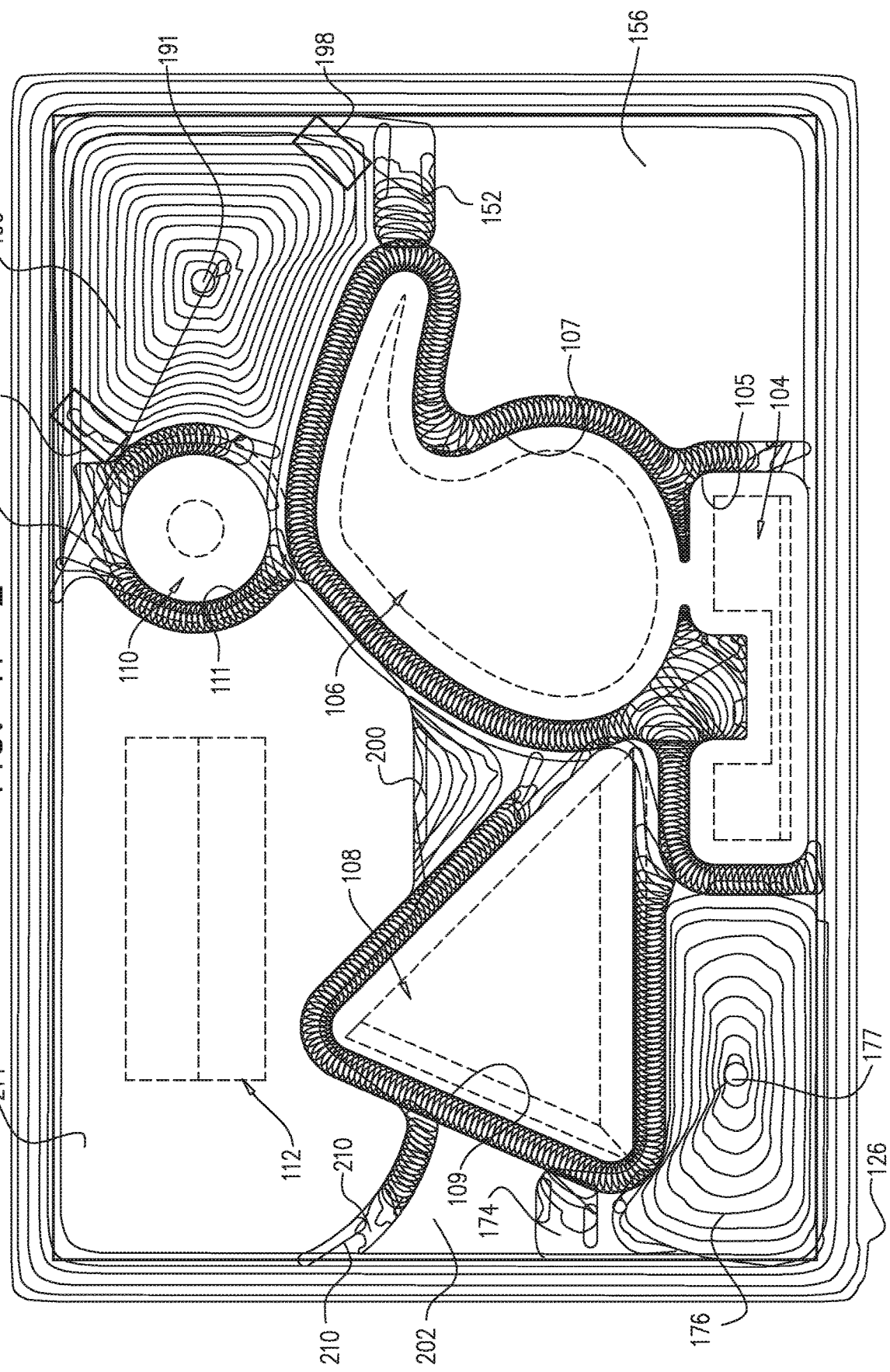

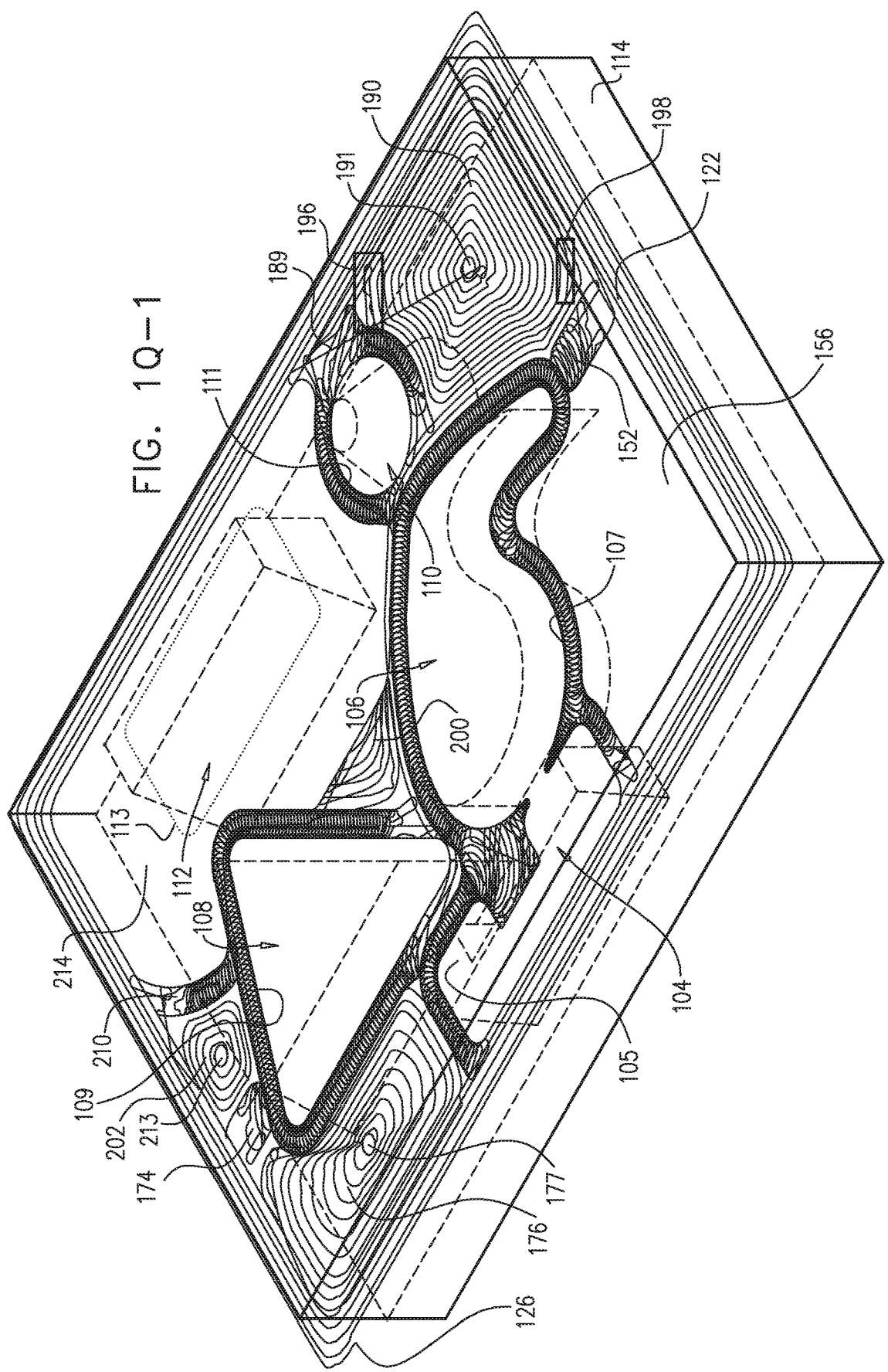

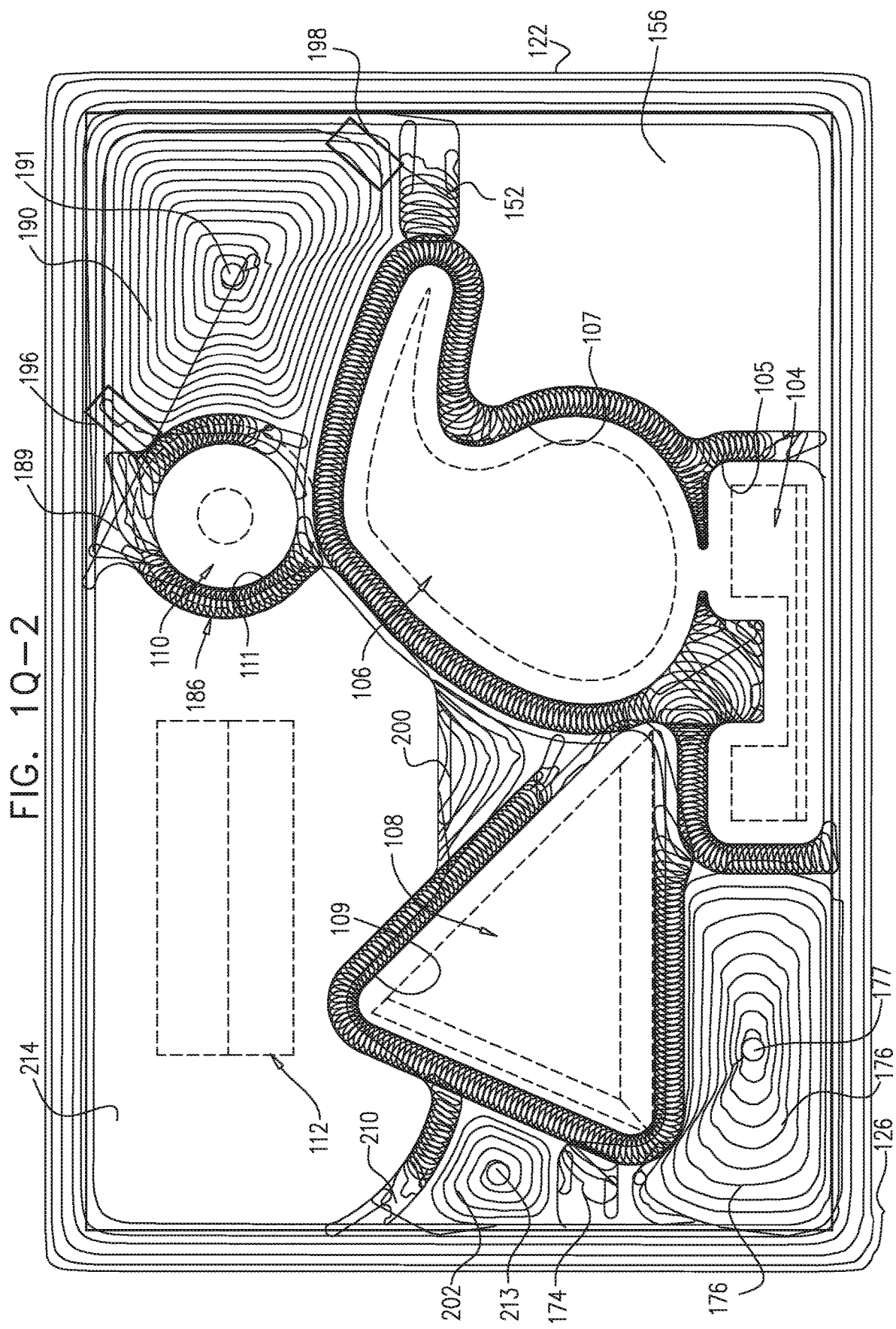

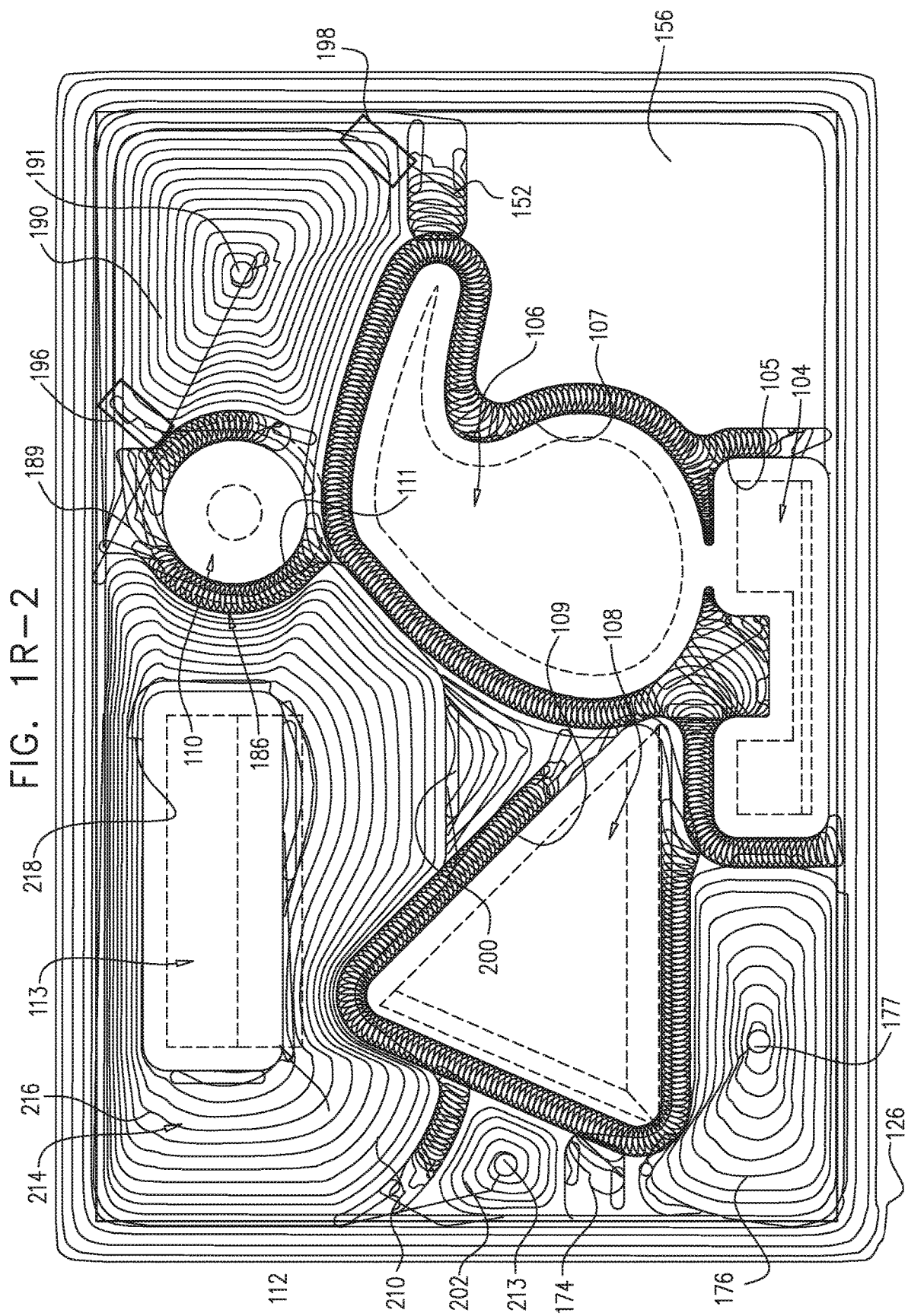

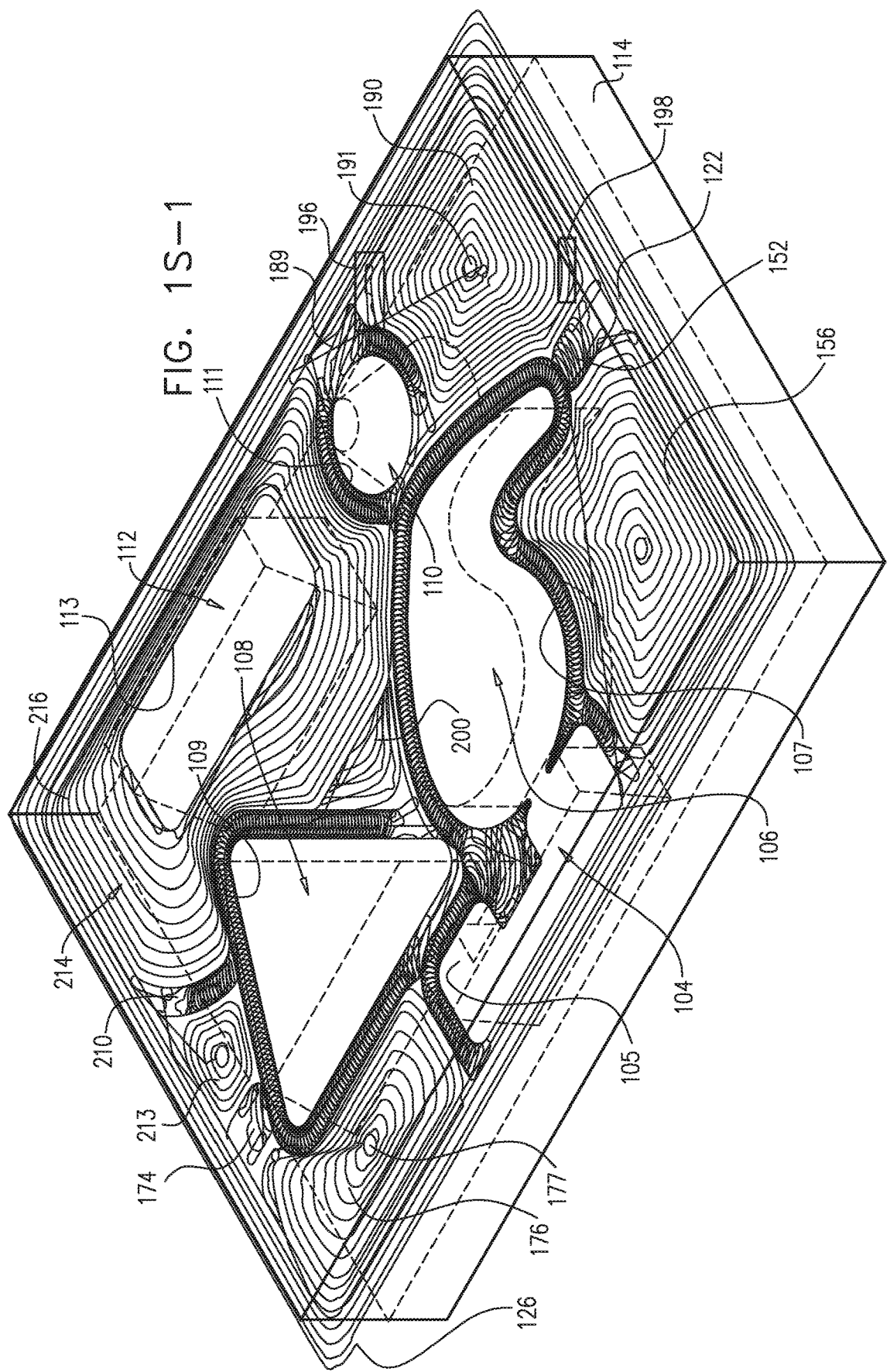

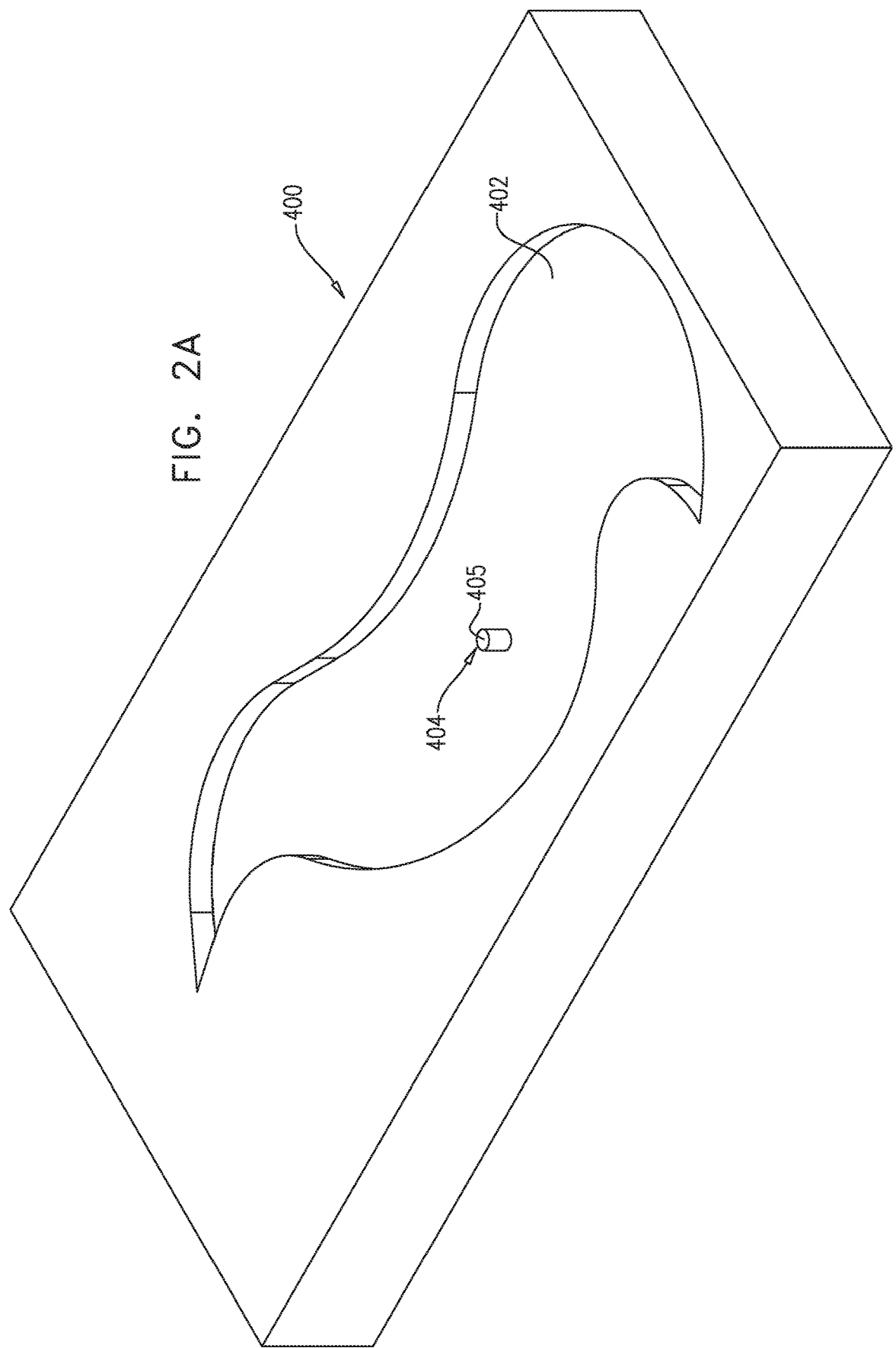

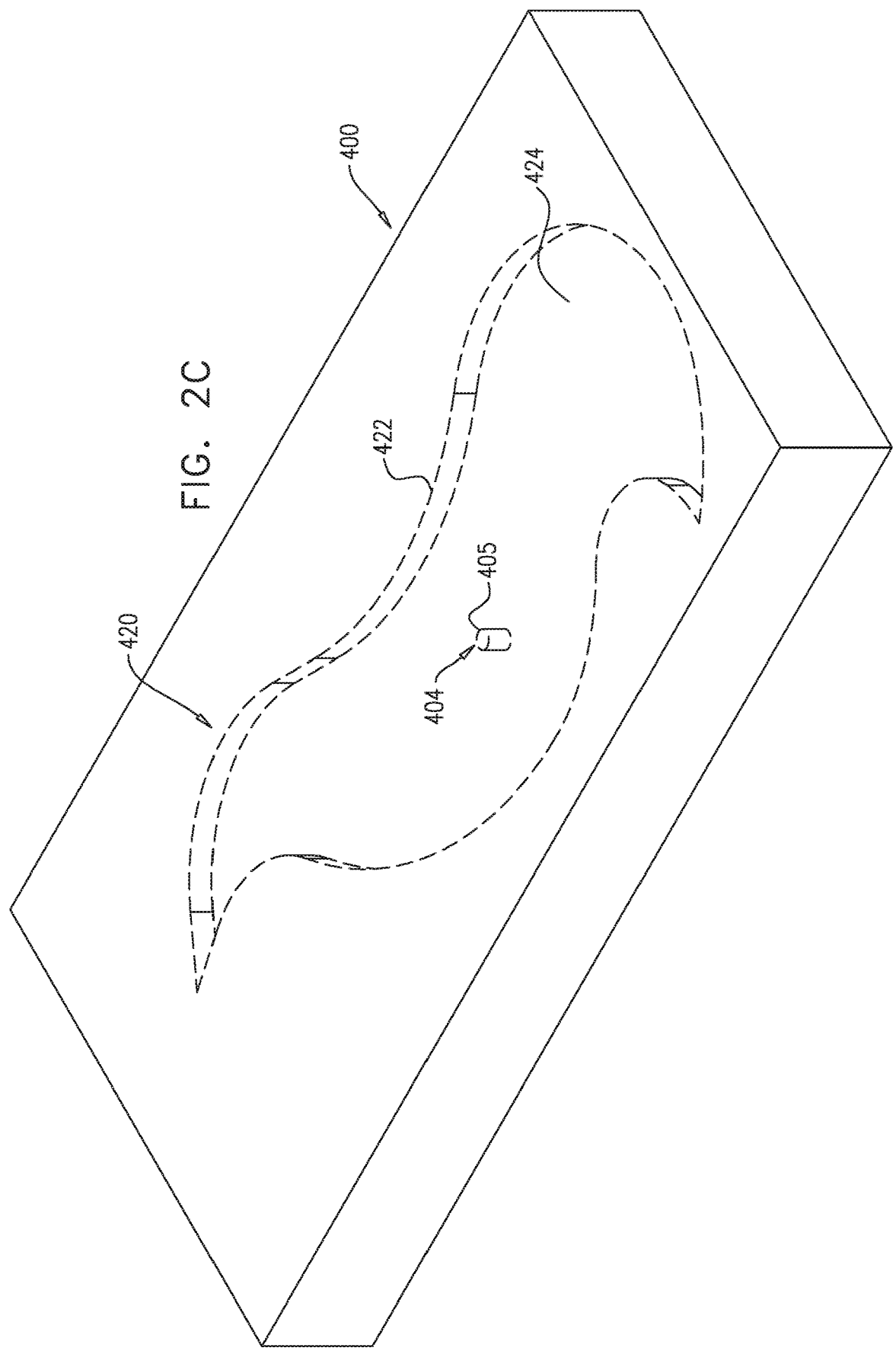

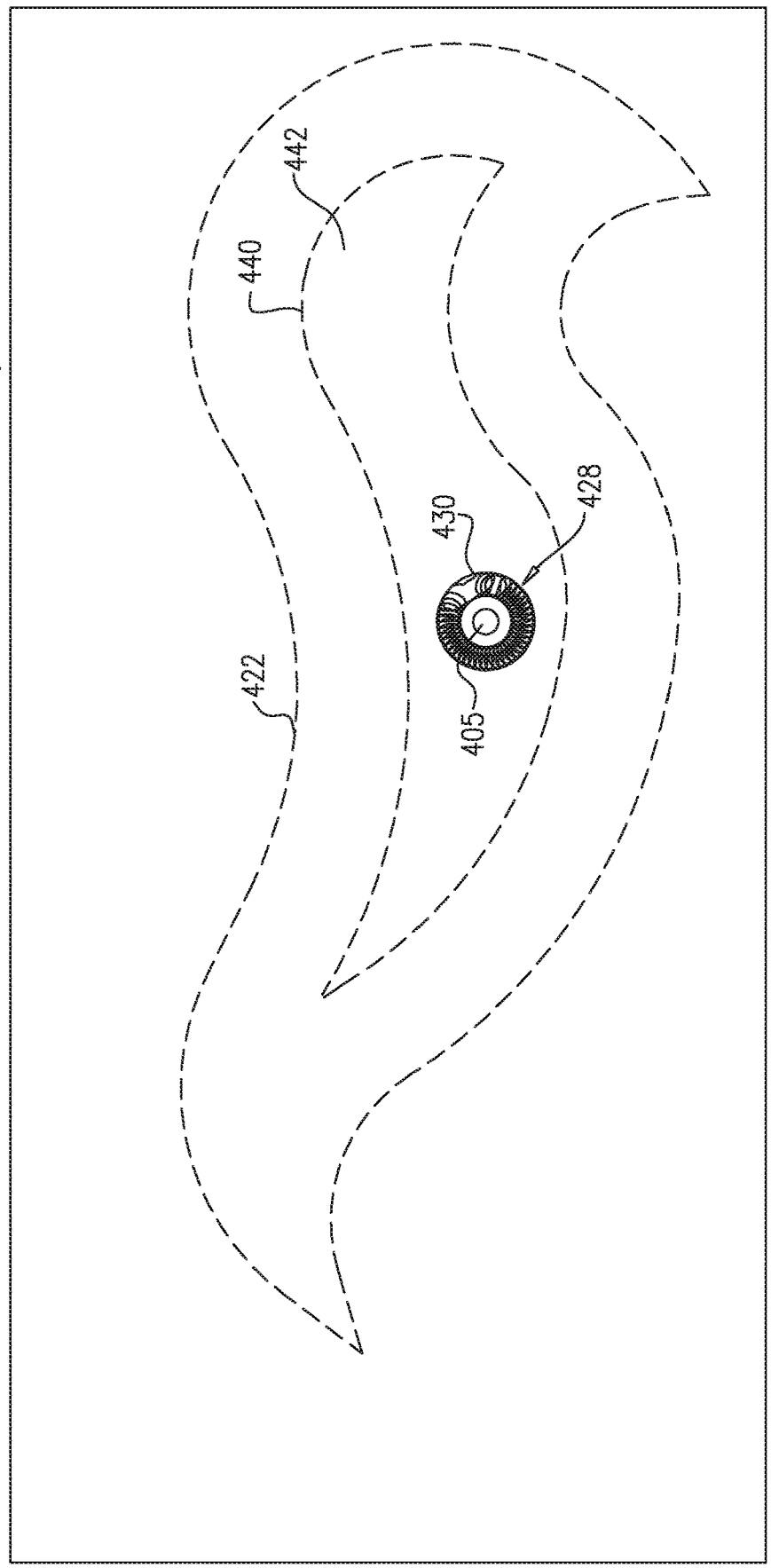

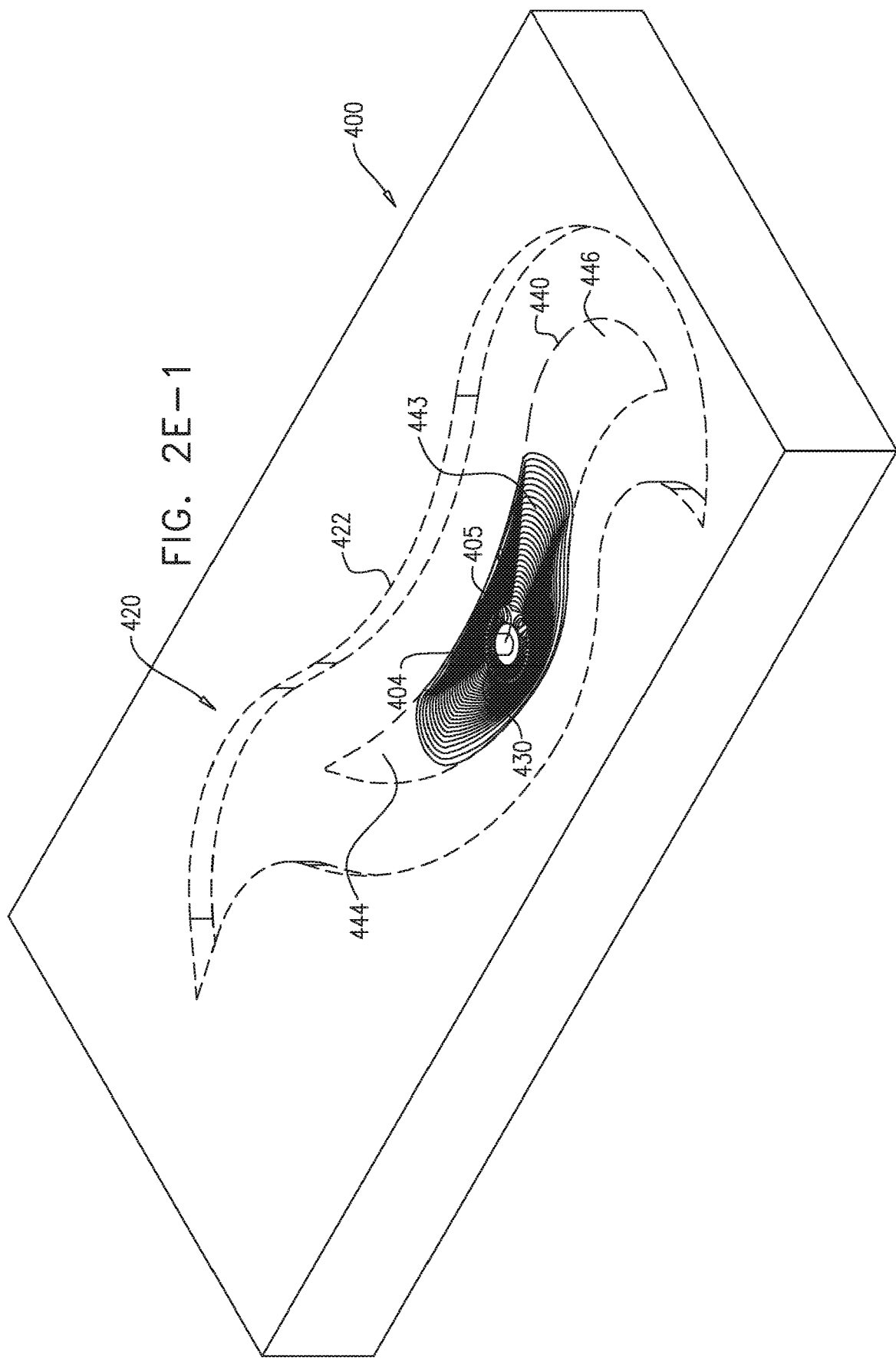

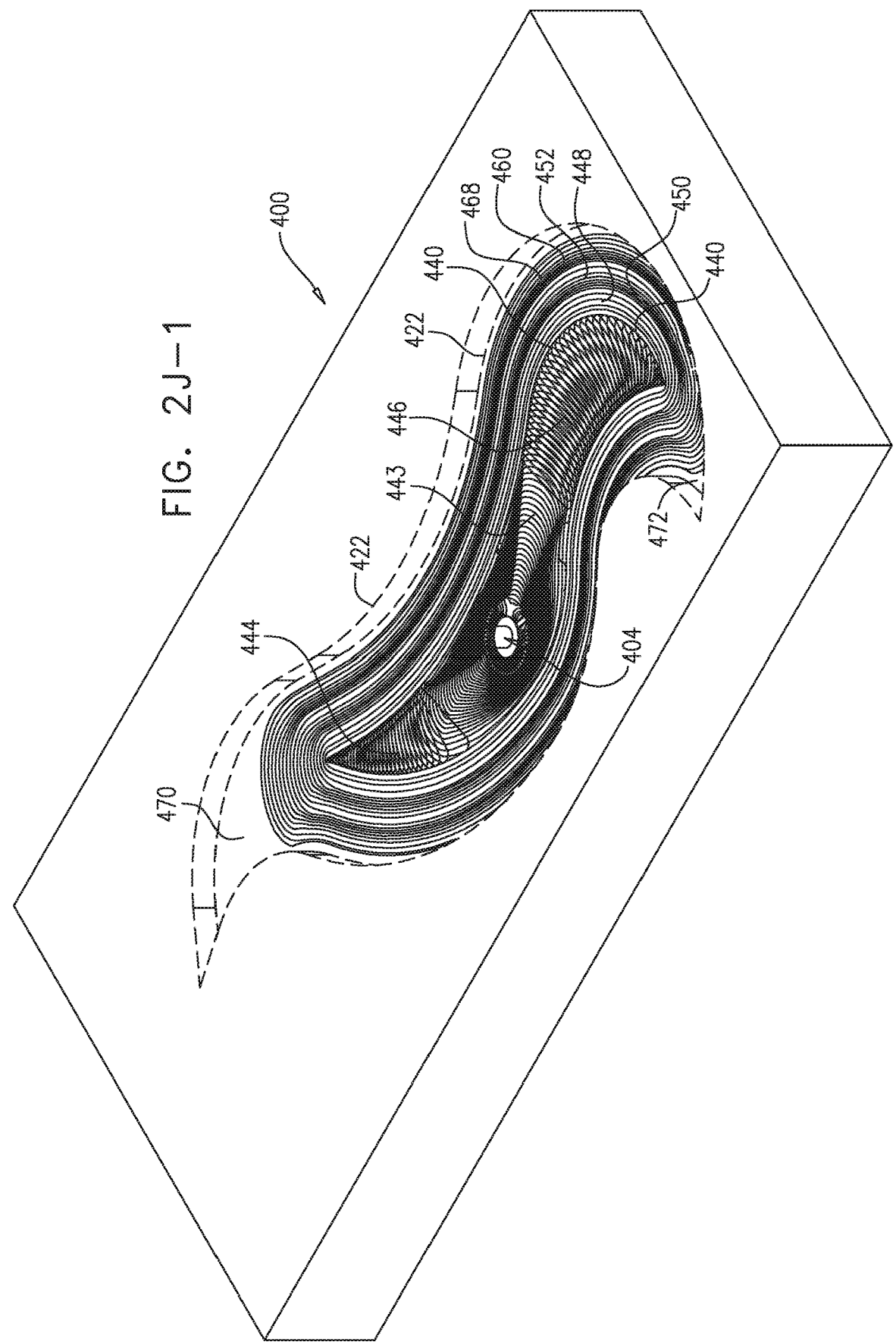

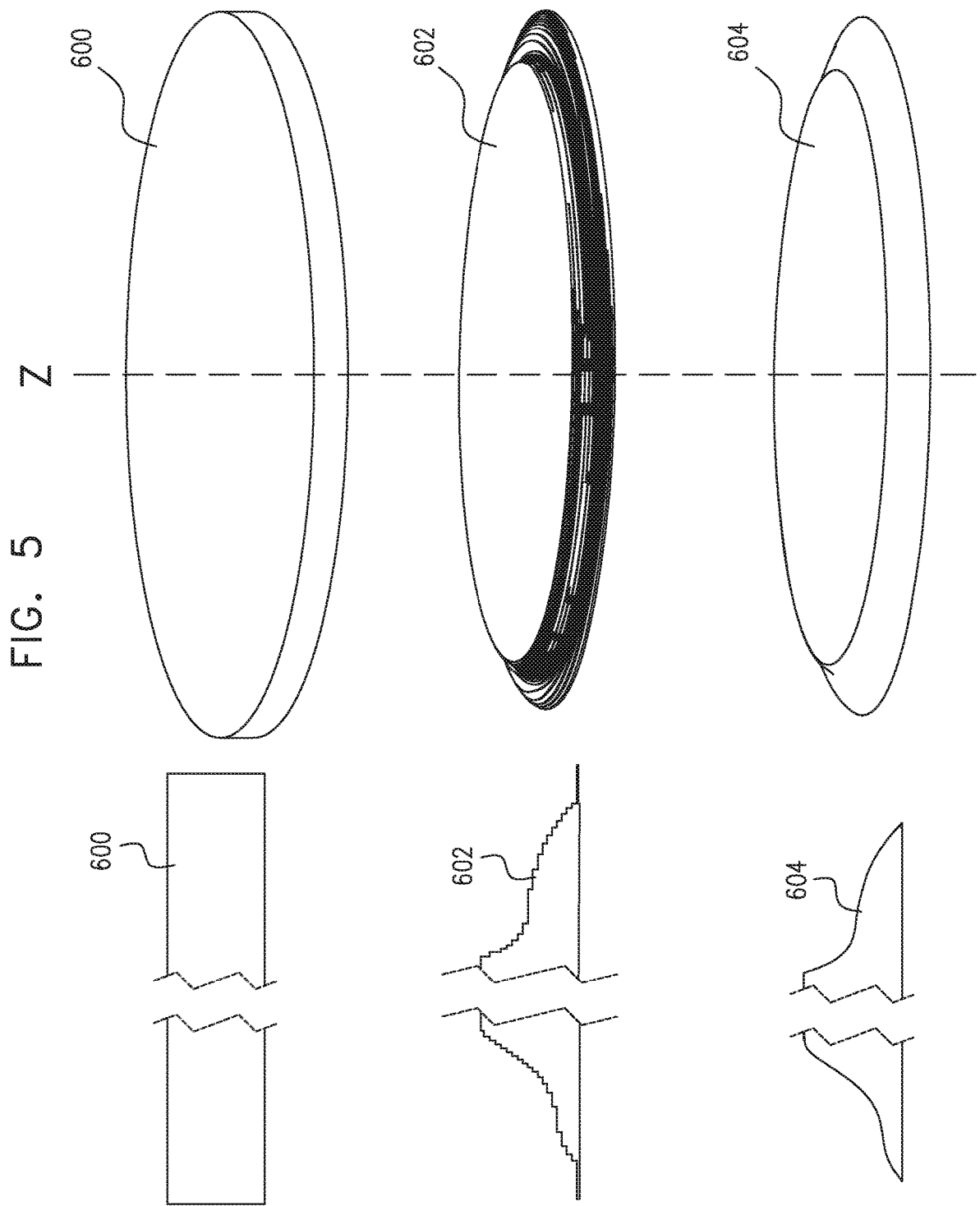

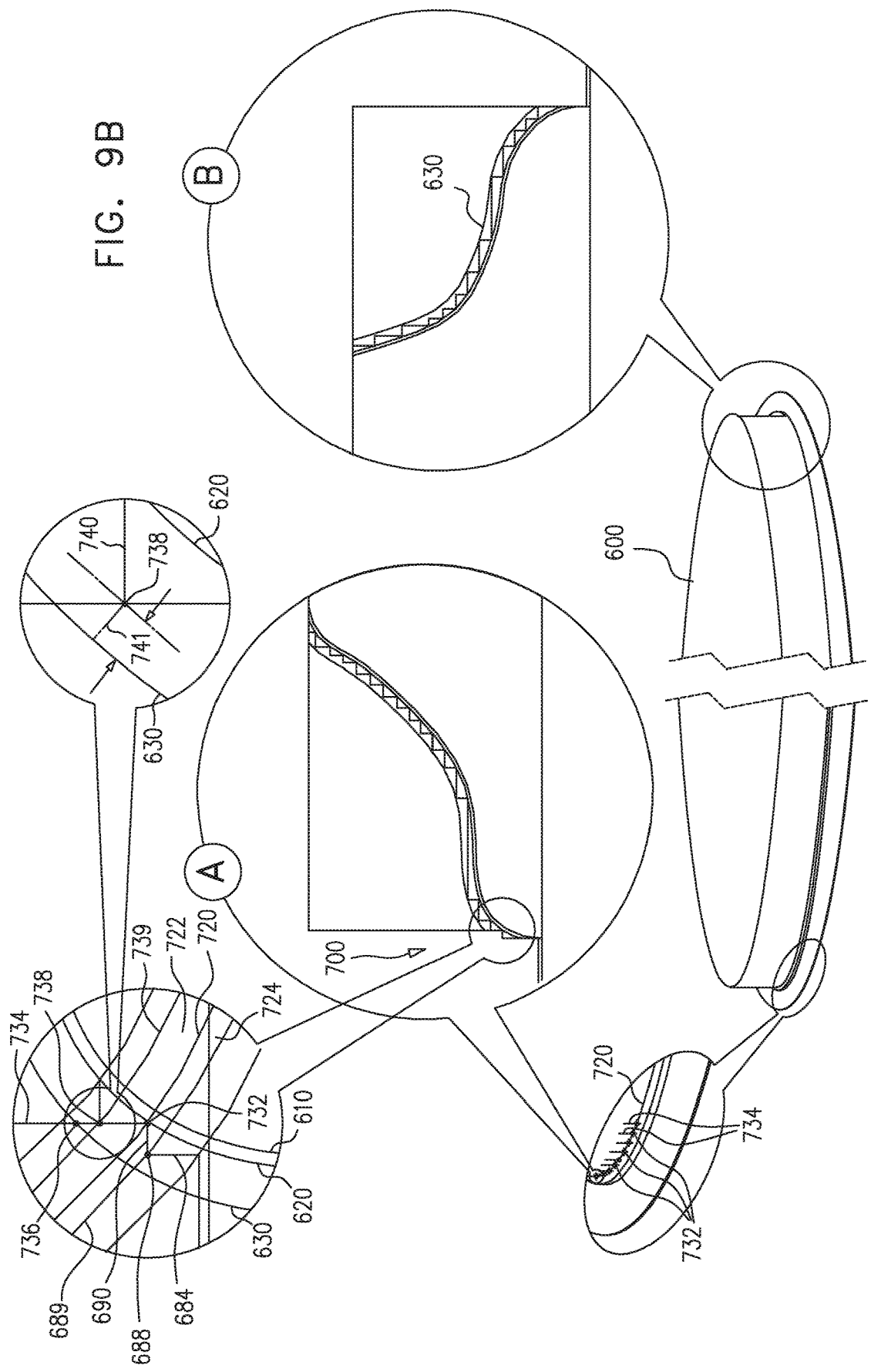

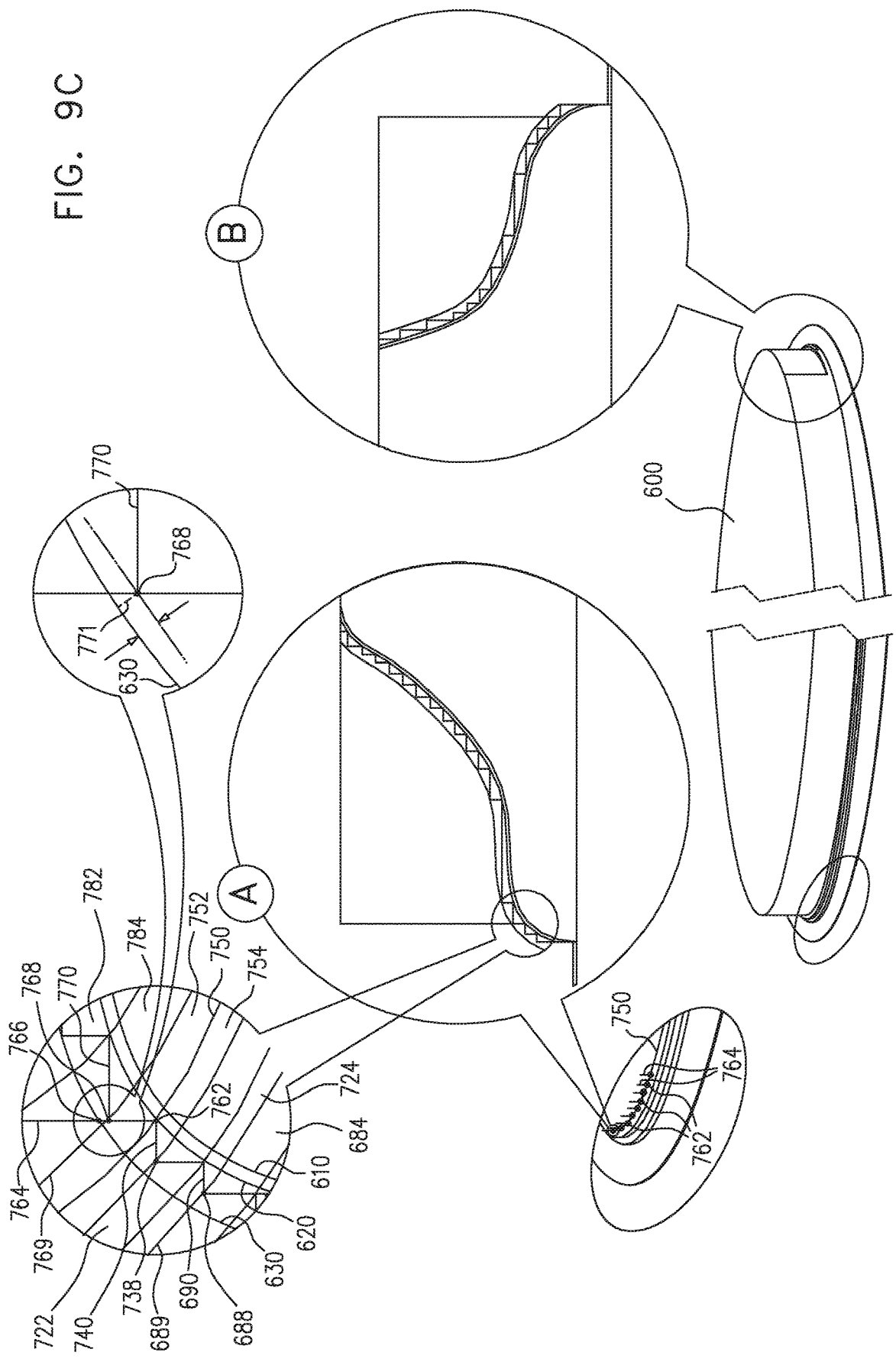

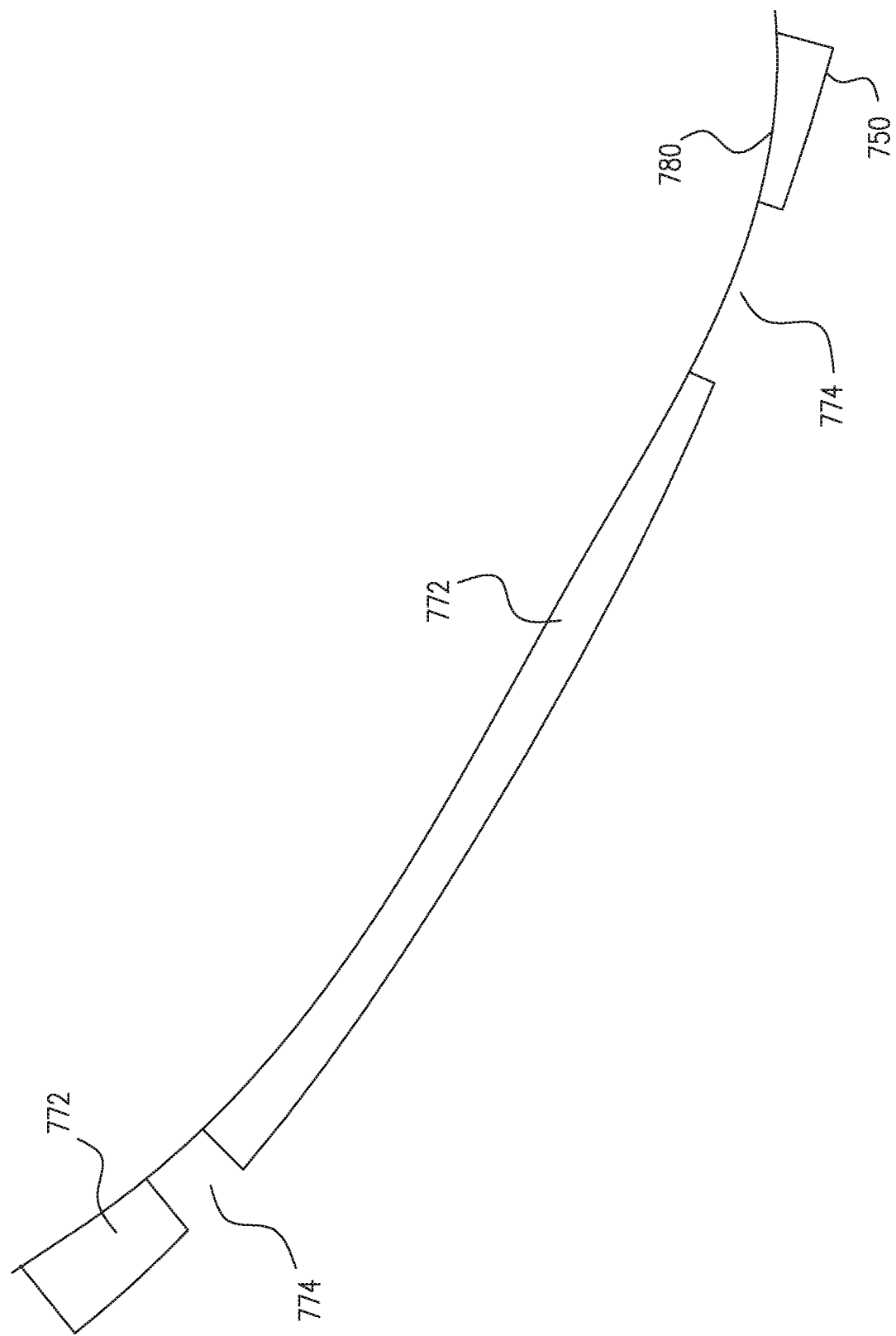

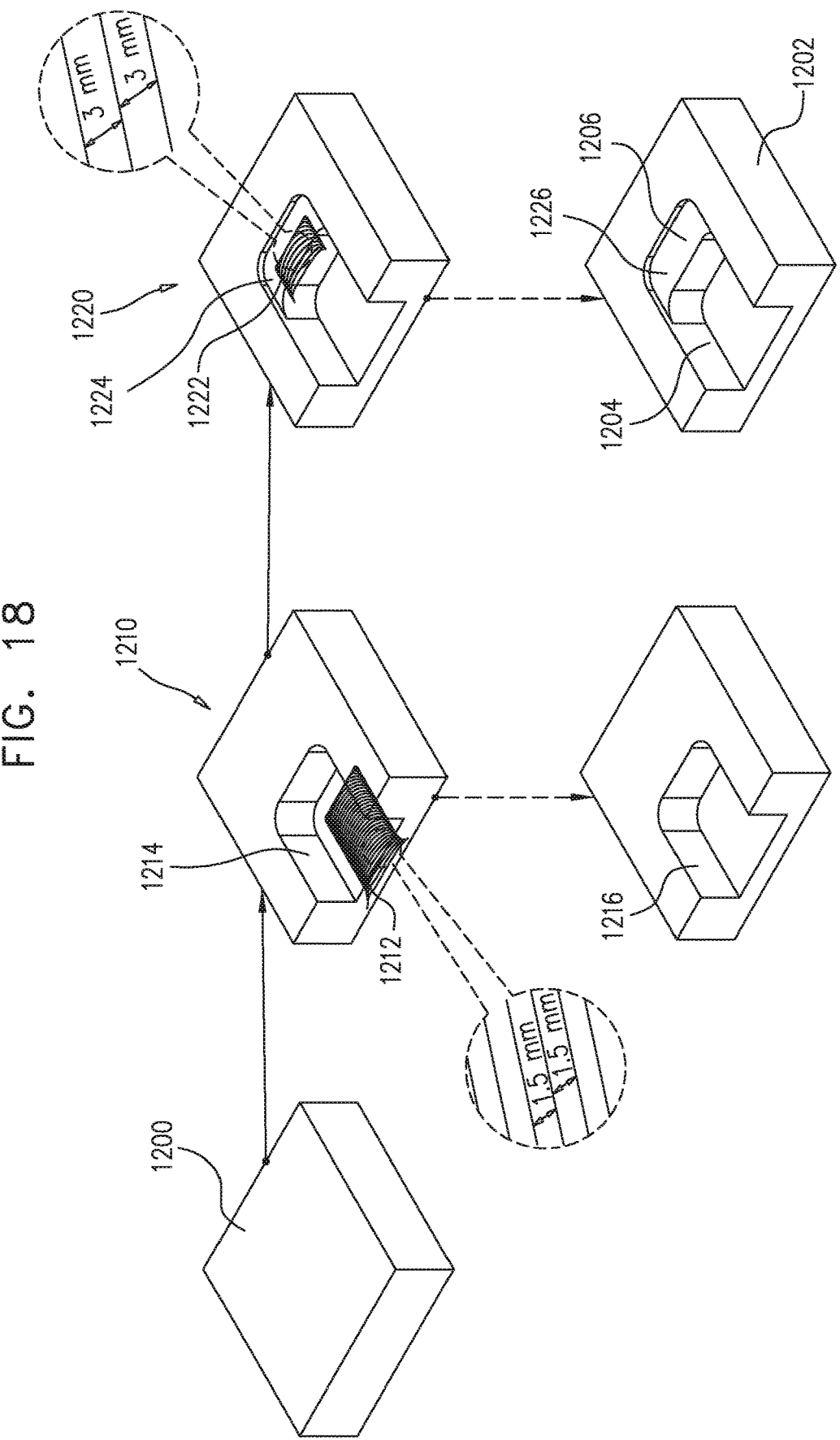

COMPUTERIZED TOOL PATH GENERATION

REFERENCE TO RELATED APPLICATIONS

This application is a continuation of U.S. patent application Ser. No. 15/598,749, filed May 18, 2017, entitled "COMPUTERIZED TOOL PATH GENERATION", now U.S. Pat. No. 10,620,607, which is a divisional of U.S. patent application Ser. No. 14/013,704, filed Aug. 29, 2013, entitled "COMPUTERIZED TOOL PATH GENERATION", now U.S. Pat. No. 9,690,282, which is a continuation-in-part of U.S. patent application Ser. No. 13/916,918, filed Jun. 13, 2013, now U.S. Pat. No. 9,052,704, which is a divisional of U.S. patent application Ser. No. 13/036,726, filed Feb. 28, 2011, published on Aug. 30, 2012 as U.S. Published Patent Application No. 2012/0221140, now U.S. Pat. No. 8,489,224, the disclosures of which are hereby incorporated by reference.

FIELD OF THE INVENTION

The present invention relates to systems and methodologies for automated tool path design and computer controlled machining and products produced thereby.

BACKGROUND OF THE INVENTION

Various systems and methodologies are known for automated tool path design and computer controlled machining.

SUMMARY OF THE INVENTION

The present invention seeks to provide improved systems and methodologies for automated tool path design and computer controlled machining and products produced thereby.

There is thus provided in accordance with a preferred embodiment of the present invention an automated computer-implemented method for generating commands for controlling a computer numerically controlled milling machine to fabricate a machined object from a workpiece having a Z-axis, the machined object being configured to facilitate subsequent finishing into a finished object, the method including defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object and calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and the number of multiple step-up cuts in the workpiece at multiple heights along the Z-axis and the areas cut in each of the multiple step-up cuts are selected so as to generally minimize the amount of workpiece material that is removed from the workpiece during the cuts while ensuring that the surfaces of the machined object produced by the multiple step-up cuts all lie between the inner limiting surface defined by the offset surface and the outer limiting surface defined by the scallop surface.

There is also provided in accordance with another preferred embodiment of the present invention an automated computer-implemented method for generating commands for controlling a computer numerically controlled milling machine to fabricate a machined object from a workpiece having a Z-axis, the machined object being configured to facilitate subsequent finishing into a finished object, the method including defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object and calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision of whether or not to cut the workpiece at a given location at each height of each of the multiple step-up cuts is a function of the required non-vertical slope of the finished object at the given location.

There is further provided in accordance with yet another preferred embodiment of the present invention an automated computer-implemented method for generating commands for controlling a computer numerically controlled milling machine to fabricate a machined object from a workpiece having a Z-axis, the machined object being configured to facilitate subsequent finishing into a finished object, the method including defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object and calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface; and a decision as to at which height each of the multiple step-up cuts is made is a function of the required non-vertical slope of the finished object at the given height at various locations on the finished object.

Preferably, the function is a function of the smallest slope of the finished object at the given height.

There is also provided in accordance with another preferred embodiment of the present invention a method for machining a workpiece having a Z-axis, employing a computer numerically controlled milling machine, to fabricate a machined object from the workpiece, the machined object being configured to facilitate subsequent finishing into a finished object, the method including defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and the number of multiple step-up cuts in the workpiece at multiple heights along the Z-axis and the areas cut in each of the multiple step-up cuts are selected so as to generally minimize the amount of workpiece material that is removed from the workpiece during the cuts while ensuring that the surfaces of the machined object produced by the multiple step-up cuts all lie between the inner limiting surface defined by the offset surface and the outer limiting surface defined by the scallop surface and directing a computer controlled machine tool along the tool path.

There is further provided in accordance with yet another preferred embodiment of the present invention a method for machining a workpiece having a Z-axis, employing a computer numerically controlled milling machine, to fabricate a machined object from the workpiece, the machined object being configured to facilitate subsequent finishing into a finished object, the method including defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision of whether or not to cut the workpiece at a given location at each height of each of the multiple step-up cuts is a function of the required non-vertical slope of the finished object at the given location and directing a computer controlled machine tool along the tool path.

There is even further provided in accordance with still another preferred embodiment of the present invention a method for machining a workpiece having a Z-axis, employing a computer numerically controlled milling machine, to fabricate a machined object from the workpiece, the machined object being configured to facilitate subsequent finishing into a finished object, the method including defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision as to at which height each of the multiple step-up cuts is made is a function of the required non-vertical slope of the finished object at the given height at various locations on the finished object and directing a computer controlled machine tool along the tool path.

Preferably, the function is a function of the smallest slope of the finished object at the given height.

In accordance with a preferred embodiment of the present invention the calculating the tool path includes selecting the height of each of the multiple step-up cuts to be the maximum height which ensures that each of the surfaces that are cut at that height lie between the inner limiting surface defined by the offset surface and the outer limiting surface defined by the scallop surface.

Preferably, the calculating the tool path includes selecting whether or not to cut the workpiece at a given location at each height of each of the multiple step-up cuts. Additionally or alternatively, the calculating the tool path includes selecting the width of the cut at a given location at each height of each of the multiple step-up cuts.

In accordance with a preferred embodiment of the present invention the tool path includes at least an initial tool path portion which defines an initial cut having vertical walls followed by at least one tool path portion which further machines the vertical walls of the initial cut into a plurality of stepwise vertical walls which together define the vertical slopes at each of the plurality of surface portions which lie adjacent the initial cut and correspond to the multiple step-up cuts.

Preferably, the calculating the tool path for the computer numerically controlled milling machine includes calculating the height of a step for a collection of mutually azimuthally separated points densely distributed all along a curve representing the intersection of a step forward edge wall with a lower step floor surface. Additionally, the calculating the height of a step for a collection of mutually azimuthally separated points includes for each one of the collection of points, drawing an imaginary vertical line, parallel to the Z-axis to extend through the point and intersect at a scallop curve intersection point with the scallop surface, ascertaining the lowest height of a scallop curve intersection point corresponding to any of the collection of mutually azimuthally separated points and selecting the height for the step as being the lowest height of a scallop curve intersection point corresponding to any of the collection of mutually azimuthally separated points.

In accordance with a preferred embodiment of the present invention the automated computer-implemented method for generating commands for controlling a computer numerically controlled milling machine also includes taking an imaginary slice through the workpiece perpendicular to the Z-axis at the height for the step, ascertaining a normal distance between the a point on the imaginary vertical line at the height and the scallop surface and if the normal distance for the one of the collection of points is less than a predetermined scallop tolerance, designating the one of the collection of points as a "good to cut" point.

There is even further provided in accordance with still another preferred embodiment of the present invention an automated computer-implemented method for generating commands for controlling a computer numerically controlled milling machine to fabricate an object from a workpiece, the method including ascertaining the available spindle power of the computer numerically controlled milling machine, automatically selecting, using a computer, a maximum depth and width of cut, which are a function at least of the available spindle power of the computer numerically controlled milling machine and configuring a tool path for a tool relative to the workpiece in which the tool path includes a plurality of tool path layers whose maximum thickness and width of cut correspond to the maximum depth and width of cut.

There is still further provided in accordance with yet another preferred embodiment of the present invention a method for machining a workpiece employing a computer numerically controlled milling machine, the method including ascertaining the available spindle power of the computer numerically controlled milling machine, automatically selecting, using a computer, a maximum depth and width of cut, which are a function at least of the available spindle power of the computer numerically controlled milling machine, configuring a tool path for a tool relative to the workpiece in which the tool path includes a plurality of tool path layers whose maximum thickness and width of cut correspond to the maximum depth and width of cut and directing a computer controlled machine tool along the tool path.

Preferably, the method also includes varying at least one additional parameter of the milling machine as a function of the available spindle power. Additionally, the at least one additional parameter of the milling machine is at least one of feed speed and rpm.

There is still further provided in accordance with yet a further preferred embodiment of the present invention an automated computer-implemented method for generating commands for controlling a computer numerically controlled milling machine to fabricate an object having a relatively thin wall from a workpiece, the method including automatically selecting, using a computer, a tool path having the following characteristics: initially machining the workpiece at first maximum values of cutting depth, cutting width, cutting speed and cutting feed to have a relatively thick wall at the location of an intended relatively thin wall, reducing the height of the relatively thick wall to the intended height of the intended relatively thin wall and thereafter reducing the thickness of the thick wall by machining the workpiece at second maximum values of cutting depth, cutting width, cutting speed and cutting feed, at least one of the second maximum values being less than a corresponding one of the first maximum values.

There is also provided in accordance with another preferred embodiment of the present invention a method for machining a workpiece employing a computer numerically controlled milling machine to fabricate an object having a relatively thin wall from the workpiece, the method including automatically selecting, using a computer, a tool path having the following characteristics: initially machining the workpiece at first maximum values of cutting depth, cutting width, cutting speed and cutting feed to have a relatively thick wall at the location of an intended relatively thin wall, reducing the height of the relatively thick wall to the intended height of the intended relatively thin wall and thereafter reducing the thickness of the thick wall by machining the workpiece at second maximum values of cutting depth, cutting width, cutting speed and cutting feed, at least one of the second maximum values being less than a corresponding one of the first maximum values and directing a computer controlled machine tool along the tool path.

There is also provided in accordance with another preferred embodiment of the present invention an automated computer-implemented method for generating commands for controlling a computer numerically controlled milling machine to fabricate an object, the method including ascertaining the extent of tool overhang of a tool being used in the computer numerically controlled milling machine, automatically selecting, using a computer, a tool path which is a function of the tool overhang, the tool path having the following characteristics: for a first tool overhang selecting a tool path having first maximum values of cutting depth, cutting width, cutting speed and cutting feed and for a second tool overhang which is greater than the first tool overhang, selecting a tool path having second maximum values of cutting depth, cutting width, cutting speed and cutting feed, at least one of the second maximum values being less than a corresponding one of the first maximum values.

There is even further provided in accordance with still another preferred embodiment of the present invention a method for machining a workpiece employing a computer numerically controlled milling machine, the method including ascertaining the extent of tool overhang of a tool being used in the computer numerically controlled milling machine, automatically selecting, using a computer, a tool path which is a function of the tool overhang, the tool path having the following characteristics: for a first tool overhang selecting a tool path having first maximum values of cutting depth, cutting width, cutting speed and cutting feed and for a second tool overhang which is greater than the first tool overhang, selecting a tool path having second maximum values of cutting depth, cutting width, cutting speed and cutting feed, at least one of the second maximum values being less than a corresponding one of the first maximum values and directing the tool along the tool path.

There is further provided in accordance with yet another preferred embodiment of the present invention an automated computer-implemented method for generating commands for controlling a computer numerically controlled milling machine to fabricate an object having a semi-open region, the method including estimating, using a computer, a first machining time for machining the semi-open region using a generally trichoidal type tool path, estimating, using a computer, a second machining time for machining the semi-open region using a generally spiral type tool path and automatically selecting, using a computer, a tool path type having a shorter machining time.

There is further provided in accordance with yet another preferred embodiment of the present invention a method for machining a workpiece using a computer numerically controlled milling machine to fabricate an object having a semi-open region, the method including estimating, using a computer, a first machining time for machining the semi-open region using a generally trichoidal type tool path, estimating, using a computer, a second machining time for machining the semi-open region using a generally spiral type tool path, automatically selecting, using a computer, a tool path type having a shorter machining time and directing a computer controlled machine tool along the tool path type having a shorter machining time.

Preferably, the generally spiral type tool path is characterized in that it includes: an initial spiral type tool path portion characteristic of machining a closed region, included within the semi-open region and having a relatively thick wall separating at least one side thereof from an open edge of the semi-open region and a plurality of tool paths suitable for removal of the relatively thick wall.

In accordance with a preferred embodiment of the present invention the plurality of tool paths are suitable for cutting mutually spaced relatively narrow channels in the thick wall, thereby defining a plurality of thick wall segments and thereafter removing the plurality of thick wall segments. Additionally, the plurality of tool paths include spiral tool paths suitable for removing the plurality of thick wall segments.

There is even further provided in accordance with still another preferred embodiment of the present invention an automated computer-implemented method for generating commands for controlling a computer numerically controlled milling machine to fabricate an object having a channel open at both its ends and including an intermediate narrowest portion, the method including automatically selecting, using a computer, a tool path type having first and second tool path portions, each starting at a different open end of the channel, the first and second tool path portions meeting at the intermediate narrowest portion.

There is also provided in accordance with another preferred embodiment of the present invention a method for machining a workpiece using a computer numerically controlled milling machine to fabricate an object having a channel open at both its ends and including an intermediate narrowest portion, the method including automatically selecting, using a computer, a tool path type having first and second tool path portions, each starting at a different open end of the channel, the first and second tool path portions meeting at the intermediate narrowest portion and directing a computer controlled machine tool along the first and second tool path portions.

There is yet further provided in accordance with still another preferred embodiment of the present invention an automated computer-implemented method for generating commands for controlling a computer numerically controlled milling machine to fabricate an object which fabrication involves cutting a workpiece at least first and second different maximum depths of cut, wherein the first maximum depth of cut is greater than the second maximum depth of cut the method including automatically selecting, using a computer, at least first and second tool paths having corresponding first and second maximum values of cutting width, cutting speed and cutting feed, at least one of the second maximum values being greater than a corresponding one of the first maximum values.

There is even further provided in accordance with yet another preferred embodiment of the present invention a method for machining a workpiece using a computer numerically controlled milling machine to fabricate an object which fabrication involves cutting a workpiece at least first and second different maximum depths of cut, wherein the first maximum depth of cut is greater than the second maximum depth of cut, the method including automatically selecting, using a computer, at least first and second tool paths having corresponding first and second maximum values of cutting width, cutting speed and cutting feed, at least one of the second maximum values being greater than a corresponding one of the first maximum values and directing a computer controlled machine tool along the at least first and second tool paths.

Preferably, the automatically selecting includes adjusting the first and second maximum values of cutting width, cutting speed and cutting feed to ensure that the mechanical load experienced by a milling tool is at a generally constant optimized value.

There is still further provided in accordance with yet a further preferred embodiment of the present invention an automated computer-implemented method for generating commands for controlling a computer numerically controlled milling machine to fabricate an object, wherein fabrication of the object involves calculating multiple tool paths requiring tool repositioning therebetween along a selectable repositioning path, the method including estimating, using a computer, a first repositioning time for a first repositioning path which includes travel in a clearance plane above a workpiece, estimating, using a computer, a second repositioning time for a second repositioning path which does not include tool travel in the clearance plane and automatically selecting, using a computer, a repositioning path having a shortest repositioning time.

There is further provided in accordance with another preferred embodiment of the present invention a method for machining a workpiece using a computer numerically controlled milling machine to fabricate an object, wherein fabrication of the object involves calculating multiple tool paths requiring tool repositioning therebetween along a selectable repositioning path, the method including estimating, using a computer, a first repositioning time for a first repositioning path which includes travel in a clearance plane above a workpiece, estimating, using a computer, a second repositioning time for a second repositioning path which does not include tool travel in the clearance plane, automatically selecting, using a computer, a repositioning path having a shortest repositioning time and directing a computer controlled machine tool along the repositioning path having the shortest repositioning time.

In accordance with yet another preferred embodiment of the present invention the second repositioning path is automatically selected by the computer from among possible multiple repositioning paths which do not include tool travel in the clearance plane on the basis of shortest repositioning time. Additionally, the multiple repositioning paths include repositioning paths which require raising of the tool and repositioning paths which do not require raising of the tool.

There is also provided in accordance with another preferred embodiment of the present invention an automated computer-implemented apparatus for generating commands for controlling a computer numerically controlled milling machine to fabricate a machined object from a workpiece having a Z-axis, the machined object being configured to facilitate subsequent finishing into a finished object, the apparatus including a tool path configuration engine operative for defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object and calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and the number of multiple step-up cuts in the workpiece at multiple heights along the Z-axis and the areas cut in each of the multiple step-up cuts are selected so as to generally minimize the amount of workpiece material that is removed from the workpiece during the cuts while ensuring that the surfaces of the machined object produced by the multiple step-up cuts all lie between the inner limiting surface defined by the offset surface and the outer limiting surface defined by the scallop surface.

There is further provided in accordance with yet another preferred embodiment of the present invention an automated computer-implemented apparatus for generating commands for controlling a computer numerically controlled milling machine to fabricate a machined object from a workpiece having a Z-axis, the machined object being configured to facilitate subsequent finishing into a finished object, the apparatus including a tool path configuration engine operative for defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object and calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision of whether or not to cut the workpiece at a given location at each height of each of the multiple step-up cuts is a function of the required non-vertical slope of the finished object at the given location.

There is even further provided in accordance with still another preferred embodiment of the present invention an automated computer-implemented apparatus for generating commands for controlling a computer numerically controlled milling machine to fabricate a machined object from a workpiece having a Z-axis, the machined object being configured to facilitate subsequent finishing into a finished object, the apparatus including a tool path configuration engine operative for defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object and calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision as to at which height each of the multiple step-up cuts is made is a function of the required non-vertical slope of the finished object at the given height at various locations on the finished object.

Preferably, the function is a function of the smallest slope of the finished object at the given height.

There is further provided in accordance with another preferred embodiment of the present invention a computer numerically controlled milling machine for fabricating a machined object from a workpiece having a Z-axis, the machined object being configured to facilitate subsequent finishing into a finished object, the computer numerically controlled milling machine including a controller operative for defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and the number of multiple step-up cuts in the workpiece at multiple heights along the Z-axis and the areas cut in each of the multiple step-up cuts are selected so as to generally minimize the amount of workpiece material that is removed from the workpiece during the cuts while ensuring that the surfaces of the machined object produced by the multiple step-up cuts all lie between the inner limiting surface defined by the offset surface and the outer limiting surface defined by the scallop surface and directing a computer controlled machine tool along the tool path.

There is still further provided in accordance with yet another preferred embodiment of the present invention a computer numerically controlled milling machine for fabricating a machined object from a workpiece having a Z-axis, the machined object being configured to facilitate subsequent finishing into a finished object, the computer numerically controlled milling machine including a controller operative for defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision of whether or not to cut the workpiece at a given location at each height of each of the multiple step-up cuts is a function of the required non-vertical slope of the finished object at the given location and directing a computer controlled machine tool along the tool path.

There is even further provided in accordance with still another preferred embodiment of the present invention a computer numerically controlled milling machine for fabricating a machined object from a workpiece having a Z-axis, the machined object being configured to facilitate subsequent finishing into a finished object, the computer numerically controlled milling machine including a controller operative for defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision as to at which height each of the multiple step-up cuts is made is a function of the required non-vertical slope of the finished object at the given height at various locations on the finished object and directing a computer controlled machine tool along the tool path.

Preferably, the function is a function of the smallest slope of the finished object at the given height.

In accordance with a preferred embodiment of the present invention the calculating the tool path includes selecting the height of each of the multiple step-up cuts to be the maximum height which ensures that each of the surfaces that are cut at that height lie between the inner limiting surface defined by the offset surface and the outer limiting surface defined by the scallop surface.

Preferably, the calculating the tool path includes selecting whether or not to cut the workpiece at a given location at each height of each of the multiple step-up cuts. Additionally or alternatively, the calculating the tool path includes selecting the width of the cut at a given location at each height of each of the multiple step-up cuts.

In accordance with a preferred embodiment of the present invention the tool path includes at least an initial tool path portion which defines an initial cut having vertical walls followed by at least one tool path portion which further machines the vertical walls of the initial cut into a plurality of stepwise vertical walls which together define the vertical slopes at each of the plurality of surface portions which lie adjacent the initial cut and correspond to the multiple step-up cuts.

Preferably, the calculating the tool path for the computer numerically controlled milling machine includes calculating the height of a step for a collection of mutually azimuthally separated points densely distributed all along a curve representing the intersection of a step forward edge wall with a lower step floor surface. Additionally, the calculating the height of a step for a collection of mutually azimuthally separated points includes for each one of the collection of points, drawing an imaginary vertical line, parallel to the Z-axis to extend through the point and intersect at a scallop curve intersection point with the scallop surface, ascertaining the lowest height of a scallop curve intersection point corresponding to any of the collection of mutually azimuthally separated points and selecting the height for the step as being the lowest height of a scallop curve intersection point corresponding to any of the collection of mutually azimuthally separated points.

In accordance with a preferred embodiment of the present invention the calculating the tool path for the computer numerically controlled milling machine also includes taking an imaginary slice through the workpiece perpendicular to the Z-axis at the height for the step, ascertaining a normal distance between the a point on the imaginary vertical line at the height and the scallop surface and if the normal distance for the one of the collection of points is less than a predetermined scallop tolerance, designating the one of the collection of points as a "good to cut" point.

There is even further provided in accordance with still another preferred embodiment of the present invention an automated computer-implemented apparatus for generating commands for controlling a computer numerically controlled milling machine to fabricate an object from a workpiece, the apparatus including a tool path configuration engine operative for ascertaining the available spindle power of the computer numerically controlled milling machine, automatically selecting, using a computer, a maximum depth and width of cut, which are a function at least of the available spindle power of the computer numerically controlled milling machine and configuring a tool path for a tool relative to the workpiece in which the tool path includes a plurality of tool path layers whose maximum thickness and width of cut correspond to the maximum depth and width of cut.

There is also provided in accordance with another preferred embodiment of the present invention a computer numerically controlled milling machine including a controller operative for ascertaining the available spindle power of the computer numerically controlled milling machine, automatically selecting a maximum depth and width of cut, which are a function at least of the available spindle power of the computer numerically controlled milling machine, configuring a tool path for a tool relative to a workpiece in which the tool path includes a plurality of tool path layers whose maximum thickness and width of cut correspond to the maximum depth and width of cut and directing a computer controlled machine tool along the tool path.

Preferably, the automatically selecting also includes varying at least one additional parameter of the milling machine as a function of the available spindle power. Additionally, the at least one additional parameter of the milling machine is at least one of feed speed and rpm.

There is still further provided in accordance with yet a further preferred embodiment of the present invention an automated computer-implemented apparatus for generating commands for controlling a computer numerically controlled milling machine to fabricate an object having a relatively thin wall from a workpiece, the apparatus including a tool path configuration engine operative for automatically selecting, using a computer, a tool path having the following characteristics: initially machining the workpiece at first maximum values of cutting depth, cutting width, cutting speed and cutting feed to have a relatively thick wall at the location of an intended relatively thin wall, reducing the height of the relatively thick wall to the intended height of the intended relatively thin wall; and thereafter reducing the thickness of the thick wall by machining the workpiece at second maximum values of cutting depth, cutting width, cutting speed and cutting feed, at least one of the second maximum values being less than a corresponding one of the first maximum values.

There is further provided in accordance with yet another preferred embodiment of the present invention a computer numerically controlled milling machine for fabricating an object having a relatively thin wall from a workpiece, the computer numerically controlled milling machine including a controller operative for automatically selecting a tool path having the following characteristics: initially machining the workpiece at first maximum values of cutting depth, cutting width, cutting speed and cutting feed to have a relatively thick wall at the location of an intended relatively thin wall, reducing the height of the relatively thick wall to the intended height of the intended relatively thin wall and thereafter reducing the thickness of the thick wall by machining the workpiece at second maximum values of cutting depth, cutting width, cutting speed and cutting feed, at least one of the second maximum values being less than a corresponding one of the first maximum values and directing a computer controlled machine tool along the tool path.

There is also provided in accordance with another preferred embodiment of the present invention an automated computer-implemented apparatus for generating commands for controlling a computer numerically controlled milling machine to fabricate an object, the apparatus including a tool path configuration engine operative for ascertaining the extent of tool overhang of a tool being used in the computer numerically controlled milling machine, automatically selecting, using a computer, a tool path which is a function of the tool overhang, the tool path having the following characteristics: for a first tool overhang selecting a tool path having first maximum values of cutting depth, cutting width, cutting speed and cutting feed and for a second tool overhang which is greater than the first tool overhang, selecting a tool path having second maximum values of cutting depth, cutting width, cutting speed and cutting feed, at least one of the second maximum values being less than a corresponding one of the first maximum values.

There is further provided in accordance with yet another preferred embodiment of the present invention a computer numerically controlled milling machine for machining a workpiece, the computer numerically controlled milling machine including a controller operative for ascertaining the extent of tool overhang of a tool being used in the computer numerically controlled milling machine, automatically selecting a tool path which is a function of the tool overhang, the tool path having the following characteristics: for a first tool overhang selecting a tool path having first maximum values of cutting depth, cutting width, cutting speed and cutting feed, for a second tool overhang which is greater than the first tool overhang, selecting a tool path having second maximum values of cutting depth, cutting width, cutting speed and cutting feed, at least one of the second maximum values being less than a corresponding one of the first maximum values and directing the tool along the tool path.

There is further provided in accordance with yet another preferred embodiment of the present invention an automated computer-implemented apparatus for generating commands for controlling a computer numerically controlled milling machine to fabricate an object having a semi-open region, the apparatus including a tool path configuration engine operative for estimating, using a computer, a first machining time for machining the semi-open region using a generally trichoidal type tool path, estimating, using a computer, a second machining time for machining the semi-open region using a generally spiral type tool path and automatically selecting, using a computer, a tool path type having a shorter machining time.

There is still further provided in accordance with yet a further preferred embodiment of the present invention a computer numerically controlled milling machine for fabricating an object having a semi-open region from a workpiece, the computer numerically controlled milling machine including a controller operative for estimating a first machining time for machining the semi-open region using a generally trichoidal type tool path, estimating a second machining time for machining the semi-open region using a generally spiral type tool path, automatically selecting a tool path type having a shorter machining time and directing a computer controlled machine tool along the tool path type having a shorter machining time.

Preferably, the generally spiral type tool path is characterized in that it includes: an initial spiral type tool path portion characteristic of machining a closed region, included within the semi-open region and having a relatively thick wall separating at least one side thereof from an open edge of the semi-open region and a plurality of tool paths suitable for removal of the relatively thick wall.

In accordance with a preferred embodiment of the present invention the plurality of tool paths are suitable for cutting mutually spaced relatively narrow channels in the thick wall, thereby defining a plurality of thick wall segments and thereafter removing the plurality of thick wall segments. Additionally, the plurality of tool paths include spiral tool paths suitable for removing the plurality of thick wall segments.

There is even further provided in accordance with still another preferred embodiment of the present invention an automated computer-implemented apparatus for generating commands for controlling a computer numerically controlled milling machine to fabricate an object having a channel open at both its ends and including an intermediate narrowest portion, the apparatus including a tool path configuration engine operative for automatically selecting, using a computer, a tool path type having first and second tool path portions, each starting at a different open end of the channel, the first and second tool path portions meeting at the intermediate narrowest portion.

There is also provided in accordance with still another preferred embodiment of the present invention a computer numerically controlled milling machine for machining a workpiece to fabricate an object having a channel open at both its ends and including an intermediate narrowest portion, the computer numerically controlled milling machine including a controller operative for automatically selecting a tool path type having first and second tool path portions, each starting at a different open end of the channel, the first and second tool path portions meeting at the intermediate narrowest portion and directing a computer controlled machine tool along the first and second tool path portions.

There is yet further provided in accordance with still another preferred embodiment of the present invention an automated computer-implemented apparatus for generating commands for controlling a computer numerically controlled milling machine to fabricate an object which fabrication involves cutting a workpiece at least first and second different maximum depths of cut, wherein the first maximum depth of cut is greater than the second maximum depth of cut the apparatus including a tool path configuration engine operative for automatically selecting, using a computer, at least first and second tool paths having corresponding first and second maximum values of cutting width, cutting speed and cutting feed, at least one of the second maximum values being greater than a corresponding one of the first maximum values.

There is even further provided in accordance with yet another preferred embodiment of the present invention a computer numerically controlled milling machine for machining a workpiece to fabricate an object which fabrication involves cutting a workpiece at least first and second different maximum depths of cut, wherein the first maximum depth of cut is greater than the second maximum depth of cut, the computer numerically controlled milling machine including a controller operative for automatically selecting at least first and second tool paths having corresponding first and second maximum values of cutting width, cutting speed and cutting feed, at least one of the second maximum values being greater than a corresponding one of the first maximum values and directing a computer controlled machine tool along the at least first and second tool paths.

Preferably, the automatically selecting includes adjusting the first and second maximum values of cutting width, cutting speed and cutting feed to ensure that the mechanical load experienced by a milling tool is at a generally constant optimized value.

There is still further provided in accordance with yet a further preferred embodiment of the present invention an automated computer-implemented apparatus for generating commands for controlling a computer numerically controlled milling machine to fabricate an object, wherein fabrication of the object involves calculating multiple tool paths requiring tool repositioning therebetween along a selectable repositioning path, the apparatus including a tool path configuration engine operative for estimating, using a computer, a first repositioning time for a first repositioning path which includes travel in a clearance plane above a workpiece, estimating, using a computer, a second repositioning time for a second repositioning path which does not include tool travel in the clearance plane and automatically selecting, using a computer, a repositioning path having a shortest repositioning time.

There is further provided in accordance with another preferred embodiment of the present invention a computer numerically controlled milling machine for machining a workpiece to fabricate an object, wherein fabrication of the object involves calculating multiple tool paths requiring tool repositioning therebetween along a selectable repositioning path, the computer numerically controlled milling machine including a controller operative for estimating a first repositioning time for a first repositioning path which includes travel in a clearance plane above a workpiece, estimating a second repositioning time for a second repositioning path which does not include tool travel in the clearance plane, automatically selecting a repositioning path having a shortest repositioning time and directing a computer controlled machine tool along the repositioning path having the shortest repositioning time.

In accordance with a preferred embodiment of the present invention the second repositioning path is automatically selected by the computer from among possible multiple repositioning paths which do not include tool travel in the clearance plane on the basis of shortest repositioning time. Additionally, the multiple repositioning paths include repositioning paths which require raising of the tool and repositioning paths which do not require raising of the tool.

There is also provided in accordance with another preferred embodiment of the present invention a machined object fabricated from a workpiece having a Z-axis, the machined object being configured to facilitate subsequent finishing into a finished object, using a computer numerically controlled milling machine by defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and the number of multiple step-up cuts in the workpiece at multiple heights along the Z-axis and the areas cut in each of the multiple step-up cuts are selected so as to generally minimize the amount of workpiece material that is removed from the workpiece during the cuts while ensuring that the surfaces of the machined object produced by the multiple step-up cuts all lie between the inner limiting surface defined by the offset surface and the outer limiting surface defined by the scallop surface and directing a computer controlled machine tool along the tool path.

There is further provided in accordance with still another preferred embodiment of the present invention a machined object fabricated from a workpiece having a Z-axis, the machined object being configured to facilitate subsequent finishing into a finished object, using a computer numerically controlled milling machine by defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision of whether or not to cut the workpiece at a given location at each height of each of the multiple step-up cuts is a function of the required non-vertical slope of the finished object at the given location and directing a computer controlled machine tool along the tool path.

There is yet further provided in accordance with another preferred embodiment of the present invention a machined object fabricated from a workpiece having a Z-axis, the machined object being configured to facilitate subsequent finishing into a finished object, using a computer numerically controlled milling machine by defining a surface of the finished object, defining an offset surface, the offset surface being outside the surface of the finished object and separated therefrom by an offset distance, the offset surface defining an inner limiting surface of the machined object, defining a scallop surface, the scallop surface being outside the offset surface and separated therefrom by a scallop distance, the scallop surface defining an outer limiting surface of the machined object, calculating a tool path for the computer numerically controlled milling machine which produces multiple step-up cuts in the workpiece at multiple heights along the Z-axis, the multiple step up cuts in the workpiece resulting in the machined object, wherein surfaces of the machined object produced by the multiple step-up cuts all lie between the inner limiting surface defined by the offset surface and the outer limiting surface defined by the scallop surface and a decision as to at which height each of the multiple step-up cuts is made is a function of the required non-vertical slope of the finished object at the given height at various locations on the finished object and directing a computer controlled machine tool along the tool path.

Preferably, the function is a function of the smallest slope of the finished object at the given height.

In accordance with a preferred embodiment of the present invention the calculating the tool path includes selecting the height of each of the multiple step-up cuts to be the maximum height which ensures that each of the surfaces that are cut at that height lie between the inner limiting surface defined by the offset surface and the outer limiting surface defined by the scallop surface.

Preferably, the calculating the tool path includes selecting whether or not to cut the workpiece at a given location at each height of each of the multiple step-up cuts. In accordance with a preferred embodiment of the present invention the calculating the tool path includes selecting the width of the cut at a given location at each height of each of the multiple step-up cuts.

Preferably, the tool path includes at least an initial tool path portion which defines an initial cut having vertical walls followed by at least one tool path portion which further machines the vertical walls of the initial cut into a plurality of stepwise vertical walls which together define the vertical slopes at each of the plurality of surface portions which lie adjacent the initial cut and correspond to the multiple step-up cuts.

Preferably, the calculating the tool path for the computer numerically controlled milling machine includes calculating the height of a step for a collection of mutually azimuthally separated points densely distributed all along a curve representing the intersection of a step forward edge wall with a lower step floor surface. In accordance with a preferred embodiment of the present invention the calculating the height of a step for a collection of mutually azimuthally separated points includes for each one of the collection of points, drawing an imaginary vertical line, parallel to the Z-axis to extend through the point and intersect at a scallop curve intersection point with the scallop surface, ascertaining the lowest height of a scallop curve intersection point corresponding to any of the collection of mutually azimuthally separated points and selecting the height for the step as being the lowest height of a scallop curve intersection point corresponding to any of the collection of mutually azimuthally separated points.

Preferably, the calculating the tool path also includes taking an imaginary slice through the workpiece perpendicular to the Z-axis at the height for the step, ascertaining a normal distance between the a point on the imaginary vertical line at the height and the scallop surface and if the normal distance for the one of the collection of points is less than a predetermined scallop tolerance, designating the one of the collection of points as a "good to cut" point.

There is even further provided in accordance with yet another preferred embodiment of the present invention a machined object fabricated from a workpiece using a computer numerically controlled milling machine by ascertaining the available spindle power of the computer numerically controlled milling machine, automatically selecting a maximum depth and width of cut, which are a function at least of the available spindle power of the computer numerically controlled milling machine, configuring a tool path for a tool relative to the workpiece in which the tool path includes a plurality of tool path layers whose maximum thickness and width of cut correspond to the maximum depth and width of cut and directing a computer controlled machine tool along the tool path.

Preferably, the automatically selecting also includes varying at least one additional parameter of the milling machine as a function of the available spindle power. In accordance with a preferred embodiment of the present invention the at least one additional parameter of the milling machine is at least one of feed speed and rpm.

There is still further provided in accordance with still another preferred embodiment of the present invention a machined object having a relatively thin wall fabricated from a workpiece using a computer numerically controlled milling machine by automatically selecting a tool path having the following characteristics: initially machining the workpiece at first maximum values of cutting depth, cutting width, cutting speed and cutting feed to have a relatively thick wall at the location of an intended relatively thin wall, reducing the height of the relatively thick wall to the intended height of the intended relatively thin wall and thereafter reducing the thickness of the thick wall by machining the workpiece at second maximum values of cutting depth, cutting width, cutting speed and cutting feed, at least one of the second maximum values being less than a corresponding one of the first maximum values and directing a computer controlled machine tool along the tool path.

There is also provided in accordance with another preferred embodiment of the present invention a machined object machined from a workpiece using a computer numerically controlled milling machine by ascertaining the extent of tool overhang of a tool being used in the computer numerically controlled milling machine, automatically selecting a tool path which is a function of the tool overhang, the tool path having the following characteristics: for a first tool overhang selecting a tool path having first maximum values of cutting depth, cutting width, cutting speed and cutting feed; for a second tool overhang which is greater than the first tool overhang, selecting a tool path having second maximum values of cutting depth, cutting width, cutting speed and cutting feed, at least one of the second maximum values being less than a corresponding one of the first maximum values and directing the tool along the tool path.

There is further provided in accordance with yet another preferred embodiment of the present invention a machined object having a semi-open region fabricated from a workpiece using a computer numerically controlled milling machine by estimating a first machining time for machining the semi-open region using a generally trichoidal type tool path, estimating a second machining time for machining the semi-open region using a generally spiral type tool path, automatically selecting a tool path type having a shorter machining time and directing a computer controlled machine tool along the tool path type having a shorter machining time.

Preferably, the generally spiral type tool path is characterized in that it includes an initial spiral type tool path portion characteristic of machining a closed region, included within the semi-open region and having a relatively thick wall separating at least one side thereof from an open edge of the semi-open region and a plurality of tool paths suitable for removal of the relatively thick wall.

In accordance with a preferred embodiment of the present invention the plurality of tool paths are suitable for cutting mutually spaced relatively narrow channels in the thick wall, thereby defining a plurality of thick wall segments and thereafter removing the plurality of thick wall segments.

Additionally, the plurality of tool paths include spiral tool paths suitable for removing the plurality of thick wall segments.

There is still further provided in accordance with still another preferred embodiment of the present invention a machined object having a channel open at both its ends and including an intermediate narrowest portion fabricated using a computer numerically controlled milling machine by automatically selecting a tool path type having first and second tool path portions, each starting at a different open end of the channel, the first and second tool path portions meeting at the intermediate narrowest portion and directing a computer controlled machine tool along the first and second tool path portions.

There is even further provided in accordance with yet a further preferred embodiment of the present invention a machined object, the fabrication of which involves cutting a workpiece at least first and second different maximum depths of cut, wherein the first maximum depth of cut is greater than the second maximum depth of cut, fabricated using a computer numerically controlled milling machine by automatically selecting at least first and second tool paths having corresponding first and second maximum values of cutting width, cutting speed and cutting feed, at least one of the second maximum values being greater than a corresponding one of the first maximum values and directing a computer controlled machine tool along the at least first and second tool paths.

In accordance with a preferred embodiment of the present invention the automatically selecting includes adjusting the first and second maximum values of cutting width, cutting speed and cutting feed to ensure that the mechanical load experienced by a milling tool is at a generally constant optimized value.

There is also provided in accordance with yet another preferred embodiment of the present invention a machined object, the fabrication of which involves calculating multiple tool paths requiring tool repositioning therebetween along a selectable repositioning path, fabricated using a computer numerically controlled milling machine by estimating a first repositioning time for a first repositioning path which includes travel in a clearance plane above a workpiece, estimating a second repositioning time for a second repositioning path which does not include tool travel in the clearance plane, automatically selecting a repositioning path having a shortest repositioning time and directing a computer controlled machine tool along the repositioning path having the shortest repositioning time.

Preferably, the second repositioning path is automatically selected by the computer from among possible multiple repositioning paths which do not include tool travel in the clearance plane on the basis of shortest repositioning time. Additionally, the multiple repositioning paths include repositioning paths which require raising of the tool and repositioning paths which do not require raising of the tool.

BRIEF DESCRIPTION OF THE DRAWINGS

The present invention will be understood and appreciated from the following detailed description, taken in conjunction with the drawings in which:

FIGS. 2A-2L-2 are together another series of simplified illustrations which are helpful in understanding the invention;

FIG. 5 is a simplified illustration of a workpiece, a machined object formed from the workpiece in accordance with a preferred embodiment of the present invention, and a finished object to be produced from the machined object;

FIGS. 9A, 9B and 9C are simplified sectional illustrations of the workpiece of FIGS. 7 and 8 superimposed over the corresponding annotated sectional illustrations in the enlargements of FIG. 6 and respectively showing elements of the calculation of first, second and third step-up cuts in accordance with a preferred embodiment of the present invention;

FIG. 12C is a simplified top view illustration of a portion of the workpiece of FIGS. 7-9C following the step-up cut illustrated in FIGS. 12A & 12B in accordance with a preferred embodiment of the present invention;

FIG. 18 is a simplified pictorial illustration of tool paths for machining objects which are calculated based on optimal cutting conditions for a maximum cutting depth and tool paths for cutting portions which involve cutting at less than the maximum cutting depth are calculated based on modified cutting conditions optimized for cutting at a depth less than the maximum cutting depth in accordance with a preferred embodiment of the present invention.

DETAILED DESCRIPTION OF PREFERRED EMBODIMENTS

The present invention relates to various aspects of an automated computer-implemented method for generating commands for controlling a computer numerical controlled (CNC) machine to fabricate an object from a stock material, various aspects of a method for machining the stock material which employs the above commands, automated computer-implemented apparatus for generating the above commands, a numerically-controlled machine operative to fabricate an object from a stock material by using the above commands, and an object fabricated by using the above commands.

The invention, in its various aspects, is described hereinbelow with respect to a series of drawings, which initially illustrate an example of an object to be fabricated, a simulated overlay of the object on a stock material to be machined and sequences of machining steps that are produced by commands generated in accordance with the present invention. It is appreciated that although sequential machining steps are illustrated, the invention is not limited to a machining method but extends as noted above to the generation of the commands, the apparatus, which generates them, the apparatus which carries them out and to the result produced thereby.

The term "calculation" is used throughout to refer to the generation of commands which produce sequences of machining steps to be employed in the machining of a particular region of the stock material. The definitions "calculate", "calculation" and calculation are of corresponding meaning.

Figure 1A:
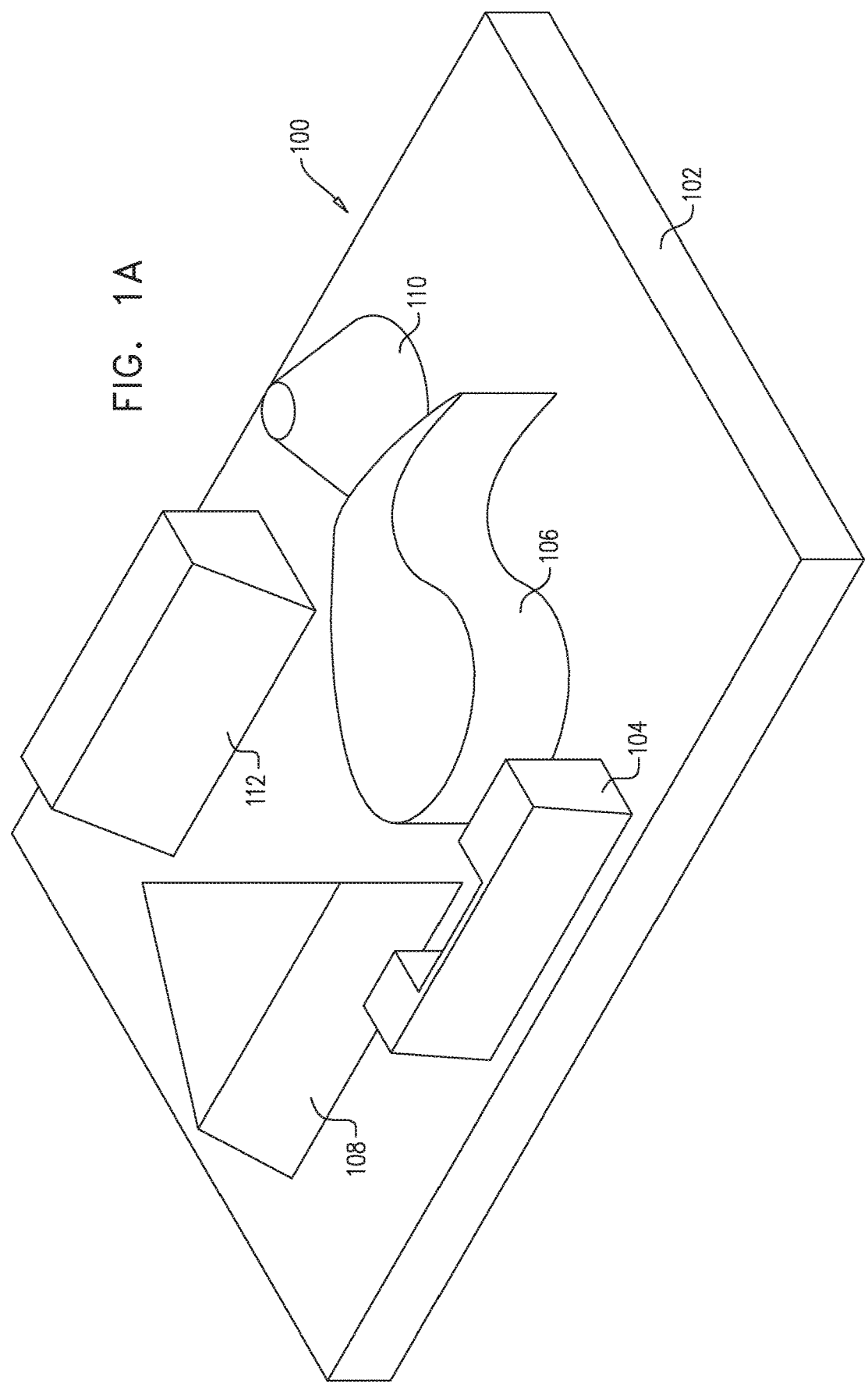
FIGS. 1A-1S-2 are together a series of simplified illustrations which are helpful in understanding the invention.

FIGS. 1A and 1B are respective pictorial and top view illustrations of an object 100 which is an example of objects that can be fabricated in accordance with the present invention. The configuration of the object 100 is selected to illustrate various particular features of the present invention. It is noted that any suitable three-dimensional object that can be machined by a conventional 3-axis CNC machine tool may be fabricated in accordance with a preferred embodiment of the present invention.

Figure 1C:
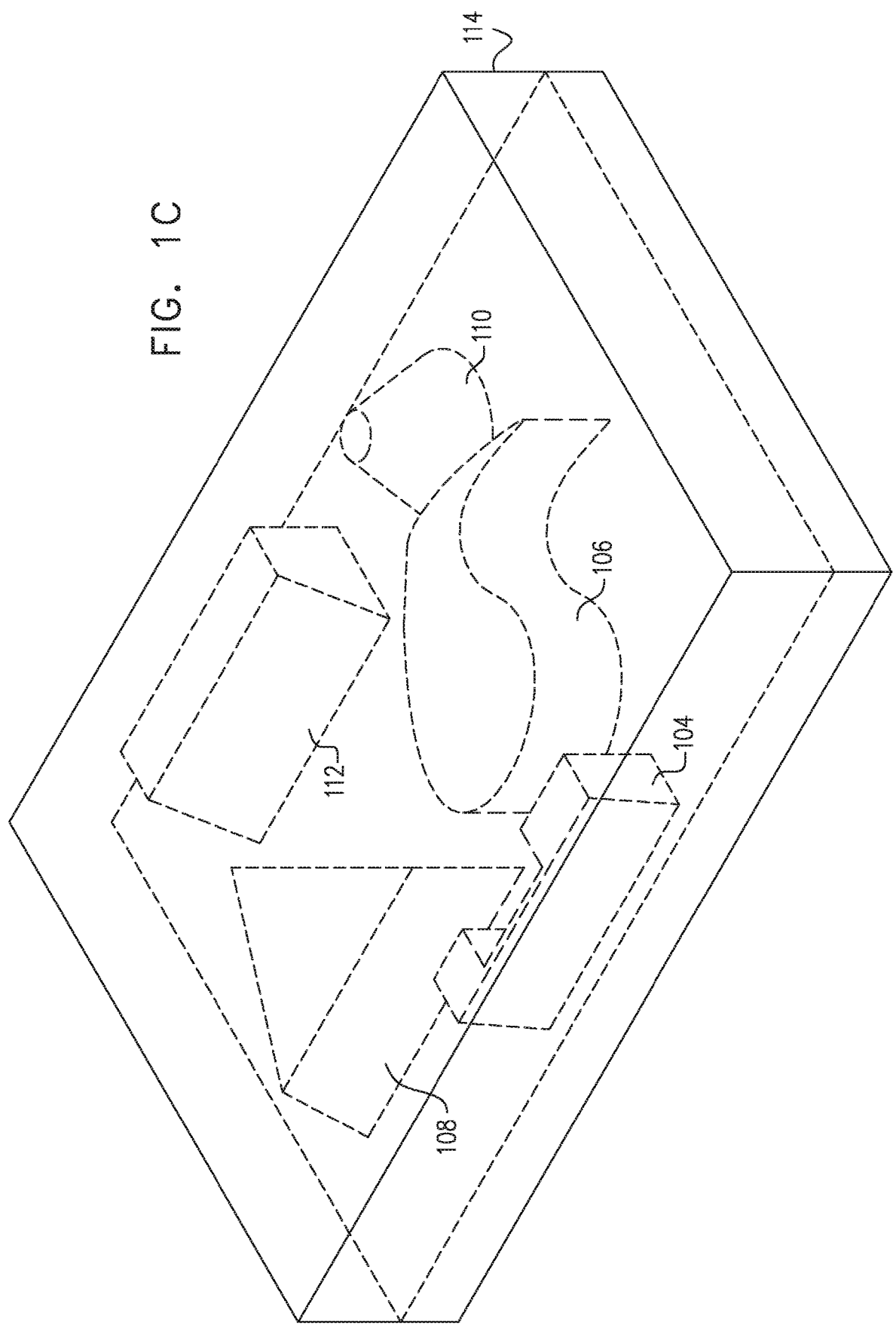

As seen in FIGS. 1A & 1B, the object 100 is seen to have a generally planar base portion 102 from which five protrusions, here designated by reference numerals 104, 106, 108, 110 and 112 extend. FIG. 1C shows stock material 114 overlaid by an outline of object 100.

In accordance with a preferred embodiment of the present invention, a tool path designer, using the automated computer-implemented method for generating commands for controlling a computer numerical controlled machine of the present invention, accesses a CAD drawing of the object 100 in a standard CAD format, such as SOLIDWORKS®. He selects a specific machine tool to be used in fabrication of the object 100 from a menu and selects a specific rotating cutting tool to carry out each machining function required to fabricate the object.

For the sake of simplicity, the illustrated object 100 is chosen to be an object that can be fabricated by a single machining function, it being appreciated that the applicability of the present invention is not limited to objects which can be fabricated by a single machining function.

The tool path designer then defines the geometry of the stock material to be used in fabrication of the object 100. This may be done automatically by the automated computer-implemented apparatus of the present invention or manually by the tool path designer. The tool path designer then specifies the material which constitutes the stock material, for example, INCONEL® 718. The present invention utilizes the choice of machine tool, rotating cutting tool and the material by the tool path designer to calculate various operational parameters, based on characteristics of the machine tool, rotating cutting tool and material.

In accordance with a preferred embodiment of the present invention, a series of display screens are employed to provide a display for the tool path designer, indicating the various operational parameters, such as minimum and maximum surface cutting speed, minimum and maximum chip thickness, minimum and maximum feed speed, minimum and maximum spindle rotational speed, minimum and maximum engagement angles between the rotating cutting tool and the workpiece, axial depth of cut, machining aggressiveness level. An example of such a series of display screens appears in FIGS. 3A-3D.

The tool path designer is given limited latitude in changing some of the parameters, such as particularly, the machining aggressiveness level. Preferably, the tool path designer may also instruct the system to select parameters for which, for example, optimization of machining time, wear inflicted on the cutting tool, machining cost or any combination thereof is achieved. It is appreciated that although for some of the operational parameters described hereinabove a range of values is displayed to the tool path designer, the present invention also calculates an optimal operational value for all of the operational parameters to be employed.

Once all of the parameters appearing on the screen, such as the display screens of FIGS. 3A-3D, are finalized, a tool path for machining the workpiece is calculated in accordance with a preferred embodiment of the present invention. The calculation of a tool path in accordance with a preferred embodiment of the present invention is described hereinbelow with reference to FIGS. 1A-1S-2 which illustrate the actual progression of tool path in stock material 114.

It is a particular feature of the present invention that the tool path is calculated recursively, whereby initially a first tool path segment of the tool path is calculated for an initial region of the workpiece, and thereafter a subsequent sequential tool path segment of the tool path is similarly calculated for an initial region of a remaining region of the workpiece. Additional subsequent sequential tool path segments are similarly calculated, until a tool path for machining the entire workpiece to the desired object has been calculated.

Initially, a first cross section of the stock material having the outline of the object 100 overlaid thereon and having a depth equal to the designated axial depth of cut is calculated. This cross section is illustrated schematically in FIG. 1D and is designated by reference numeral 116. Cross section 116 is characterized as having an external boundary 118 and a plurality of islands 105, 107, 109, 111 and 113 respectively corresponding to the cross sections of protrusions 104, 106, 108, 110 and 112 at the depth of cross section 116. It is appreciated that islands 105, 107, 109, 111 and 113 are offset externally to the cross sections of protrusions 104, 106, 108, 110 and 112 by a distance which is generally a bit larger than the radius of the rotating cutting tool, thereby when machining a tool path which circumvents the islands, a narrow finishing width remains to be finish machined at a later stage.

It is appreciated that the axial depth of cross section 116 constitutes a first step down which is a first phase in the machining of object 100. Throughout, the term "step down" is used to describe a single machining phase at a constant depth. As shown in FIG. 1C, the complete machining of object 100 requires two additional step downs corresponding to cross sections 119 and 120. Therefore, subsequent to the calculation of cross section 116, a second step down and thereafter a third step down are calculated, corresponding to cross sections 119 and 120. Preferably, the vertical distance between subsequent step downs is generally between 1 and 4 times the diameter of the rotating cutting tool.

In accordance with a preferred embodiment of the present invention, a machining region is initially automatically identified in cross section 116. There are preferably three types of machining regions which are classified by the characteristics of their exterior boundaries. Throughout, a segment of the boundary of a region through which the region can be reached by a rotating cutting tool from the outside of the region by horizontal progression of the rotating cutting tool is termed an "open edge". All other boundary segments are termed throughout as "closed edges".

The three types of machining regions are classified as follows:

Type I—an open region characterized in that the entire exterior boundary of the region consists solely of open edges;

Type II—a semi-open region characterized in that the exterior boundary of the region consists of both open edges and closed edges;

Type III—a closed region characterized in that the entire exterior boundary of the region consists solely of closed edges;

Preferably, a tool path to be employed in machining a region is calculated to comprise one or more tool path segments, wherein each tool path segment is one of a converging spiral tool path segment, a trochoidal-like tool path segment and a diverging spiral tool path segment. Generally, a converging spiral tool path segment is preferred when machining a Type I region, a trochoidal-like tool path segment is preferred when machining a Type II region, and a diverging spiral tool path is preferred when machining a Type III region.

The term "trochoidal-like" is used throughout to mean a trochoidal tool path or a modification thereof that retains a curved cutting path and a return path which could be either curved or generally straight.

As known to persons skilled in the art, the machining of spiral tool path segments is generally more efficient with respect to the amount of material removed per unit of time than the machining of trochoidal-like tool path segments for generally similar average stepovers. Therefore, the present invention seeks to maximize the area to be machined by spiral tool path segments.

A converging spiral tool path segment calculated to machine a Type I region preferably is a tool path segment which spirals inwardly from an external boundary of the region to an internal contour. The internal contour is preferably calculated as follows:

In a case where there are no islands within the external boundary of the Type I region, the internal contour is preferably calculated to be a small circle having a radius which is generally smaller than the radius of the cutting tool, and which is centered around the center of area of the region;

In a case where there is one island within the external boundary of the Type I region, and the shortest distance between the one island and the external boundary of the Type I region is longer than a selected fraction of the diameter of the rotating cutting tool, the internal contour is preferably calculated to be generally alongside the external boundary of the island; and In a case where:
 there is one island within the external boundary of the Type I region and the shortest distance between the single island and the external boundary of the Type I region is shorter than a selected fraction of the diameter of the rotating cutting tool; or
 there is more than one island within the external boundary of the Type I region
 the internal contour is preferably calculated to be a contour which is offset interiorly to the external boundary of the region by a distance which is generally equal to 1.5 radii of the rotating cutting tool.

Once the internal contour is calculated, it is automatically verified that the internal contour does not self intersect. In a case where the internal contour does self intersect at one or more locations, preferably a bottleneck is identified in the vicinity of each such self intersection. If the bottleneck does not overlap with an island, a separating channel is preferably calculated at each such bottleneck. A separating channel preferably divides the region into two Type I regions which can be machined independently of each other by separate converging spiral tool path segments. If the bottleneck does overlap with an island, the internal contour is preferably recalculated to be offset interiorly to the external boundary by generally half of the original offset. This process is repeated until an internal contour which does not self-intersect is calculated.

It is a particular feature of the present invention that a converging spiral tool path segment which spirals inwardly from an external boundary of a region to an internal contour is calculated to be a "morphing spiral". The term "morphing spiral" is used throughout to mean a spiral tool path segment which gradually morphs the geometrical shape of one boundary or contour to the geometrical shape of a second boundary or contour as the spiral tool path segment spirals therebetween. While various methods of morphing are known to persons skilled in the art, the present invention seeks to implement particular methods of morphing in accordance with preferred embodiments of the present invention, as described hereinbelow.

It is another particular feature of the present invention that the engagement angle of the cutting tool employed throughout the tool path segment is not fixed, but rather may vary between the predetermined minimum and maximum engagement angles over the course of the tool path segment. This varying of the engagement angle allows for varying stepovers over the course of the tool path segment, and thereby enables the tool path segment to morph between two generally dissimilar geometrical shapes. The term "stepover" is used throughout to designate the distance between sequential loops of a spiral tool path segment. It is appreciated that the cutting tool efficiency which is achieved by employing a morphing spiral tool path segment is generally significantly greater than the cutting tool efficiency which is achieved by employing a trochoidal-like tool path segment. It is also appreciated that where appropriate, an engagement angle which is generally close to the maximum engagement angle is preferred.

While it is appreciated that employing varying engagement angles over the course of a tool path segment may have a negative impact of increasing the wear of the cutting tool due to the varying mechanical load on the cutting tool and to chip thinning, it is a particular feature of the present invention that this negative impact is generally compensated for by automatically dynamically adjusting the feed velocity to correspond to the varying engagement angle. It is another particular feature of the present invention that the engagement angle is varied gradually over the course of the tool path segment, thereby preventing sudden and sharp changes in cutting tool load, and thereby further reducing excess wear of the cutting tool.

Figure 4A:
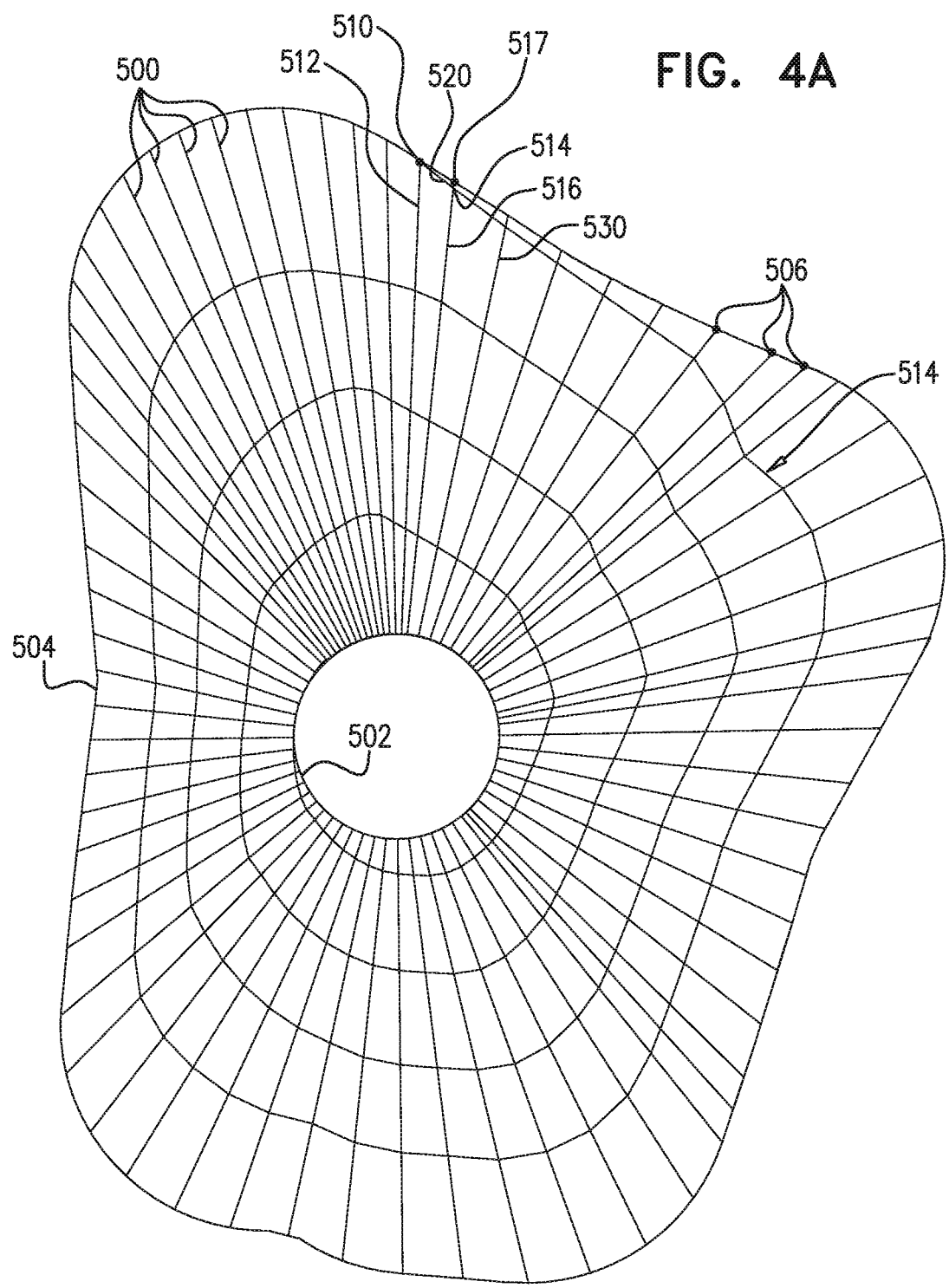
FIGS. 4A and 4B are simplified illustrations of details of functionality illustrated more generally in certain ones of FIGS. 1A-1S-2 and FIGS. 2A-2L-2.

Returning now to the calculation of a converging spiral tool path segment employed to machine a Type I region, once an internal contour has been calculated, the number of loops to be included in a converging spiral tool path segment which spirals inwardly from the external boundary of the region to the internal contour is calculated preferably as illustrated in FIG. 4A.

As shown in FIG. 4A, a plurality of bridges 500 of a predefined density are each stretched from the internal contour 502 to the external boundary 504. A bridge point 506 of each of bridges 500 is initially defined as the point of intersection of bridge 500 with external boundary 504. The length of the shortest bridge divided by the minimum stepover is generally equal to the maximum number of loops that can be included in the spiral tool path segment. The length of the longest bridge divided by the maximum stepover is generally equal to the minimum number of loops which must be included in the spiral tool path. As described hereinabove, minimum and maximum engagement angles are determined based on information provided by the tool path designer, which angles determine the minimum and maximum stepover of the spiral tool path segment.

It is appreciated that the furthest distance, in any direction, from internal contour 502 which can be machined by a converging spiral tool path segment is the number of loops included in the converging spiral tool path segment multiplied by the maximum stepover. Areas between internal contour 502 and external boundary 504 beyond this furthest distance from the internal contour cannot be machined by the converging spiral tool path segment, and are therefore preferably machined by clipping prior to the machining of the converging spiral tool path segment. Throughout, the term "clipping" is used to define the calculation of machining of areas of a region which cannot be machined by an optimal spiral tool path segment. Typically, clipped areas are machined either by a trochoidal-like tool path segment, before the machining of the spiral tool path segment, or by machining a separating channel which separates the clipped area from the remainder of the region and by subsequently machining the separated clipped area separately by a spiral tool path segment.

Throughout, a parameter 'n' will be used to designate a possible number of loops to be included in a spiral tool path segment, wherein n is a number between the minimum number of loops which must be included in the spiral tool path segment and the maximum number of loops that can be included in the spiral tool path segment.

For each possible value of n, a first work time for a first machining method needed to machine the area between external boundary 504 and internal contour 502 is calculated by summing the time needed to machine the spiral tool path segment and the time needed to machine all clipped areas which were identified between external boundary 504 and internal contour 502 as described hereinabove. The optimal number of loops to be included in the spiral tool path segment is chosen to be the value of n for which the first calculated work time is the shortest.

In a case where the internal contour is calculated to be a small circle which is centered around the center of area of the region, a second work time for a second machining method is calculated by summing the work time needed to machine a separating channel extending along the shortest bridge connecting the external boundary to the internal contour, further extending through the small circle and then further extending along an opposite bridge up to an opposite segment of the external boundary, thus dividing the region into two independent Type I regions, and the work time needed to machine the two independent Type I regions. In a case where the second work time is shorter than the first work time, the second machining method is preferred over the first machining method.

Once the optimal number of loops to be included in the converging spiral tool path segment is chosen, clipped areas and tool paths for their removal are calculated as described hereinabove. Subsequently, a new external boundary defined by the clipped areas is calculated and all bridge points are updated accordingly to be located on the new external boundary. Thereafter, the actual path of the spiral tool path segment is calculated, as follows:

Initially, the bridge point 510 of a first bridge 512 is preferably selected as a first spiral point of spiral tool path segment 514. First bridge 512 is preferably selected to minimize the time required to move the cutting tool from its previous position. A possible second spiral point of spiral tool path segment 514 is calculated as a point on a second bridge 516, immediately adjacent to first bridge 512 in a climbing direction of the cutting tool from first bridge 512, which point is distanced from bridge point 517 of second bridge 516 along second bridge 516 by the length of second bridge 516 divided by the remaining number of loops to be included in tool path segment 514.

For the possible second spiral point, the engagement angle at which the cutting tool will engage the material by following the spiral tool path segment 514 from first spiral point 510 to the possible second spiral point is calculated. In a case where the calculated engagement angle is between the predetermined minimum and maximum engagement angles, the possible second spiral point is chosen as the second spiral point 518, and a new linear subsegment 520 between first spiral point 510 and second spiral point 518 is added to spiral tool path segment 514.

In a case where the engagement angle is less than the predetermined minimum engagement angle, a binary search for a second spiral point for which the calculated engagement angle is generally equal to the predetermined minimum engagement angle is performed. The binary search is performed between the possible second spiral point and a point on second bridge 516 distanced from bridge point 517 of second bridge 516 by the maximum stepover. Once a second spiral point 518 is found, a new linear subsegment 520 between first spiral point 510 and second spiral point 518 is added to spiral tool path segment 514.

In a case where the engagement angle is greater than the predetermined maximum engagement angle, a binary search for a second spiral point for which the calculated engagement angle is generally equal to the predetermined maximum engagement angle is performed. The binary search is performed between bridge point 517 of the second bridge 516 and the possible second spiral point. Once a second spiral point 518 is found, a new linear subsegment 520 between first spiral point 510 and second spiral point 518 is added to spiral tool path segment 514.

In a case where new linear subsegment 520 intersects with internal contour 502 of the region, the spiral tool path segment 514 is terminated at the point of intersection, possibly creating one or more separate unmachined residual areas generally adjacent to internal contour 502. For each such separate residual area, if the size of the separate residual area is larger than a predetermined small value, it is calculated to be machined by a trochoidal-like tool path segment.

In a case where new linear subsegment 520 intersects with an island, the calculation of spiral tool path segment 514 is terminated at the point of intersection, and a moat is calculated to commence at the point of intersection and circumvent the island. The remainder of the region for which a tool path has yet to be calculated is designated as a new Type I region to be calculated separately.

The term "moat" is used throughout to designate a trochoidal-like tool path segment which machines a channel generally adjacent to an island that circumvents the island, thereby separating the island from the remainder of the material which needs to be machined. The width of the moat is preferably at least 2.5 times the radius of the cutting tool and preferably at most 4 times the radius of the cutting tool. These values are predefined, however they may be modified by the tool path designer. It is a particular feature of the present invention that machining a moat around an island is operative to create a residual region which is of the same type as the original region. This is of particular value when machining a Type I region or a Type III region which are thus able to be generally machined by spiral tool path segments which are generally more efficient than trochoidal-like tool path segments.

Additionally, the machining of a moat to circumvent an island is effective in preventing the formation of two fronts of a machined region adjacent to the island, which may potentially form one or more long narrow residual walls between the two fronts. As known to persons skilled in the art, the formation of narrow residual walls is undesirable as machining them may lead to damage to the cutting tool and\or to the workpiece.

Once second spiral point 518 has been calculated, the remaining number of loops to be included in the remainder of tool path segment 514 is updated. It is appreciated that the remaining number of loops may be a mixed number. The subsequent segments of the remainder of spiral tool path segment 514 are calculated recursively, whereby second spiral point 518 is designated to be a new first point of the remainder of spiral tool path segment 514, and the bridge 530 immediately adjacent to second bridge 516 in a climbing direction of the cutting tool from second bridge 516 is designated to be a new second bridge. Additionally, second spiral point 518 is designated as a new bridge point of second bridge 516, and the remaining region to be machined is recalculated.

The machining of a Type II region is calculated as follows:

Initially, a spiral machining time is calculated as the sum of the machining time needed for machining separating channels adjacent to all closed edges of the Type II region and the machining time needed for machining the remaining area of the region by a converging spiral tool path segment. Additionally, a trochoidal-like machining time is calculated as the machining time needed for machining the entire Type II region by a trochoidal-like tool path segment. If the spiral machining time is shorter than the trochoidal-like machining time, separating channels are calculated adjacent to all closed edges of the region, and the remaining separated area is calculated to be machined by a converging spiral tool path segment. If the spiral machining time is longer than the trochoidal-like machining time, a trochoidal-like tool path segment is calculated as follows:

The longest open edge of the region is selected as the "front" of the region. The remainder of the exterior boundary of the region is defined as the "blocking boundary". A starting end is selected as one of the two ends of the front, for which when machining along the front from the starting end to the opposite end would result in a climb milling tool path.

Figure 4B:
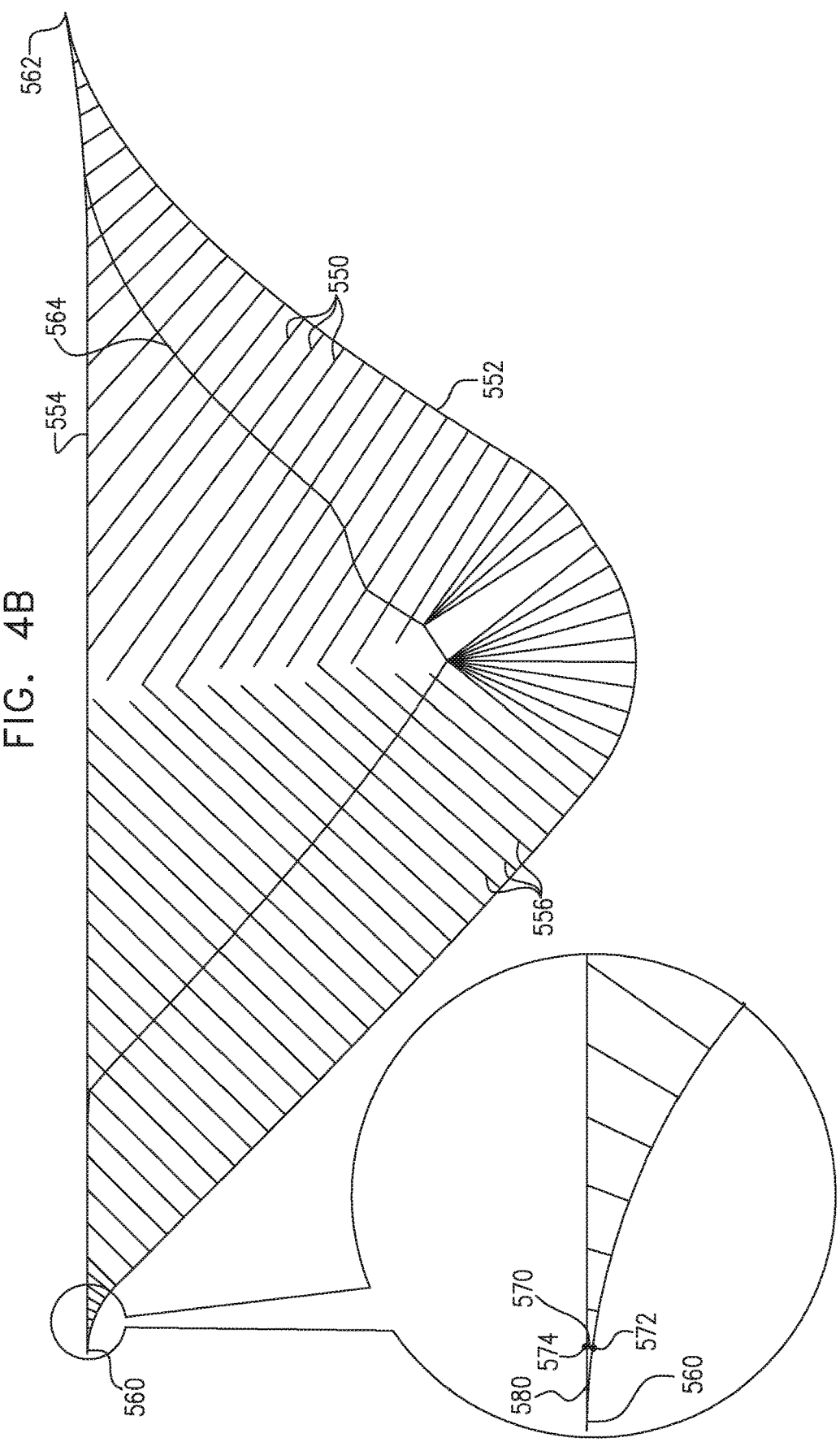

As shown in FIG. 4B a plurality of bridge lines 550 of a predefined density are each stretched from a front 552 across the region towards a blocking boundary 554. A bridge point 556 of each of bridges 550 is initially defined as the point of intersection of each of bridges 550 with front 552. A starting end 560 and an opposite end 562 are selected so that bridges 550 are ordered from starting end 560 to opposite end 562 in a climbing direction of the cutting tool. A single open trochoidal-like tool path segment 564 for machining an area adjacent to front 552 having a width which is generally equal to the maximum stepover is calculated by selecting a suitable point on each of bridges 550 and interconnecting the suitable points in the order of bridge lines 550 between starting end 560 and opposite end 562, as follows:

Initially, starting end 560 is preferably selected as a first point of the single trochoidal-like tool path segment 564. A possible second point of the trochoidal-like tool path segment 564 is calculated as a point on a first bridge 554, immediately adjacent to first point 560 in a climbing direction of the cutting tool from first point 560, which possible second point is distanced from bridge point 572 of the first bridge by the larger of the maximum stepover and the length of first bridge 554. In the illustrated example of FIG. 4B, the possible second point is calculated to be at the intersection 574 of first bridge 572 and blocking boundary 554.

For the possible second point, the engagement angle at which the cutting tool will engage the material by following the cutting tool path from the first point to the possible second point is calculated. In a case where the calculated engagement angle is between the predetermined minimum and maximum engagement angles, the possible second point is chosen as the second point, and a new linear subsegment between first point 560 and the second point is added to the single trochoidal-like cutting tool path segment 564.

In a case where the engagement angle is less than the predetermined minimum engagement angle, a binary search for a second point for which the calculated engagement angle is generally equal to the predetermined minimum engagement angle is performed. The binary search is performed between the possible second point and a point on first bridge 554 distanced from bridge point 572 of first bridge 554, along first bridge 554, by the larger of the maximum stepover and the length of first bridge 554. Once a second point is found, a new linear subsegment between first point 560 and the second point is added to the single trochoidal-like cutting tool path segment 564.

In a case where the engagement angle is greater than the predetermined maximum engagement angle, a binary search for a second point for which the calculated engagement angle is generally equal to the predetermined maximum engagement angle is performed. The binary search is performed between bridge point 572 of first bridge 554 and the possible second point. Once a second point is found, a new linear subsegment between first point 560 and the second point is added to the single trochoidal-like cutting tool path segment 564.

In the illustrated example of FIG. 4B, intersection 574 is selected as the second point, and a new linear subsegment 580 between first point 560 and second point 574 is added to the single trochoidal-like cutting tool path segment 564.

Subsequently, calculation of the remainder of the single trochoidal-like tool path segment 564 is achieved by recursively performing the aforementioned calculation of tool path subsegments through suitable points on ordered bridges 550 up until opposite end 562 of selected front 552. In a case where the single trochoidal-like tool path segment 564 crosses an island, the single trochoidal-like tool path segment 564 is clipped at the intersecting points of the single trochoidal-like tool path segment 564 and the external boundary of the island, thereby creating two disjoint subsegments of the single trochoidal-like tool path segment 564. These two subsegments are then connected along a section of the external boundary of the island facing the front, which section is a closed edge.

The aforementioned calculation completes the calculation of a tool path segment for machining an object of the Type II region. At this point, the remainder of the Type II region to be machined is calculated, and a tool path for machining of the remainder of the Type II region is calculated recursively as described hereinabove. It is appreciated that the machining of the remainder of the Type II region requires repositioning of the cutting tool to a starting end of a front of the remainder of the Type II region. It is appreciated that repositioning techniques are well known to persons skilled in the art.

Referring now to the calculation of a tool path for machining of a Type III region, a diverging spiral tool path is preferred when machining Type III regions, as described hereinabove. A diverging spiral tool path segment calculated to machine a Type III region is a tool path segment which spirals outwardly from an innermost contour to an external boundary via a multiplicity of nested internal contours. The nested internal contours are calculated as follows:

A first nested internal contour is calculated to be a contour which is offset interiorly to the external boundary of the region by a distance which is generally equal to 1.5 radii of the cutting tool. Additional nested internal contours are then calculated recursively inwardly from the first nested internal contour, each nested internal contour being inwardly spaced from the nested internal contour immediately externally adjacent thereto by a distance which is generally equal to 1.5 radii of the rotating cutting tool. A last nested internal contour is calculated to be a contour having a center of area which is closer than 1.5 radii of the cutting tool to at least one point on the contour. Inwardly of the last nested internal contour, the innermost contour is calculated to be a small circle having a radius which is generally smaller than the radius of the cutting tool, and which is centered around the center of area of the last nested internal offset contour.

In a case where the innermost contour is either within the external boundary of an island or intersects with the external boundary of an island, a moat is calculated to circumvent the island, and the innermost contour is recalculated to be immediately external to the external boundary of the moat, such that the innermost contour does not intersect with any other islands. It is noted that nested internal contours which intersect with an external boundary of any island are discarded.

Once the nested internal contours have been calculated, the number of loops to be included in a diverging spiral tool path segment which will spiral outwardly from the innermost contour to the last nested internal offset contour is calculated preferably as follows:

A plurality of bridge lines are stretched from the innermost contour to a next internal offset contour immediately externally adjacent thereto. A bridge point of each bridge is initially defined as the point of intersection of the bridge with the innermost contour. The length of the shortest bridge divided by the minimum stepover provides a theoretical maximum of the number of loops that can be theoretically included in the diverging spiral tool path. The length of the longest bridge divided by the maximum stepover provides an absolute minimum of the number of loops which must be included in the diverging spiral tool path segment that is required to machine the entire area between the innermost contour and the next internal offset contour.

It is appreciated that the furthest distance, in any direction, from the innermost contour which can be reached by a diverging spiral tool path segment is the number of loops included in the diverging spiral tool path segment multiplied by the maximum stepover. Areas between the innermost contour and the next internal offset contour beyond this furthest distance cannot be machined by the diverging spiral tool path segment, and are preferably machined by clipping after the machining of the diverging spiral tool path segment.

Throughout, the parameter n is used to designate a possible number of loops to be included in the spiral tool path segment, wherein n is a number between the minimum number of loops which must be included in the spiral tool path segment and the maximum number of loops that can be included in the spiral tool path segment.

For each possible value of n, the work time needed to machine the area between the innermost contour and the next internal offset contour is calculated by summing the time needed to machine the spiral tool path segment and the time needed to machine all clipped areas which were identified between the innermost contour and the next internal offset contour as described hereinabove. The optimal value of loops to be included in the spiral tool path segment is chosen to be the value of n for which the calculated work time is the shortest.

Once the optimal value of loops to be included in the tool path segment is chosen, the actual path of the spiral tool path segment is calculated. Initially, the bridge point of a first bridge is preferably selected as a starting spiral point of the spiral tool path segment. The first bridge is preferably selected to minimize the time required to move the rotating cutting tool from its previous position. A possible second spiral point of the spiral tool path segment is calculated as a point on a second bridge, immediately adjacent to the first bridge in a climbing direction of the cutting tool from the first bridge, which point is distanced from the bridge point of the second bridge by the length of the second bridge divided by the remaining number of loops to be included in the tool path segment.

For the possible second spiral point, the engagement angle at which the cutting tool will engage the material by following the cutting tool path from the first spiral point to the possible second spiral point is calculated. In a case where the calculated engagement angle is between the predetermined minimum and maximum engagement angles, the possible second spiral point is chosen as the second spiral point, and a new linear subsegment between the first spiral point and the second spiral point is added to the spiral cutting tool path segment.

In a case where the engagement angle is less than the predetermined minimum engagement angle, a binary search for a second spiral point for which the calculated engagement angle is generally equal to the predetermined minimum engagement angle is performed. The binary search is performed between the possible second spiral point and a point on the second bridge distanced from the bridge point of the second bridge by the maximum stepover. Once a second spiral point is found, a new linear subsegment between the first spiral point and the second spiral point is added to the spiral tool path segment.

In a case where the engagement angle is greater than the predetermined maximum engagement angle, a binary search for a second spiral point for which the calculated engagement angle is generally equal to the predetermined maximum engagement angle is performed. The binary search is performed between the bridge point of the second bridge and the possible second spiral point. Once a second spiral point is found, a new linear subsegment between the first spiral point and the second spiral point is added to the spiral tool path segment.

In a case where the new linear subsegment intersects with an island, the calculation of the spiral tool path segment is terminated at the point of intersection, where a moat is calculated to commence and circumvent the island. The remainder of the region for which a tool path has yet to be calculated is designated as a new Type III region to be calculated separately.

In a case where the new linear subsegment intersects with the next internal offset contour, an additional loop of the diverging spiral tool path segment is calculated, and the portions of the additional loop which are internal to the next internal offset contour define one or more uncalculated residual regions between the diverging spiral tool path segment and the next internal offset contour, which residual regions are each calculated as a Type II region, preferably by employing a trochoidal-like tool path segment. The portions of the additional loop which are internal to the next internal offset contour are connected along the next internal offset contour to form a continuous loop which is the final loop of the diverging spiral tool path segment.

Once the second spiral point has been calculated, the remaining number of loops to be included in the tool path segment is recalculated and the subsequent segments of the spiral cutting tool path segment are calculated recursively, whereby the second spiral point is designated to be a new starting point of the remainder of the spiral tool path segment, and the bridge immediately adjacent to the second bridge in a climbing direction of the cutting tool from the second bridge is designated to be the new second bridge. Additionally, the second spiral point is designated as the new bridge point of the second bridge, and the remaining region to be machined is recalculated.

Subsequently, calculation of the remainder of the diverging spiral tool path for the remainder of the region is achieved by recursively performing the aforementioned calculation of diverging spiral tool path segments through subsequent consecutive pairs of nested internal contours between the last nested internal offset contour and the external boundary of the region.

It is appreciated that all of the calculations of the tool paths described hereinabove produce piecewise linear tool paths. In cases where a piecewise linear tool path is not suitable for a particular workpiece being machined by a particular CNC machine, a smoothing approximation of the piecewise linear tool path may be calculated. Such approximation methods are well known to persons skilled in the art.

Figure 1D:
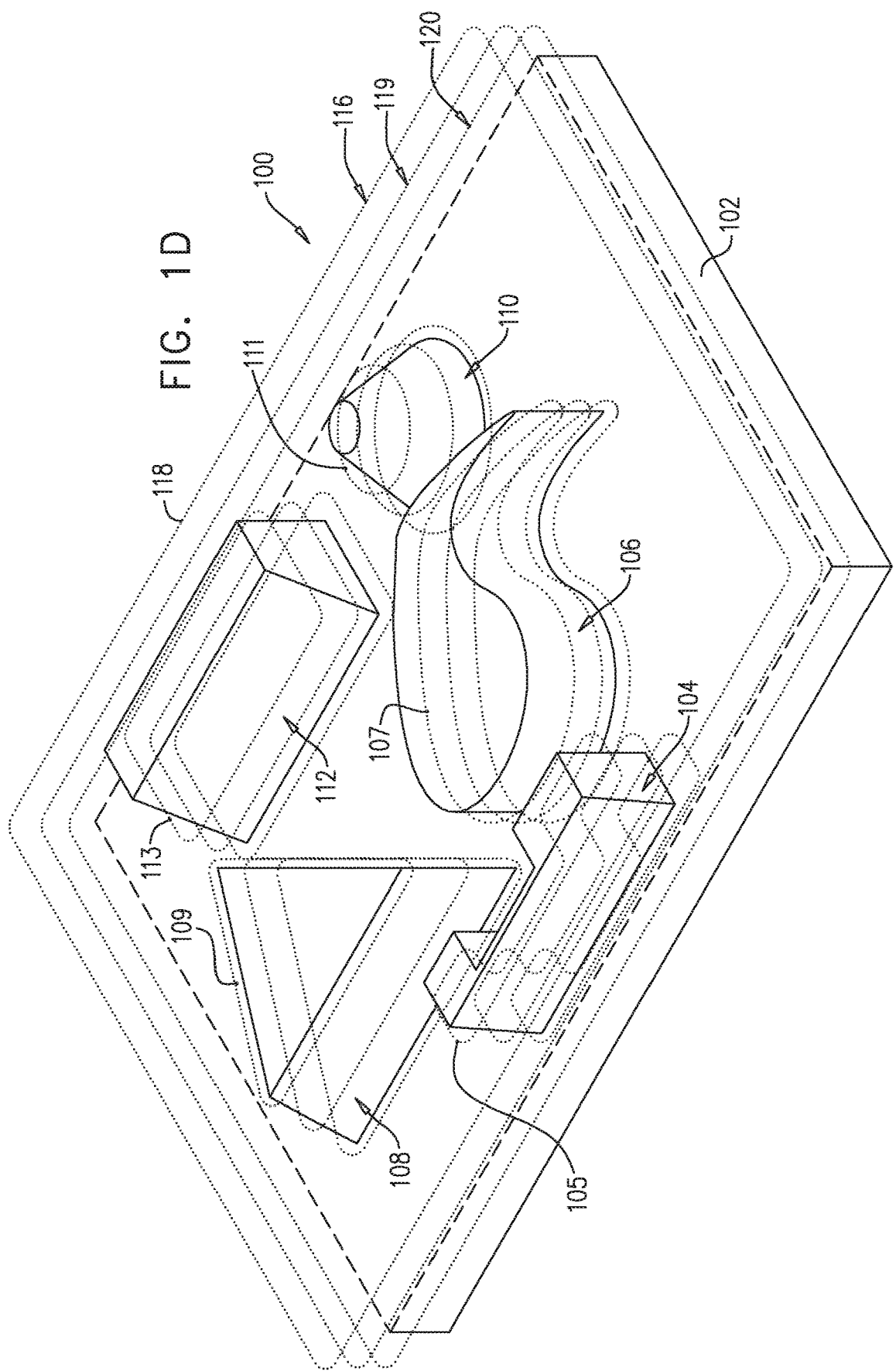
Figures 1, 1E:
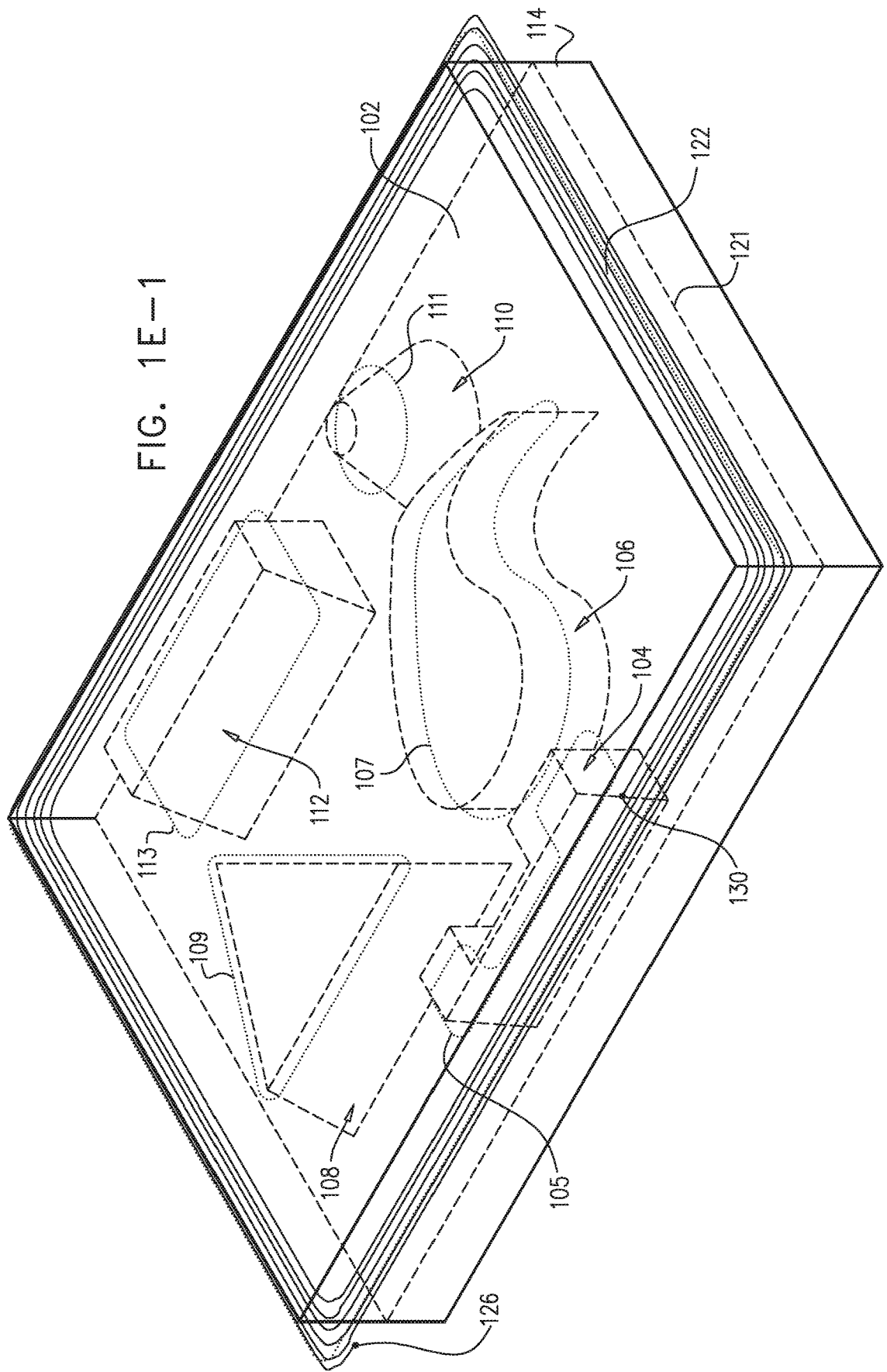
Figures 1, 1F:
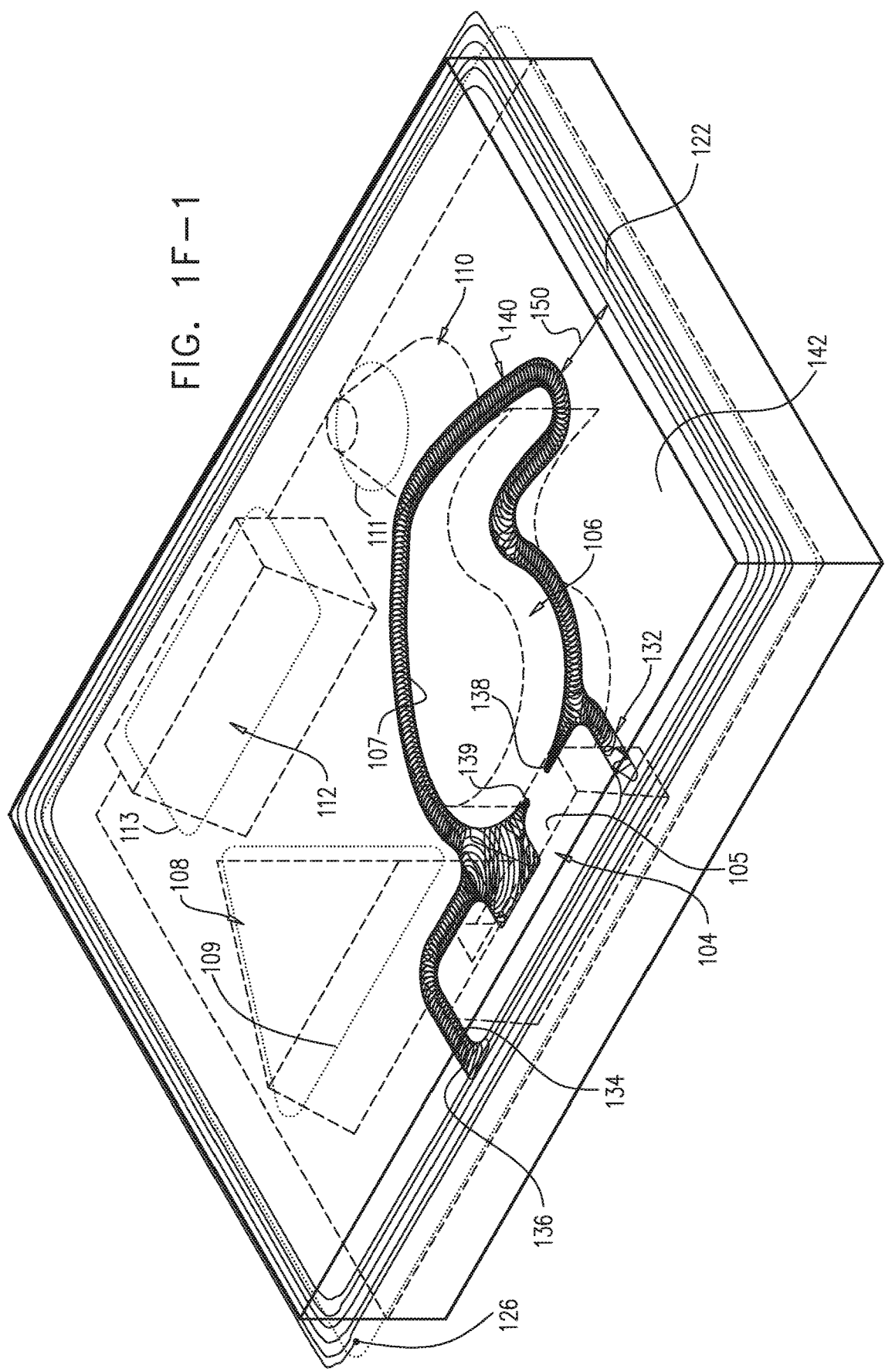
Figures 1, 1F, 2:
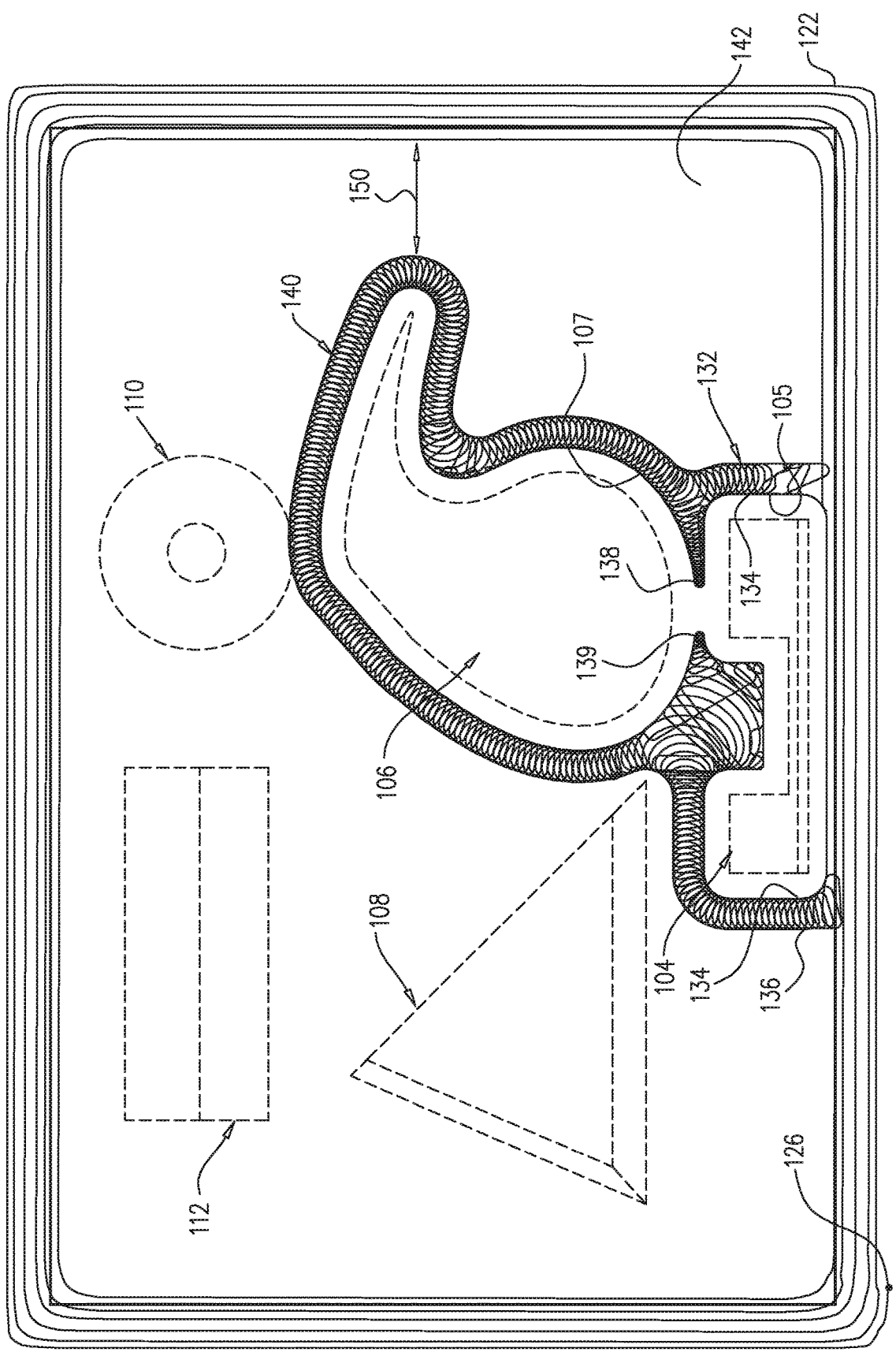

Returning now to the illustrated example of FIG. 1D, cross section 116 is initially identified as a Type I region which includes multiple protrusions. Therefore, a converging spiral tool path segment is calculated between the external boundary of the workpiece and a calculated internal contour, as the initial tool path segment. This calculation preferably begins with calculation of a spiral tool path segment which begins from a selected location just outside the periphery of cross section 116. Reference is made in this context to FIGS. 1E-1 and 1E-2, which are respective isometric and top view illustrations of the stock material 114 overlaid by outline 121 of object 100 in which the initial spiral tool path segment is indicated generally by reference numeral 122. It is noted that the spiral tool path is indicated by solid lines, which represent the center of the rotating cutting tool, whose cross-sectional extent is designated by reference numeral 124 in FIG. 1E-2. The selected location, here designated by reference numeral 126, is preferably selected to minimize the time required to move the rotating cutting tool from its previous position.

In the illustrated example of FIGS. 1E-1 and 1E-2, the initial tool path segment is a converging spiral segment which is calculated as described hereinabove. As shown in FIGS. 1E-1 and 1E-2, initial spiral tool path segment 122, ultimately intersects with island 105 at intersecting point 130 at which point spiral tool path segment 122 is terminated. As shown in FIGS. 1F-1 and 1F-2, a moat 132 which circumvents island 105 is calculated.

As shown in FIGS. 1F-1 and 1F-2, an inner boundary 134 of moat 132 is calculated to be generally alongside the outer boundary of island 105. It is appreciated that a narrow offset remains between the island 105 and an inner boundary 134 of the moat, which may be finish machined at a later stage. The outer boundary 136 of moat 132 is calculated as being offset from inner boundary 134 by the moat width.

As shown in FIGS. 1F-1 and 1F-2, the outer boundary 136 of moat 132 intersects with island 107 at points 138 and 139. Therefore, an additional moat 140 is calculated to circumvent island 107, whereby moats 132 and 140 are joined to form one continuous moat which circumvents islands 105 and 107. As clearly shown in FIGS. 1F-1 and 1F-2, the combination of the initial spiral tool path segment 122 and subsequent moats 132 and 140 which circumvent islands 105 and 107 define a new Type I region which is designated by reference numeral 142.

Figures 1, 1G:
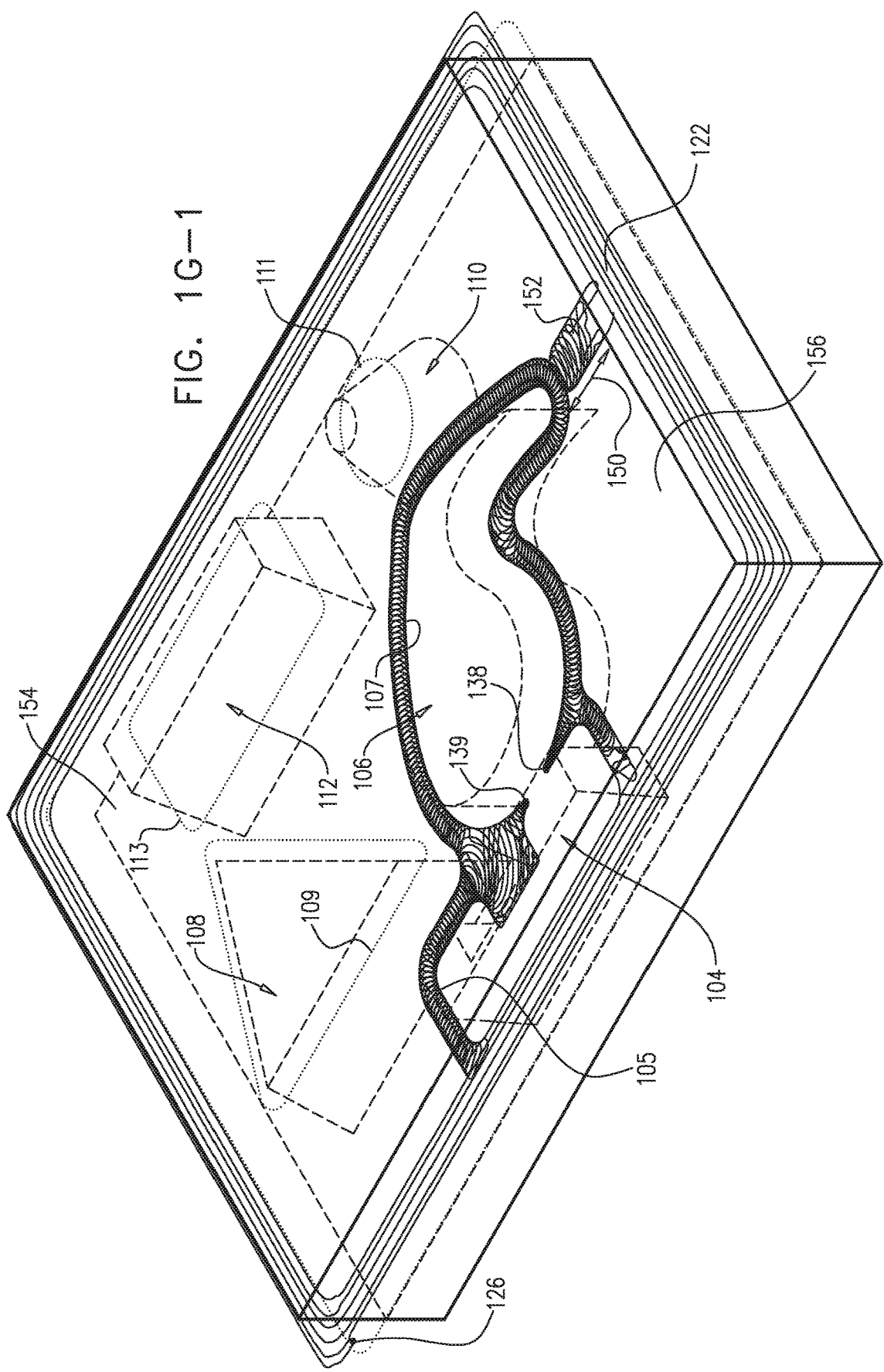

Region 142 includes multiple islands 109, 111 and 113. As clearly shown in FIGS. 1F-1 and 1F-2, a bottleneck 150 is detected in region 142. Therefore, as shown in FIGS. 1G-1 and 1G-2, a separating channel 152 is calculated at the location of bottleneck 150, effectively dividing region 142 into two independent Type I regions designated by reference numerals 154 and 156.

Figures 1, 1H, 2:
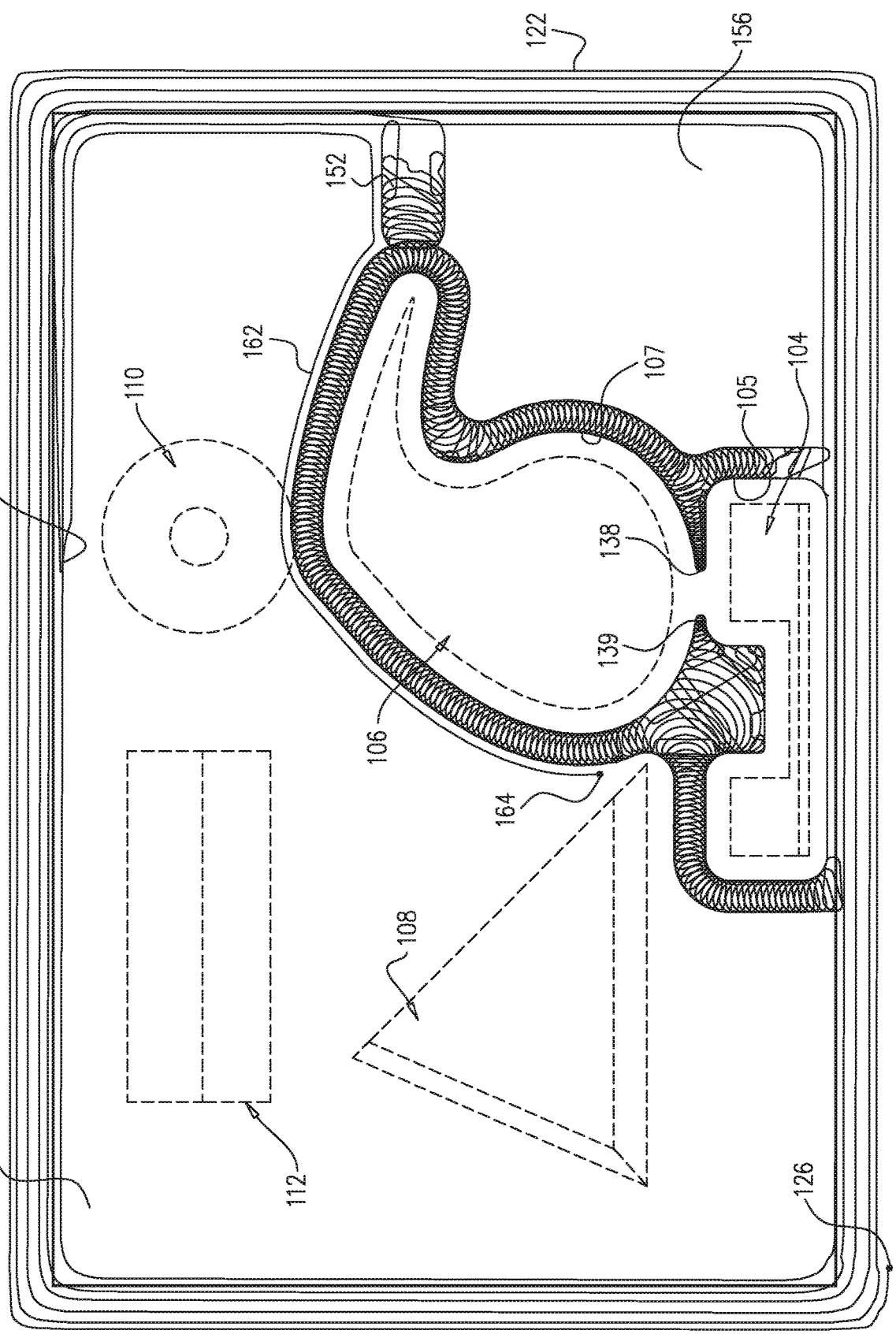
Figures 2, 11:
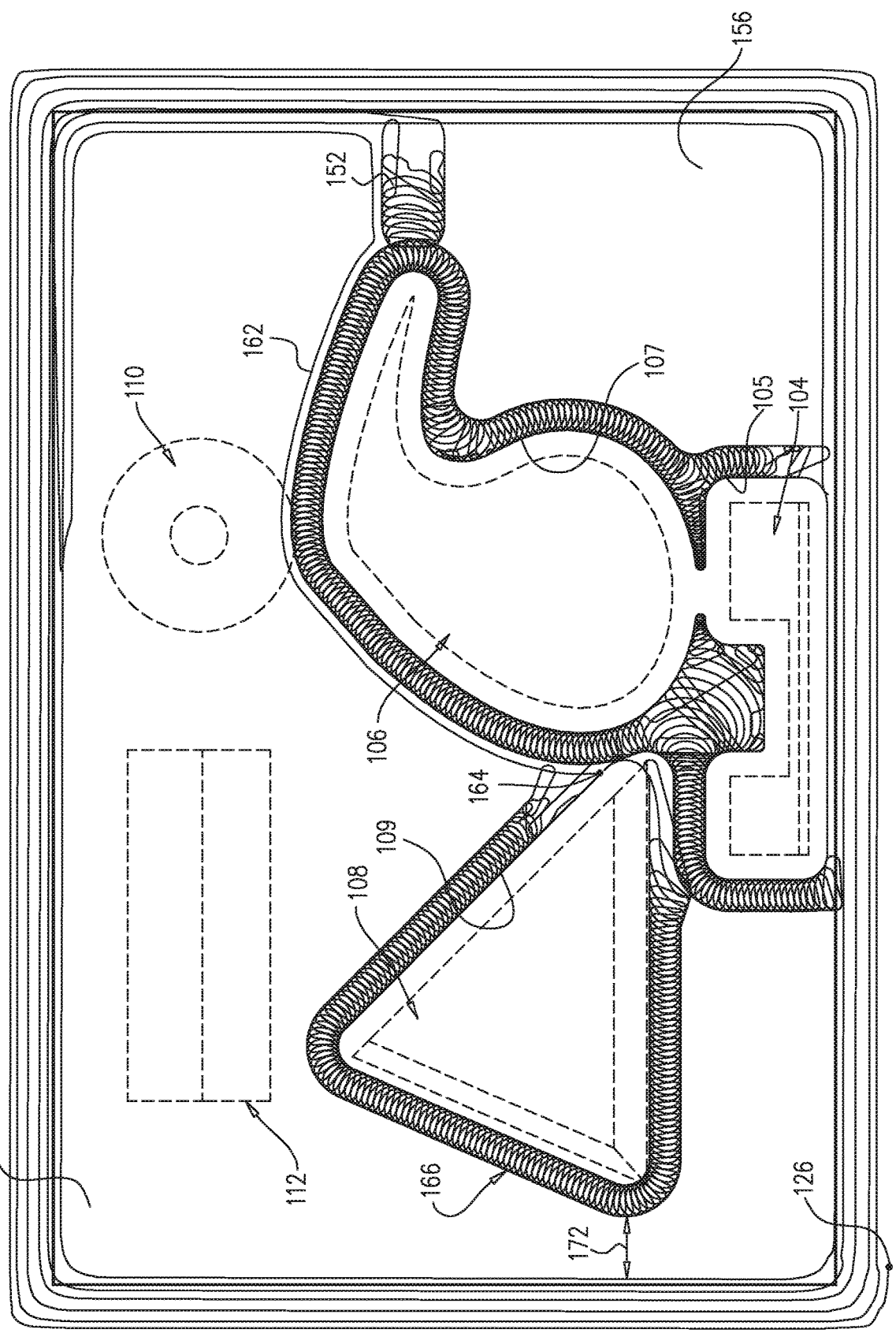
Figures 1, 1K, 2:
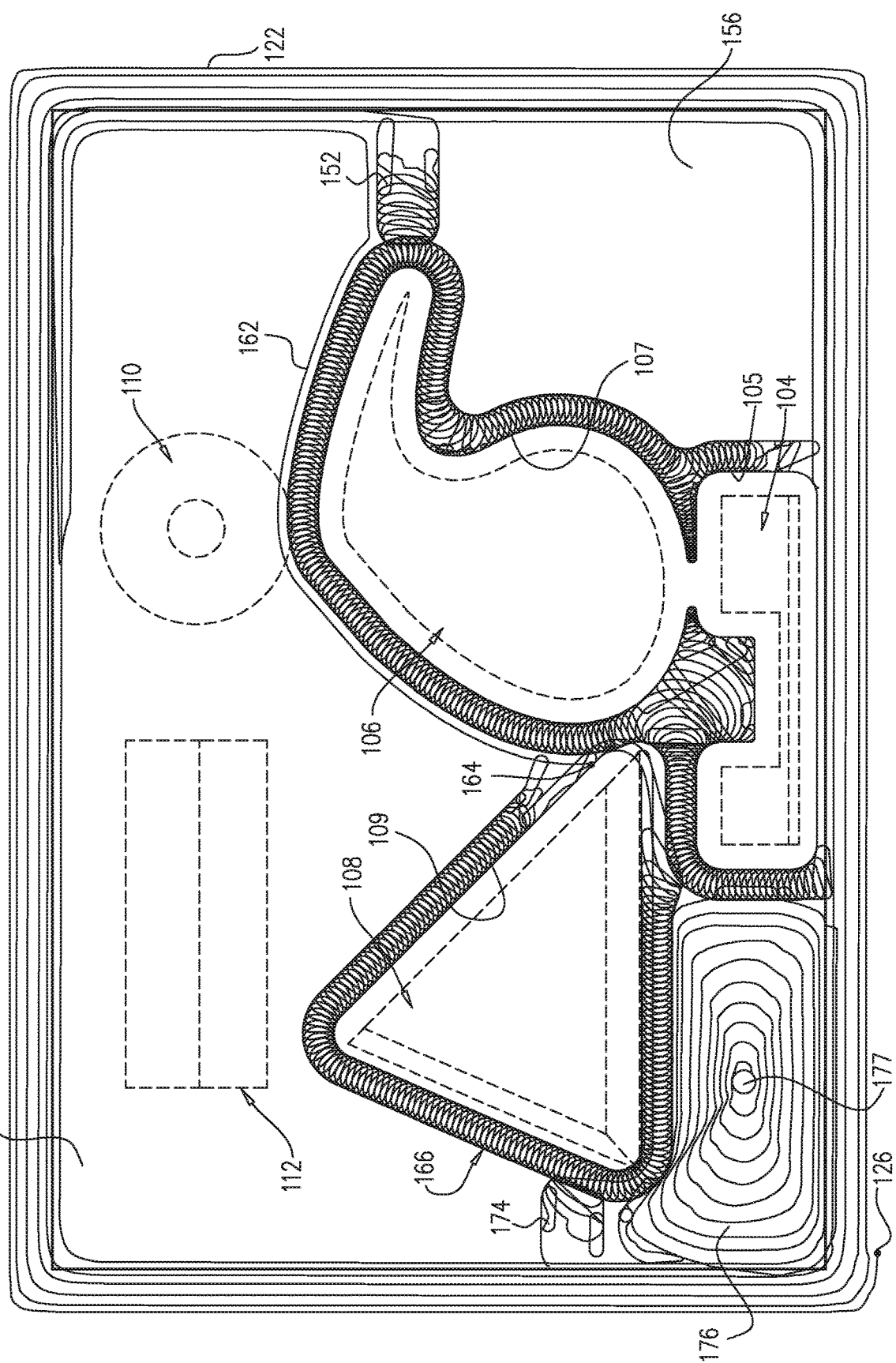

Turning now to FIGS. 1H-1 and 1H-2, it is shown that initially, a spiral tool path segment for region 154 is calculated, while the calculation of region 156 is deferred. As shown in FIGS. 1H-1 and 1H-2, a starting point 160 is chosen and a spiral tool path segment 162 extends from initial point 160 generally along the external boundary of region 154 until intersecting with island 109 at intersecting point 164 at which point spiral tool path segment 162 is terminated. As shown in FIGS. 1I-1 and 1I-2, a moat 166 which circumvents island 109 is calculated. The remainder of region 154 is identified as a Type I region designated by reference numeral 170.

Region 170 includes islands 111 and 113. As clearly shown in 1I-1 and 1I-2, a bottleneck 172 is detected in region 170. Therefore, as shown in 1J-1 and 1J-2, a separating channel 174 is calculated at the location of bottleneck 172, effectively dividing region 170 into two independent Type I regions designated by reference numerals 176 and 178.

Turning now to 1K-1 and 1K-2, it is shown that initially, a spiral path for machining region 176 is calculated, while the calculation of region 178 is deferred. As shown in FIGS. 1K-I and 1K-2, region 176 does not include any islands, therefore a converging spiral tool path segment is calculated to machine region 176 with the internal boundary of region 176 being a small circle 177 of a radius which is generally smaller than the radius of the tool, and which is centered around the center of area of region 176.

Figures 1, 1L, 2:
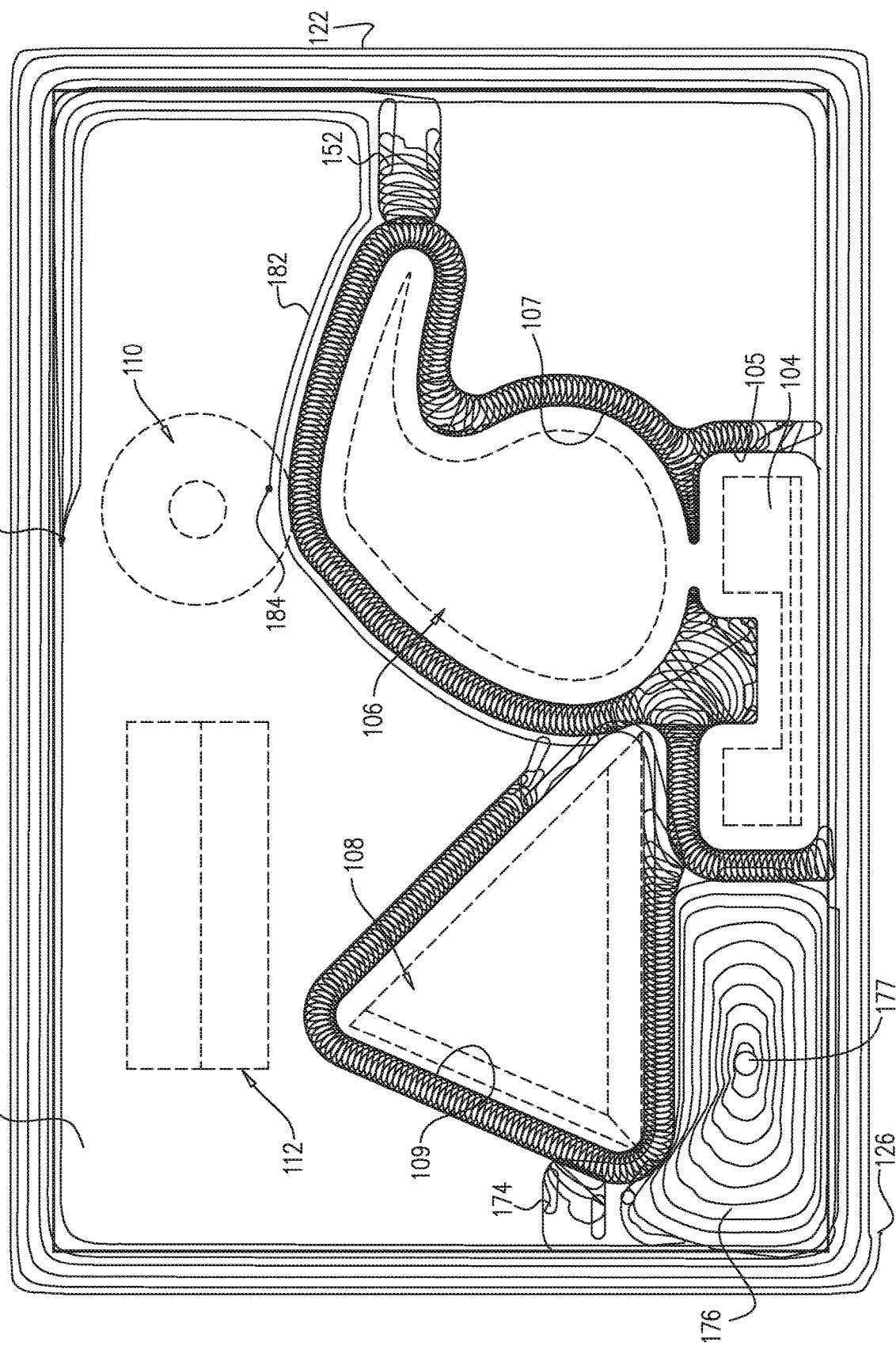
Figures 1, 1M:
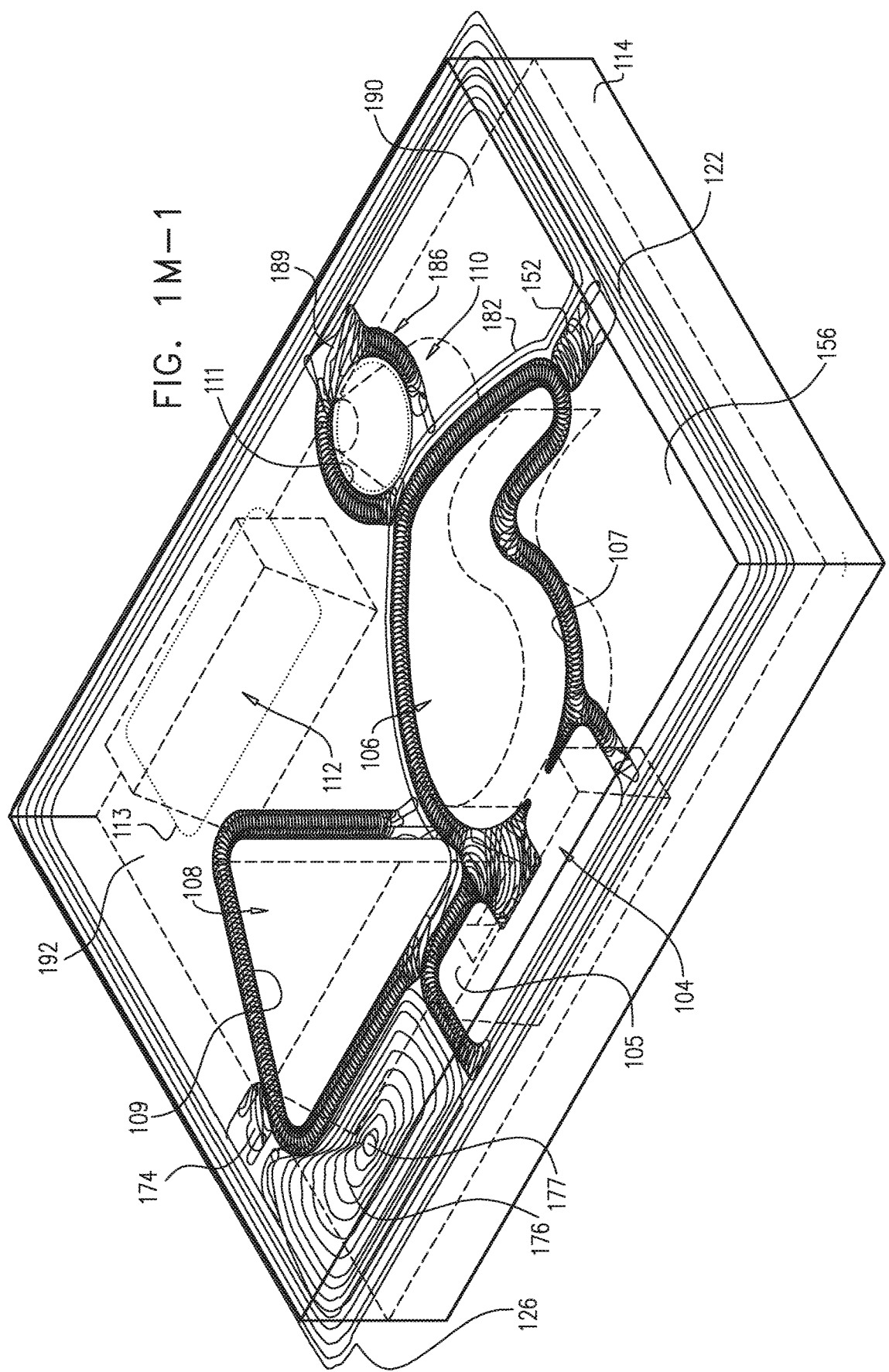
Figures 1, 1M, 2:
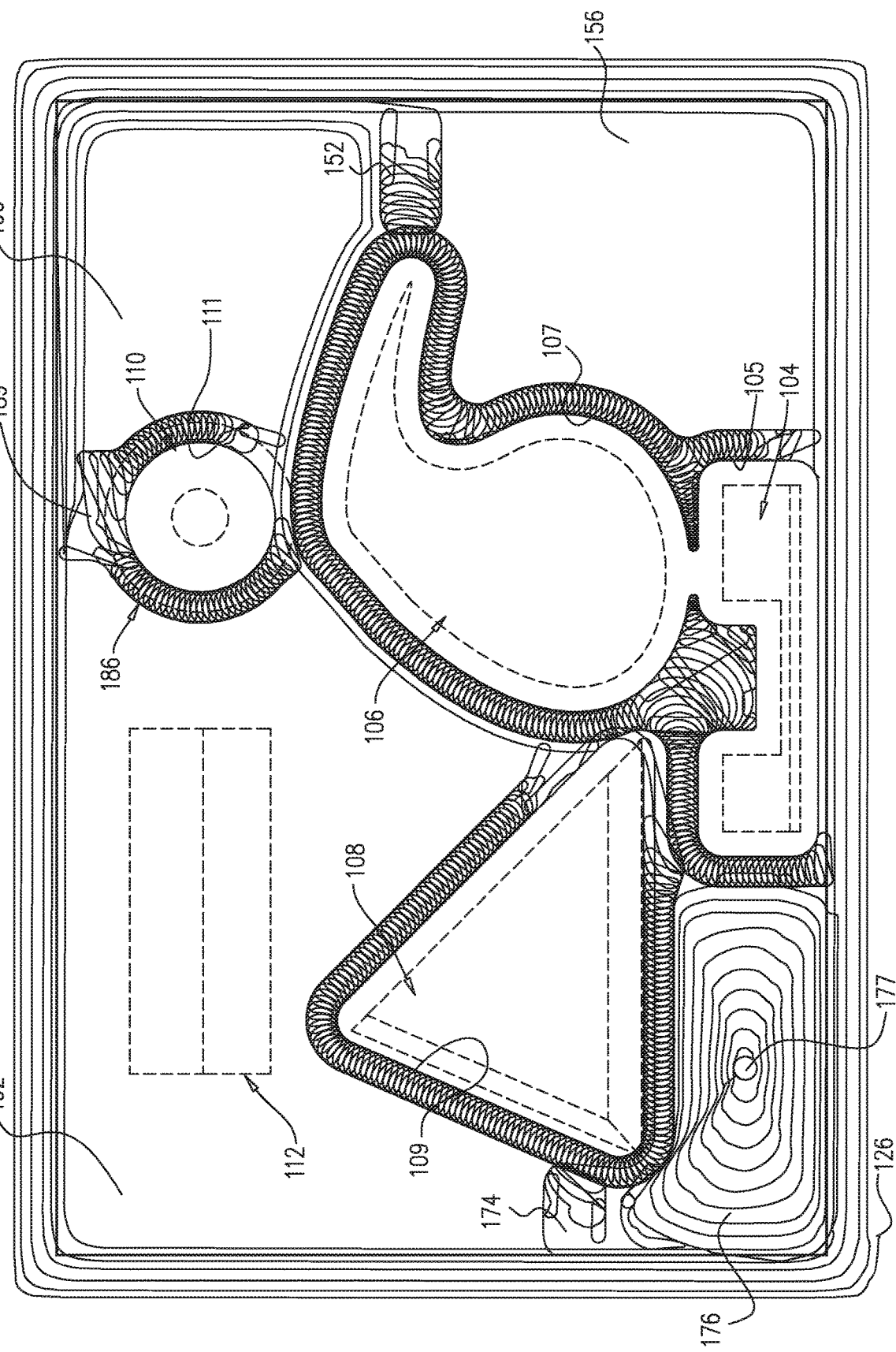

Subsequentially, a spiral tool path segment for region 178 is calculated. As shown in FIGS. 1L-1 and 1L-2, a starting point 180 is chosen and a spiral tool path segment 182 is extended from initial point 180 generally along the external boundary of region 178 until intersecting with island 111 at intersecting point 184 at which point spiral tool path segment 182 is terminated. As shown in FIGS. 1M-1 and IM-2, a moat 186 which circumvents protrusion 110 is calculated.

It is appreciated that in a case where the external boundary of a moat is calculated to be in close proximity to the external boundary of the Type I region which includes the moat, a local widening of the moat is calculated to prevent the forming of a narrow residual wall between the moat and the external boundary of the region. As known to persons skilled in the art, the formation of narrow residual walls is undesirable as machining them may lead to damage to the cutting tool and or to the workpiece.

As seen in FIGS. 1M-1 and IM-2, the external boundary of moat 186 is calculated to be in close proximity to the external boundary of region 178. Therefore, moat 186 is locally widened up to the external boundary of region 178, along a narrow residual wall area 189 in which, without this widening, a narrow residual wall would be have been formed between moat 186 and the external boundary of region 178. Locally widened moat 186 divides region 178 into two independent Type I regions designated by reference numerals 190 and 192.

Turning now to FIGS. 1N-1 and 1N-2, it is shown that initially, region 190 is calculated, while the calculation of region 192 is deferred. As shown in FIGS. 1N-1 and 1N-2, two clipped areas of region 190 designated by numerals 196 and 198 are identified. Areas 196 and 198 are calculated to be machined by a trochoidal-like tool path segment prior to the machining of the remainder of region 190 by a spiral tool path segment.

The remainder of region 190 does not include any islands, therefore a converging spiral tool path segment is calculated to machine the remainder of region 190 with the internal boundary being a small circle 191 of a radius which is generally smaller than the radius of the tool, and which is centered around the center of area of the remainder of region 190.

Subsequentially, a spiral tool path segment for region 192 is calculated. As shown in FIGS. 1O-1 and 1O-2, one area of region 192, designated by numeral 200 is identified by clipping. Area 200 is calculated to be machined by a trochoidal-like tool path segment prior to the machining of the remainder of region 192 by a spiral tool path segment.

Additionally, as shown in FIGS. 1P-1 and 1P-2, an additional area of region 192, designated by numeral 202 is identified by clipping. However, it is calculated that area 202 would be more efficiently machined as a separate Type I region. Therefore, a separating channel 210 which divides the remainder of region 192 into two Type I regions designated by numerals 202 and 214 is calculated. Region 202 does not include any protrusions, therefore, as shown in FIGS. 1Q-1 and 1Q-2, a converging spiral tool path segment is calculated to machine region 202 with the internal boundary being a small circle 213 of a radius which is generally smaller than the radius of the tool, and which is centered around the center of area of region 202.

It is calculated that machining a separating channel 210 and machining region 202 as a Type I region results in a machining time which is shorter than the machining time of region 202 by a trochoidal-like tool path segment.

Figures 1, 1R:
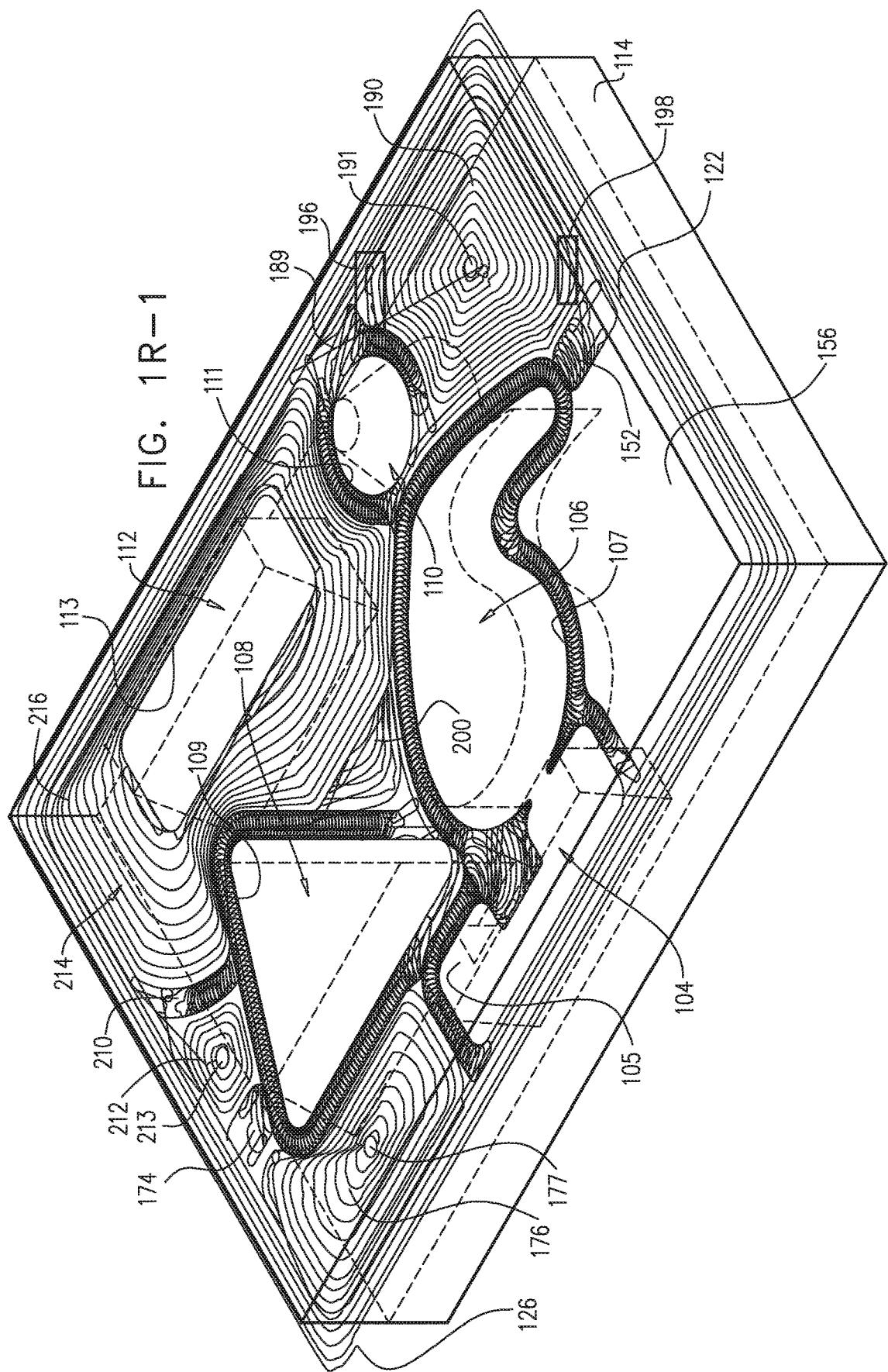

Turning now to FIGS. 1R-1 and 1R-2, it is shown that region 214 includes one island 113 which is generally centrally located within region 214. Therefore, a converging spiral tool path segment 216 is calculated to machine region 214 with the internal boundary being generally alongside the external perimeter of island 113. As shown in FIG. 1R-2, spiral tool path segment 216, ultimately intersects with island 113 at intersecting point 218 at which point spiral tool path segment 216 is terminated. It is appreciated that after machining segment 216, there may remain one or more Type II regions adjacent to island 113 which are machined by trochoidal-like tool path segments.

Figures 1, 1S, 2:
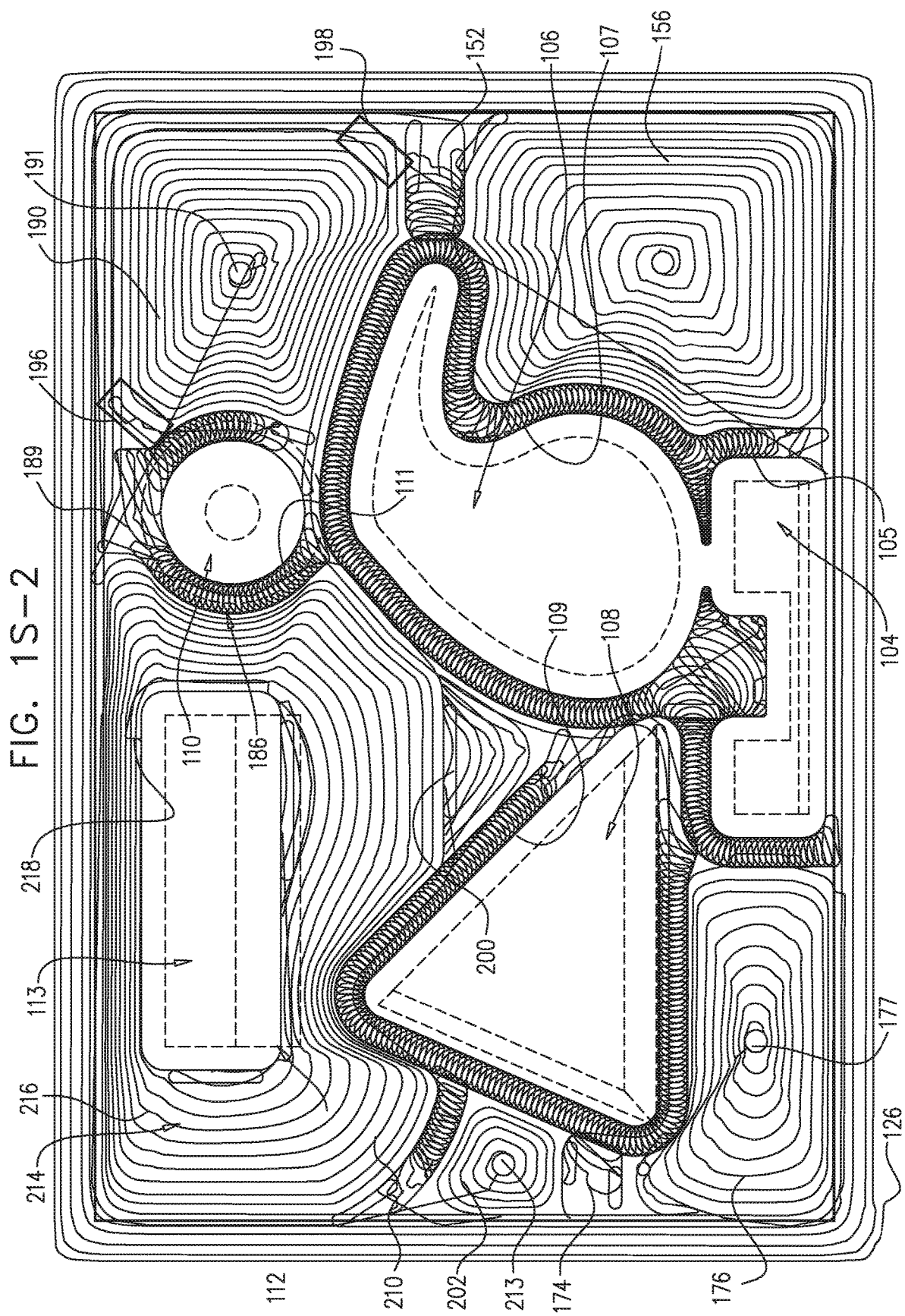

Turning now to FIGS. 1S-1 and 1S-2, it is shown that, the machining of region 156 is calculated. As shown in FIGS. 1S-1 and 1S-2, a clipped area of region 156 designated by numeral 230 is identified by clipping. Area 230 is preferably calculated to be machined by a trochoidal-like tool path segment, and the remainder of region 156 is then calculated to be machined by a spiral tool path segment.

It is appreciated that the calculation described hereinabove constitutes the calculation of a tool path for the machining of a first step down which is a first phase in the machining of object 100. Throughout, the term "step down" is used to describe a single machining phase at a constant depth. As shown in FIG. 1C, the complete machining of object 100 requires three step downs. Therefore, subsequent and similar to the calculation described hereinabove, the tool path designer calculates the machining of second step down 119 and thereafter of third step down 120, thereby completing the entire rough machining of object 100. Preferably, the vertical distance between subsequent step downs is generally between 1 and 4 times the diameter of the cutting tool.

It is appreciated that following the rough machining of a workpiece, an additional stage of rest rough machining is calculated, which reduces the large residual steps created by the series of step downs on the sloping surfaces of object 100.

Figure 2B:
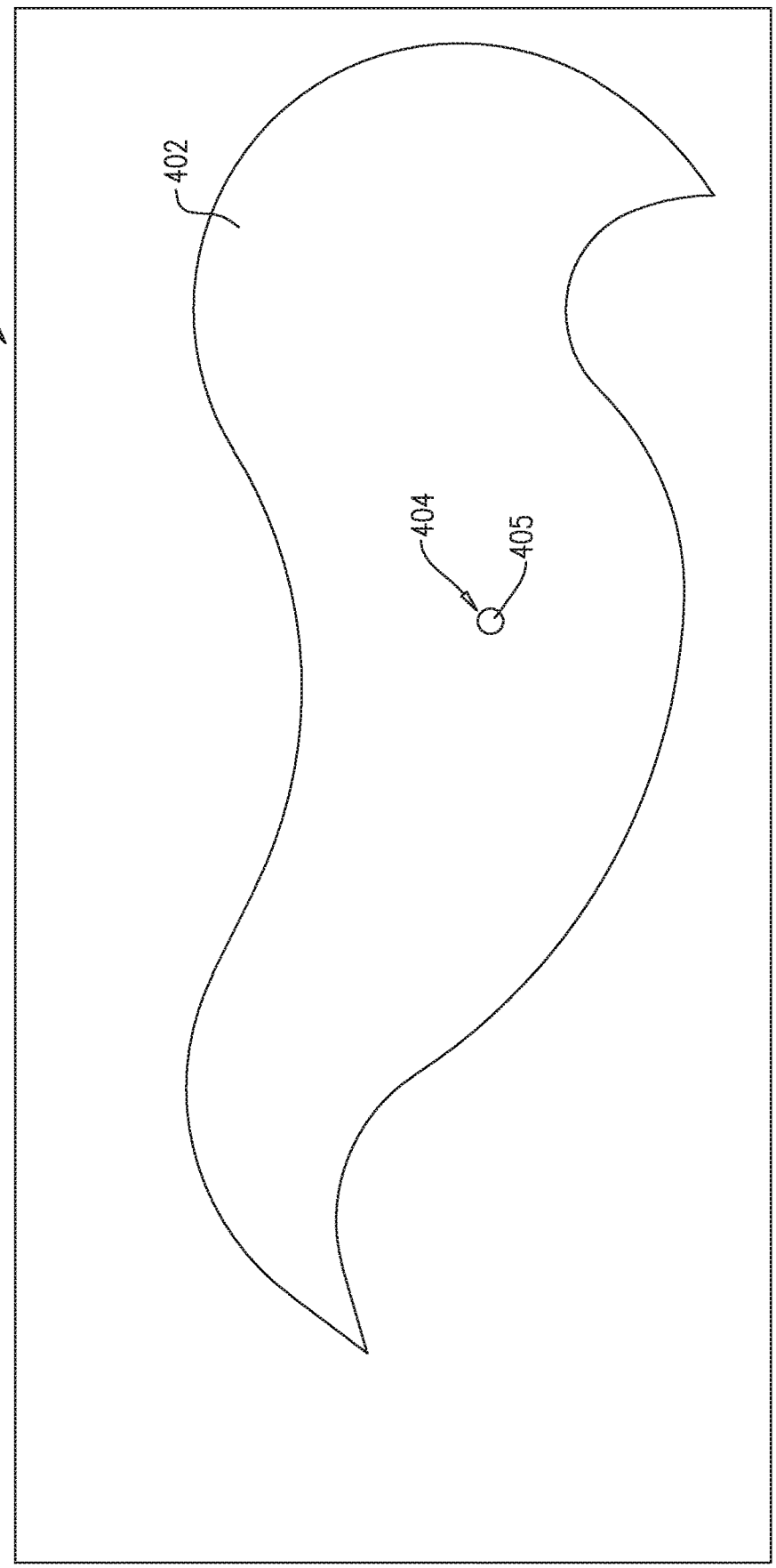

Reference is now made to FIGS. 2A-2L-2, which illustrate the calculation of another tool path in accordance with a preferred embodiment of the present invention. FIGS. 2A and 2B are respective isometric and top view illustrations of an object 400, which is another example of objects that can be fabricated in accordance with the present invention. The configuration of the object 400 is selected to illustrate additional various particular features of the present invention. It is noted that any suitable three-dimensional object that can be machined by a conventional 3-axis machine tool may be fabricated in accordance with a preferred embodiment of the present invention.

As seen in FIGS. 2A & 2B, the object 400 is seen to have a generally planar base portion 402 from which one protrusion, here designated by reference numeral 404, extends. FIG. 2C shows stock material 410 overlaid by a cross section 420 of object 400. Cross section 420 is characterized as having an external boundary 422 and an island 405 corresponding to the cross section of protrusion 404 at the depth of cross section 420.

In the illustrated example of FIG. 2C, cross section 420 is initially identified as a Type III region 424 which includes one island 405. As described hereinabove, a plurality of nested offset contours is calculated between the external boundary 422 of region 424 and an innermost contour of region 424. The innermost contour is initially calculated to be overlapping with the external boundary of island 405. Therefore, as shown in FIGS. 2D-1 and 2D-2, a moat 428 is calculated to circumvent island 405, and the innermost contour 430 is calculated to be immediately external to the external boundary of moat 428.

Figures 1, 2D:
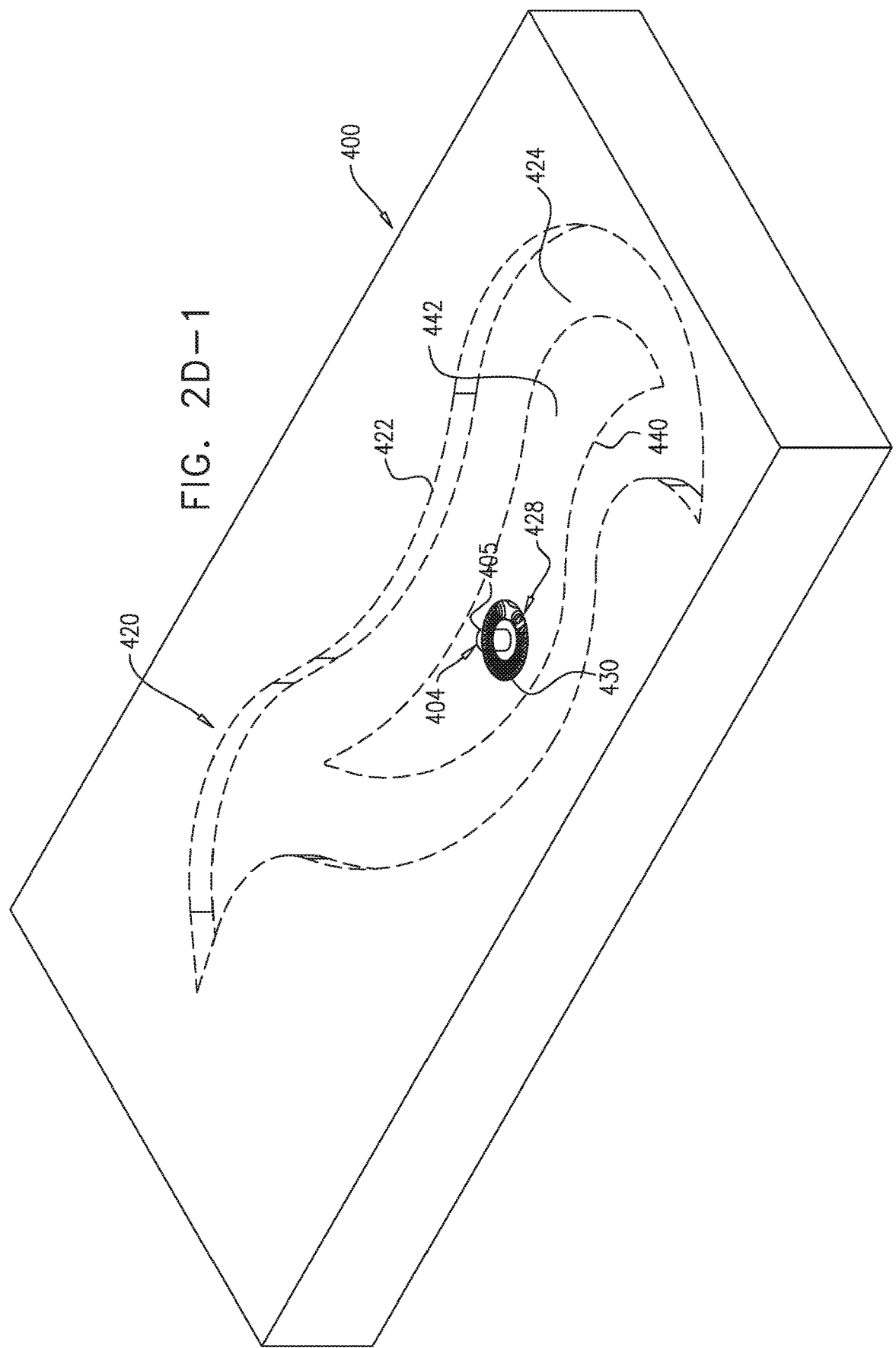
Figures 2, 2E:
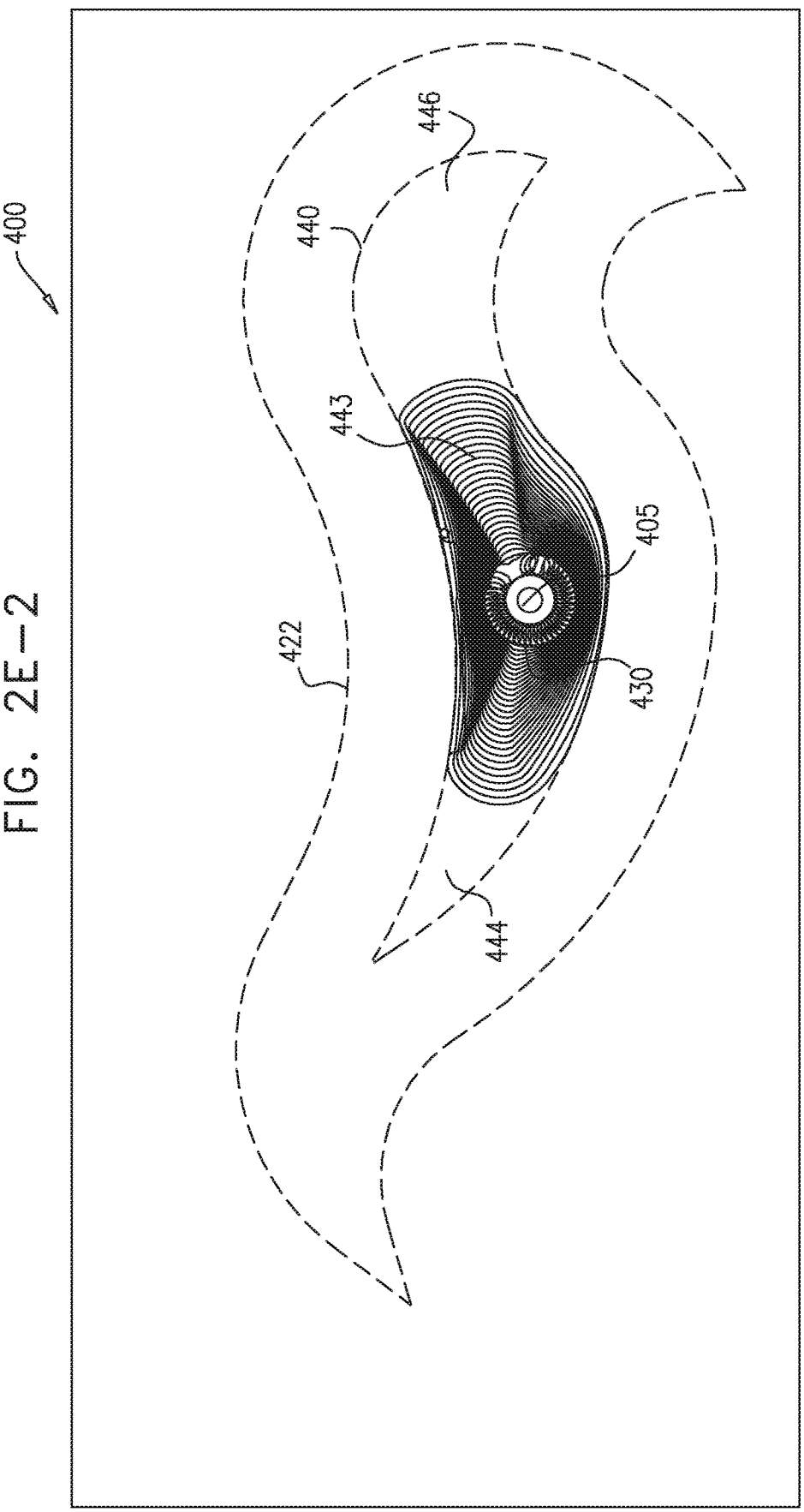
Figures 1, 2F:
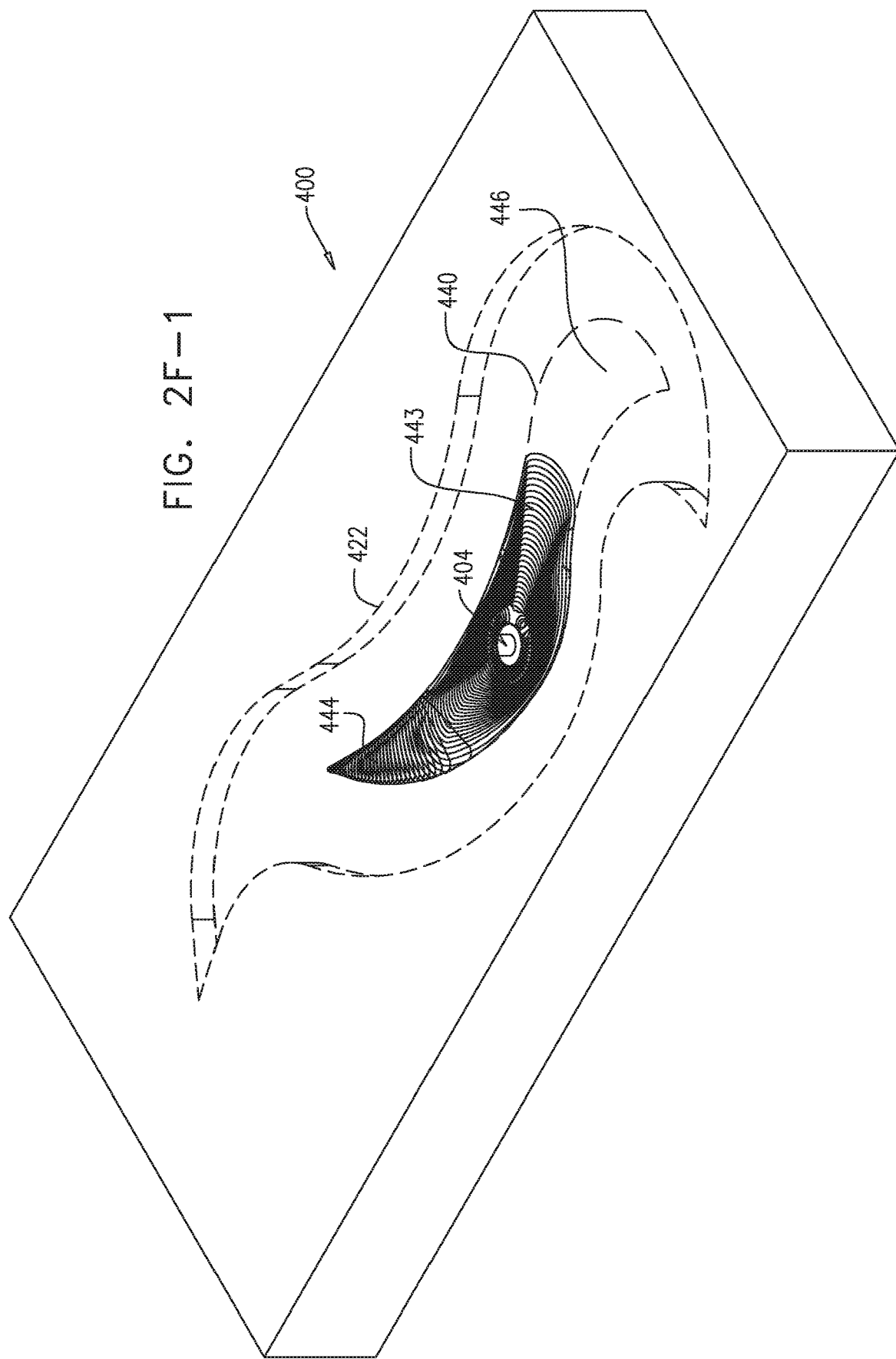
Figures 2, 2F:
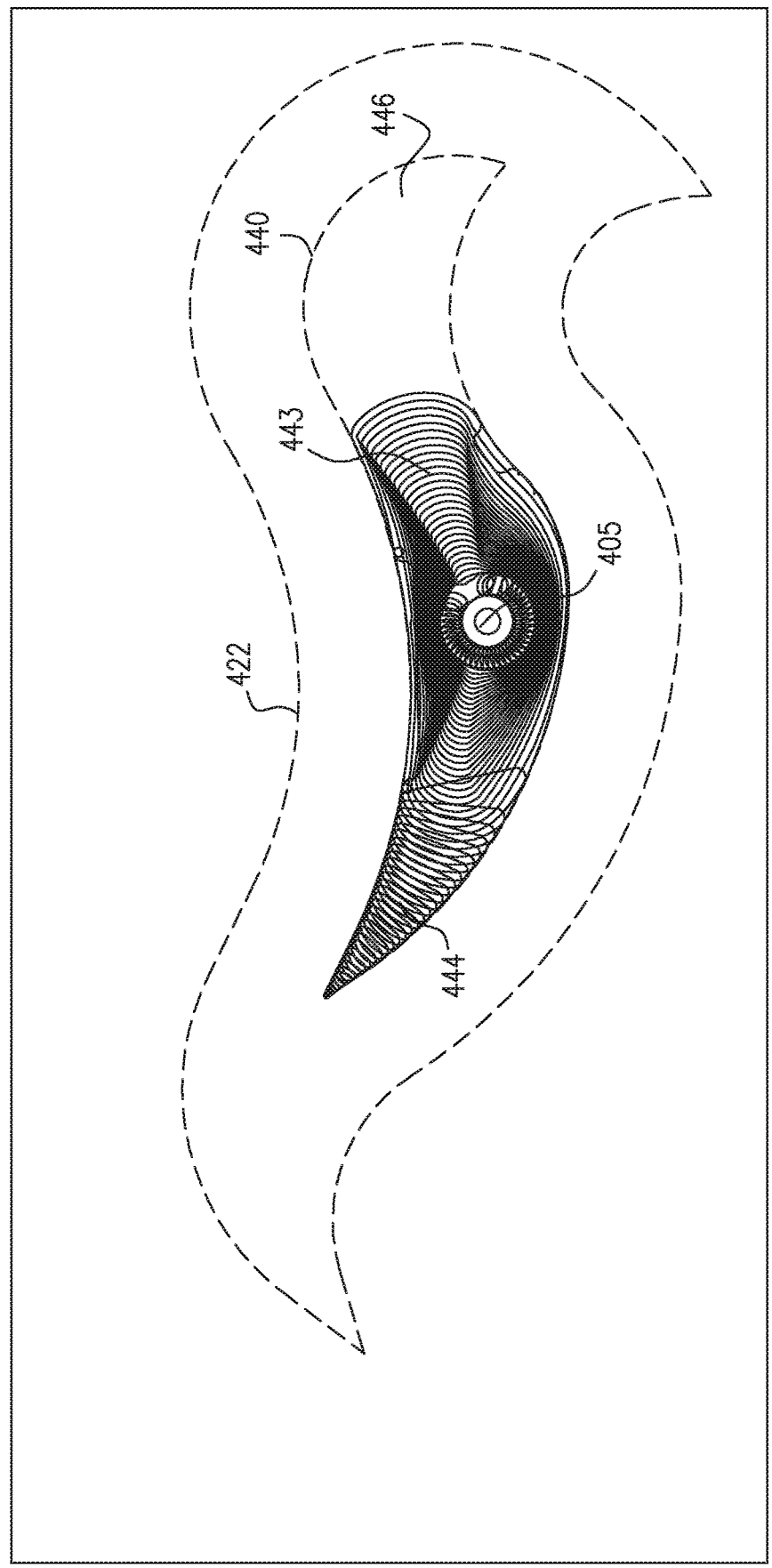
Figures 1, 2G:
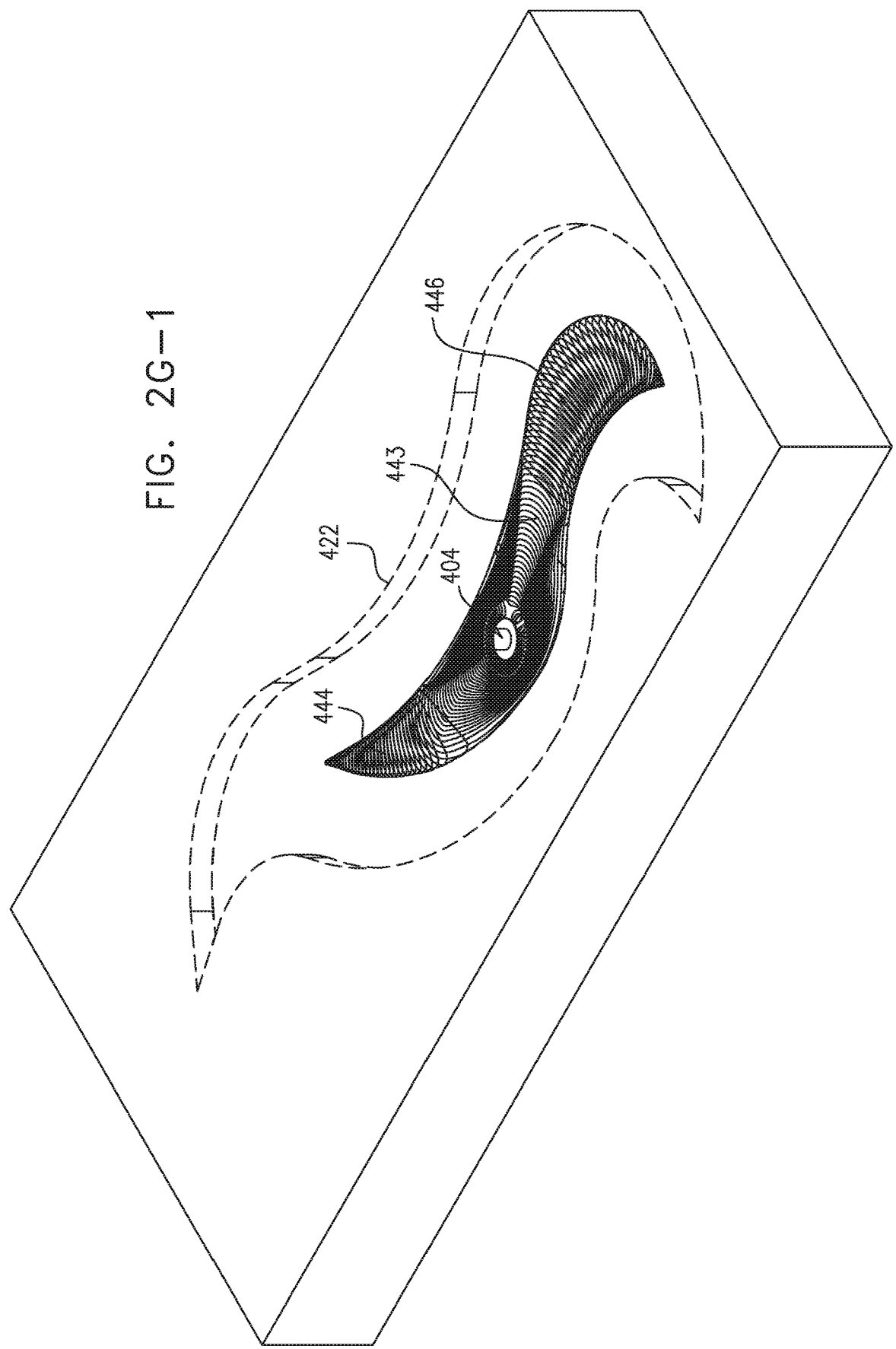
Figures 2, 2G:
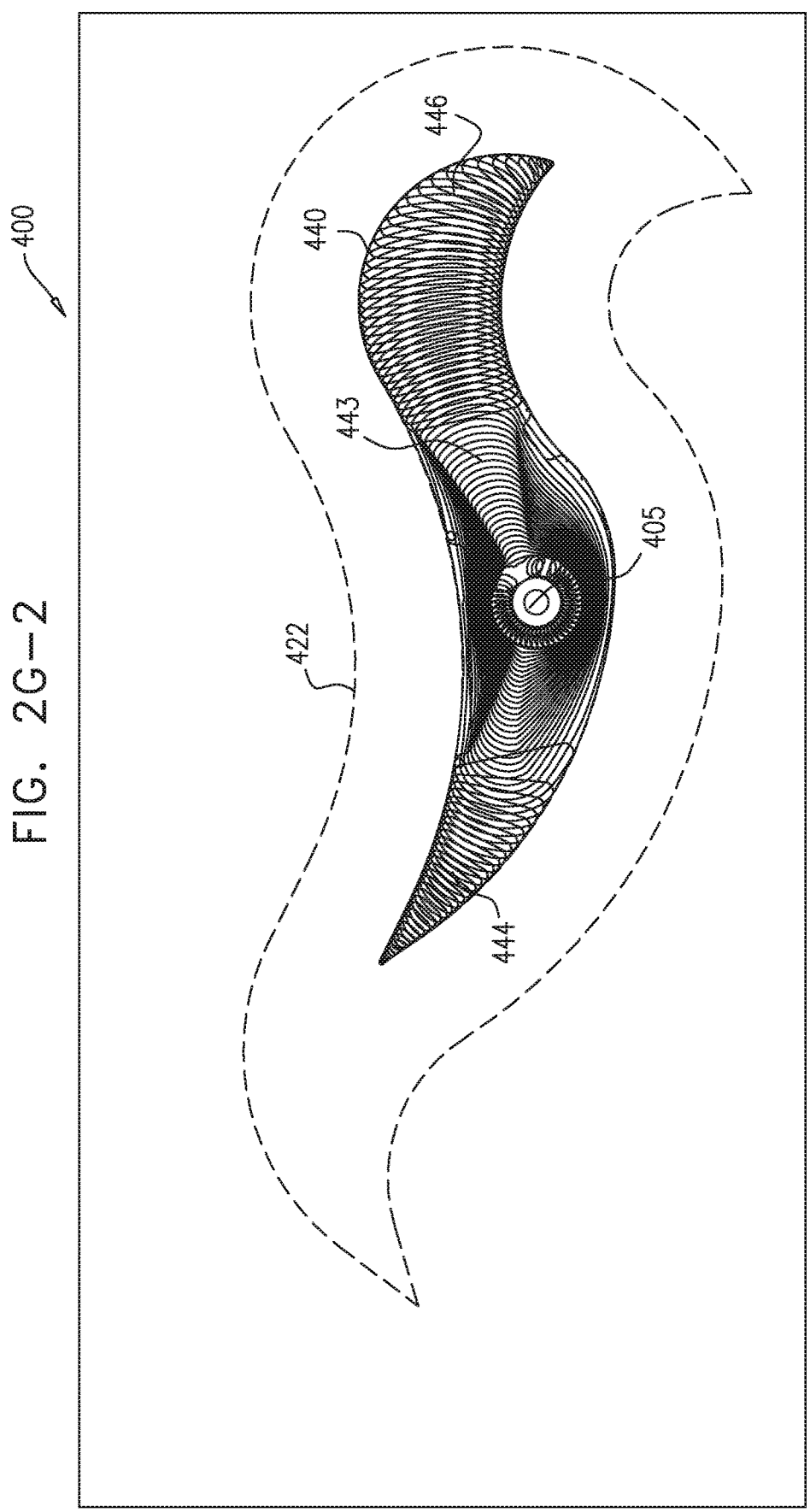

As shown in FIGS. 2D-1 and 2D-2, innermost contour 430 and nested internal contour 440, external to innermost contour 430, define a Type III region 442. As shown in FIGS. 2E-1 and 2E-2, a diverging tool path segment 443 is initially calculated to spiral outwardly between innermost contour 430 and nested internal contour 440, thereby creating two residual regions 444 and 446. As shown in FIGS. 2F-1 and 2F-2, residual region 444 is calculated to be machined as a Type II region by employing a trochoidal-like tool path segment. Similarly, as shown in FIGS. 2G-1 and 2G-2, residual region 446 is calculated to be machined as a Type II region by employing a trochoidal-like tool path segment.

Figures 1, 2H:
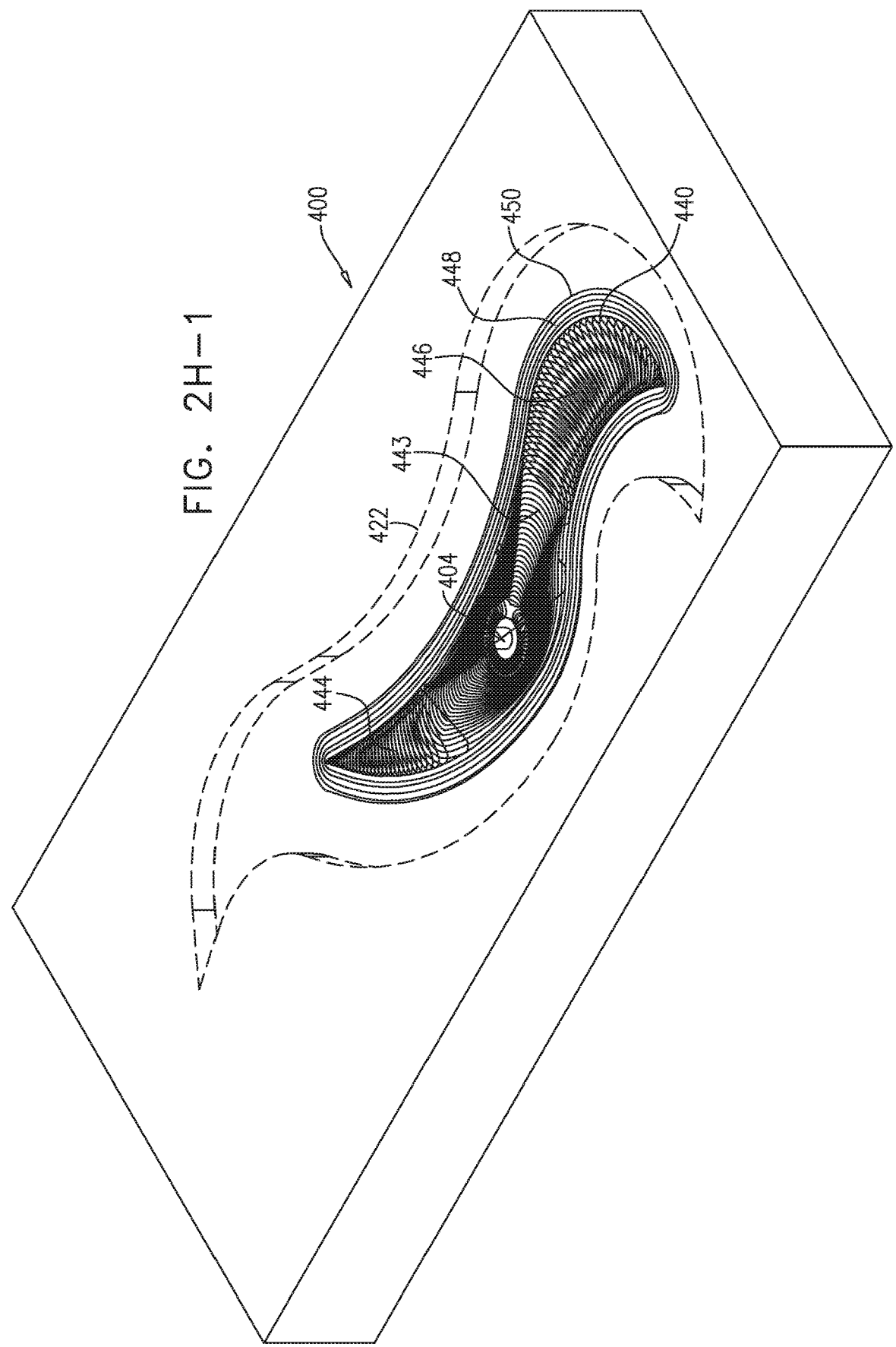
Figures 2, 2H:
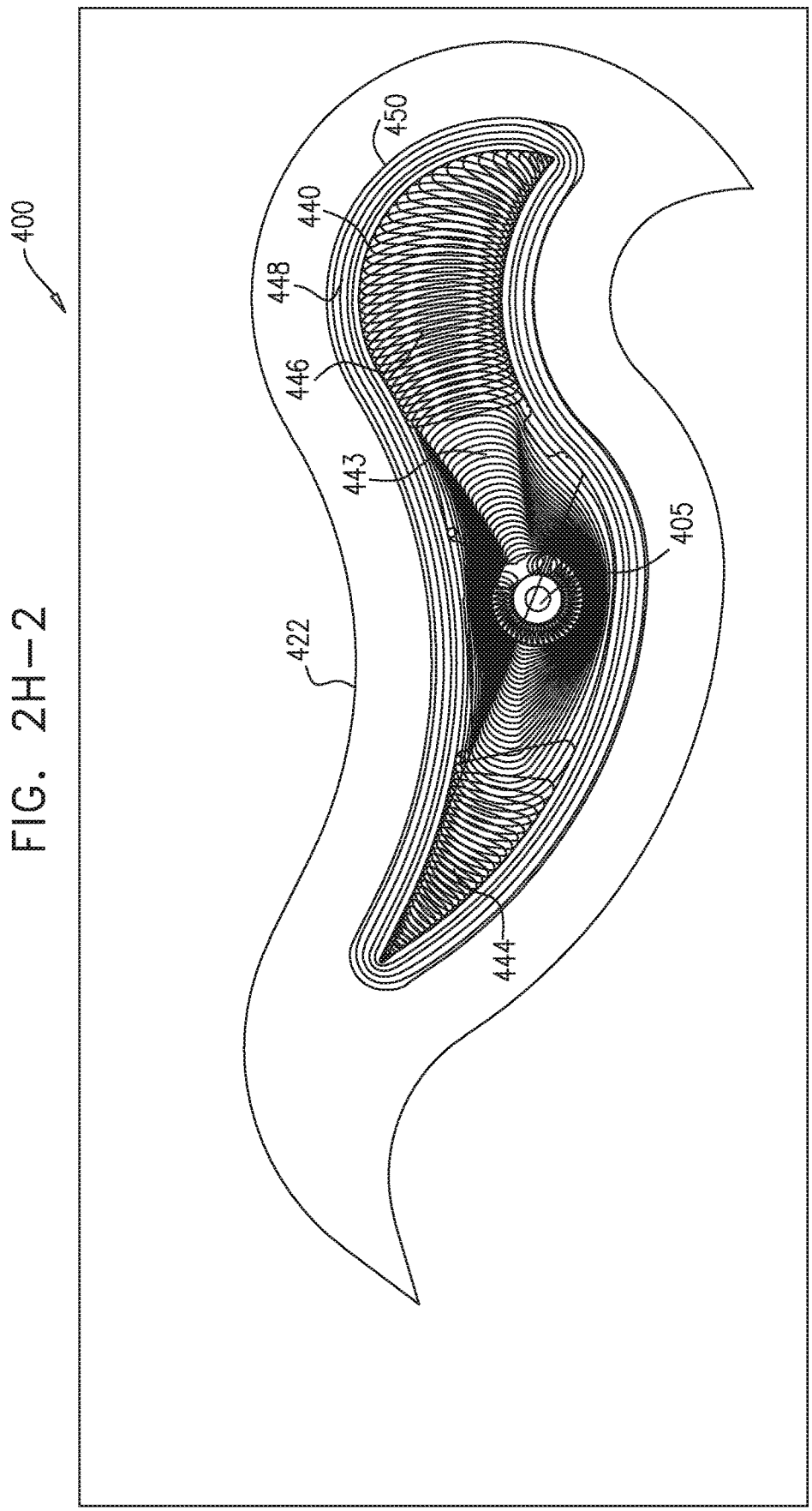
Figures 1, 21:
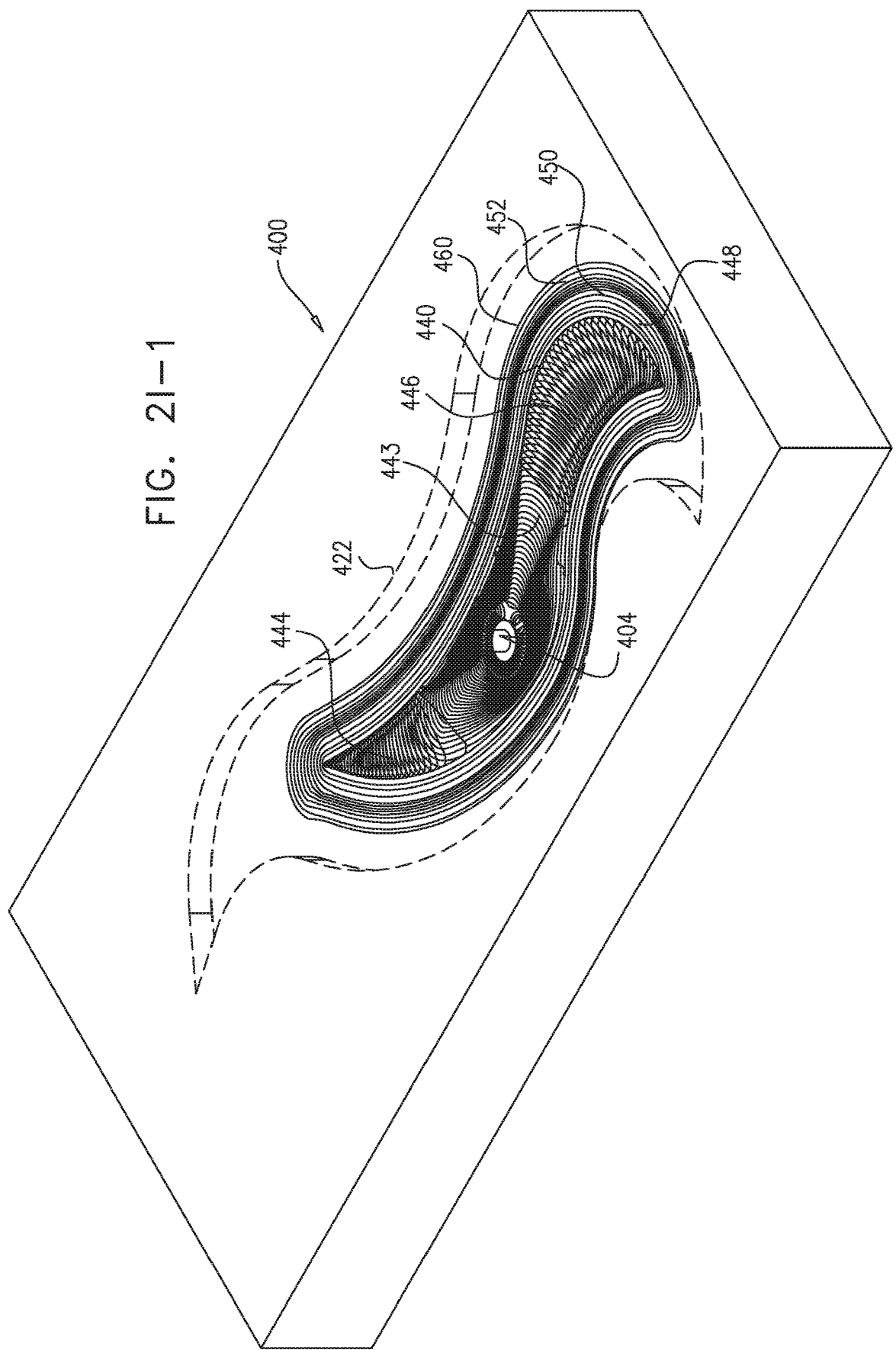
Figures 2, 21:
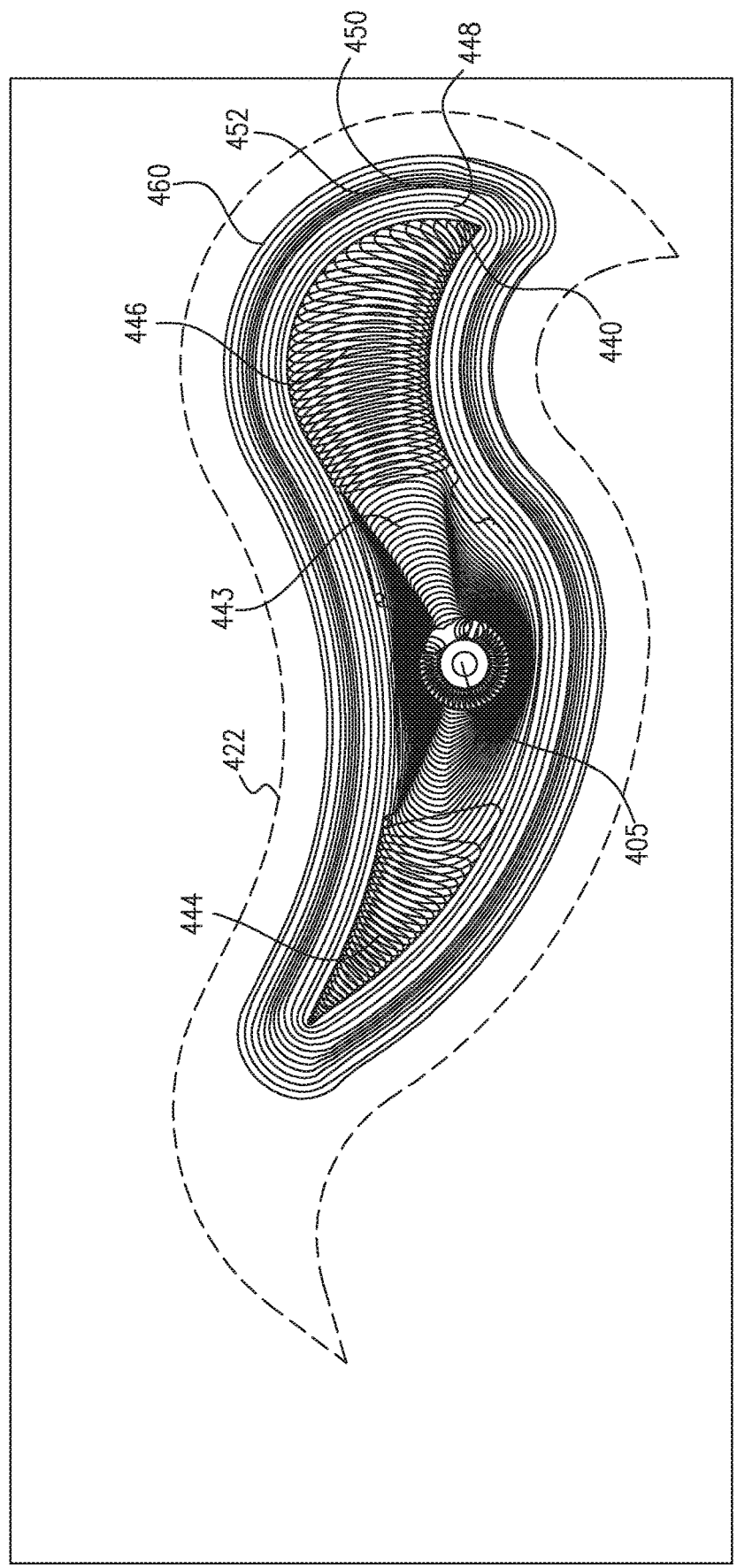

Turning now to FIGS. 2H-1 and 2H-2, it is shown that a diverging spiral tool path segment is calculated to machine a Type III region 448 defined between nested internal contour 440 and nested internal contour 450. Subsequently, as shown in FIGS. 2I-1 and 2I-2, a diverging spiral tool path segment is similarly calculated to machine a Type III region 452 defined between nested internal contour 450 and nested internal contour 460.

Figures 2, 2J:
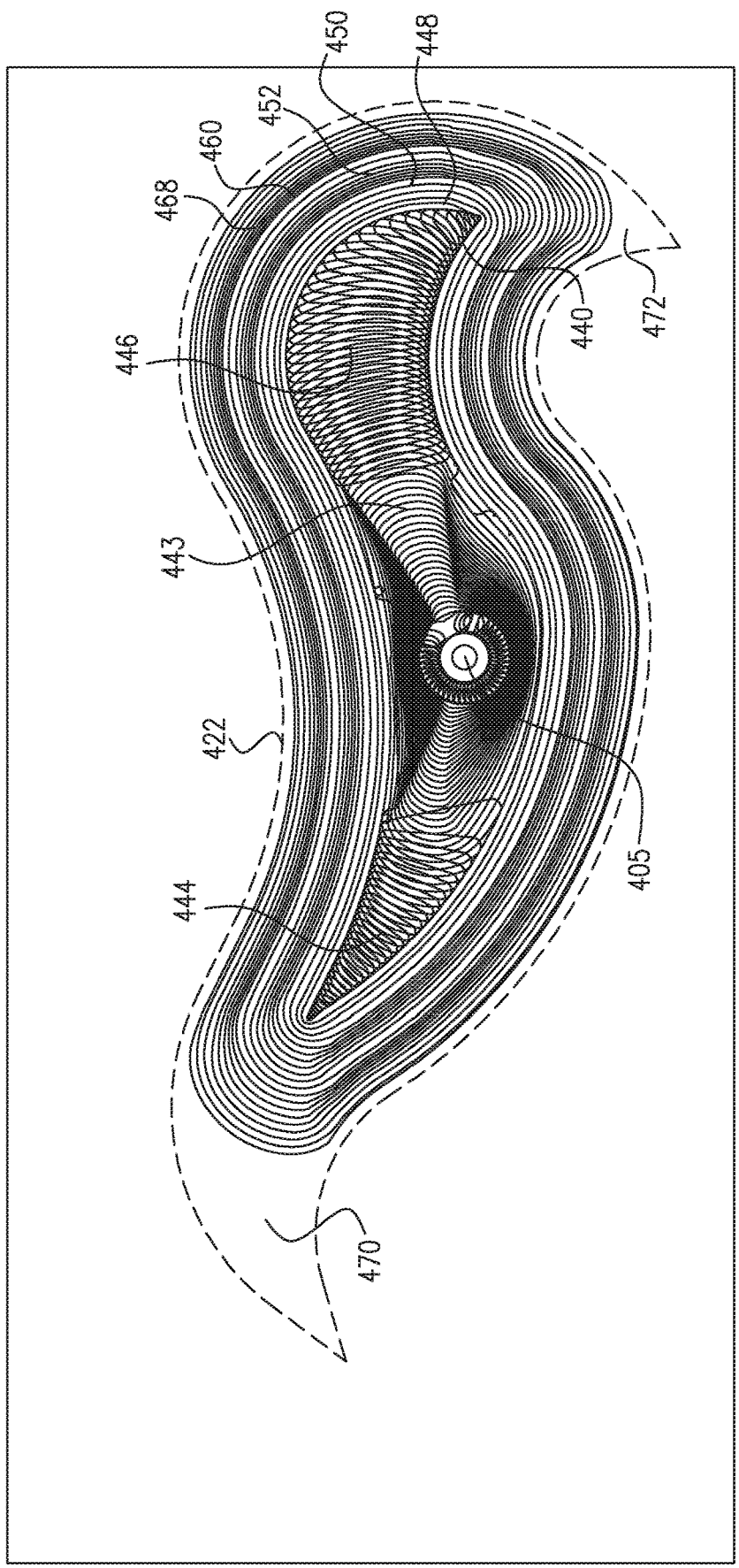
Figures 1, 2K:
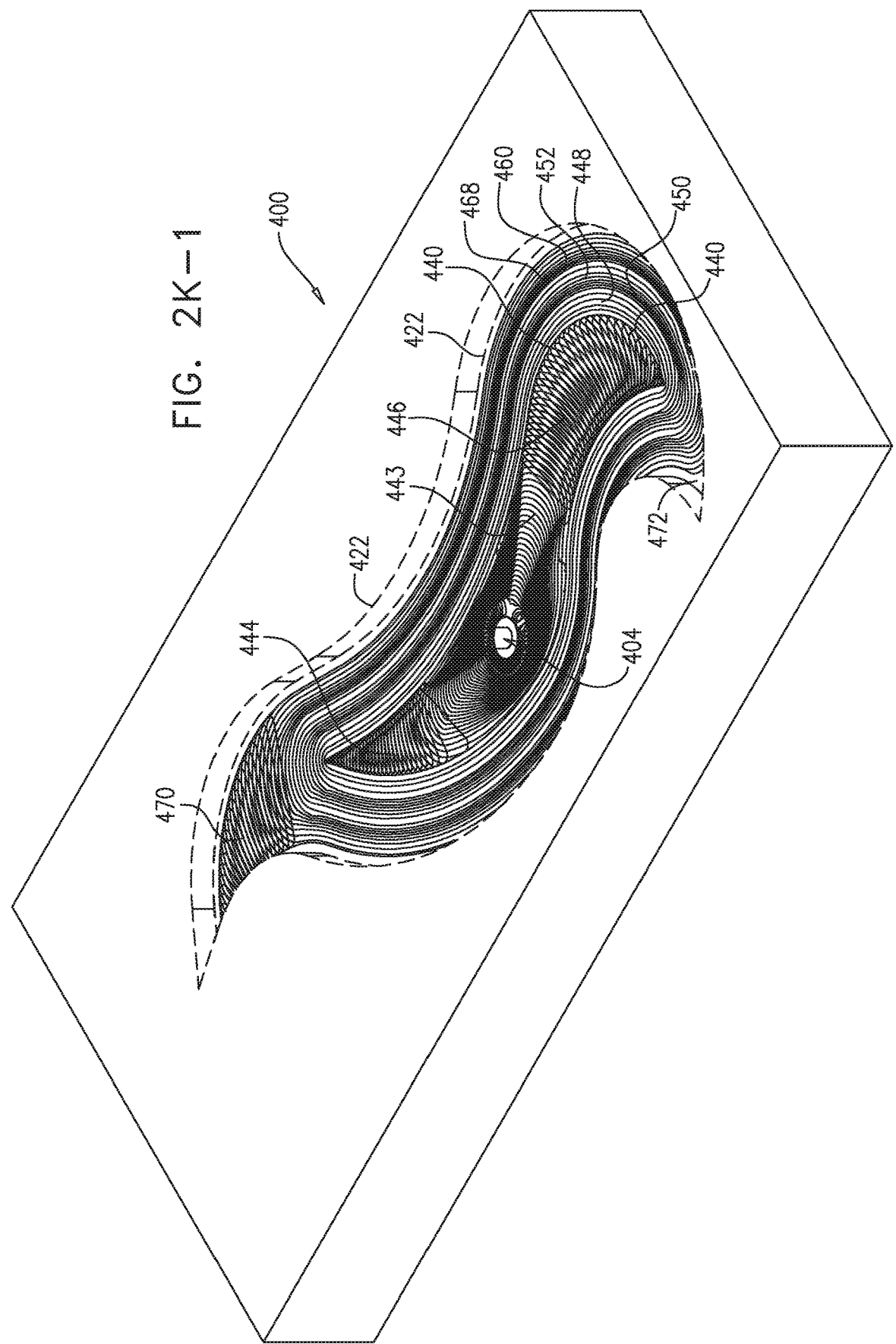
Figures 2, 2K:
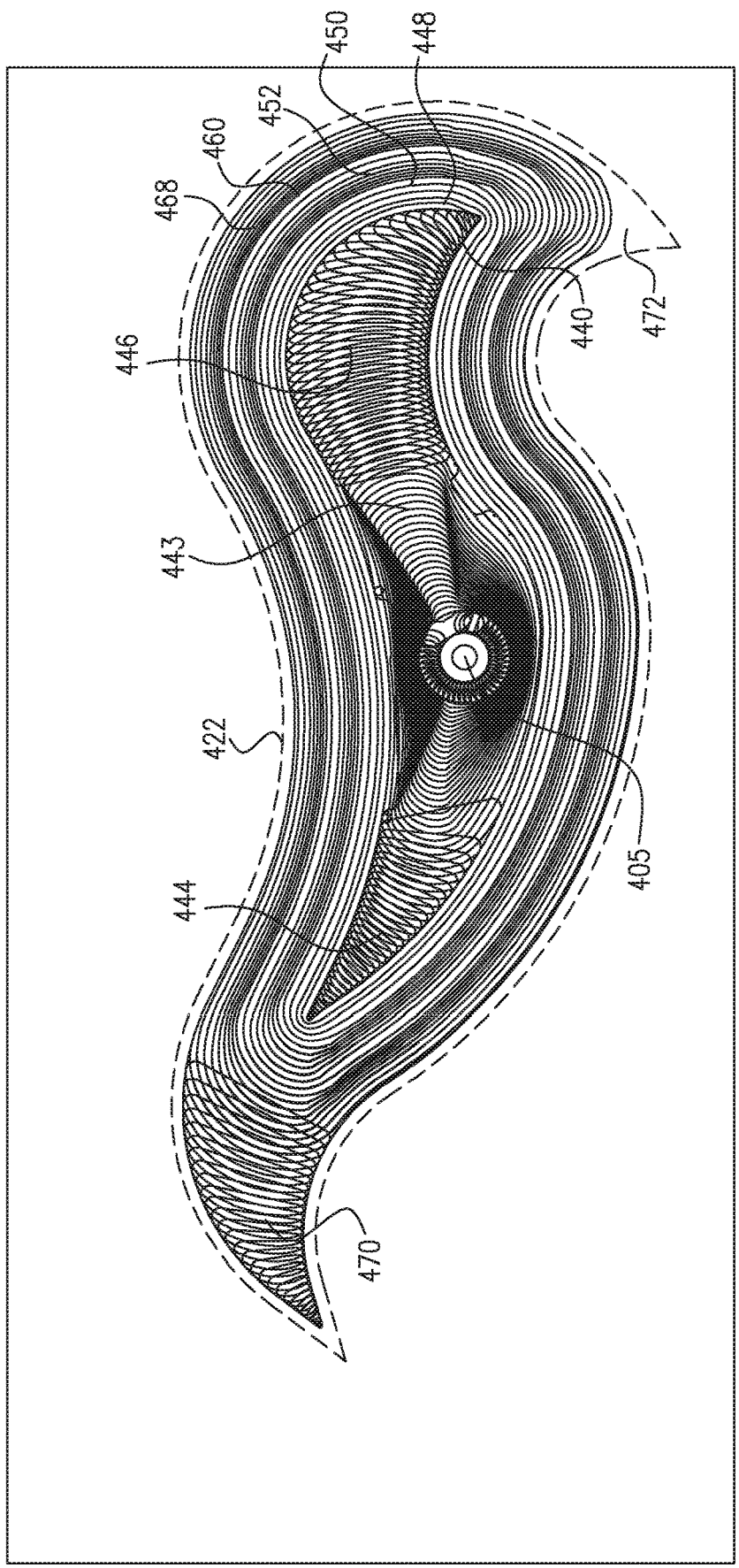
Figures 1, 2L:
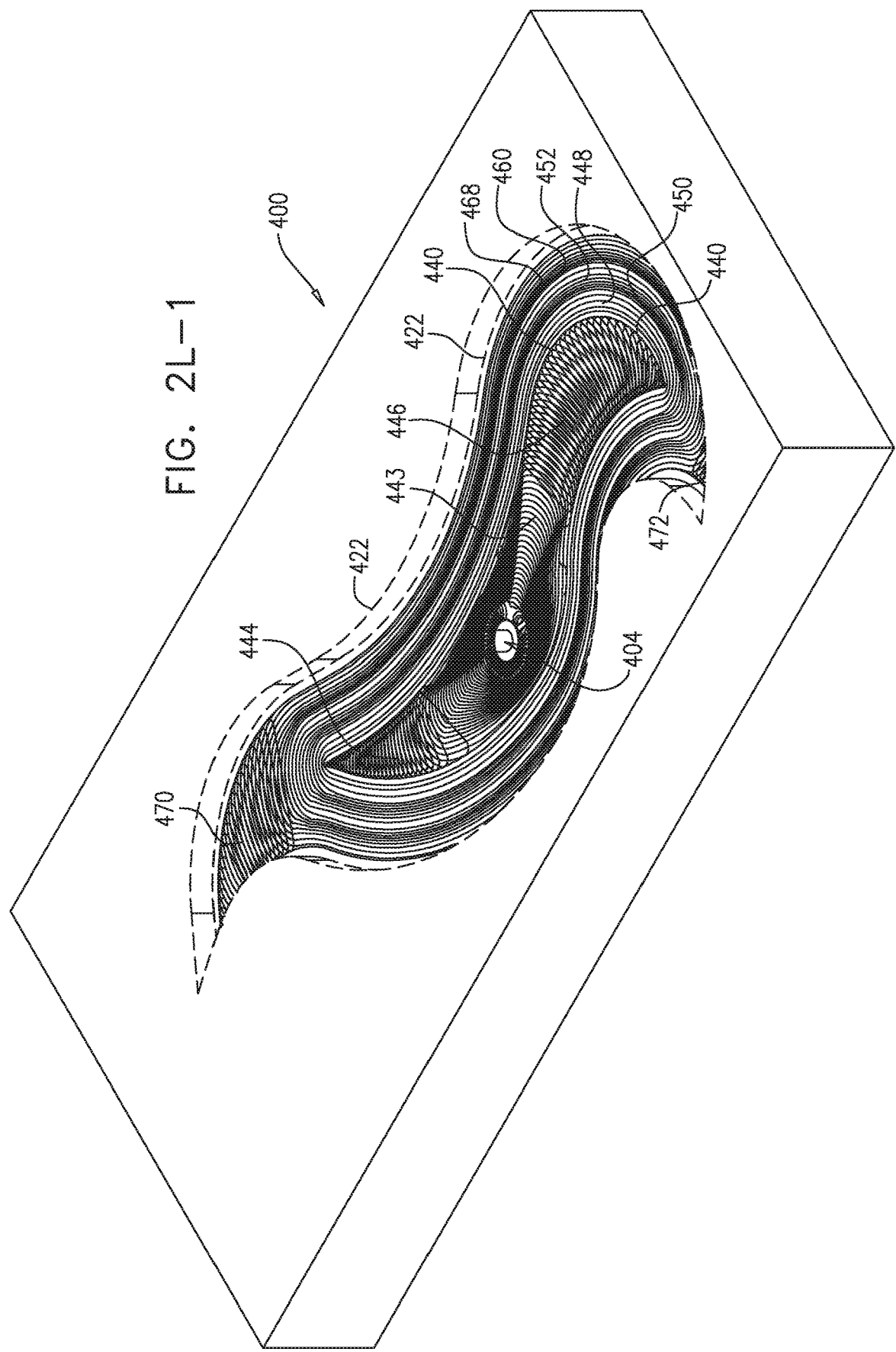
Figures 2, 2L:
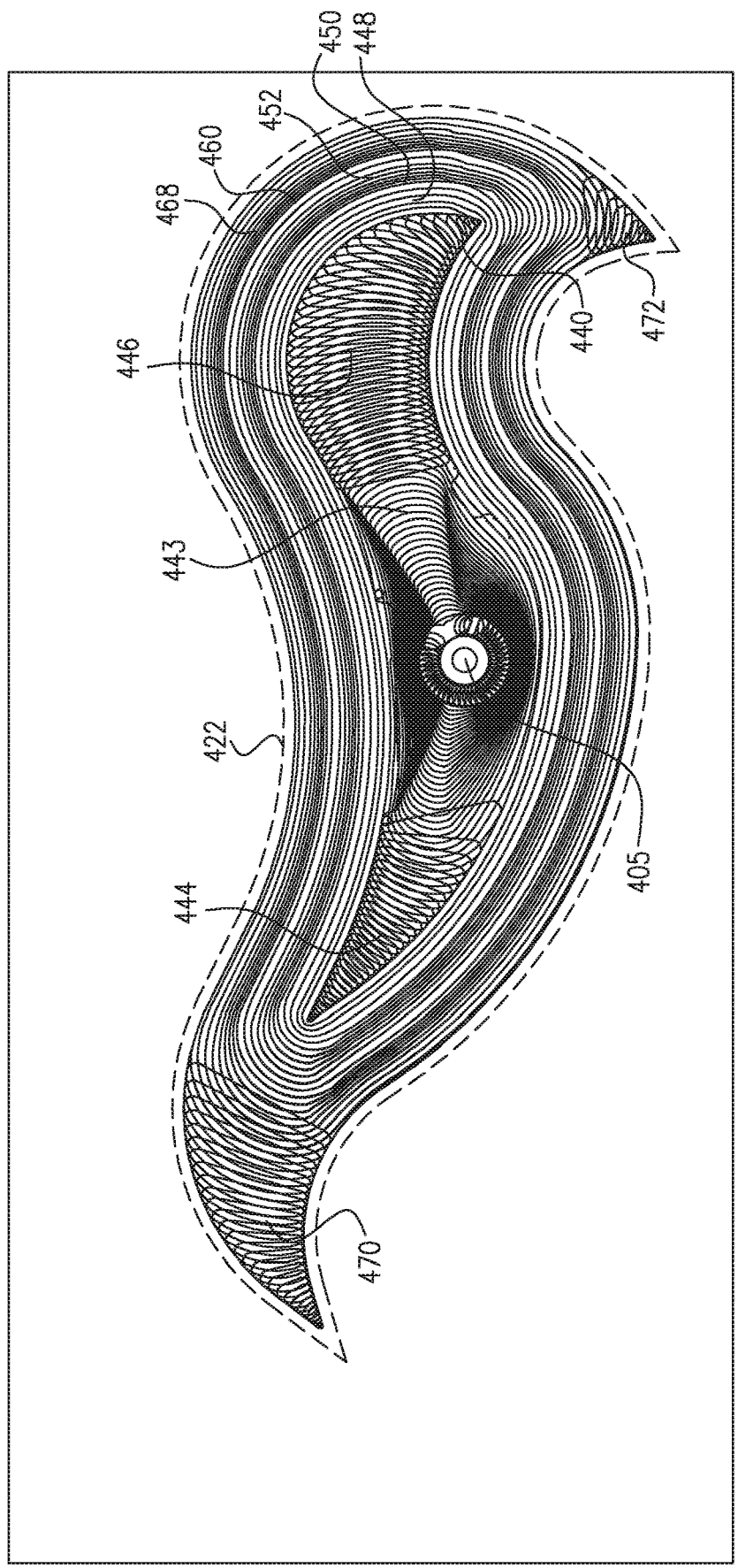
Figure 3A:
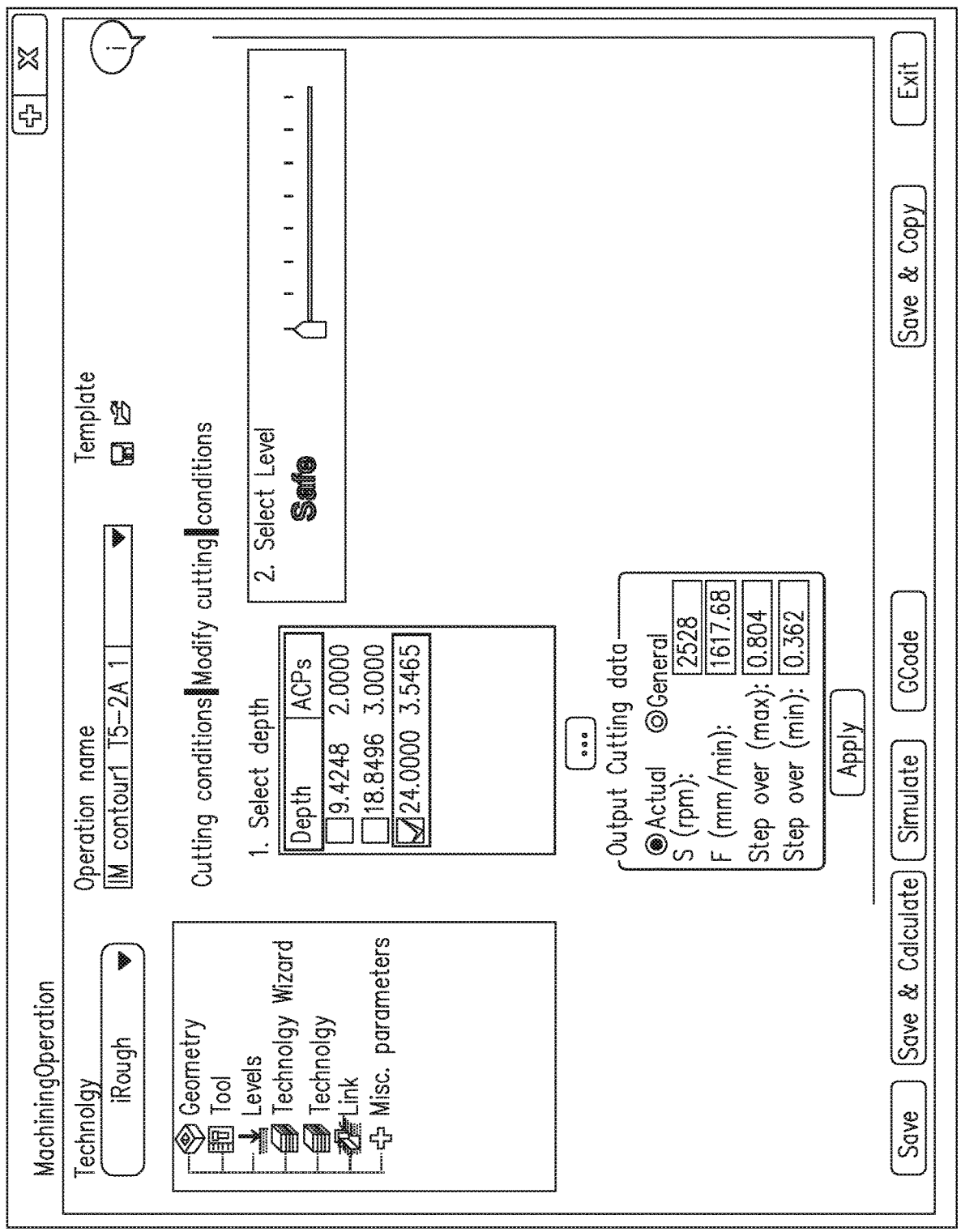
FIGS. 3A-3D are simplified screen shots illustrating some aspects of the present invention.
Figure 3B:
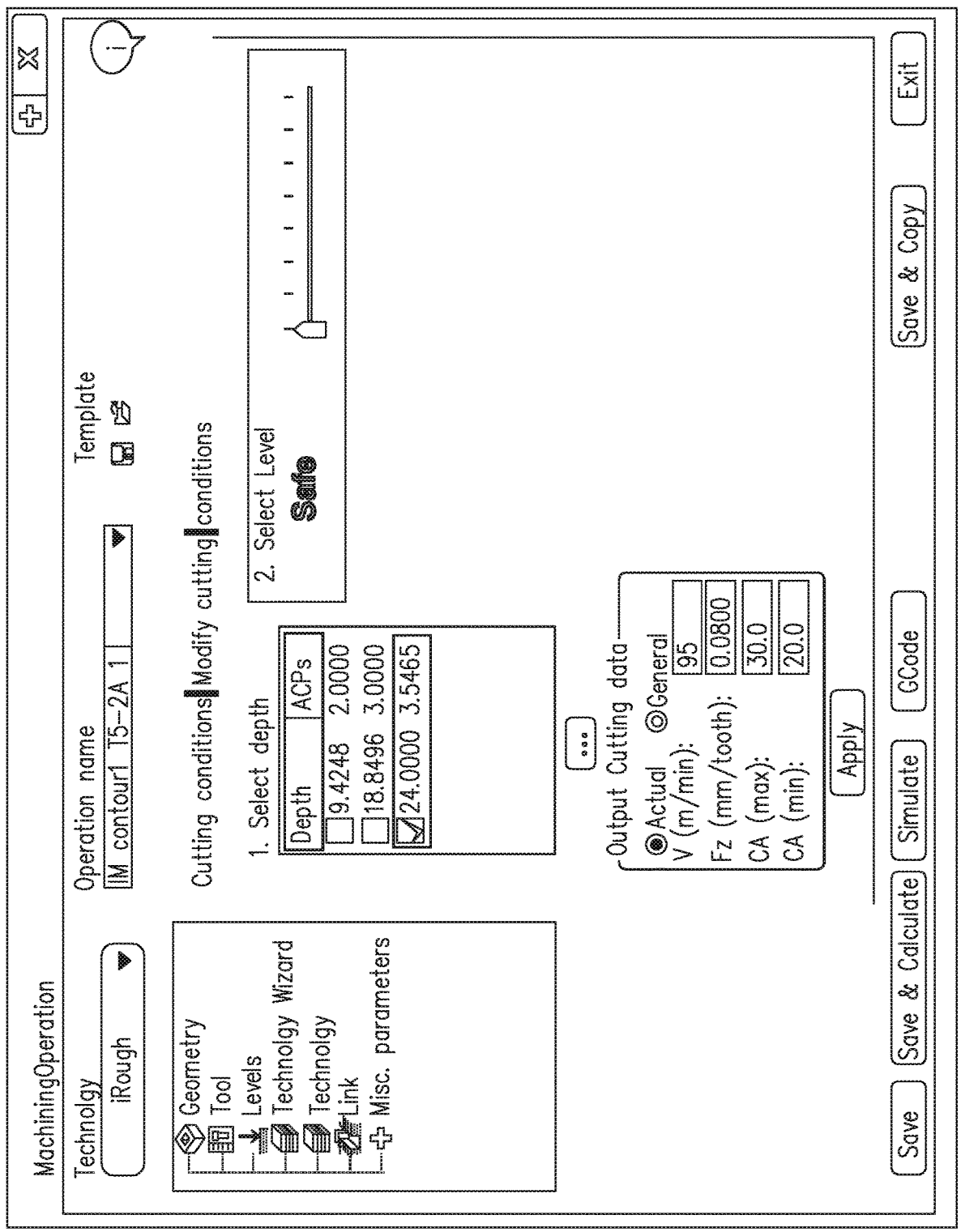
Figure 3C:
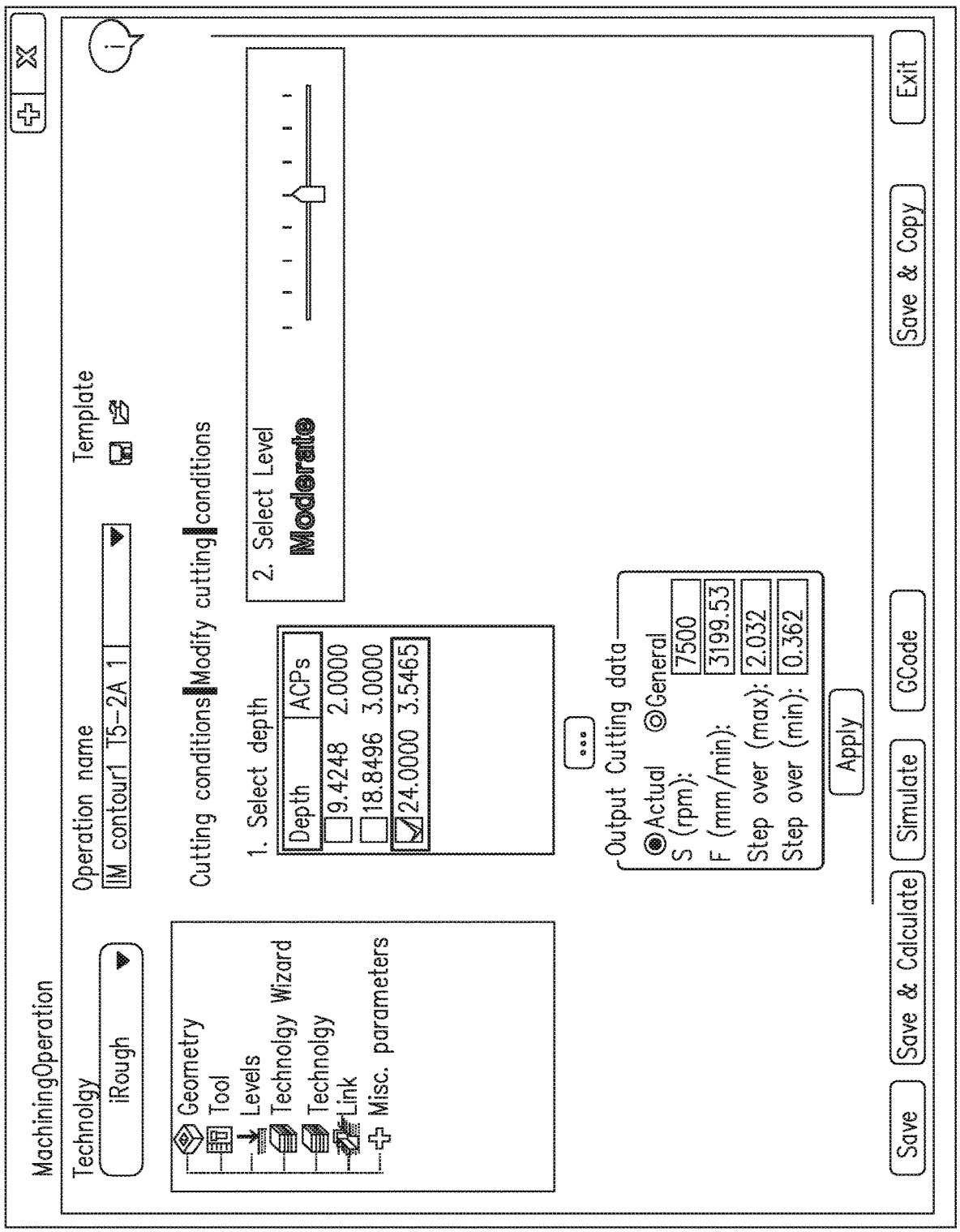
Figure 3D:
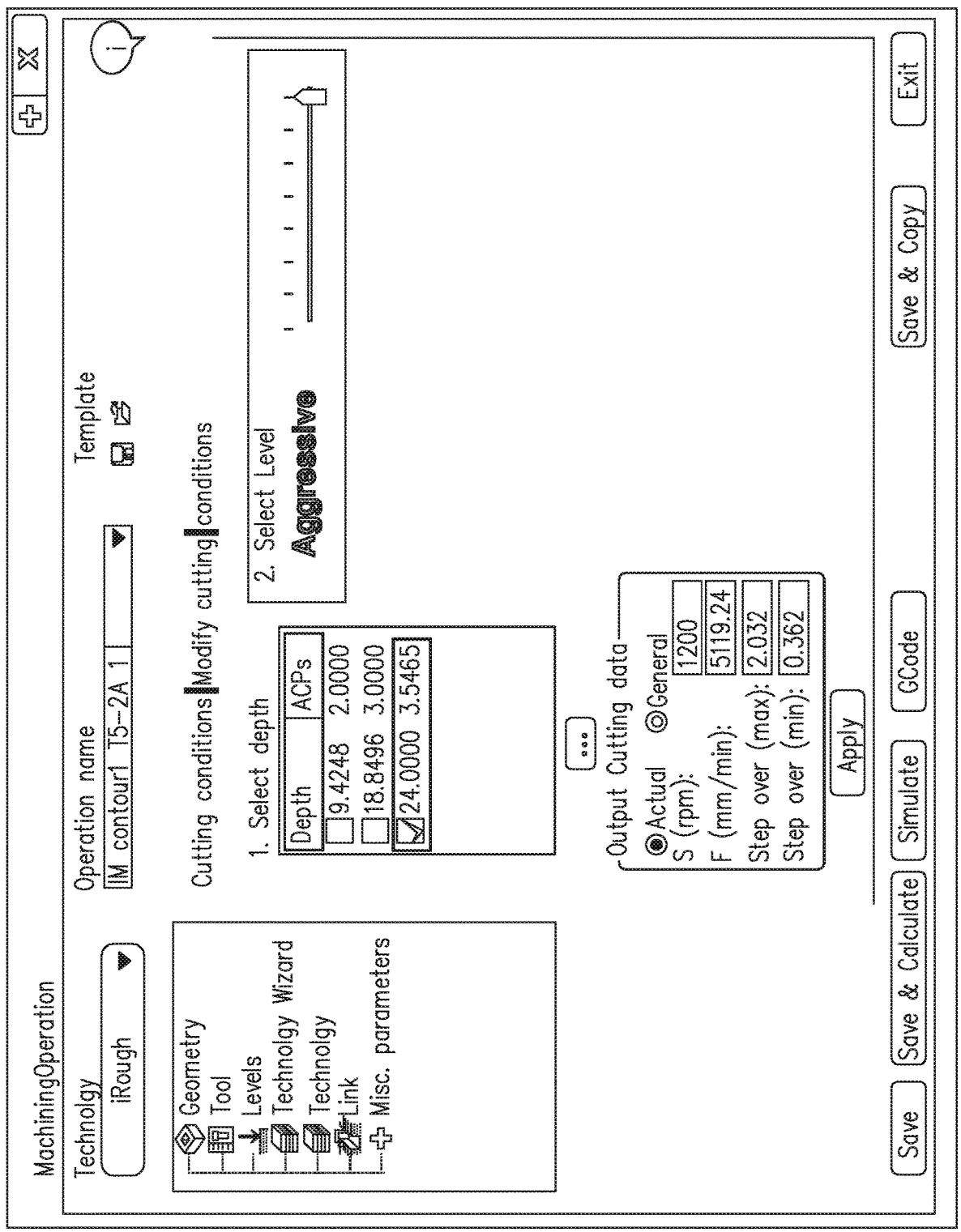

Turning now to FIGS. 2J-1 and 2J-2, it is shown that a diverging tool path segment is calculated to machine a Type III region 468 defined between nested internal contour 460 and external boundary 422, thereby creating two residual regions 470 and 472. As shown in FIGS. 2K-1 and 2K-2, residual region 470 is calculated to be machined as a Type II region by employing a trochoidal-like tool path segment. Similarly, as shown in FIGS. 2L-1 and 2L-2, residual region 472 is calculated to be machined as a Type II region by employing a trochoidal-like tool path segment, thereby completing the calculation of the machining of object 400.

Reference is now made to FIG. 5, which is a simplified composite pictorial and sectional illustration of an initial workpiece 600, a machined object 602 formed from the workpiece in accordance with a preferred embodiment of the present invention and a finished object 604 to be produced from the machined object. In the illustrated embodiment, the initial workpiece 600 is shown as a block of metal such as, for example, tool steel, mold steel or titanium. The machined object 602 is seen as a roughed out object which will be finished using techniques, which are outside the scope of the present invention, to produce the finished object 604.

For simplicity of explanation, a common vertical axis Z is defined in the workpiece 600, in the machined object 602 and in the finished object 604.

The machined object 602 of FIG. 5 is typically characterized in that it is a generally disc-like object, which is typically non-circularly symmetric and typically has non-uniformly sloped edges.

More specifically referring to the illustrated machined object 602 and finished object 604:
 the slope configuration of the edge at least a given height along the Z axis varies at different azimuthal locations along the edge; and
 the slope of the edge varies at different heights along the Z axis at least one given azimuth.

It is appreciated that machined objects may be produced in accordance with an embodiment of the present invention wherein only one or neither of these features exist. For the purposes of explanation, the shapes of the machined object 602 and of the finished object 604 have been selected to illustrate both of these features.

The method of the present invention described below with reference to FIGS. 6-12C is an automated computer-implemented system and method for generating commands for controlling a computer numerically controlled milling machine to fabricate a machined object from a workpiece having a Z-axis, the machined object being configured to facilitate subsequent finishing into a finished object. An illustrated embodiment of the method includes the following steps:
 defining a surface of the finished object;
 defining an offset surface, the offset surface being outside the surface of the finished object and separated therefrom by an offset distance, the offset surface defining an inner limiting surface of the machined object;
 defining a scallop surface, the scallop surface being outside the offset surface and separated therefrom by a scallop distance, the scallop surface defining an outer limiting surface of the machined object; and
 calculating a tool path for the computer numerically controlled milling machine which produces multiple step-up cuts in the workpiece at multiple heights along the Z-axis, the multiple step up cuts in the workpiece resulting in the machined object, wherein:
  surfaces of the machined object produced by the multiple step-up cuts all lie between the inner limiting surface defined by the offset surface and the outer limiting surface defined by the scallop surface; and
  the number of multiple step-up cuts in the workpiece at multiple heights along the Z-axis and the areas cut in each of the multiple step-up cuts are selected so as to generally minimize the amount of workpiece material that is removed from the workpiece during the cuts while ensuring that the surfaces of the machined object produced by the multiple step-up cuts all lie between the inner limiting surface defined by the offset surface and the outer limiting surface defined by the scallop surface.

In another aspect, the system and method provide the following:
 defining a surface of the finished object;
 defining an offset surface, the offset surface being outside the surface of the finished object and separated therefrom by an offset distance, the offset surface defining an inner limiting surface of the machined object;
 defining a scallop surface, the scallop surface being outside the offset surface and separated therefrom by a scallop distance, the scallop surface defining an outer limiting surface of the machined object; and calculating a tool path for the computer numerically controlled milling machine which produces multiple step-up cuts in the workpiece at multiple heights along the Z-axis, the multiple step up cuts in the workpiece resulting in the machined object, wherein:

surfaces of the machined object produced by the multiple step-up cuts all lie between the inner limiting surface defined by the offset surface and the outer limiting surface defined by the scallop surface; and a decision of whether or not to cut the workpiece at a given location at each height of each of the multiple step-up cuts is a function of the required non-vertical slope of the finished object at the given location.

In a further aspect, the method and system provide:

defining a surface of the finished object;

defining an offset surface, the offset surface being outside the surface of the finished object and separated therefrom by an offset distance, the offset surface defining an inner limiting surface of the machined object;

defining a scallop surface, the scallop surface being outside the offset surface and separated therefrom by a scallop distance, the scallop surface defining an outer limiting surface of the machined object; and calculating a tool path for the computer numerically controlled milling machine which produces multiple step-up cuts in the workpiece at multiple heights along the Z-axis, the multiple step up cuts in the workpiece resulting in the machined object, wherein:

surfaces of the machined object produced by the multiple step-up cuts all lie between the inner limiting surface defined by the offset surface and the outer limiting surface defined by the scallop surface; and a decision as to at which height each of the multiple step-up cuts is made is a function of the required non-vertical slope of the finished object at the given height at various locations on the finished object.

Figure 6:
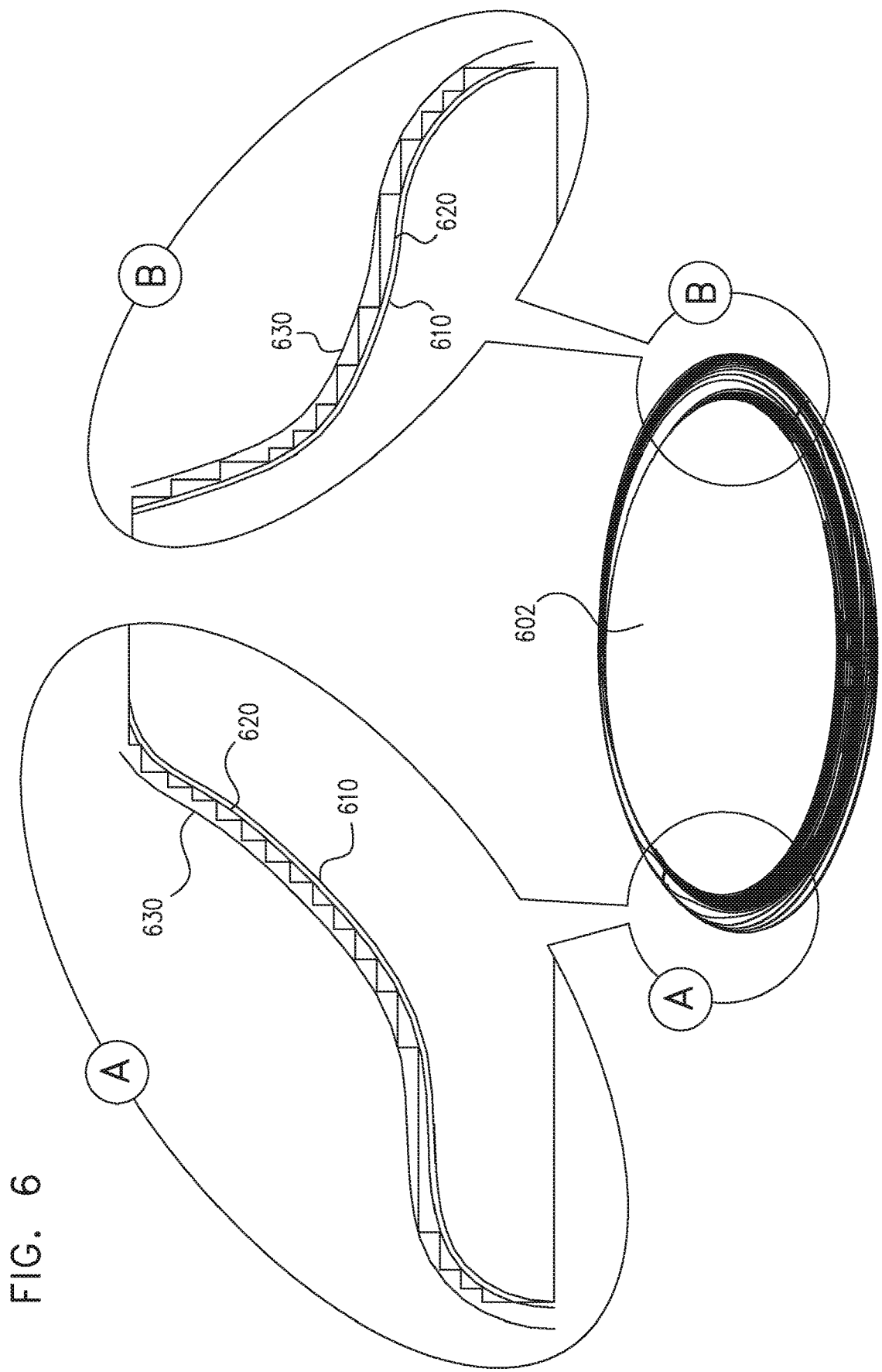
FIG. 6 is a simplified annotated pictorial illustration of the machined object of FIG. 5 showing, in sectional enlargements, finished object surface, offset surface and scallop surface profiles at two mutually azimuthally separated locations in accordance with a preferred embodiment of the present invention.

Reference is now made to FIG. 6, which is a simplified annotated pictorial illustration of the machined object 602 of FIG. 5 showing, in sectional enlargements here designated by letters A and B, typical finished object surface, offset surface and scallop surface profiles at two mutually azimuthally separated locations, respectively designated A and B, in accordance with a preferred embodiment of the present invention.

FIG. 6 is annotated to show three mutually parallel curves:

a first curve, here designated as finished object surface curve 610, which represents the intended wall surface of a finished object to be produced from machined object 602, by finishing techniques which are outside the scope of the present invention;

a second curve, here designated as surface offset curve 620, parallel to finished object surface curve 610 in three dimensions, which represents an offset distance from the finished object surface curve 610, indicating a minimum thickness of material which must remain on the machined object 602 beyond the finished object surface curve 610;

a third curve, here designated as scallop surface curve 630, parallel to finished object curve 610 and to surface offset curve 620 in three dimensions, which represents a maximum scallop distance from the surface offset curve 620 defining the maximum thickness of metal which can remain on the machined object 602 beyond the surface offset curve.

In a typical case, the separation between the finished object surface curve 610 and the surface offset curve 620 is a few millimeters and the separation between the surface offset curve 620 and the scallop surface curve 630 is 10% to 50% of the separation between the finished object surface curve 610 and the surface offset curve 620. The scallop tolerance is typically 10% to 30% of the separation between the surface offset curve 620 and the scallop surface curve 630.

The finished object surface curve 610 is typically selected by the object designer. The separations between the finished object surface curve 610, the surface offset curve 620 and the scallop surface curve 630, as well as a scallop tolerance are typically selected by a computerized tool path technologist who employs an embodiment of the present invention for programming tool paths for computerized machine tools.

Criteria used by the computerized tool path technologist in selecting the foregoing separations between the finished object surface curve 610, the surface offset curve 620 and the scallop surface curve 630 as well as the scallop tolerance are well known.

Figure 7:
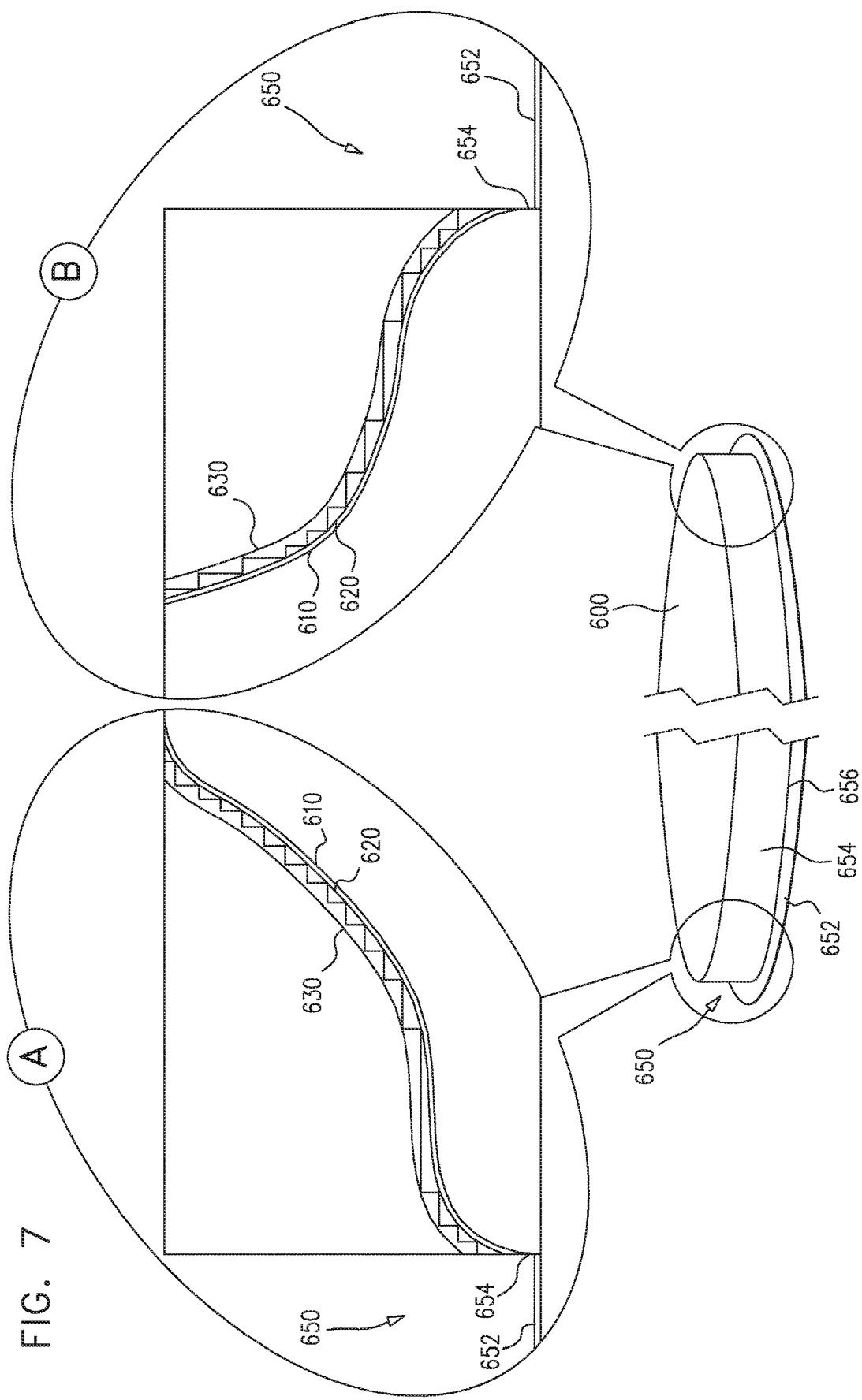
FIG. 7 is a simplified pictorial illustration of the workpiece of FIG. 5 showing an initial two-dimensional deep cut therein and also showing, in enlargements the cut superimposed over the corresponding enlargements of FIG. 6.

Reference is now made additionally to FIG. 7, which is a simplified pictorial illustration of the initial workpiece 600 of FIG. 5 showing an initial deep cut 650 therein and also showing, in enlargements respectively designated A and B, the corresponding enlargements A and B of FIG. 6 superimposed over the workpiece 600, having the initial deep cut 650. In the illustrated embodiment, the initial deep cut 650 is circumferential, it being appreciated that this is not necessarily the case.

The initial circumferential deep cut 650 defines a deep cut floor surface 652, a circumferential deep cut edge wall surface 654 and an intersection curve 656 which represents the intersection between deep cut floor surface 652 and circumferential deep cut edge wall surface 654.

Figure 8:
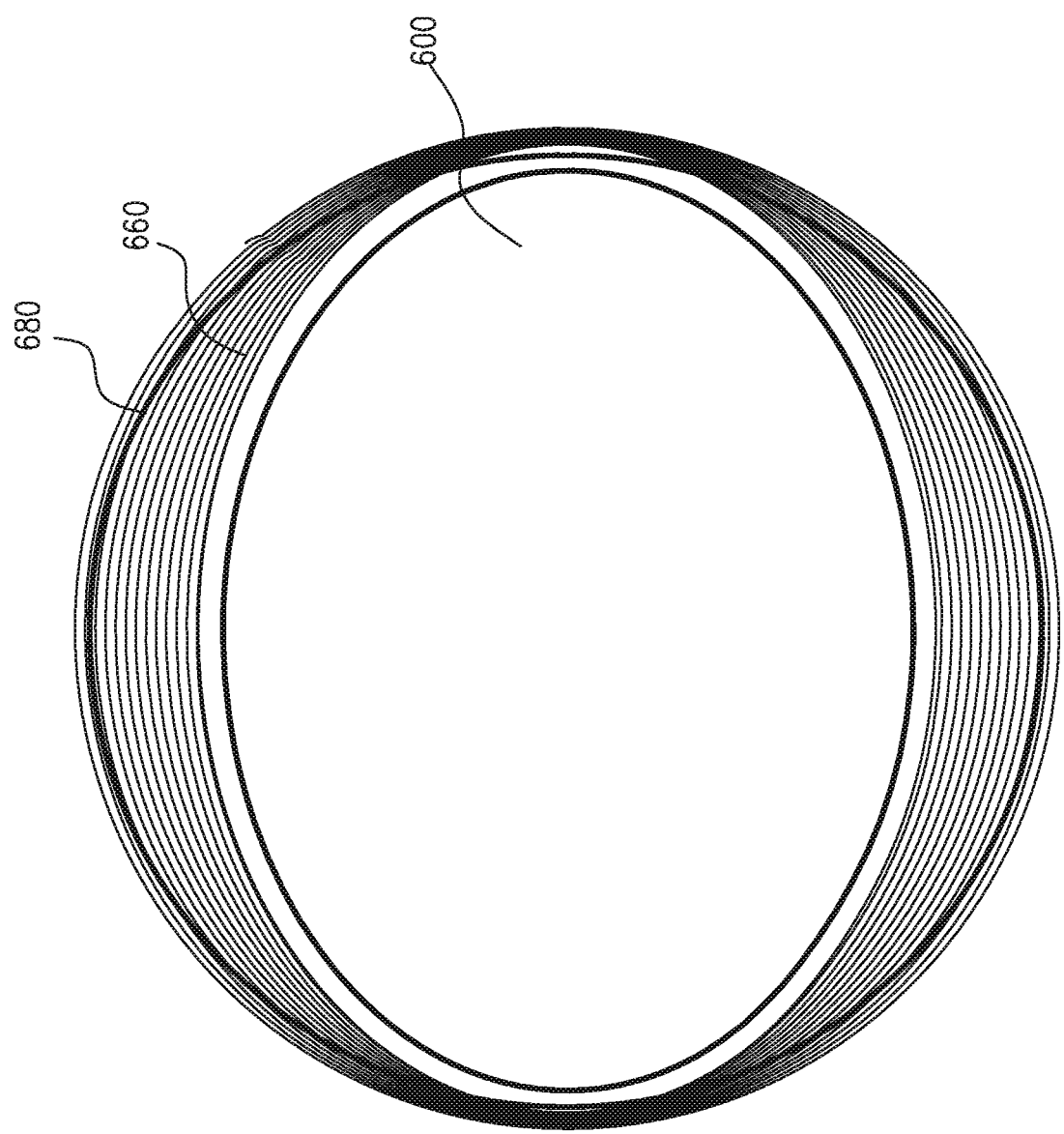
FIG. 8 is a simplified top view illustration of the workpiece of FIG. 5 following the initial cut illustrated in FIG. 7 and showing a tool path preferably employed to achieve this cut in accordance with a preferred embodiment of the present invention.

In accordance with a preferred embodiment of the present invention, once the surface offset curve 620 and the scallop surface curve 630 have been established, a tool path is generated for the initial deep cut 650 shown in FIG. 7. This tool path is shown in FIG. 8 and designated by reference numeral 660. The outside edge of the workpiece 600 is indicated by reference numeral 680.

Thereafter, tool paths are generated for cutting steps into the edge wall 654 of the workpiece, preferably sequentially and monotonically upward from the deep cut floor surface 652 defined by initial deep cut 650, in accordance with a preferred embodiment of the present invention. These monotonically upwardly cut steps are here termed "step-up cuts" and transform the workpiece shown in FIG. 7 into the machined object 602 of FIG. 5.

Figure 9A:
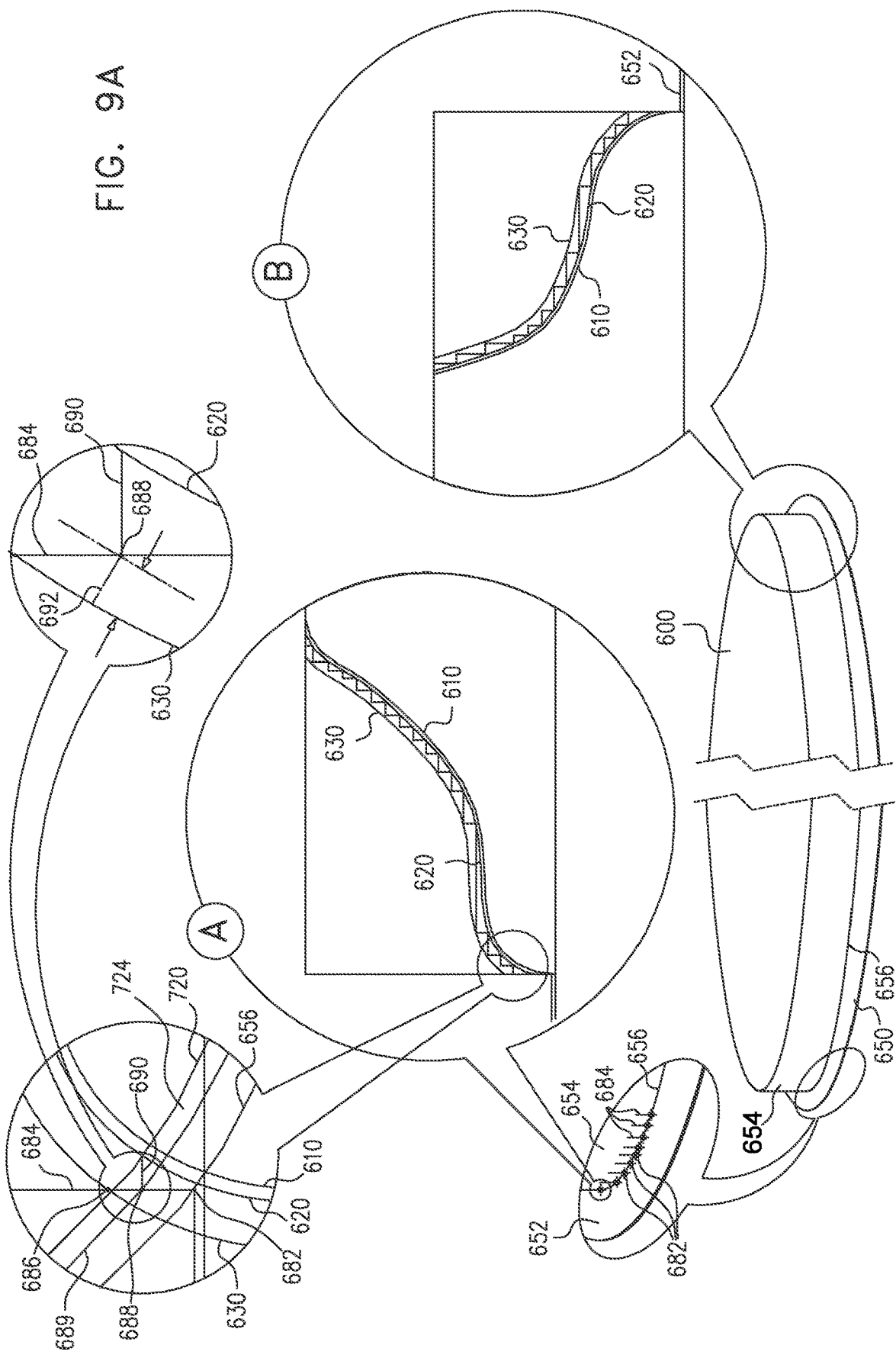

Reference is now made in this context additionally to FIGS. 9A, 9B and 9C, which are simplified sectional illustrations inter alia of the corresponding annotated sectional illustrations in the respective enlargements A and B of FIG. 6 superimposed over the workpiece 600 having the deep cut 650, as it appears in FIGS. 7 and 8 and respectively showing first, second and third step-up cuts in accordance with a preferred embodiment of the present invention.

A preferred method for calculation of the height of the first step-up cut will now be described in detail with reference to FIG. 9A:

Initially, the height of a first step from the bottom of the initial deep cut is calculated for a collection of mutually azimuthally separated points 682 densely distributed all along curve 656 at the intersection of floor 652 and the edge wall 654, defined by the initial deep cut 650 shown in FIGS. 7 and 8 as follows:

For each one of the collection of points 682, an imaginary vertical line 684, parallel to the Z-axis and along the edge wall 654, is constructed to extend through the point 682 and intersect at a point 686 with the scallop surface curve 630. The height of intersection point 686 is noted; and Taking the heights of the intersection points 686 of the imaginary vertical lines 684 with the scallop surface curve 630 for each point 682 in the collection of points all along the circumference of edge wall 654, the lowest height of an intersection point from among all of them is selected as the first step height and is identified as a point along line 684 and designated by reference numeral 688. A curve running through all points 688 along the circumference of edge wall 654 is designated by reference numeral 689.

Figure 10A:
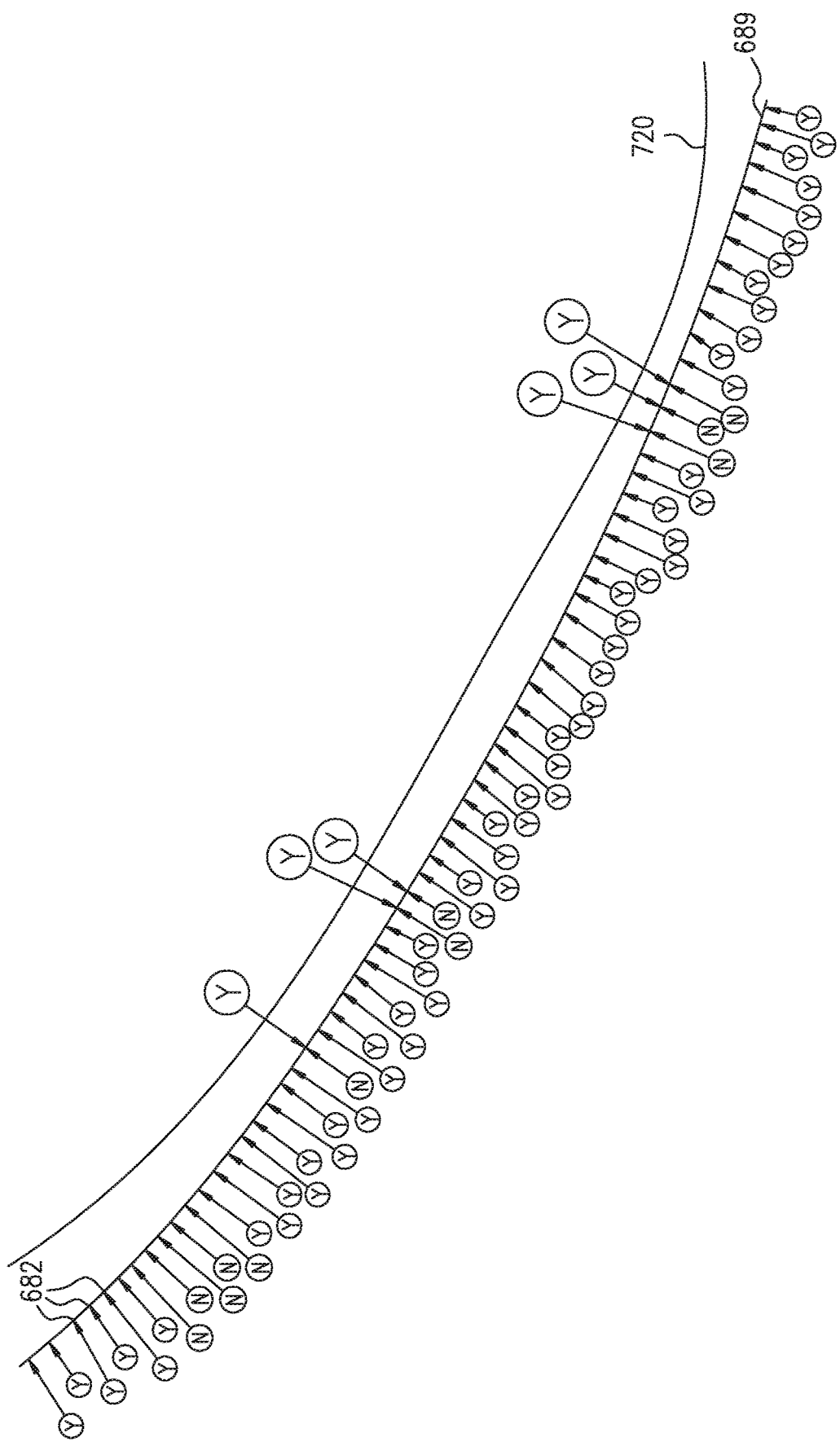
FIGS. 10A and 10B are simplified sectional illustrations of the workpiece of FIGS. 7-9A showing a first step-up cut in accordance with a preferred embodiment of the present invention.

Next, a determination of which contiguous azimuthal regions along the circumference of the initial deep cut, represented by edge wall 654, are to be cut down to the height represented by point 688, is carried out as follows:

An imaginary slice is taken through the workpiece of FIGS. 7, 8, 9A, 9B & 9C perpendicular to common vertical axis Z at the first step height represented by point 688 and is shown as a horizontal line designated 690 in FIGS. 9A, 9B & 9C;

The normal distance 692 between the point 688 at height 690 and the scallop surface curve 630 is ascertained;

If distance 692 is less than the scallop tolerance, which is a predetermined value, the point 682 is marked as a "good to cut" point, here designated by the letter Y in FIG. 10A. Otherwise that point 682 is marked as a "no cut" point, here designated by the letter N in FIG. 10A.

Once all of the points 682, which typically number in the tens of thousands in large machined objects, have been classified as either Y points or N points, as seen in FIG. 10A, a short "no-cut" gap elimination process is undertaken wherein sequences of "no-cut" points 682 of less than a predetermined number of points, typically 4 points, are reclassified as "good to cut" points. FIG. 10A indicates such short "no-cut" gaps and their reclassification and FIG. 10B shows the reclassified sequences of points.

Figure 10B:
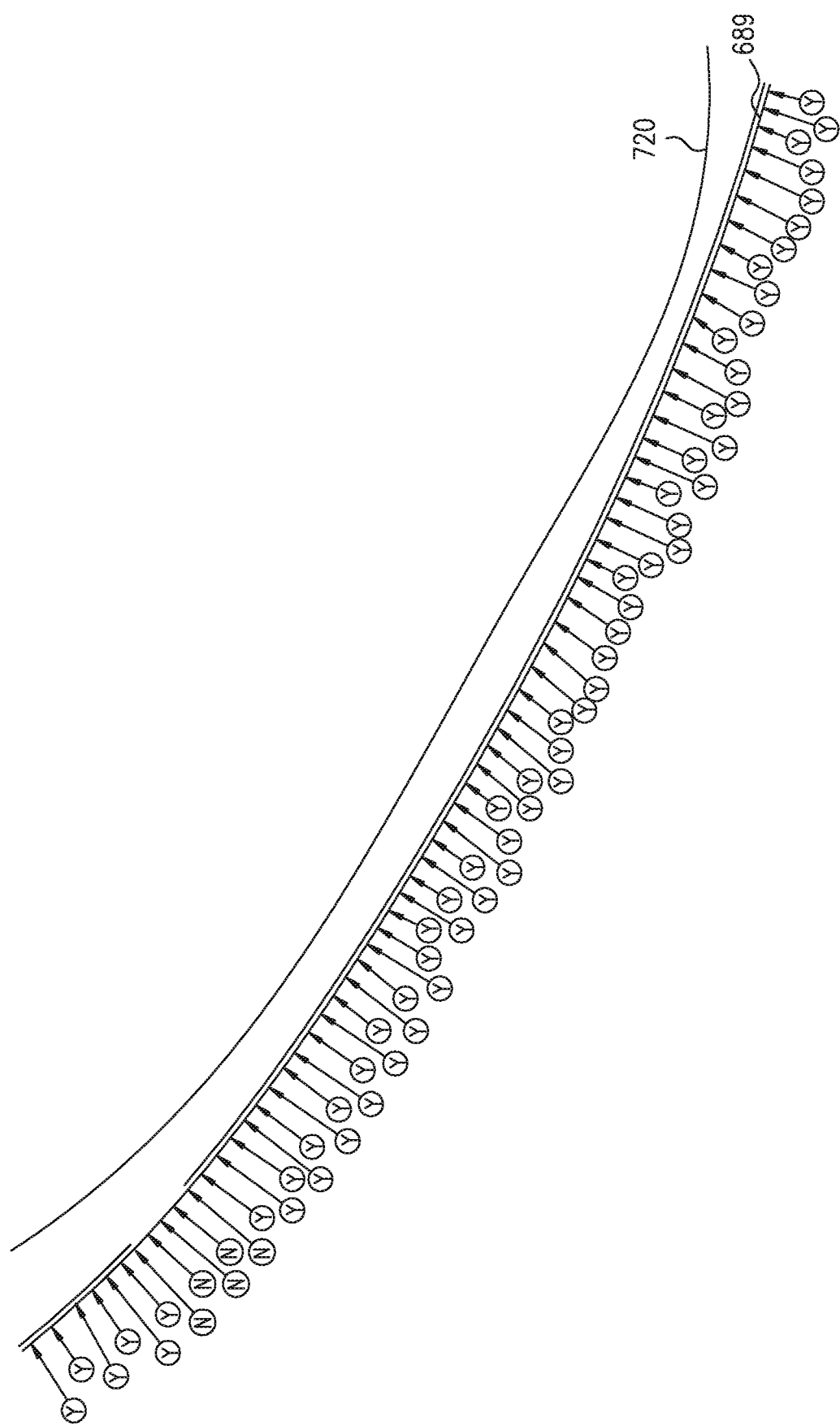
Figure 10C:
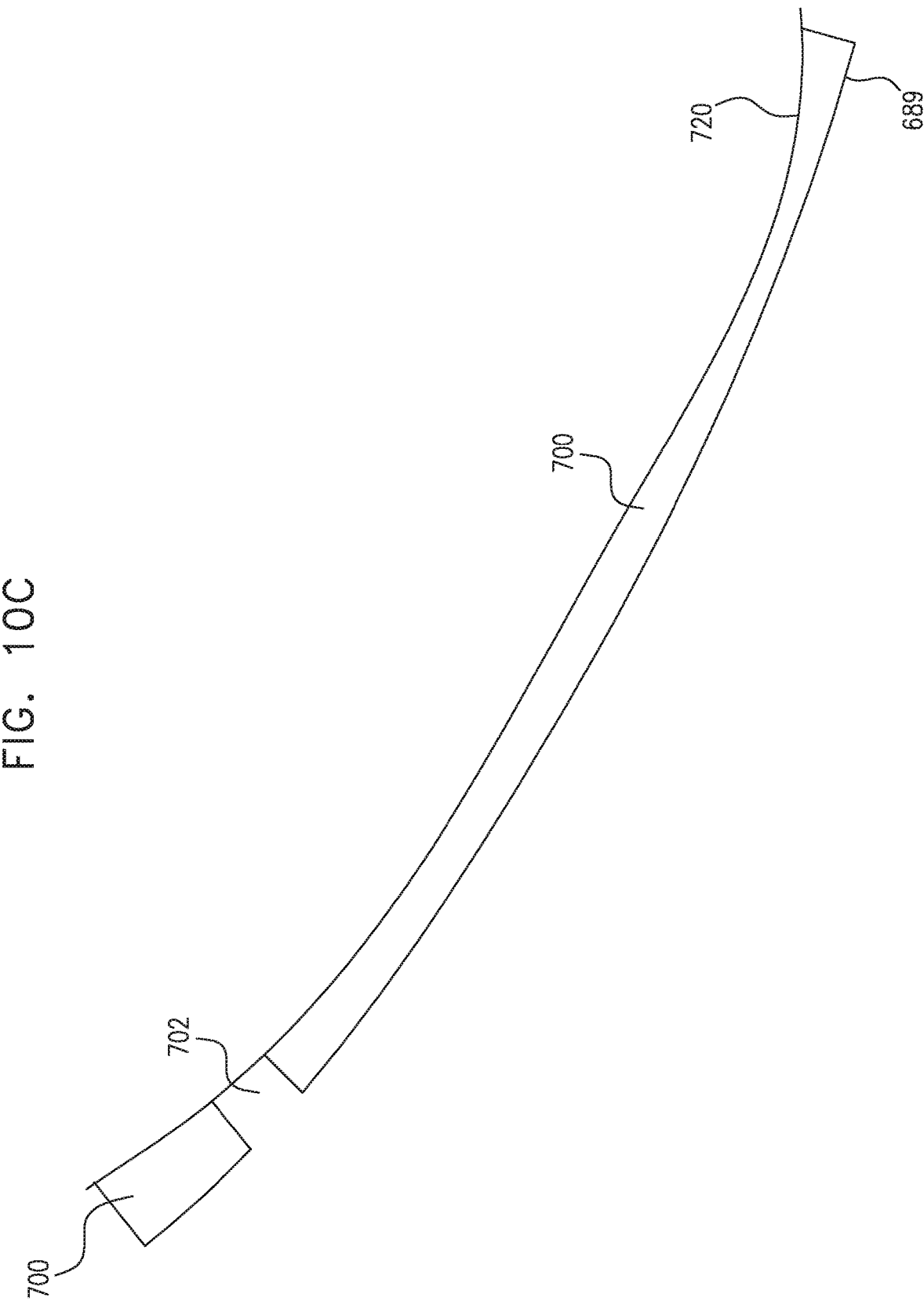
FIG. 10C is a simplified top view illustration of a portion of the workpiece of FIGS. 7-9A following the step-up cut illustrated in FIGS. 10A & 10B in accordance with a preferred embodiment of the present invention.

For each sequence of at least 4 contiguous "good to cut" points, an azimuthal cut region 700 is defined as illustrated in FIG. 10C and for each sequence of at least 4 contiguous "no-cut" points, an azimuthal non-cut region 702 is defined as illustrated in FIG. 10C.

It is appreciated that the depth of cut in a plane, perpendicular to the Z-axis, at a height represented by horizontal line 690, which indicates the width of the cut region 700 corresponding to each "good to cut" point 682 in FIG. 10B is determined by the separation between curve 689 and the intersection of the plane defined by horizontal line 690 with the offset surface 620. The intersection of the plane defined by horizontal line 690 with the offset surface 620 is a curve designated by reference numeral 720 and defines the base of a second step forward edge wall 722 and an edge of a first step floor surface 724 which lies at height 690.

It is further appreciated that the cut region 700 is preferably machined as a semi-open region as described hereinabove with reference to FIG. 4B.

Calculation of the height of a second step-up cut will now be described in detail with reference to FIG. 9B:

Initially, the height of a step from first step floor surface 724, which height represents the height of the second step, is calculated for a collection of mutually azimuthally separated points 732 densely distributed all along curve 720 representing the intersection of second step edge wall 722 with first step floor surface 724, as shown in FIGS. 9B & 9C as follows:

For each one of the collection of points 732, an imaginary vertical line 734, parallel to the Z-axis and along the second step edge wall 722, is constructed to extend through the point 732 and intersect at a point 736 with the scallop surface curve 630. The height of intersection point 736 is noted;

Taking the heights of the intersection points 736 of the imaginary vertical lines 734 with the scallop surface curve 630 for each point 732 in the collection of points all along the circumference of second step edge wall 722, the lowest height of an intersection point from among all of them is selected as the second step height and is identified as a point along line 734 and designated by reference numeral 738. A curve running through all points 738 along the circumference of second step edge wall 722 is designated by reference numeral 739.

Figure 11A:
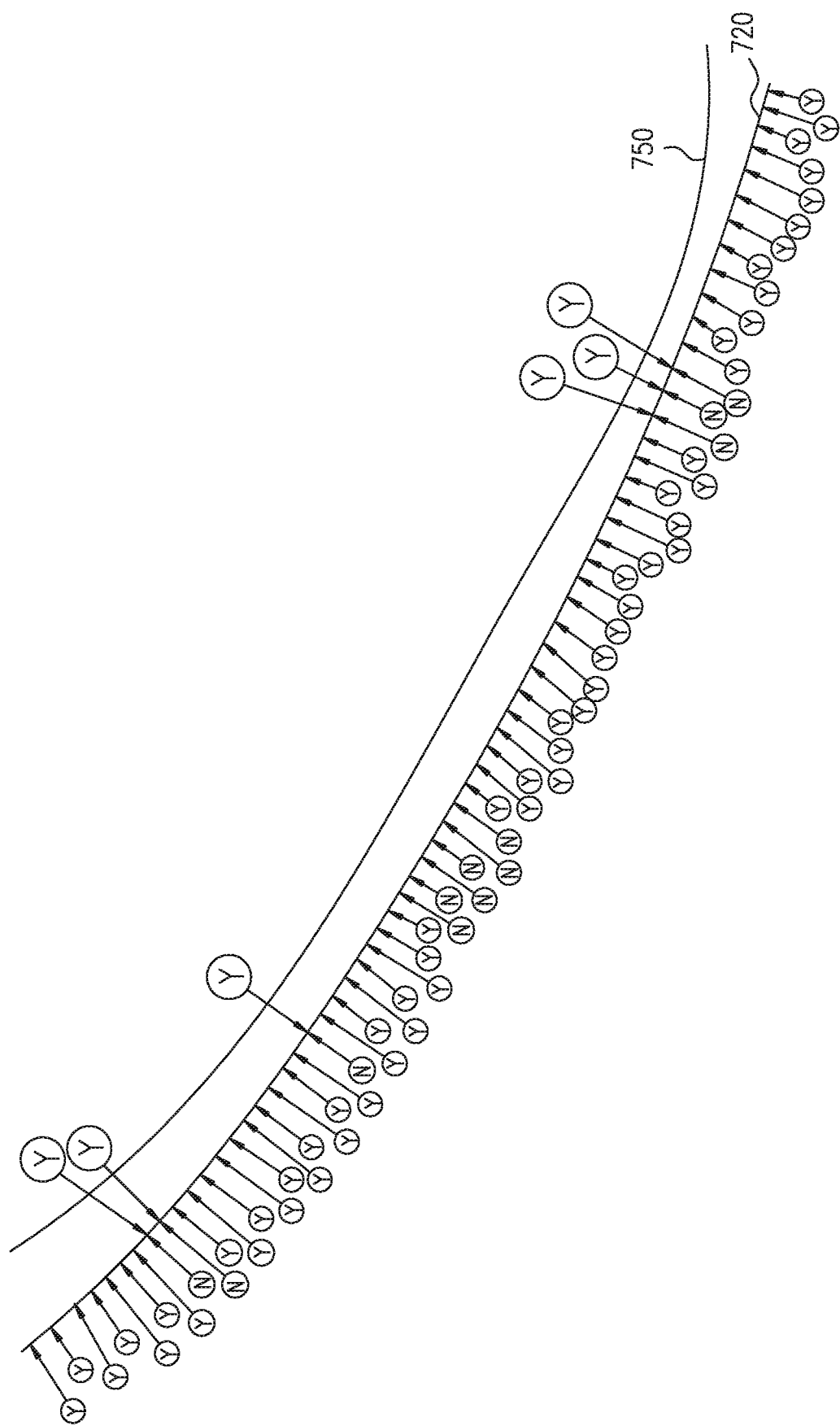
FIGS. 11A and 11B are simplified sectional illustrations of the workpiece of FIGS. 7-9B showing a second step-up cut in accordance with a preferred embodiment of the present invention.

An imaginary horizontal slice is taken through the workpiece of FIGS. 7, 8, 9A, 9B & 9C at the second step height represented by point 738 and is shown as a horizontal line designated 740 in FIGS. 9B & 9C;

The normal distance 741 between the point 738 at height 740 and the scallop surface curve 630 is ascertained;

If normal distance 741 is less than the scallop tolerance, which is a predetermined value, the point 732 is marked as a "good to cut" point, here designated by the letter Y in FIG. 11A. Otherwise that point 732 is marked as a "no cut" point, here designated by the letter N in FIG. 11A.

Once all of the points 732, which typically number in the tens of thousands in large machined objects, have been classified as either Y points or N points, as seen in FIG. 11A, a short "no-cut" gap elimination process is undertaken wherein sequences of "no-cut" points 732 of less than a predetermined number of points, typically 4 points, are reclassified as "good to cut" points. FIG. 11A indicates such short "no-cut" gaps and their reclassification and FIG. 11B shows the reclassified sequences of points.

Figure 11B:
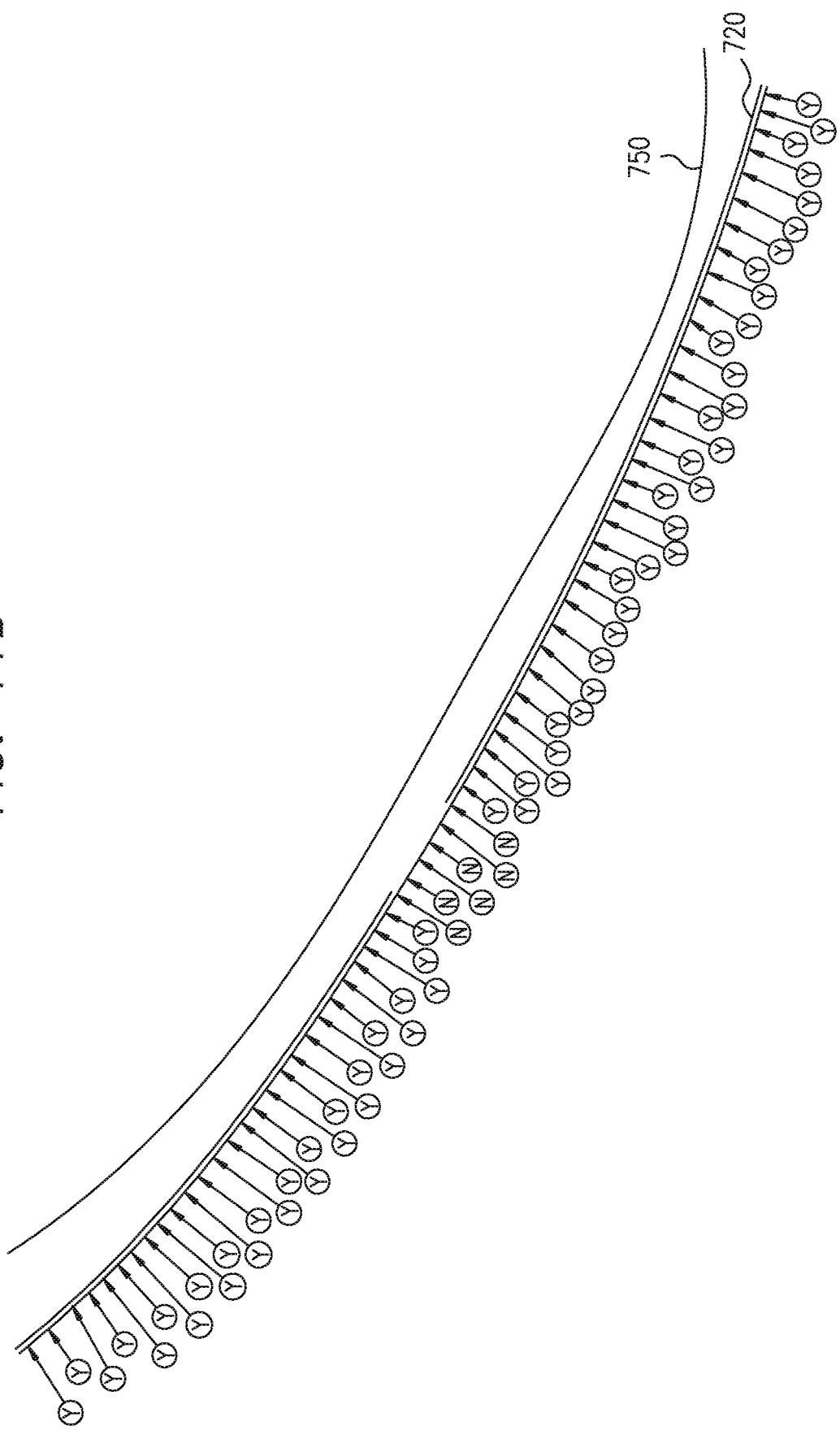
Figure 11C:
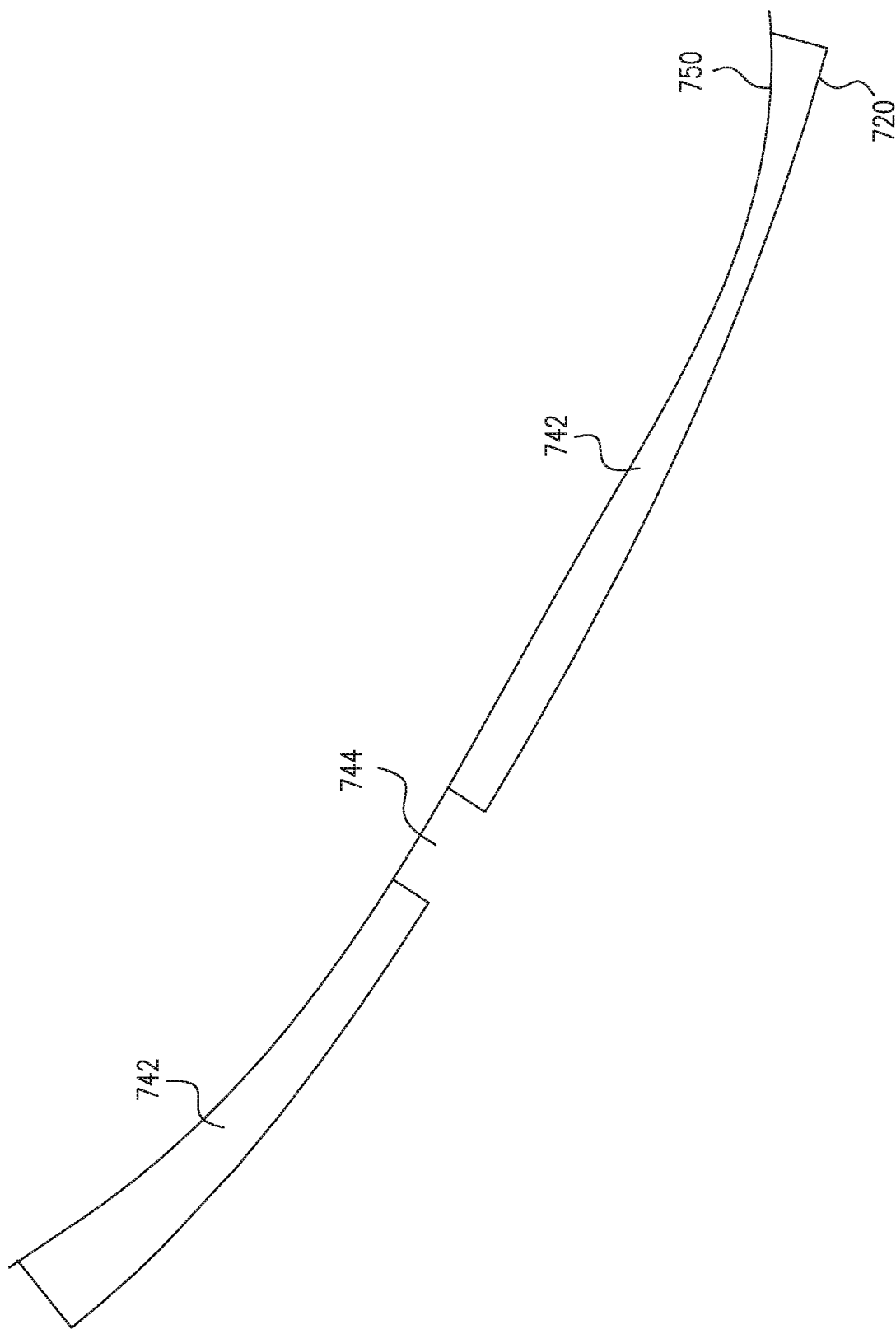
FIG. 11C is a simplified top view illustration of a portion of the workpiece of FIGS. 7-9B following the step-up cut illustrated in FIGS. 11A & 11B in accordance with a preferred embodiment of the present invention.

For each sequence of at least 4 contiguous "good to cut" points, an azimuthal cut region 742 is defined as illustrated in FIG. 11C and for each sequence of at least 4 contiguous "no-cut" points, an azimuthal no-cut region 744 is defined as illustrated in FIG. 11C.

It is appreciated that the depth of cut in a plane, perpendicular to the Z-axis, at a height represented by horizontal line 740, which indicates the width of the cut region 742 corresponding to each "good to cut" point 732 in FIG. 11B is determined by the separation between curve 739 and the intersection of the plane defined by horizontal line 740 with the offset surface 620. The intersection of the plane defined by horizontal line 740 with the offset surface 620 is a curve designated by reference numeral 750 and defines the base of a third step forward edge wall 752 and an edge of a second step floor surface 754 which lies at height 740.

It is further appreciated that the cut region 742 is preferably machined as a semi-open region as described hereinabove with reference to FIG. 4B.

Calculation of the height of a third step-up cut will now be described in detail with reference to FIG. 9C:

Initially, the height of a step from second step floor surface 754, which height represents the height of the third step, is calculated for a collection of mutually azimuthally separated points 762 densely distributed all along curve 750 representing the intersection of third step forward edge wall 752 with second step floor surface 754, as shown in FIGS. 9B & 9C as follows:

For each one of the collection of points 762, an imaginary vertical line 764, parallel to the Z-axis and along the third step forward wall 752, is constructed to extend through the point 762 and intersect at a point 766 with the scallop surface curve 630. The height of intersection point 766 is noted; and Taking the heights of the intersection points 766 of the imaginary vertical lines 764 with the scallop surface curve 630 for each point 762 in the collection of points all along the circumference of third step forward edge wall 752, the lowest height of an intersection point from among all of them is selected as the third step height and is identified as a point along line 764 and designated by reference numeral 768. A curve running through all points 768 along the circumference of third step forward edge wall 752 is designated by reference numeral 769.

Figure 12A:
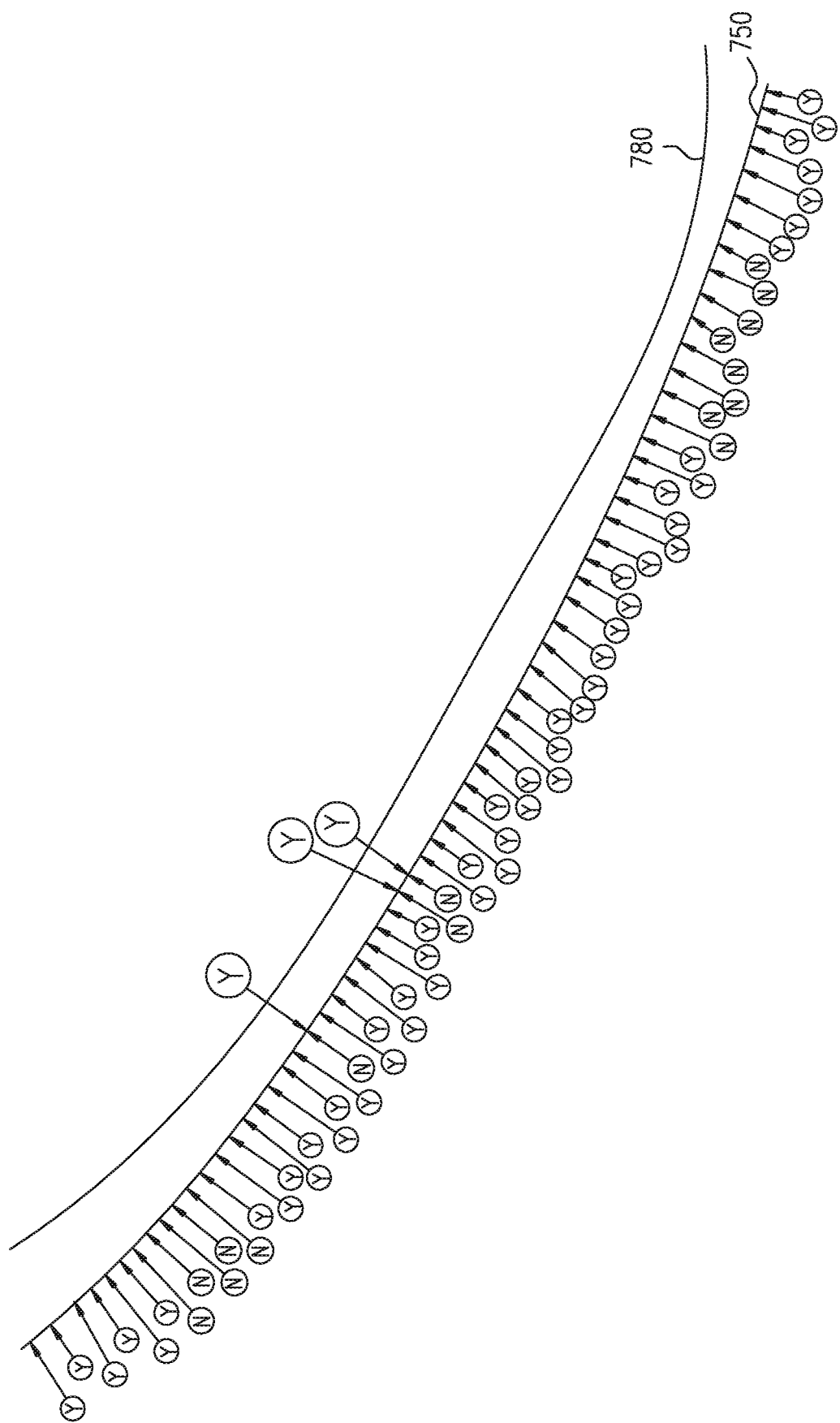
FIGS. 12A and 12B are simplified sectional illustrations of the workpiece of FIGS. 7-9C showing a first step-up cut in accordance with a preferred embodiment of the present invention.

An imaginary horizontal slice is taken through the workpiece of FIGS. 7, 8, 9A, 9B & 9C at the third step height represented by point 768 and is shown as a horizontal line designated 770 in FIG. 9C;

The normal distance 771 between the point 768 at height 770 and the scallop surface curve 630 is ascertained;

If normal distance 771 is less than the scallop tolerance, which is a predetermined value, the point 762 is marked as a "good to cut" point, here designated by the letter Y in FIG. 12A. Otherwise that point 762 is marked as a "no cut" point, here designated by the letter N in FIG. 12A.

Once all of the points 762, which typically number in the tens of thousands in large machined objects, have been classified as either Y points or N points, as seen in FIG. 12A, a short "no-cut" gap elimination process is undertaken wherein sequences of "no-cut" points 762 of less than a predetermined number of points, typically 4 points, are reclassified as "good to cut" points. FIG. 12A indicates such short "no-cut" gaps and their reclassification and FIG. 12B shows the reclassified sequences of points.

For each sequence of at least 4 contiguous "good to cut" points, an azimuthal cut region 772 is defined as illustrated in FIG. 12C and for each sequence of at least 4 contiguous "no-cut" points, an azimuthal no-cut region 774 is defined as illustrated in FIG. 12C.

Figure 12B:
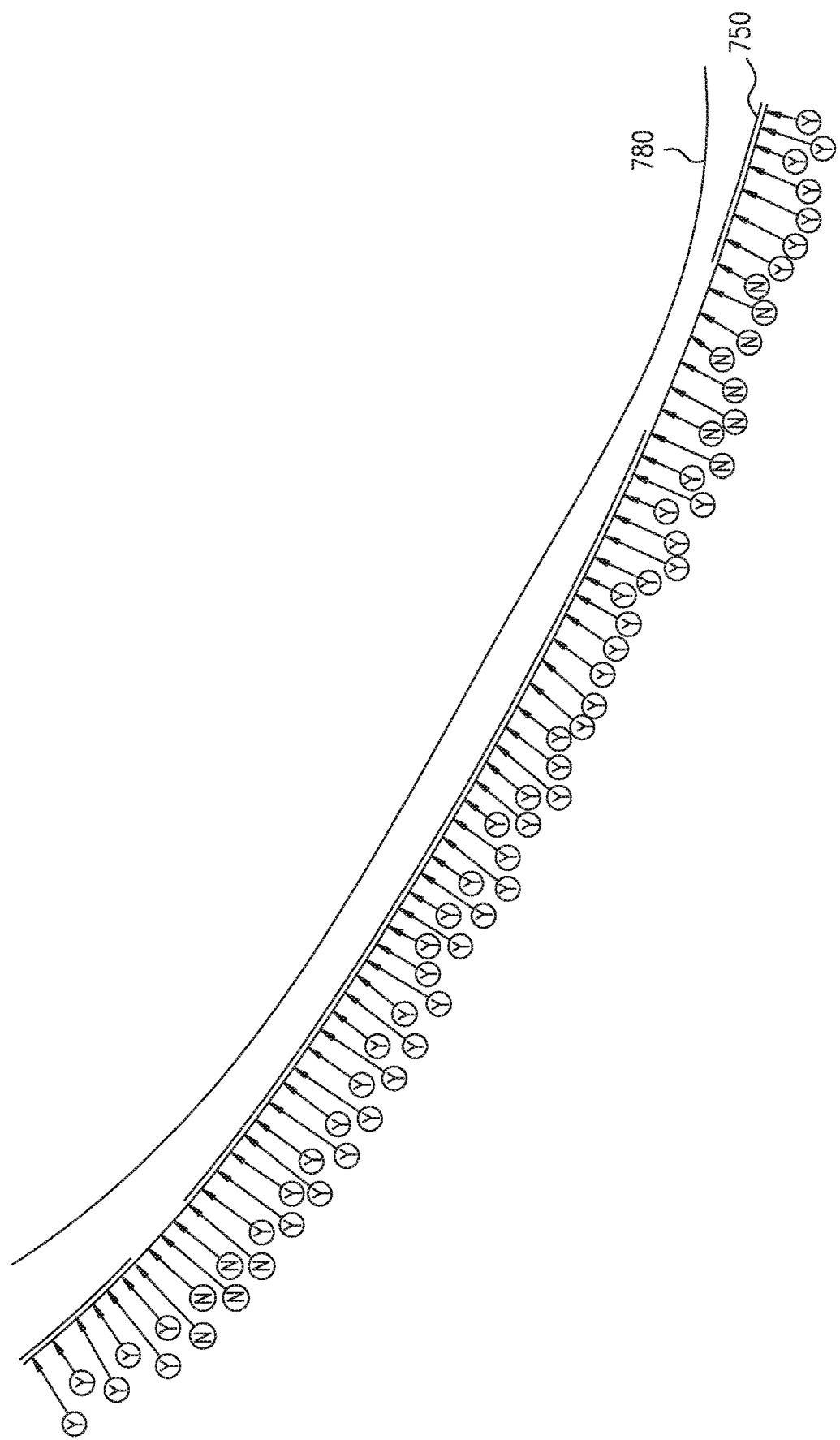

It is appreciated that the depth of cut in a plane, perpendicular to the Z-axis, at a height represented by horizontal line 770, which indicates the width of the cut region 772 corresponding to each "good to cut" point 762 in FIG. 12B is determined by the separation between curve 739 and the intersection of the plane defined by horizontal line 770 with the offset surface 620. The intersection of the plane defined by horizontal line 770 with the offset surface 620 is a curve designated by reference numeral 780 and defines the base of a fourth step forward edge wall 782 and an edge of a third step floor surface 784 which lies at height 770.

It is further appreciated that the cut region 772 is preferably machined as a semi-open region as described hereinabove with reference to FIG. 4B.

The foregoing process continues until step-up cuts reaching the top of workpiece 600 have been calculated. Once all of the step-up cut calculations have been completed, the order in which the various semi-open cut regions are to be machined is determined by application of known techniques and methodologies, which are outside of the scope of the present invention.

It will be appreciated that the aforesaid method of calculation of the step-up cut regions has at least the following beneficial results:

Generally ensuring that machined object 602 does not include material which extends beyond the designated scallop surface; and Generally ensuring that step-up machining of the workpiece 600 does not unnecessarily remove material which removal is not mandated by the designated scallop surface.

Figure 13:
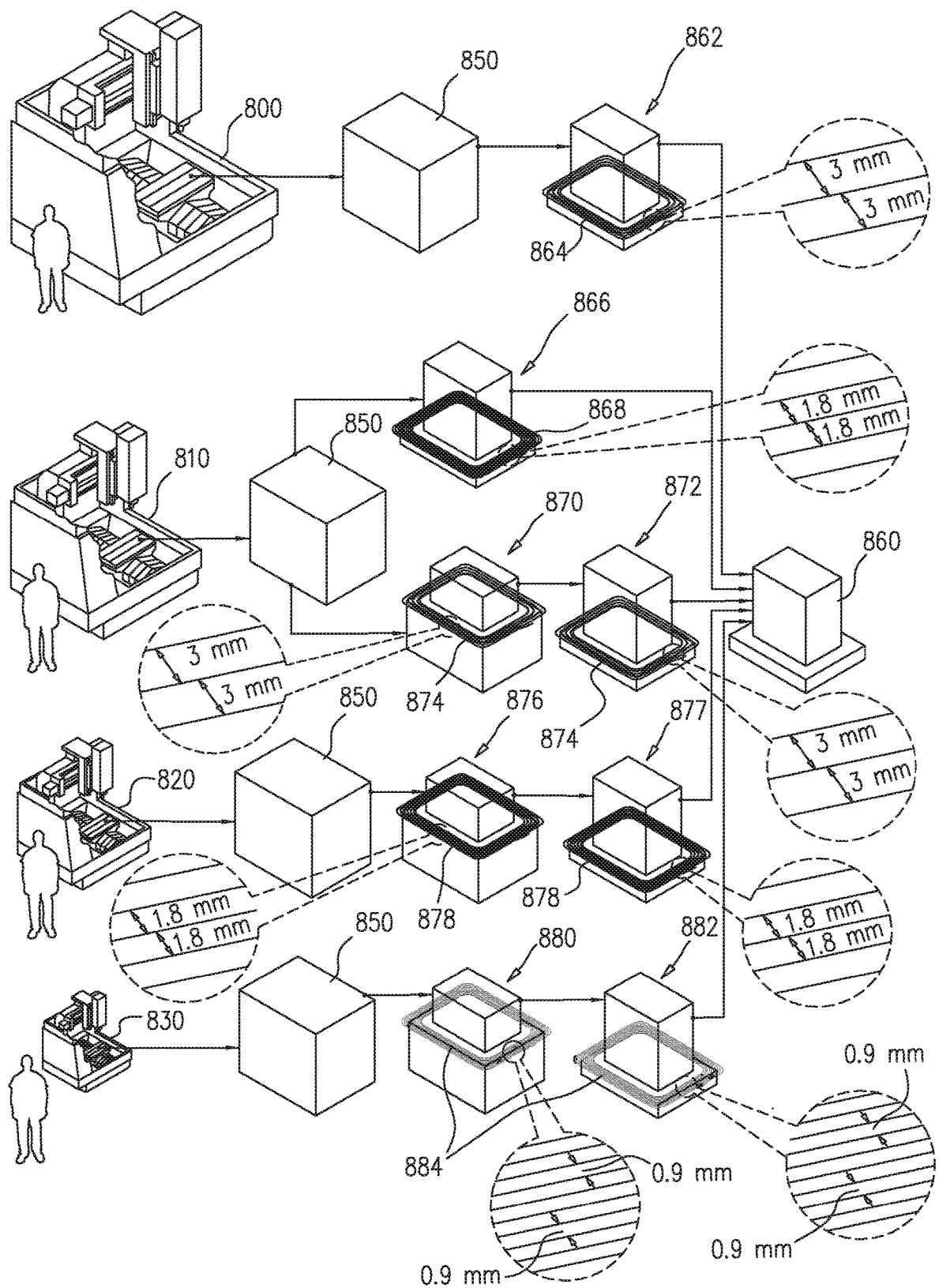
FIG. 13 is a simplified partially symbolic, partially pictorial illustration of exemplary selection of axial depth of cut and stepover as a function of available spindle power in accordance with a preferred embodiment of the present invention.

Reference is now made to FIG. 13, which is a simplified partially symbolic, partially pictorial illustration of exemplary selection of axial depth of cut and stepover as a function of available spindle power in accordance with a preferred embodiment of the present invention.

The method of the present invention described below in reference to FIG. 13 is an automated computer-implemented method for generating commands for controlling a computer numerically controlled milling machine to fabricate an object from a workpiece. In the illustrated embodiment of the present invention, the method includes the following steps:

ascertaining the available spindle power of the computer numerically controlled milling machine;

automatically selecting, using a computer, a maximum depth and width of cut, which are a function at least of the available spindle power of the computer numerically controlled milling machine; and configuring a tool path for the tool relative to the workpiece in which the tool path includes a plurality of tool path layers whose maximum thickness and width of cut correspond to the maximum depth and width of cut.

FIG. 13 illustrates four typical milling machines having four different levels of available spindle power. For example, milling machine 800 is a Makino A99 milling machine with a 50 KW spindle; milling machine 810 is a Makino A88e milling machine with a 30 KW spindle; milling machine 820 is a Haas VF2 milling machine with a 15 KW spindle and milling machine 830 is a MUGA Center R45-30 with a 5.5 KW spindle.

For the purposes of explanation, it is assumed that an identical workpiece, typically a block of steel 850, having typical dimensions of 300 mm by 300 mm by 150 mm, is machined by each of milling machines 800, 810, 820 and 830 to produce an identical machined object 860. For clarity, the block 850 and the machined object 860 are shown out of proportion to the size of the milling machines.

As seen in FIG. 13, milling machine 800, which has a relatively high spindle power, removes material from block 850 in a single step and following a toolpath which has a maximum stepover, typically 3 mm. This is shown at machining stage 862 and the toolpath is shown schematically and designated by reference numeral 864.

As further seen in FIG. 13, milling machine 810, which has a medium spindle power, may remove material from block 850 in one of two alternative procedures. In a first of such alternative procedures, milling machine 810 removes material from block 850 in a single step and following a toolpath which has an intermediate stepover, typically 1.8 mm. This is shown at machining stage 866 and the toolpath is shown schematically and designated by reference numeral 868.

In a second of such alternative procedures, milling machine 810 removes material from block 850 in two steps and following a toolpath which has a maximum stepover, typically 3 mm. This is shown at machining stages 870 and 872 and the toolpaths are shown schematically and designated by reference numeral 874.

As additionally seen in FIG. 13, milling machine 820, which has a low spindle power, removes material from block 850 in two steps and following a toolpath which has an intermediate stepover, typically 1.8 mm. This is shown at machining stages 876 and 877 and the toolpath is shown schematically and designated by reference numeral 878.

As further seen in FIG. 13, milling machine 830, which has a very low spindle power, removes material from block 850 in two steps and following a toolpath which has an low stepover, typically 0.9 mm. This is shown at machining stages 880 and 882 and the toolpath is shown schematically and designated by reference numeral 884.

It is appreciated that the foregoing description of FIG. 13 is merely illustrative of the functionality of an embodiment of the present invention and that additional parameters, such as feed speed and rpm may additionally be varied as a function of spindle power.

Figure 14:
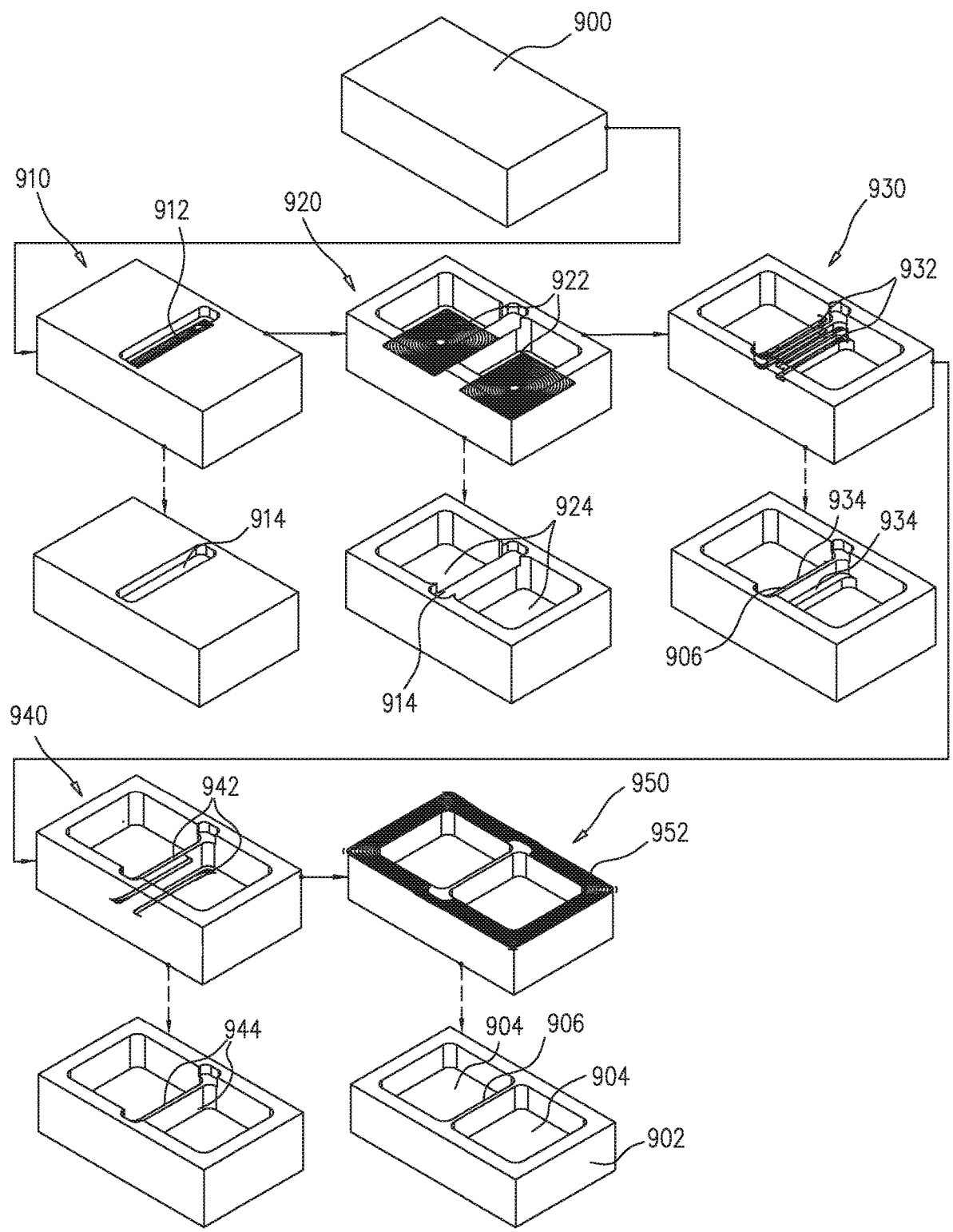
FIG. 14 is a simplified pictorial illustration of tool paths for machining objects having thin walls in accordance with a preferred embodiment of the present invention.

Reference is now made to FIG. 14, which is a simplified pictorial illustration of tool paths for machining objects having thin walls in accordance with a preferred embodiment of the present invention.

The embodiment of the present invention described below with reference to FIG. 14 provides an automated computer-implemented system and method for generating commands for controlling a computer numerically controlled milling machine to fabricate an object having a relatively thin wall from a workpiece. As illustrated, the system and method include automatically selecting, using a computer, a tool path having the following functional features:

initially machining the workpiece at first maximum values of cutting depth, cutting width, cutting speed and cutting feed to have a relatively thick wall at the location of an intended relatively thin wall;

reducing the height of the relatively thick wall to the intended height of the intended relatively thin wall; and thereafter reducing the thickness of the thick wall by machining the workpiece at second maximum values of cutting depth, cutting width, cutting speed and cutting feed, at least one of the second maximum values being less than a corresponding one of the first maximum values.

For the purposes of explanation, it is assumed that a workpiece, typically a block of steel 900, having typical dimensions of 220 mm by 120 mm by 60 mm, is machined to produce a machined object 902 having internal pockets 904 each of dimensions 100 mm by 100 mm by 30 mm, separated by a thin wall 906 having a thickness of 1 mm and a height of 30 mm.

At a machining stage 910, a toolpath 912 is followed, producing an initial cut 914 overlying the location of the thin wall 906 and having a width greater than the intended thickness of the thin wall 906.

Thereafter, at a machining stage 920, a toolpath 922 is followed producing two cuts 924 corresponding to internal pockets 904.

Thereafter, at a machining stage 930, a toolpath 932 is followed producing two cuts 934 defining an upper portion of thin wall 906.

Thereafter, at a machining stage 940, a toolpath 942 is followed producing two cuts 944, below cuts 934, defining a lower portion of thin wall 906.

Finally, at a machining stage 950, a toolpath 952 is followed reducing the height of the machined object 902 to the height of the thin wall 906.

Figure 15:
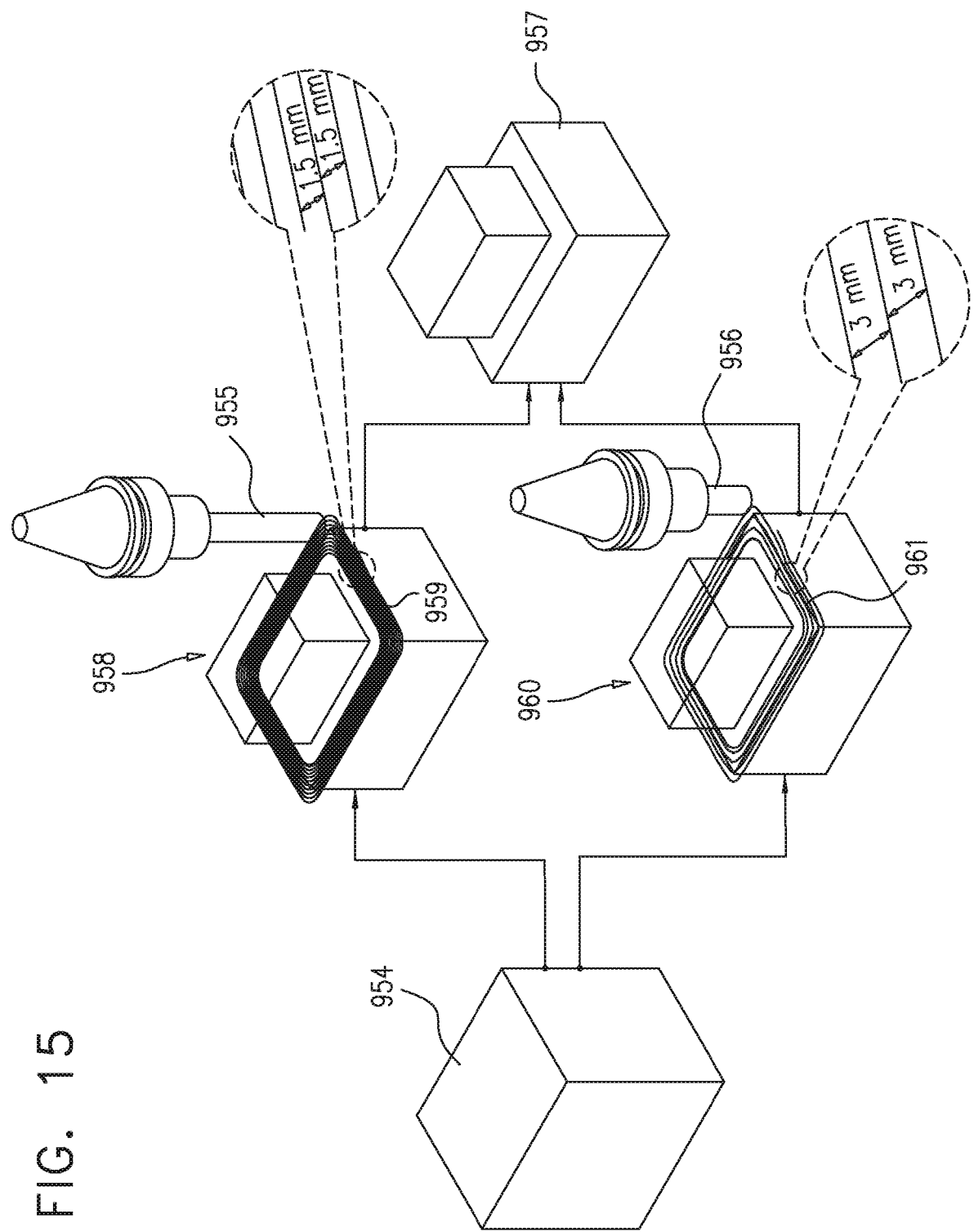
FIG. 15 is a simplified partially symbolic, partially pictorial illustration of varying stepover as a function of tool overhang in accordance with a preferred embodiment of the present invention.

Reference is now made to FIG. 15, which is a simplified, partially symbolic, partially pictorial illustration of exemplary selection of milling aggressiveness such as feed speed, rpm, axial depth of cut and stepover as a function of tool overhang in accordance with a preferred embodiment of the present invention. For the purpose of conciseness only stepover as a function of tool overhang is illustrated in FIG. 15.

The embodiment of the present invention described below with reference to FIG. 15 provides an automated computer-implemented method for generating commands for controlling a computer numerically controlled milling machine to fabricate an object. In the illustrated embodiment, the system and method include the following:

ascertaining the extent of tool overhang of a tool being used in the computer numerically controlled milling machine; and automatically selecting, using a computer, a tool path which is a function of the tool overhang, the tool path having the following characteristics:

for a first tool overhang selecting a tool path having first maximum values of cutting depth, cutting width, cutting speed and cutting feed;

for a second tool overhang which is greater than the first tool overhang, selecting a tool path having second maximum values of cutting depth, cutting width, cutting speed and cutting feed, at least one of the second maximum values being less than a corresponding one of the first maximum values.

FIG. 15 shows a workpiece, typically a block of steel 954, having typical dimensions of 300 mm by 300 mm by 150 mm, which is machined by each of two milling tools 955 and 956 to produce an identical machined object 957. For clarity, the block 954 and the machined object 957 are shown out of proportion to the size of the milling tools 955 and 956.

As seen in FIG. 15, milling tool 955, which has a relatively long tool overhang, typically 150 mm, removes material from block 954 following a toolpath which has a relatively small stepover, typically 1.5 mm. This is shown at machining stage 958 and the toolpath is shown schematically and designated by reference numeral 959.

As further seen in FIG. 15, milling tool 956, which has a relatively short tool overhang, typically 60 mm, removes material from block 954 following a toolpath which has a relatively large stepover, typically 3 mm. This is shown at machining stage 960 and the toolpath is shown schematically and designated by reference numeral 961.

Figure 16:
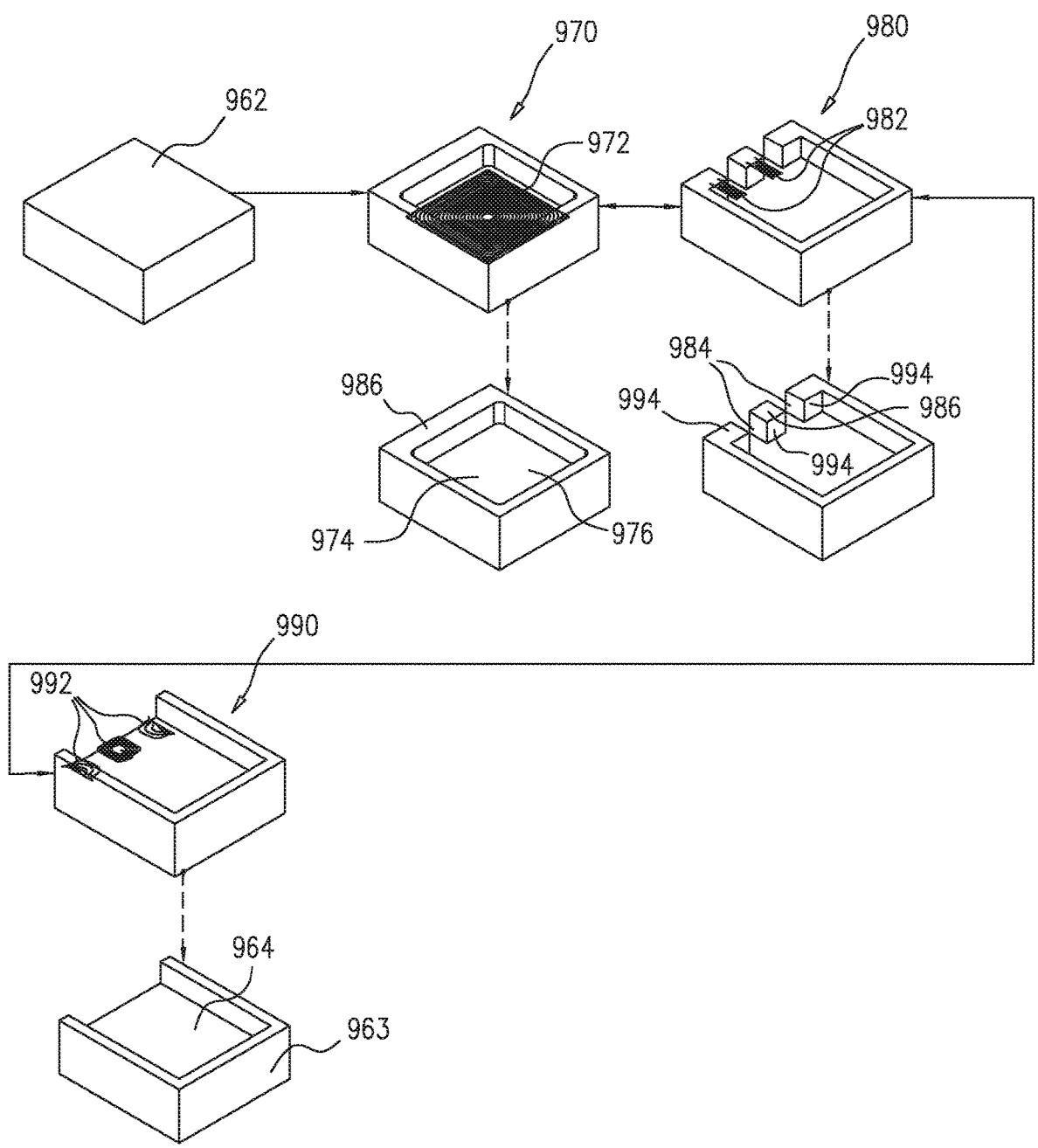
FIG. 16 is a simplified pictorial illustration of machining functionality in accordance with another preferred embodiment of the present invention.

Reference is now made to FIG. 16, which is a simplified pictorial illustration of machining functionality in accordance with another preferred embodiment of the present invention.

The embodiment of the present invention described below with reference to FIG. 16 provides an automated computer-implemented method and system for generating commands for controlling a computer numerically controlled milling machine to fabricate an object having a semi-open region. In the illustrated embodiment of the present invention, the method and system includes the following:

estimating, using a computer, a first machining time for machining the semi-open region using a generally trichoidal type tool path;

estimating, using a computer, a second machining time for machining the semi-open region using a generally spiral type tool path; and automatically selecting, using a computer, a tool path type having a shorter machining time.

For the purposes of explanation, it is assumed that a workpiece, typically a block of steel 962, having typical dimensions of 150 mm by 120 mm by 50 mm, is machined to produce a machined object 963 having a semi-open pocket 964 of dimensions 140 mm by 100 mm by 20 mm At a machining stage 970, a toolpath 972 is followed, producing an initial cut 974 resulting in a closed pocket 976. It is a particular feature of this embodiment of the present invention that the system initially machines the workpiece to define a geometry, here a closed pocket, which differs from the desired final geometry, here an semi-open pocket. This has an advantage in that it enables the machining of the pocket to be mainly done using a spiral tool path.

Thereafter, at a machining stage 980, a toolpath 982 is followed, producing mutually spaced channels 984 extending through a wall 986, which separates the closed pocket 976 from the edge of the workpiece. It is a particular feature of this embodiment of the present invention that the system initially machines channels in a wall which is ultimately to be removed.

Thereafter, at a machining stage 990, a toolpath 992 is followed, removing blocks 994 which remained in the wall 986 following cutting of the channels 984 and thereby defining the semi-open pocket 964.

Figure 17:
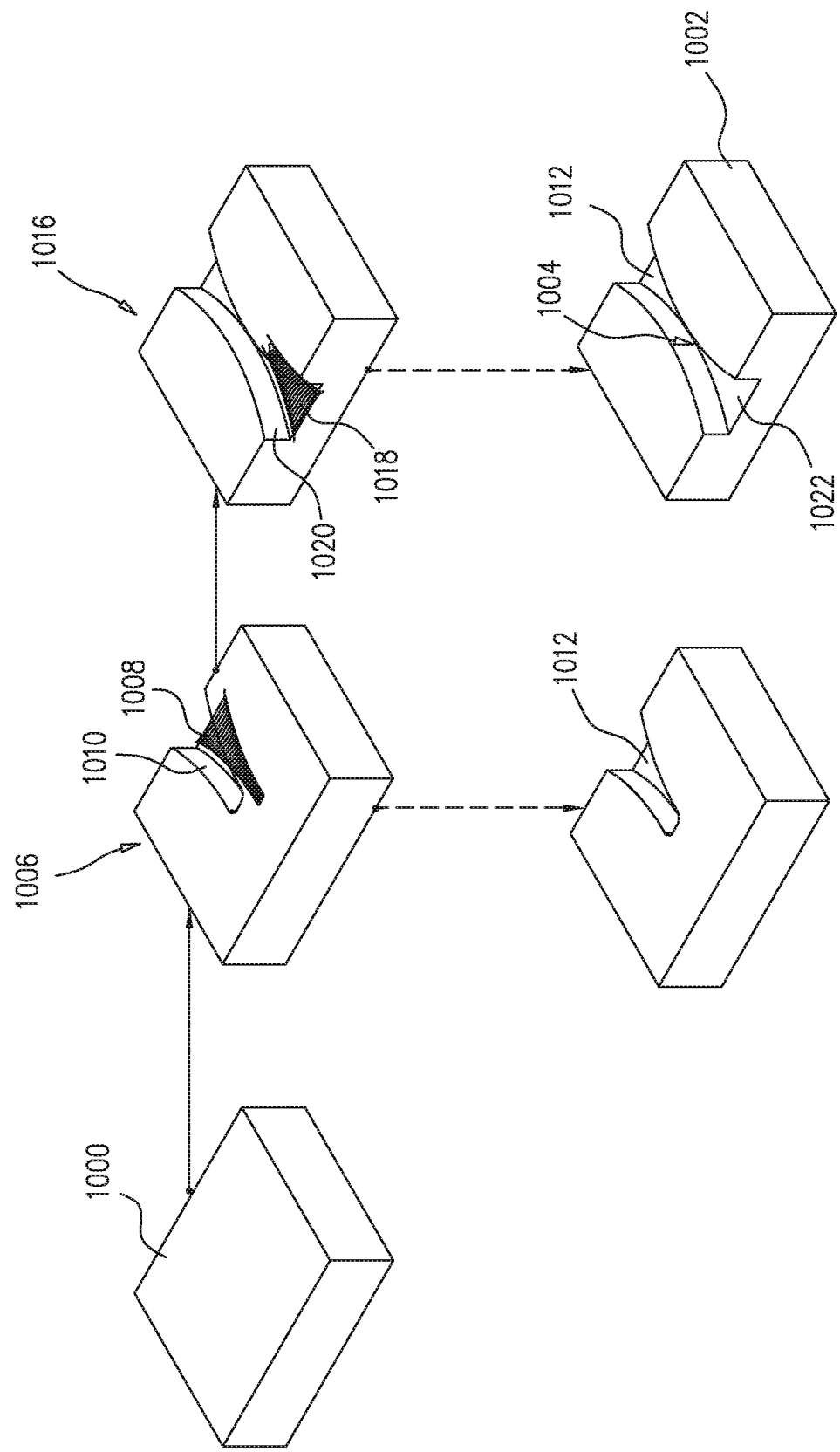
FIG. 17 is a simplified pictorial illustration of tool paths for machining objects having an hourglass-shaped channel in accordance with a preferred embodiment of the present invention.

Reference is now made to FIG. 17, which is a simplified pictorial illustration of tool paths for machining objects having an hourglass-shaped channel in accordance with a preferred embodiment of the present invention.

The embodiment of the present invention described below with reference to FIG. 17 provides an automated computer-implemented system and method for generating commands for controlling a computer numerically controlled milling machine to fabricate an object having a channel open at both its ends and including an intermediate narrowest portion. In the illustrated embodiment of the present invention the method includes automatically selecting, using a computer, a tool path type having first and second tool path portions, each starting at a different open end of the channel, the first and second tool path portions meeting at the intermediate narrowest portion.

For the purposes of explanation, it is assumed that a workpiece, typically a block of steel 1000, having typical dimensions of 150 mm by 120 mm by 50 mm, is machined to produce a machined object 1002 having an hourglass-shaped channel 1004 which is open on both ends thereof.

At a machining stage 1006, a toolpath 1008 is followed, producing an initial cut 1010, resulting in an inwardly tapered semi open pocket 1012.

Thereafter, at a machining stage 1016, a toolpath 1018 is followed, producing a further cut 1020, resulting in an inwardly tapered semi open pocket 1022 joined to pocket 1012 at a narrow point and defining therewith hourglass-shaped channel 1004 which is open on both ends thereof.

It is a particular feature of this embodiment of the present invention that the system machines a channel in multiple stages so that thin wall machining takes place at a point of minimum width of the channel.

Reference is now made to Fig. objectobjectobject18, which is a simplified pictorial illustration of tool paths for machining objects which are calculated based on optimal cutting conditions for a maximum cutting depth and tool paths for cutting portions which involve cutting at less than the maximum cutting depth are calculated based on modified cutting conditions optimized for cutting at a depth less than the maximum cutting depth.

The embodiment of the present invention described below with reference to FIG. 18 provides an automated computer-implemented system and method for generating commands for controlling a computer numerically controlled milling machine to fabricate an object which fabrication involves cutting a workpiece at least first and second different maximum depths of cut, wherein said first maximum depth of cut is greater than said second maximum depth of cut. In the illustrated embodiment of the present invention, the method includes automatically selecting, using a computer, at least first and second tool paths having corresponding first and second maximum values of cutting width, cutting speed and cutting feed, at least one of said second maximum values being greater than a corresponding one of said first maximum values.

For the purposes of explanation, it is assumed that a workpiece, typically a block of steel 1200, having typical dimensions of 150 mm by 120 mm by 50 mm, is machined to produce a machined object 1202 having a semi-open pocket 1204 having a ledge 1206.

At a machining stage 1210, a toolpath 1212 is followed, producing an initial cut 1214, resulting in a semi-open pocket 1216. Toolpath 1212 has a relatively small stepover, typically 1.5 mm.

Thereafter, at a machining stage 1220, a toolpath 1222 is followed, producing a cut 1224, resulting in a semi-open ledge 1226. Toolpath 1222 has a relatively large stepover, typically 3 mm.

It is a particular feature of this embodiment of the present invention that the system adjusts the cutting conditions to ensure that the mechanical load experienced by the milling tool is at a generally constant optimized value.

Figure 19A:
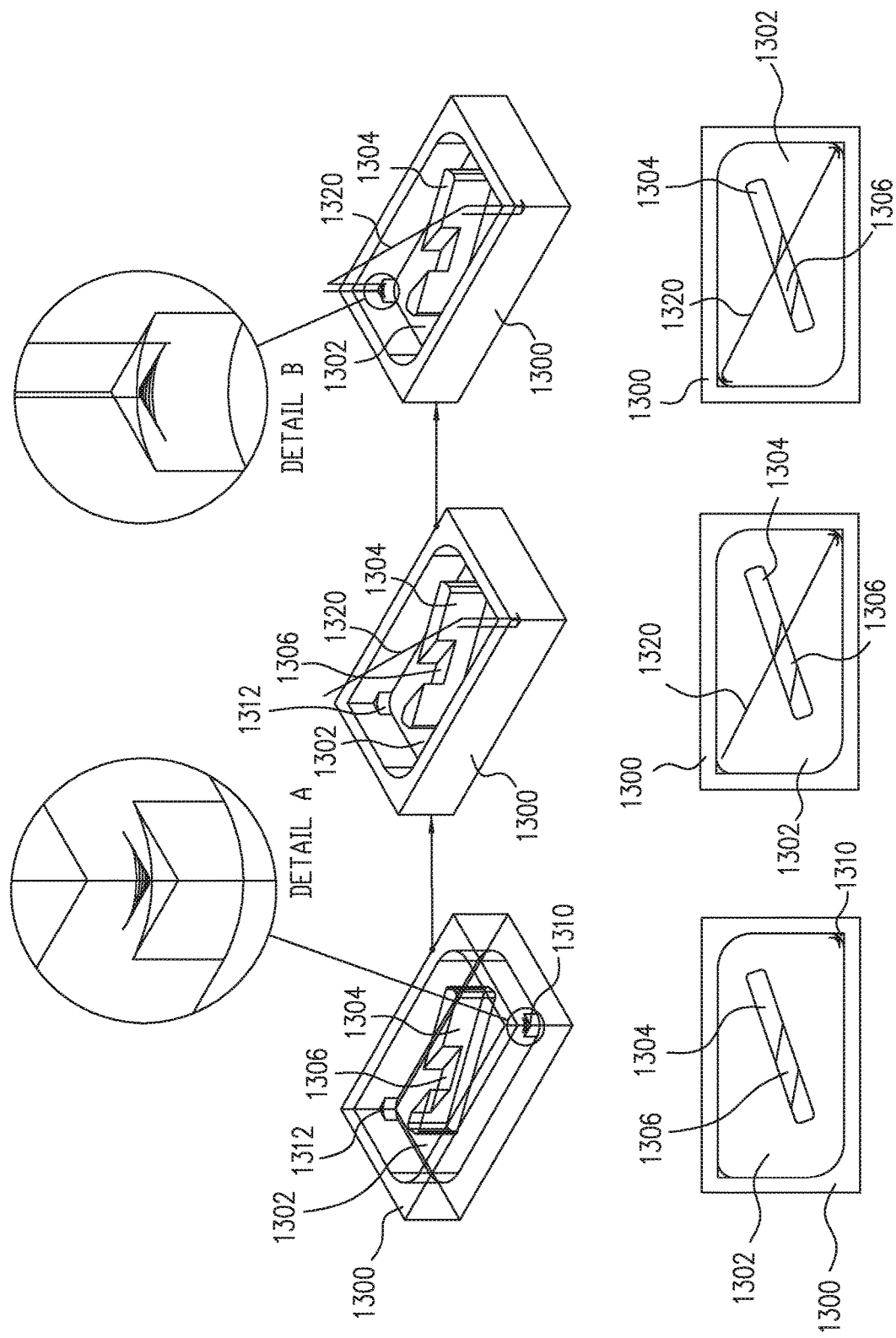
FIGS. 19A, 19B and 19C are simplified illustrations of three alternative tool repositioning moves from the end of one tool path to the beginning of a subsequent tool path in the same pocket in accordance with a preferred embodiment of the present invention.
Figure 19B:
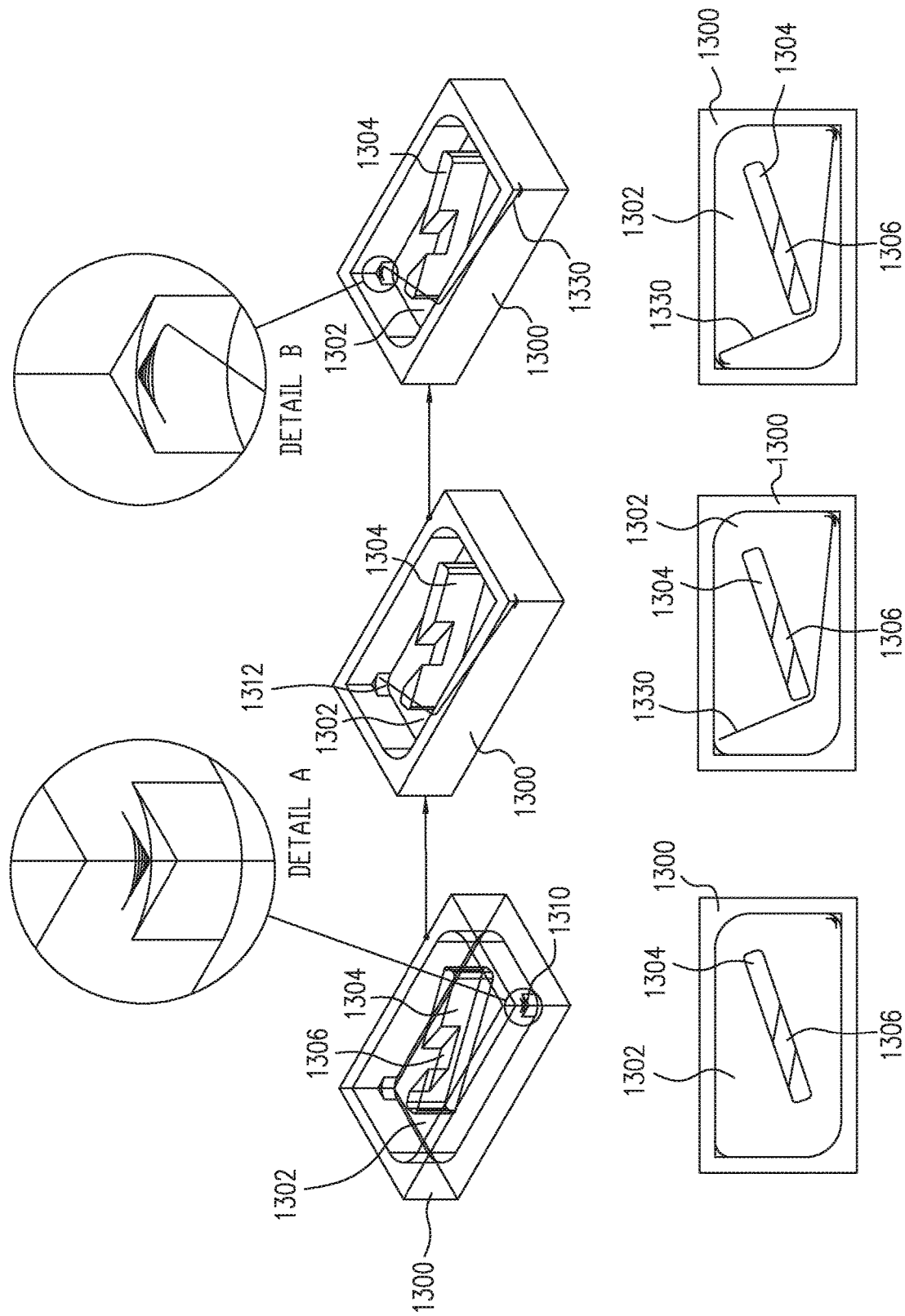
Figure 19C:
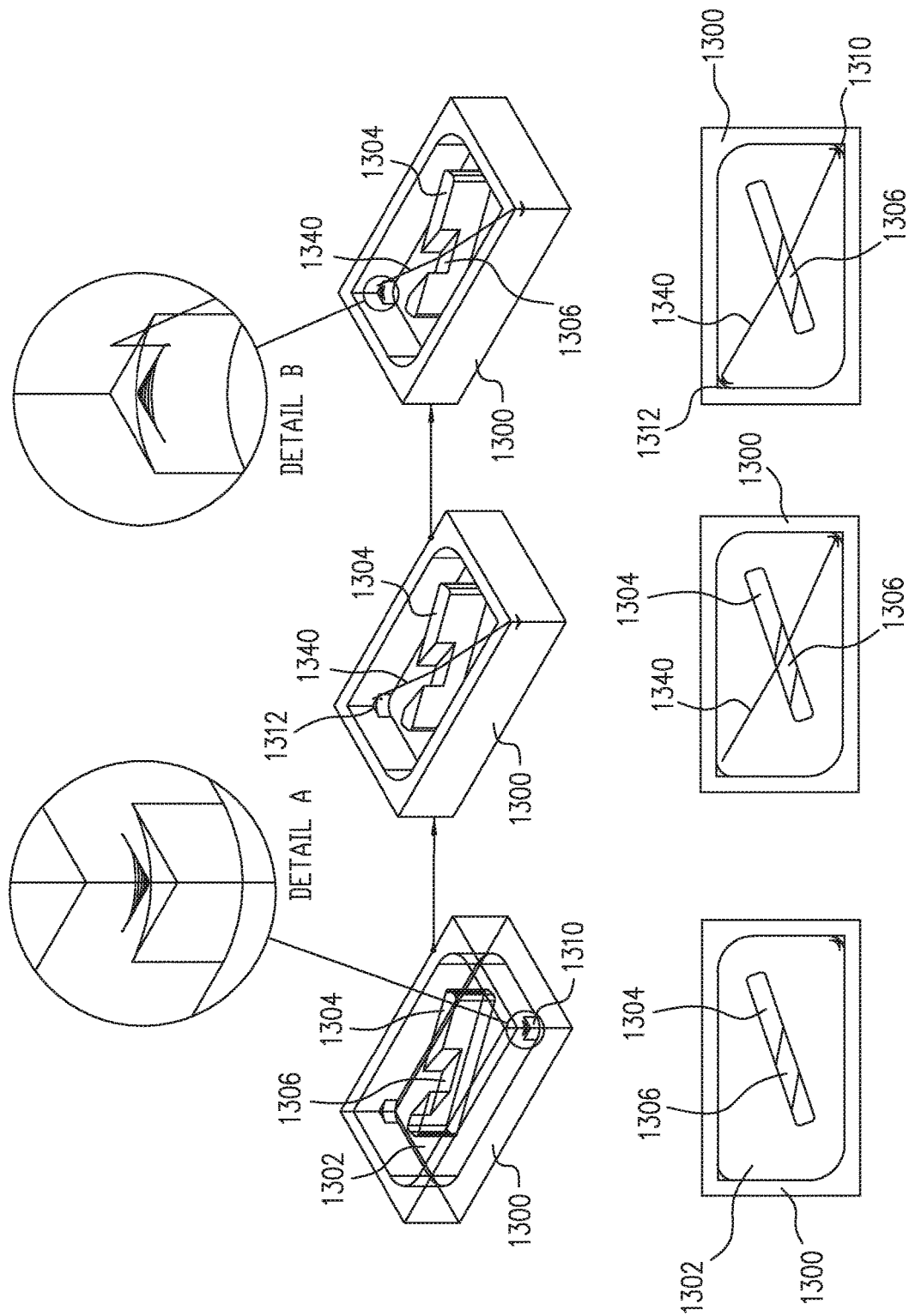

Reference is now made to FIGS. 19A, 19B and 19C, which are simplified illustrations of three alternative tool repositioning moves from the end of one tool path to the beginning of a subsequent tool path in the same pocket in accordance with a preferred embodiment of the present invention. Each of FIGS. 19A, 19B and 19C includes a pictorial view and a top view, for the purpose of clarity.

The embodiment of the present invention described below with reference to FIGS. 19A-19C provides an automated computer-implemented system and method for generating commands for controlling a computer numerically controlled milling machine to fabricate an object, wherein fabrication of the object involves calculating multiple tool paths requiring tool repositioning therebetween along a selectable repositioning path. In the illustrated embodiment of the present invention, the method includes the following steps which can take place multiple times, each for a different repositioning between tool path segments:

estimating, using a computer, a first repositioning time for a first repositioning path which includes travel in a clearance plane above a workpiece;

estimating, using a computer, a second repositioning time for a second repositioning path which does not include tool travel in the clearance plane; and automatically selecting, using a computer, a repositioning path having a shortest repositioning time.

For the purposes of explanation, there is illustrated a partially machined workpiece 1300, having typical maximum outer dimensions of 150 mm by 120 mm by 50 mm.

As seen, the workpiece 1300 has formed therein a closed pocket 1302 having an island 1304 formed with a slot 1306 extending therethrough. Machining of a first corner ledge 1310, involving a first tool path segment, has been completed and the tool must be repositioned to machine a second corner ledge 1312, involving a second tool path segment.

In FIG. 19A the tool follows a repositioning path 1320 which draws the tool initially upwardly from ledge 1310 beyond the top of the workpiece 1300 and then across the workpiece at a uniform height in a straight line to a location above ledge 1312 to be machined and then downwardly to machine ledge 1312. The tool travel time for repositioning path 1320 is calculated.

In FIG. 19B the tool follows an alternative repositioning path 1330 which draws the tool without changing its height, from ledge 1310 around island 1304 to the appropriate location of the tool for milling ledge 1312. The tool travel time for repositioning path 1330 is calculated.

In FIG. 19C the tool follows a further repositioning path 1340 which draws the tool initially upwardly from ledge 1310 to a minimum height, below the top of the workpiece 1300, at which height the tool clears the island 1304 and then across the workpiece at this height, not necessarily in a straight line to a location above ledge 1312 to be machined and then downwardly to machine ledge 1312. The tool travel time for repositioning path 1340 is calculated. In this case, the repositioning path 1340 passes through slot 1306 and is not necessarily collinear with a line connecting the locations of ledges 1310 and 1312. The tool travel time for repositioning path 1340 is calculated.

The tool travel times for the above three reposition paths are compared and the repositioning path having the shortest tool travel time is employed.

It is a particular feature of this embodiment of the present invention that the repositioning path having a minimum tool travel time is employed.

It will be appreciated by persons skilled in the art that the present invention is not limited by what has been particularly claimed hereinbelow. Rather the scope of the present invention includes various combinations and subcombinations of the features described hereinabove as well as modifications and variations thereof as would occur to persons skilled in the art upon reading the foregoing description with reference to the drawings and which are not in the prior art.

The invention claimed is:

1. An automated computer-implemented method for generating commands for controlling a computer numerically controlled milling machine to fabricate an object having a relatively thin wall from a workpiece, the method comprising:
   automatically selecting, using a computer, a tool path having the following characteristics:
      initially machining said workpiece at first maximum values of cutting depth, cutting width, cutting speed and cutting feed to define a relatively thick wall at the location of an intended relatively thin wall, said relatively thick wall being defined by machining said workpiece on two opposite sides of said relatively thick wall; and thereafter
      reducing the thickness of the thick wall by machining said workpiece, from said two opposite sides of said relatively thick wall, at second maximum values of cutting depth, cutting width, cutting speed and cutting feed, at least one of said second maximum values being less than a corresponding one of said first maximum values, said reducing the thickness comprising:
         machining said workpiece to define an upper portion of said relatively thin wall, said upper portion of said relatively thin wall being defined by machining said workpiece on two opposite sides of an upper portion of said relatively thick wall; and
         thereafter machining said workpiece to define a lower portion of said relatively thin wall, said lower portion of said relatively thin wall being defined by machining said workpiece on two opposite sides of a lower portion of said relatively thick wall.

2. An automated computer-implemented method for generating commands for controlling a computer numerically controlled milling machine according to claim 1 and wherein said characteristics also comprise machining said workpiece to reduce the height of the relatively thick wall to the intended height of the intended relatively thin wall.

3. An automated computer-implemented method for generating commands for controlling a computer numerically controlled milling machine according to claim 1 and wherein said characteristics also comprise machining said workpiece to reduce the height of the relatively thick wall to the intended height of the intended relatively thin wall prior to said initially machining.

4. An automated computer-implemented method for generating commands for controlling a computer numerically controlled milling machine according to claim 1 and wherein said characteristics also comprise machining said workpiece to reduce the height of said object to the height of said thin wall.

5. An automated computer-implemented apparatus for generating commands for controlling a computer numerically controlled milling machine to fabricate an object having a relatively thin wall from a workpiece, the apparatus comprising a tool path configuration engine operative for:
   automatically selecting, using a computer, a tool path having the following characteristics:
      initially machining said workpiece at first maximum values of cutting depth, cutting width, cutting speed and cutting feed to define a relatively thick wall at the location of an intended relatively thin wall, said relatively thick wall being defined by machining said workpiece on two opposite sides of said relatively thick wall; and
      thereafter reducing the thickness of the thick wall by machining said workpiece, from said two opposite sides of said relatively thick wall, at second maximum values of cutting depth, cutting width, cutting speed and cutting feed, at least one of said second maximum values being less than a corresponding one of said first maximum values, said reducing the thickness comprising:
         machining said workpiece to define an upper portion of said relatively thin wall, said upper portion of said relatively thin wall being defined by machining said workpiece on two opposite sides of an upper portion of said relatively thick wall; and
         thereafter machining said workpiece to define a lower portion of said relatively thin wall, said lower portion of said relatively thin wall being defined by machining said workpiece on two opposite sides of a lower portion of said relatively thick wall.

6. An automated computer-implemented apparatus for generating commands for controlling a computer numerically controlled milling machine according to claim 5 and wherein said characteristics also comprise machining said workpiece to reduce the height of the relatively thick wall to the intended height of the intended relatively thin wall.

7. An automated computer-implemented apparatus for generating commands for controlling a computer numerically controlled milling machine according to claim 5 and wherein said characteristics also comprise machining said workpiece to reduce the height of the relatively thick wall to the intended height of the intended relatively thin wall prior to said initially machining.

8. An automated computer-implemented apparatus for generating commands for controlling a computer numerically controlled milling machine according to claim 5 and wherein said characteristics also comprise machining said workpiece to reduce the height of said object to the height of said thin wall.

\* \* \* \* \*